United States Patent
Umeda et al.

(10) Patent No.: US 11,953,664 B2
(45) Date of Patent: Apr. 9, 2024

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Takeshi Umeda, Fujisawa (JP); Tomoki Ito, Kawasaki (JP); Atsushi Shibayama, Tokyo (JP)

(73) Assignee: Nikon Corporation, Tokyo (JP)

(*) Notice: Subject to any disclaimer, the term of this patent is extended or adjusted under 35 U.S.C. 154(b) by 35 days.

(21) Appl. No.: 17/588,269

(22) Filed: Jan. 29, 2022

(65) Prior Publication Data

US 2022/0155572 A1    May 19, 2022

Related U.S. Application Data

(63) Continuation of application No. 16/334,021, filed as application No. PCT/JP2017/036289 on Oct. 5, 2017, now Pat. No. 11,269,167.

(30) Foreign Application Priority Data

Oct. 7, 2016  (JP) .................................. 2016-198640

(51) Int. Cl.
*G02B 15/14* (2006.01)
*G02B 15/16* (2006.01)
(Continued)

(52) U.S. Cl.
CPC ............... *G02B 15/145105* (2019.08); *G02B 15/143103* (2019.08); *G02B 15/20* (2013.01);
(Continued)

(58) Field of Classification Search
None
See application file for complete search history.

(56) References Cited

U.S. PATENT DOCUMENTS

| 6,141,156 A | 10/2000 | Aoki |
|---|---|---|
| 7,907,354 B2 | 3/2011 | Take |

(Continued)

FOREIGN PATENT DOCUMENTS

| JP | H02-207210 A | 8/1990 |
|---|---|---|
| JP | 2011-186417 A | 9/2011 |

(Continued)

OTHER PUBLICATIONS

Office Action dated Aug. 12, 2022, in Chinese Patent Application No. 202110533232.3.
(Continued)

*Primary Examiner* — Darryl J Collins
(74) *Attorney, Agent, or Firm* — Potomac Law Group, PLLC

(57) ABSTRACT

A zoom optical system includes a positive first lens group, a negative second lens group disposed on an image side of the first lens group, a positive third lens group disposed on an image side of the second lens group, a negative fourth lens group disposed on an image side of the third lens group, and a final lens group disposed on an image side of the fourth lens group and closest to an image. During zooming, distances between lens groups change, and the first lens group moves along an optical axis. A negative focusing lens group is provided, and the final lens group is disposed on an image side of the focusing lens group. A negative vibration proof group of the second lens group may include, in order from an object, a negative lens, an air gap and a cemented lens of a negative lens and a positive lens. The final lens group may have negative refractive power.

17 Claims, 105 Drawing Sheets

(51) Int. Cl.
*G02B 15/20* (2006.01)
*G02B 15/22* (2006.01)
*H04N 23/69* (2023.01)
*G02B 13/18* (2006.01)

(52) U.S. Cl.
CPC ............ *H04N 23/69* (2023.01); *G02B 13/18* (2013.01); *G03B 2205/0046* (2013.01)

(56) References Cited

U.S. PATENT DOCUMENTS

| | | | |
|---|---|---|---|
| 9,261,683 | B2 | 2/2016 | Noguchi et al. |
| 9,509,912 | B2 | 11/2016 | Okumura |
| 2010/0321791 | A1* | 12/2010 | Hayakawa ............ G02B 15/173 359/683 |
| 2011/0007403 | A1* | 1/2011 | Matsuo .......... G02B 15/145113 359/683 |
| 2011/0019033 | A1 | 1/2011 | Ori et al. |
| 2011/0242648 | A1 | 10/2011 | Mizuta et al. |
| 2012/0092777 | A1 | 4/2012 | Tochigi et al. |
| 2012/0242887 | A1 | 9/2012 | Matsumura et al. |
| 2014/0211029 | A1* | 7/2014 | Okumura ....... G02B 15/145113 359/557 |
| 2014/0218800 | A1 | 8/2014 | Li et al. |
| 2014/0333821 | A1 | 11/2014 | Hagiwara |
| 2015/0070534 | A1 | 3/2015 | Noguchi et al. |
| 2015/0085165 | A1 | 3/2015 | Maruyama et al. |
| 2016/0018630 | A1 | 1/2016 | Ori et al. |
| 2016/0025955 | A1* | 1/2016 | Ito .......................... G02B 1/113 359/557 |
| 2016/0349491 | A1 | 12/2016 | Suzuki |
| 2017/0192212 | A1* | 7/2017 | Yamamoto ............. G02B 15/20 |
| 2018/0031812 | A1 | 2/2018 | Suzuki |

FOREIGN PATENT DOCUMENTS

| | | |
|---|---|---|
| JP | 2012-083601 A | 4/2012 |
| JP | 2014-219616 A | 11/2014 |
| JP | 2015-055697 A | 3/2015 |
| JP | 2015-064492 A | 4/2015 |
| JP | 2015-072369 A | 4/2015 |
| JP | 2015-102588 A | 6/2015 |
| WO | WO 2010/073565 A1 | 7/2010 |

OTHER PUBLICATIONS

Extended European search report dated Feb. 6, 2023, in European Patent Application No. 22204752.4.
Office Action dated May 19, 2022, in Chinese Patent Application No. 202110532977.8.
International Search Report from International Patent Application No. PCT/JP2017/036289, dated Jan. 9, 2018.
English translation of International Preliminary Report on Patentability from International Patent Application No. PCT/JP2017/036289, dated Apr. 18, 2019.
Office Action dated Oct. 8, 2019, in Japanese Patent Application No. 2018-543963.
Partial Supplementary European Search Report dated Sep. 14, 2020, in European Patent Application No. 17858484.3.
Office Action dated Sep. 25, 2020, in Chinese Patent Application No. 201780061832.6.
Extended European search report dated Dec. 17, 2020, in European Patent Application No. 17858484.3.
Office Action dated Oct. 5, 2021, in Japanese Patent Application No. 2020-060806.

* cited by examiner

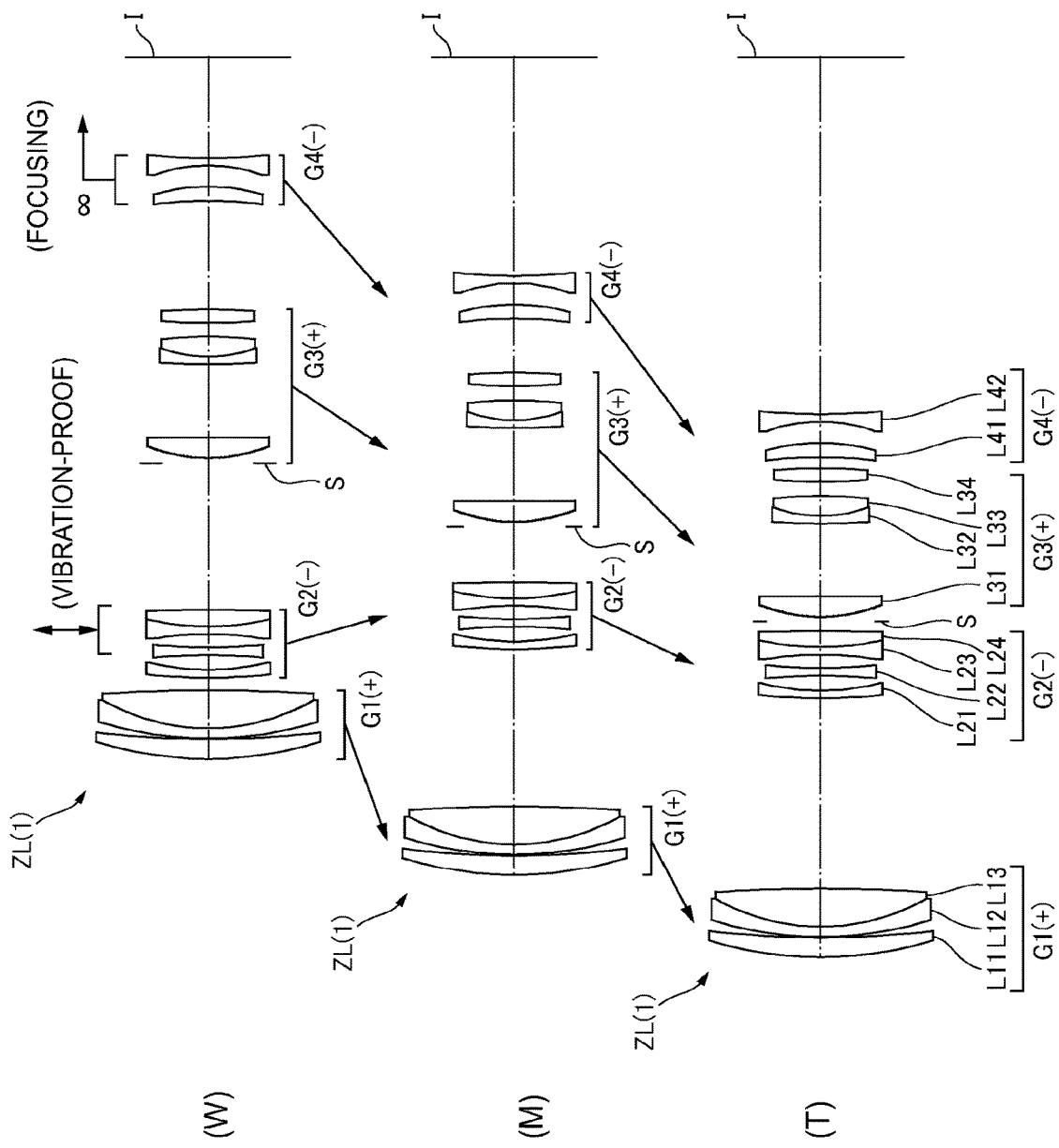

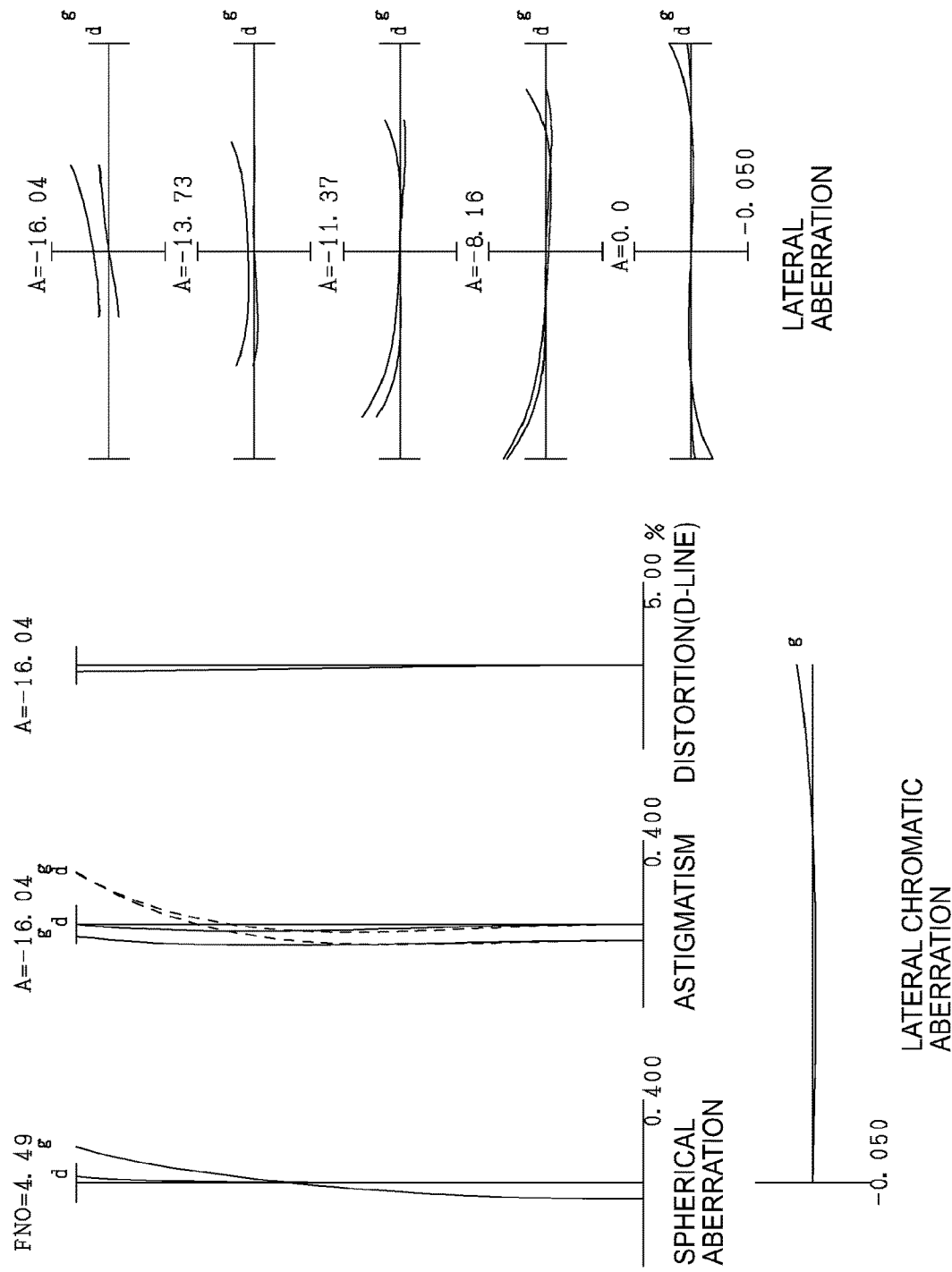

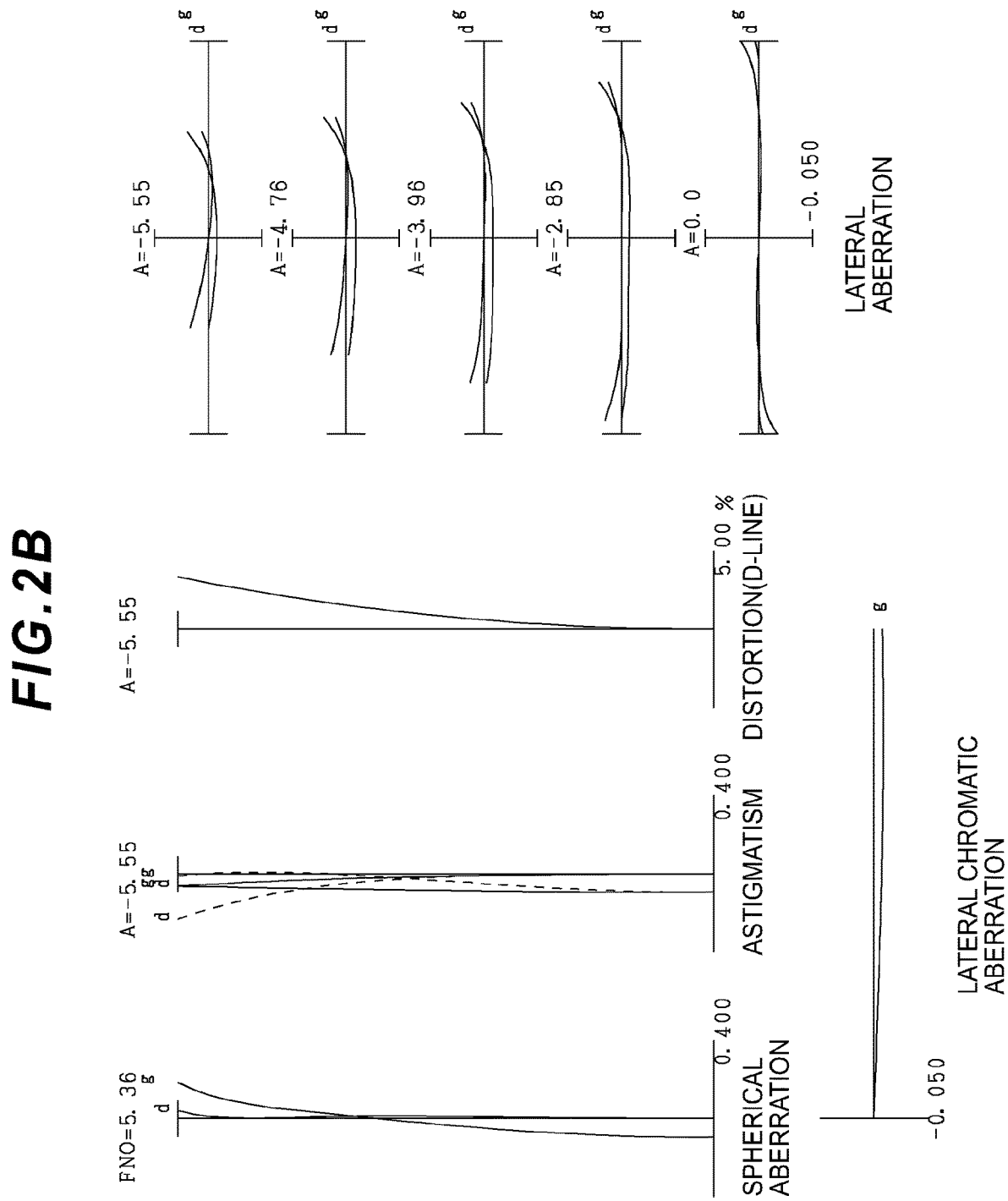

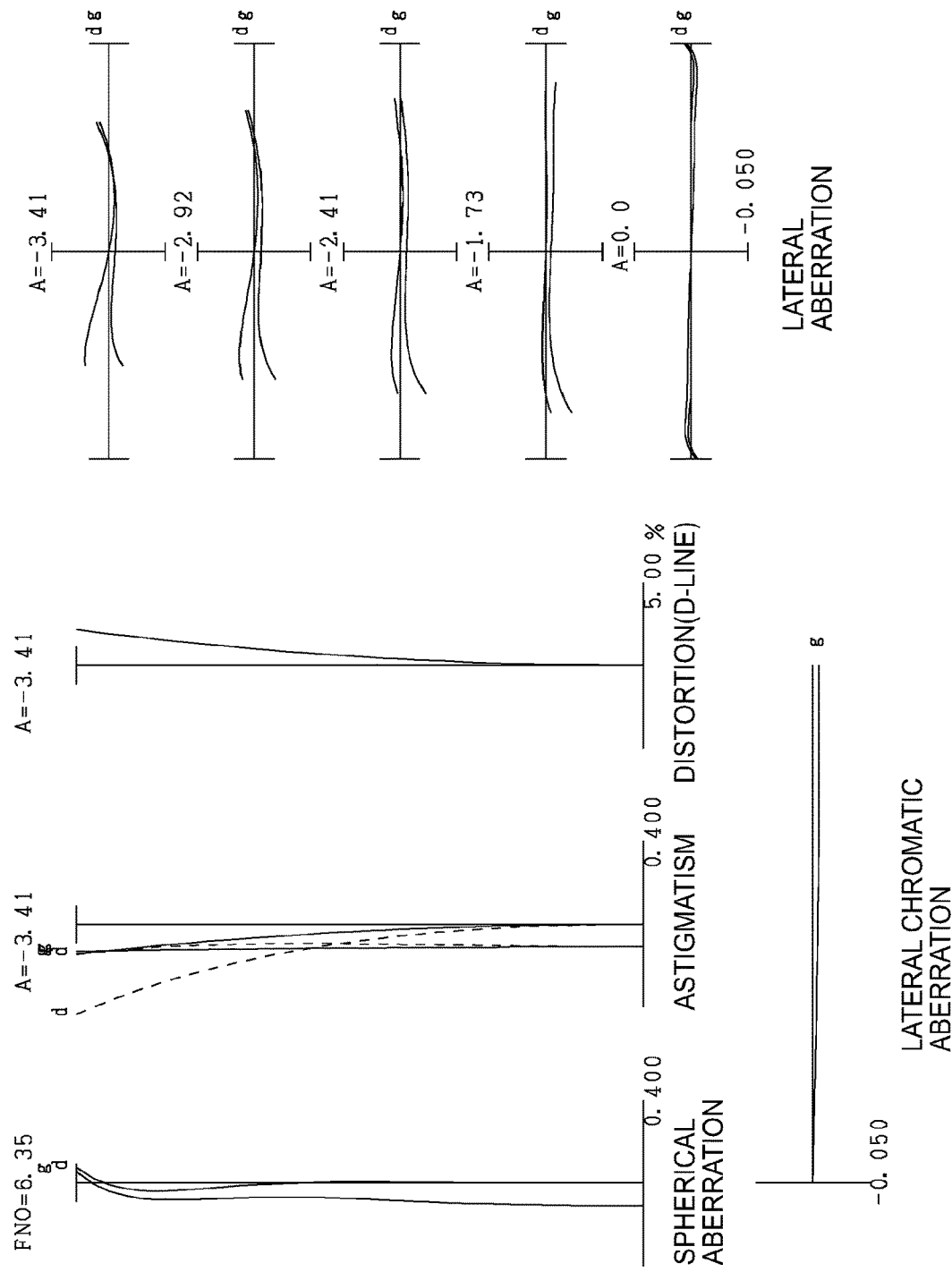

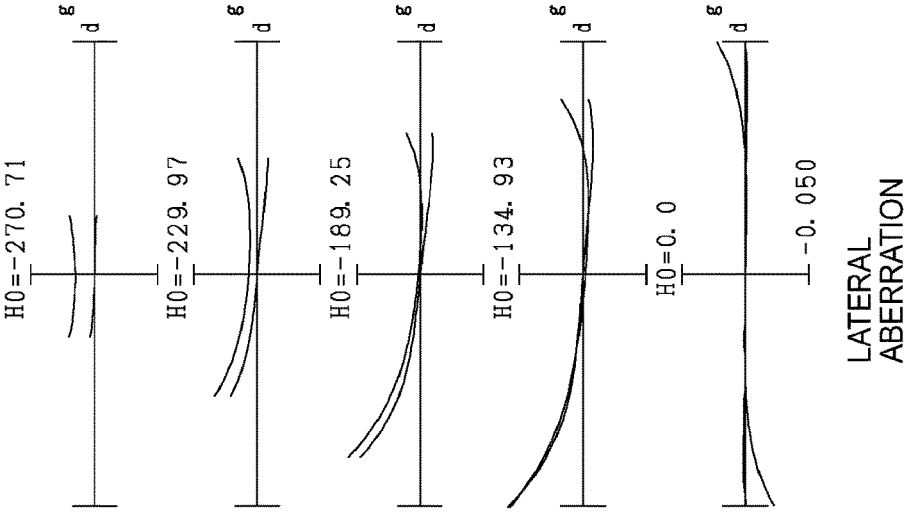
FIG.3A
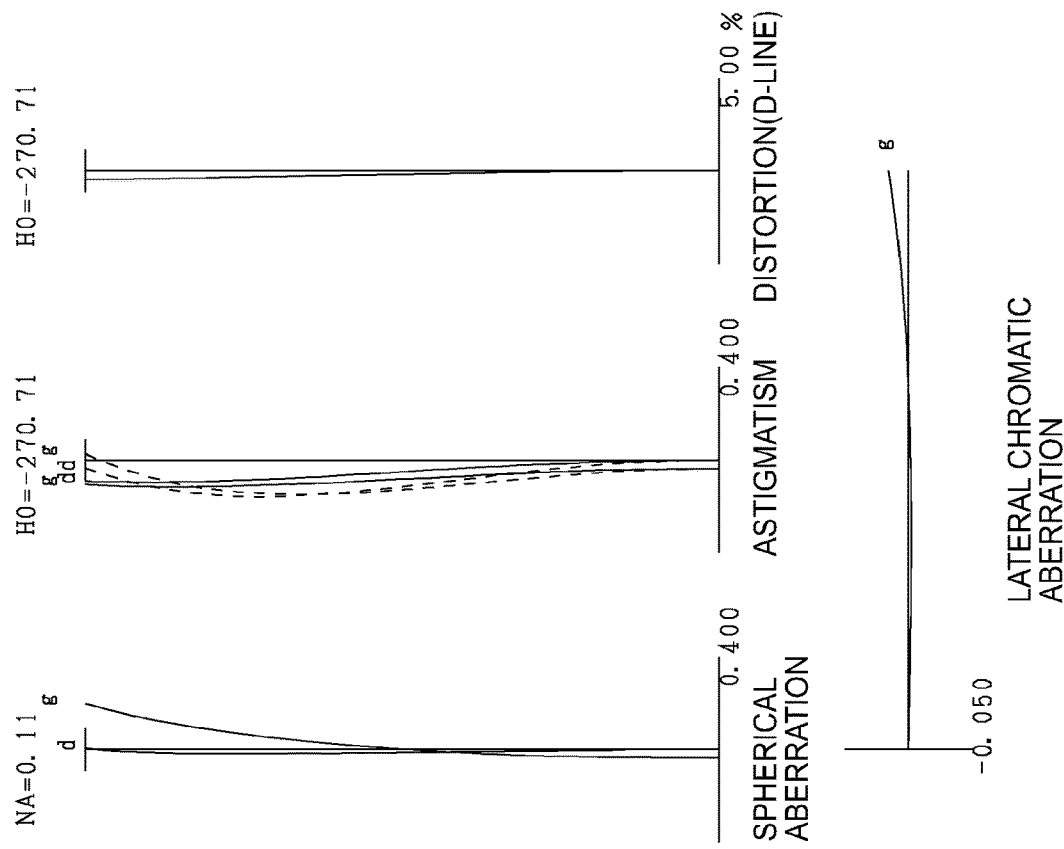

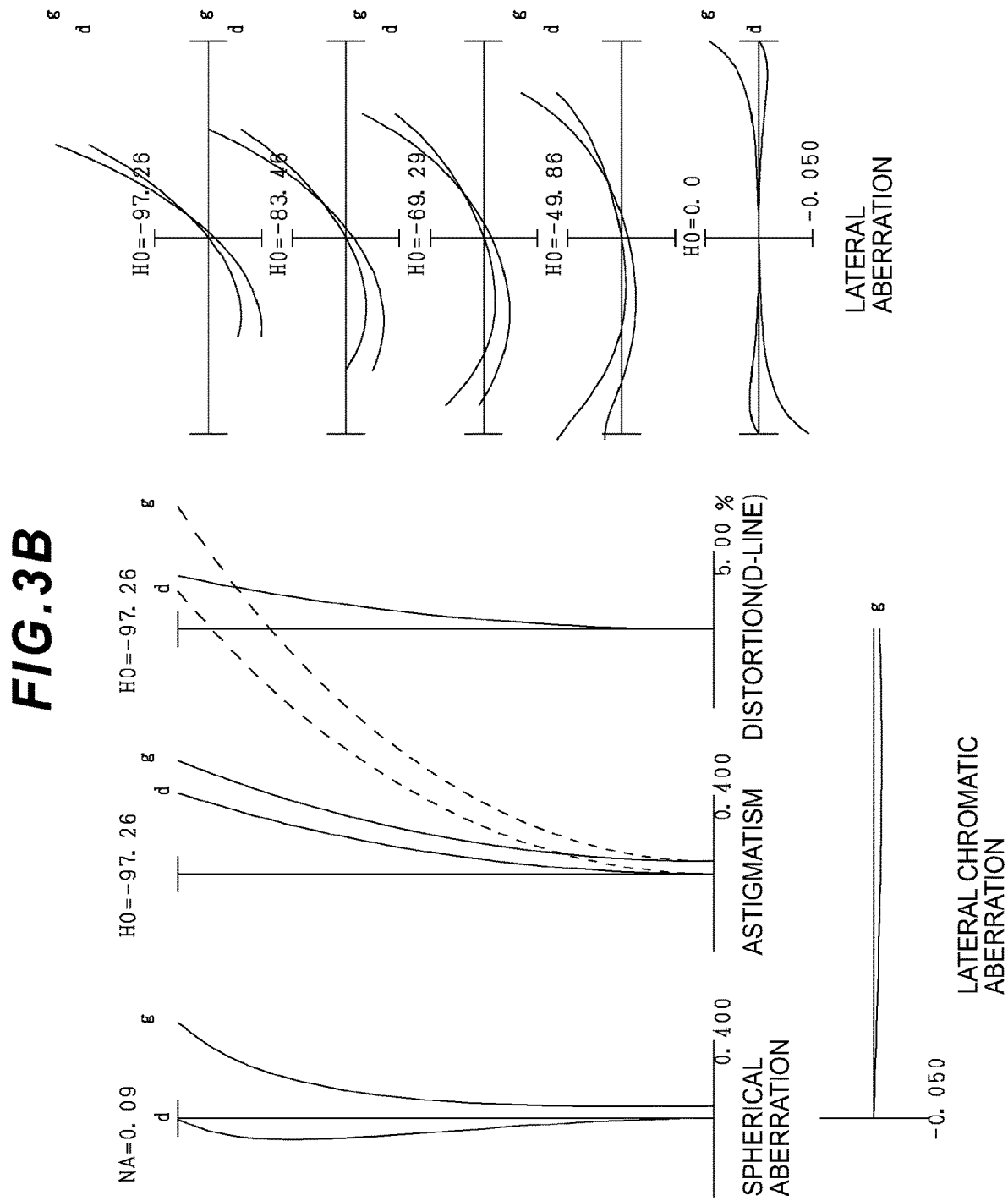

LATERAL ABERRATION

LATERAL ABERRATION

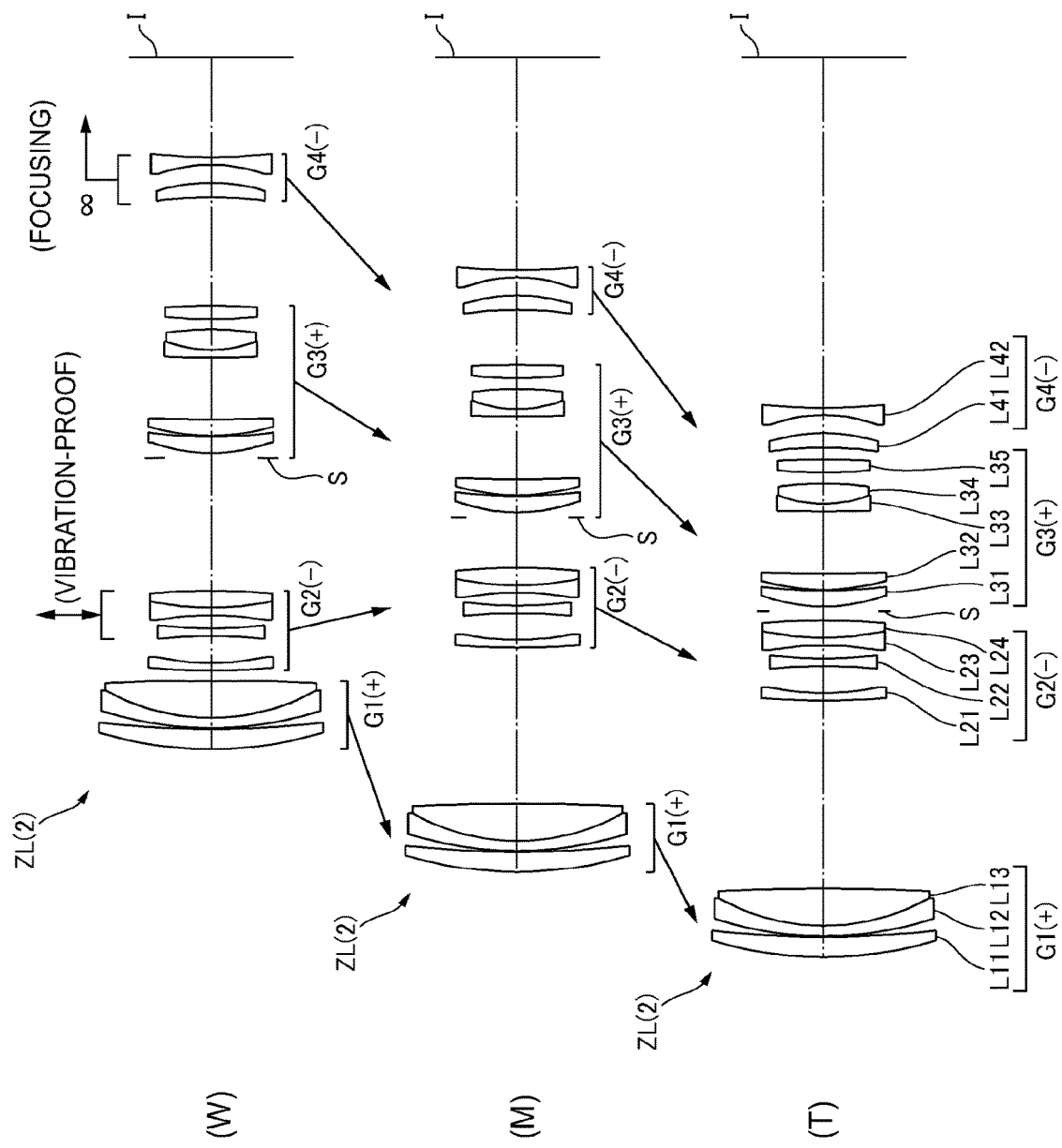

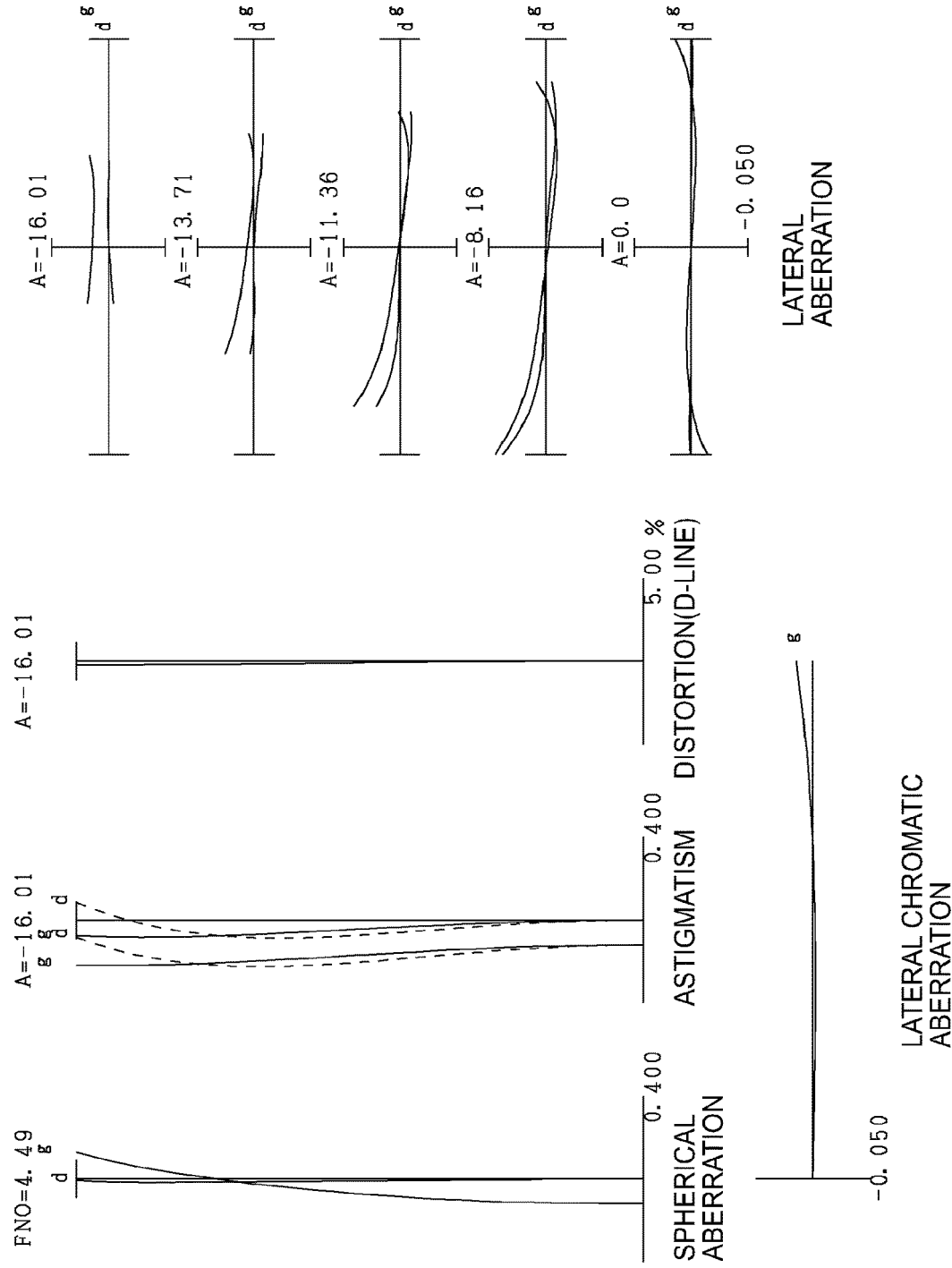

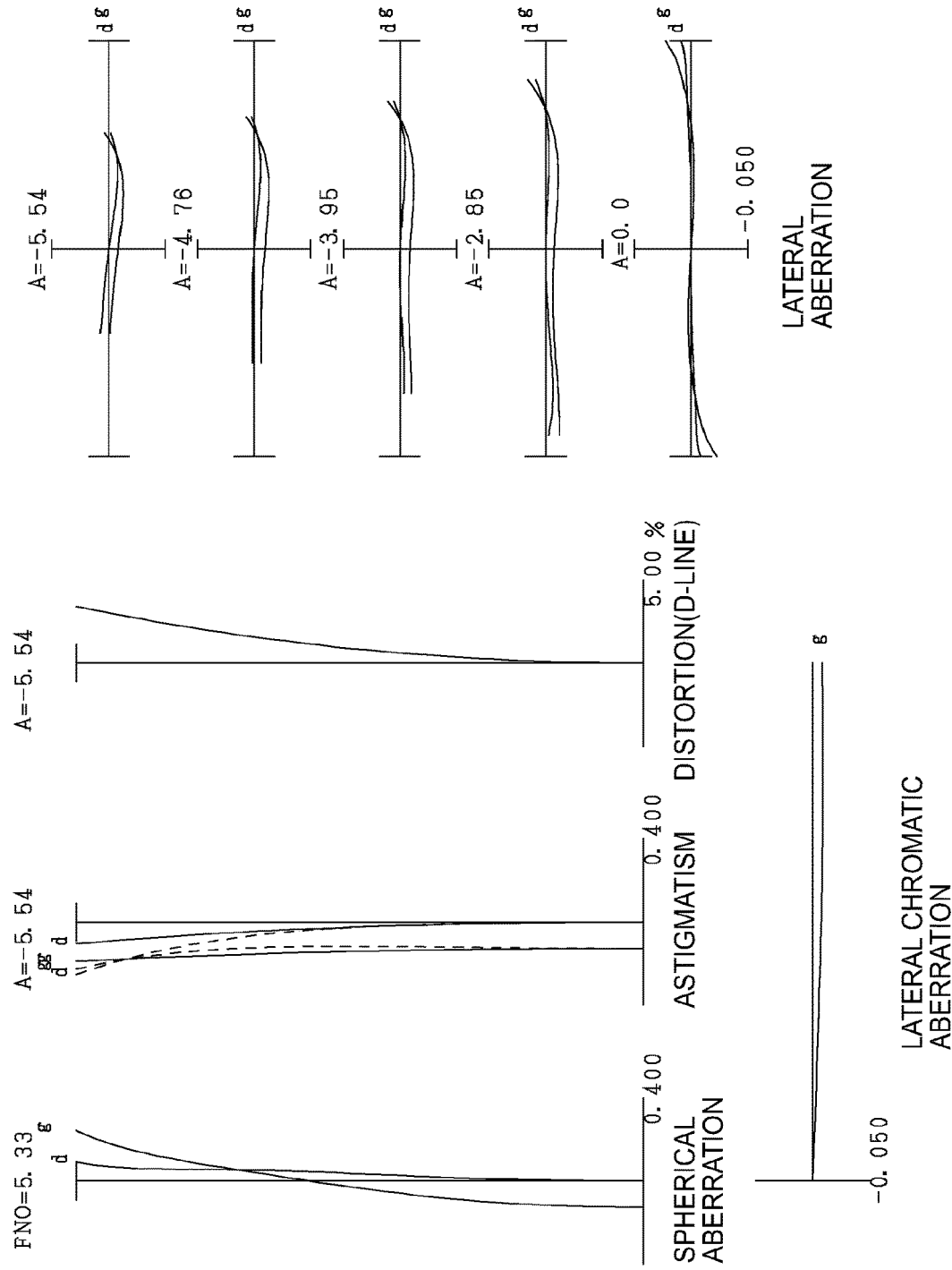

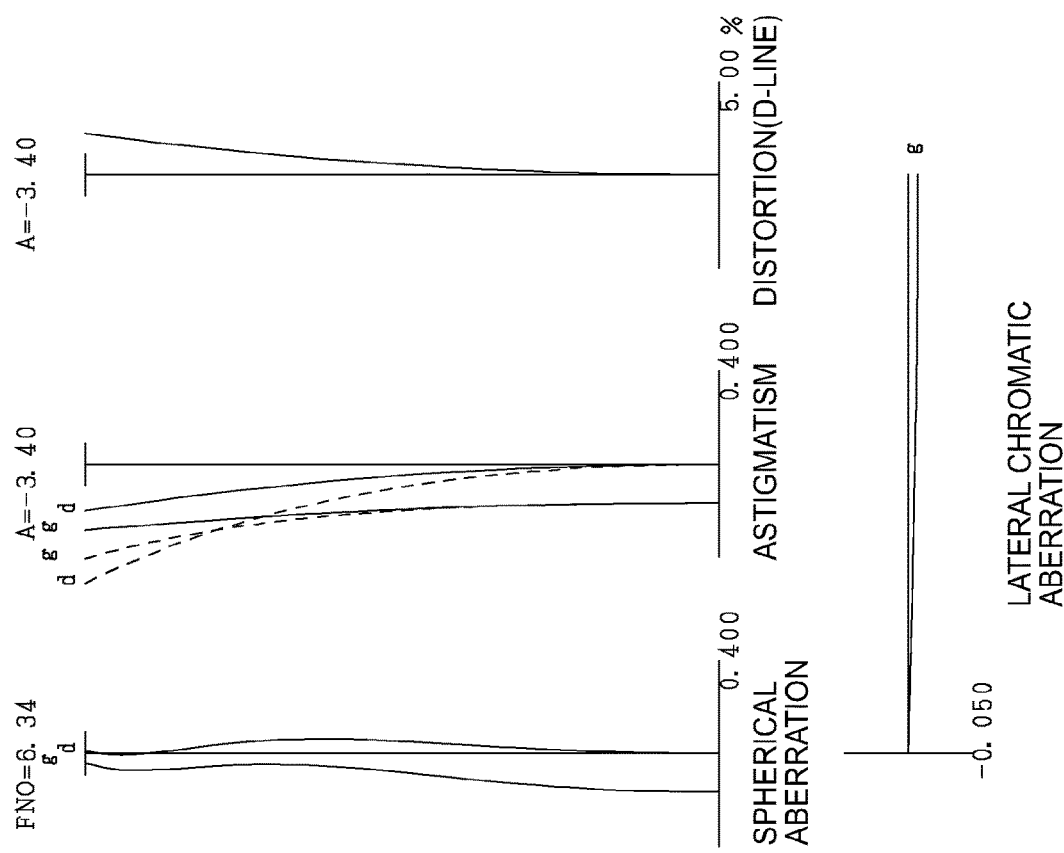

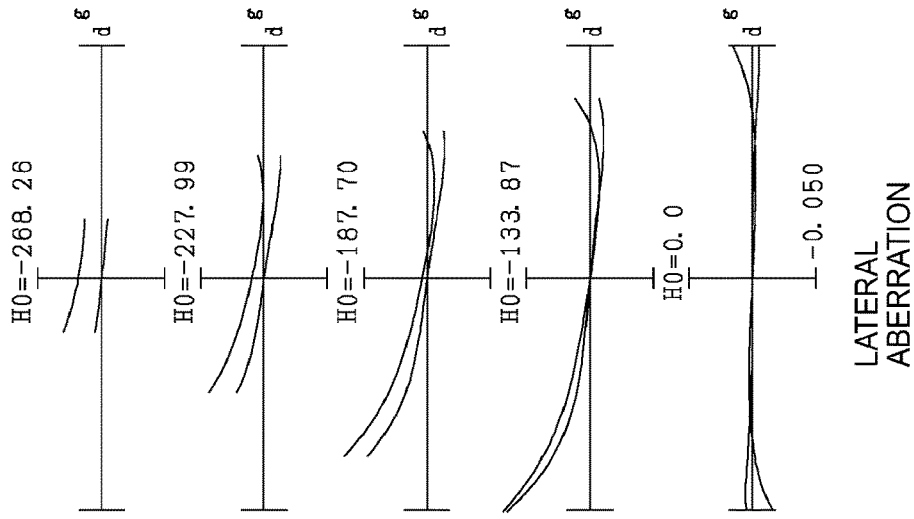
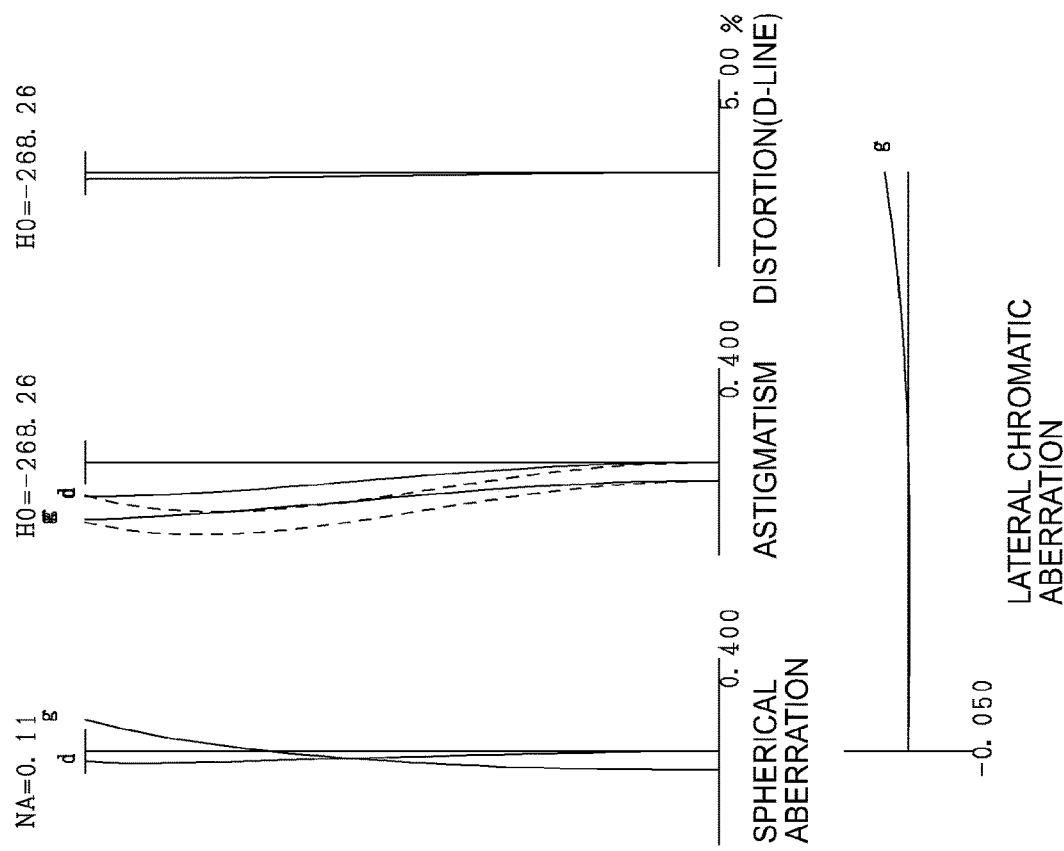
FIG.7A

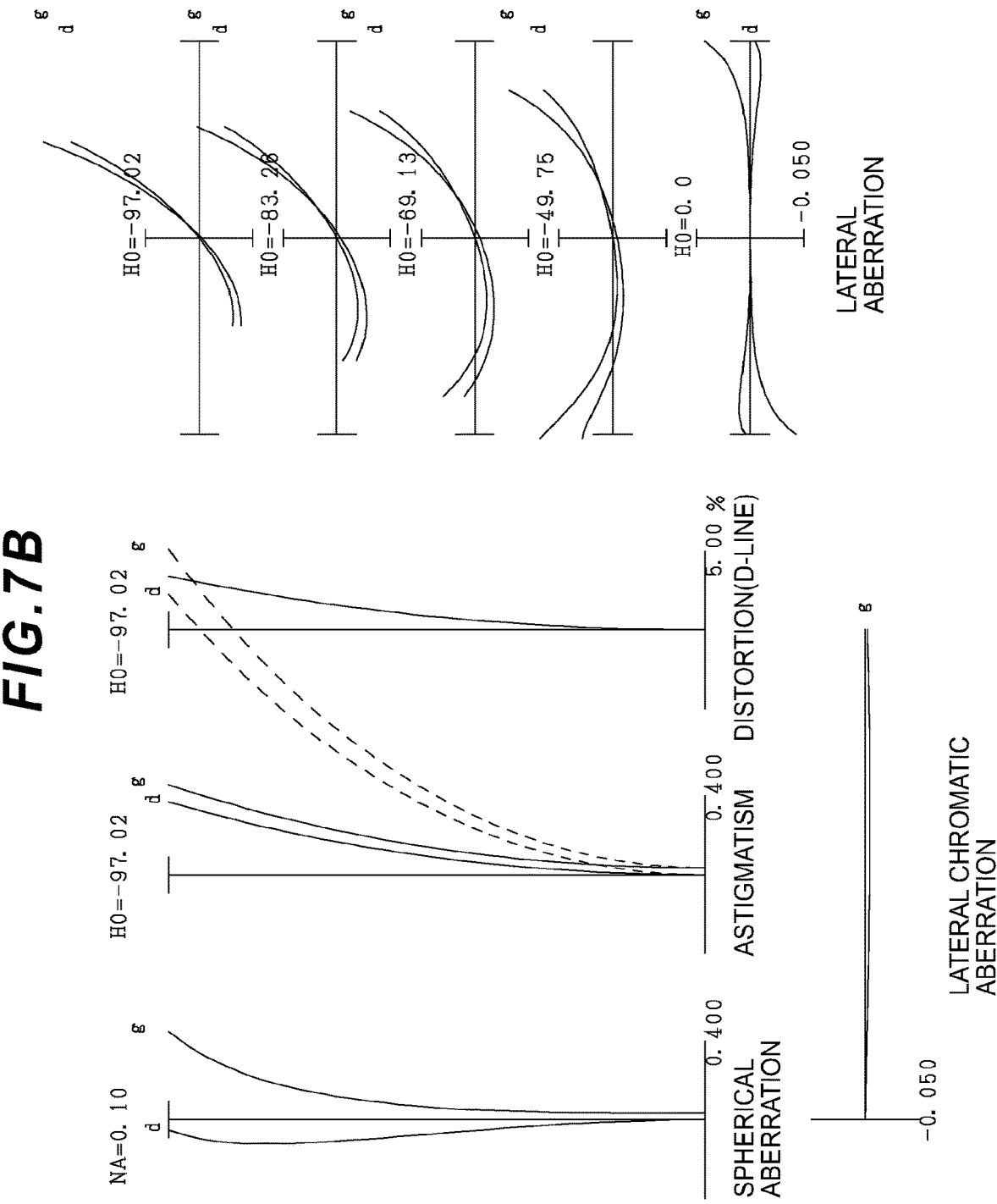

LATERAL ABERRATION

LATERAL ABERRATION

LATERAL ABERRATION

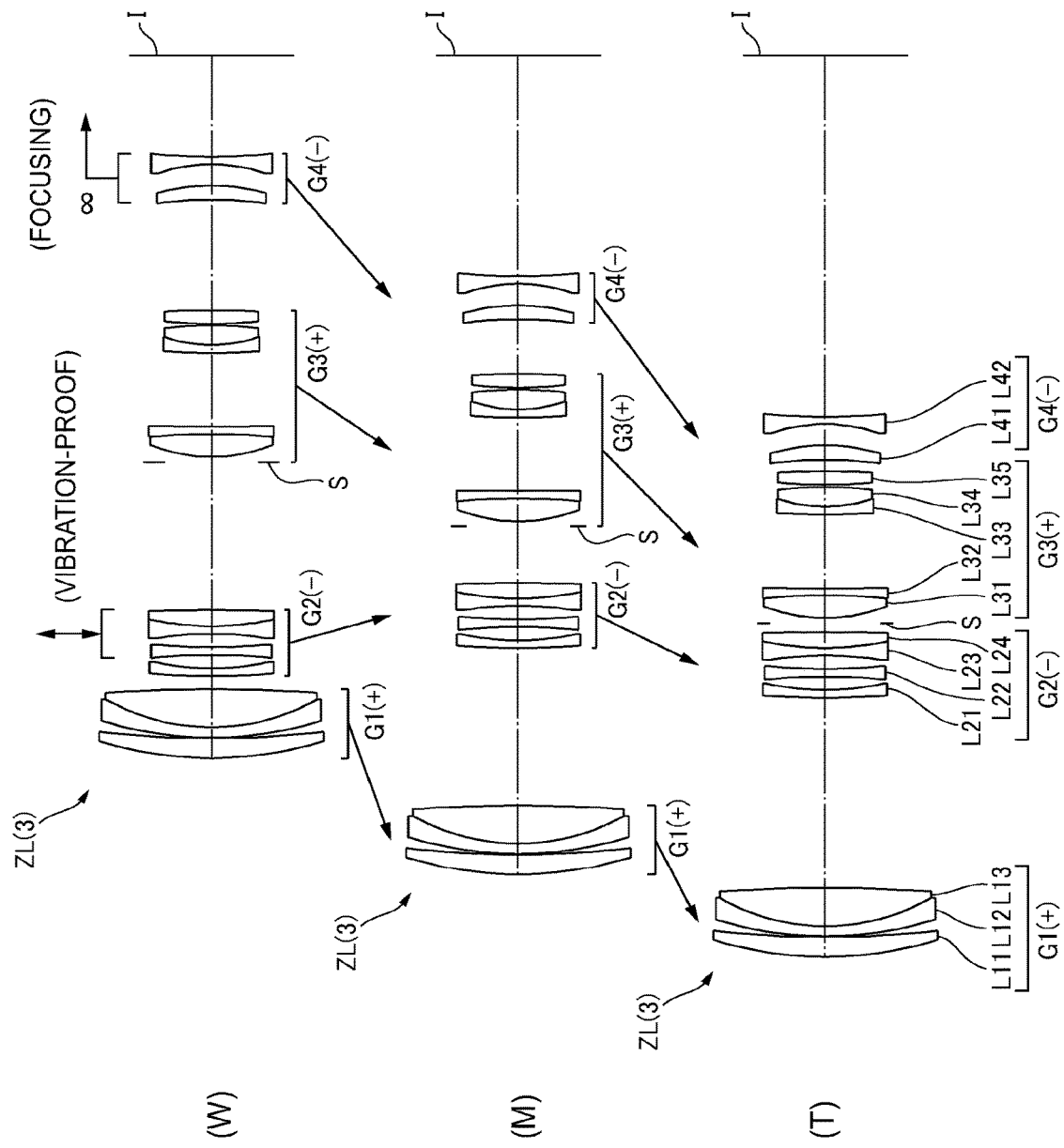

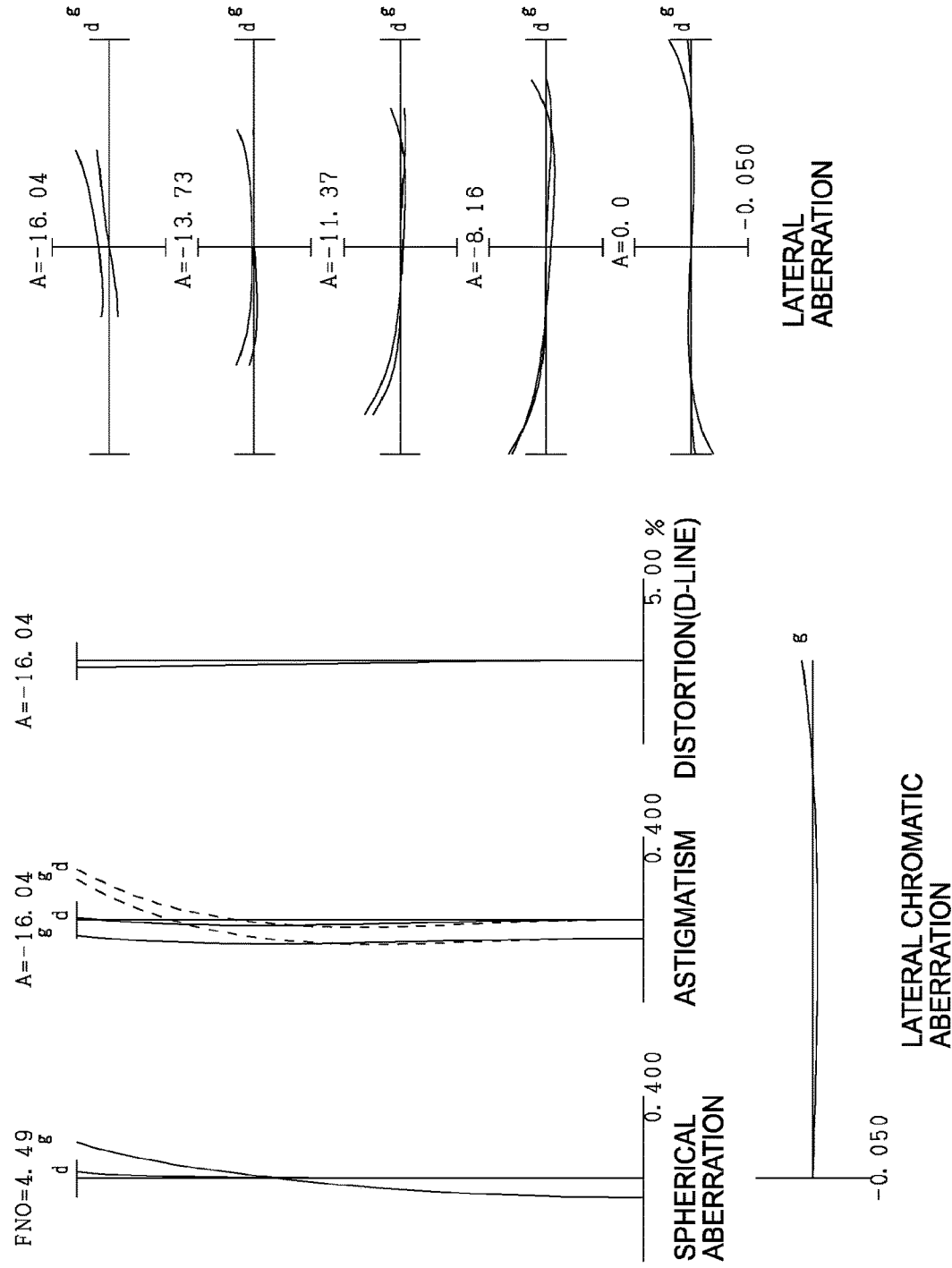

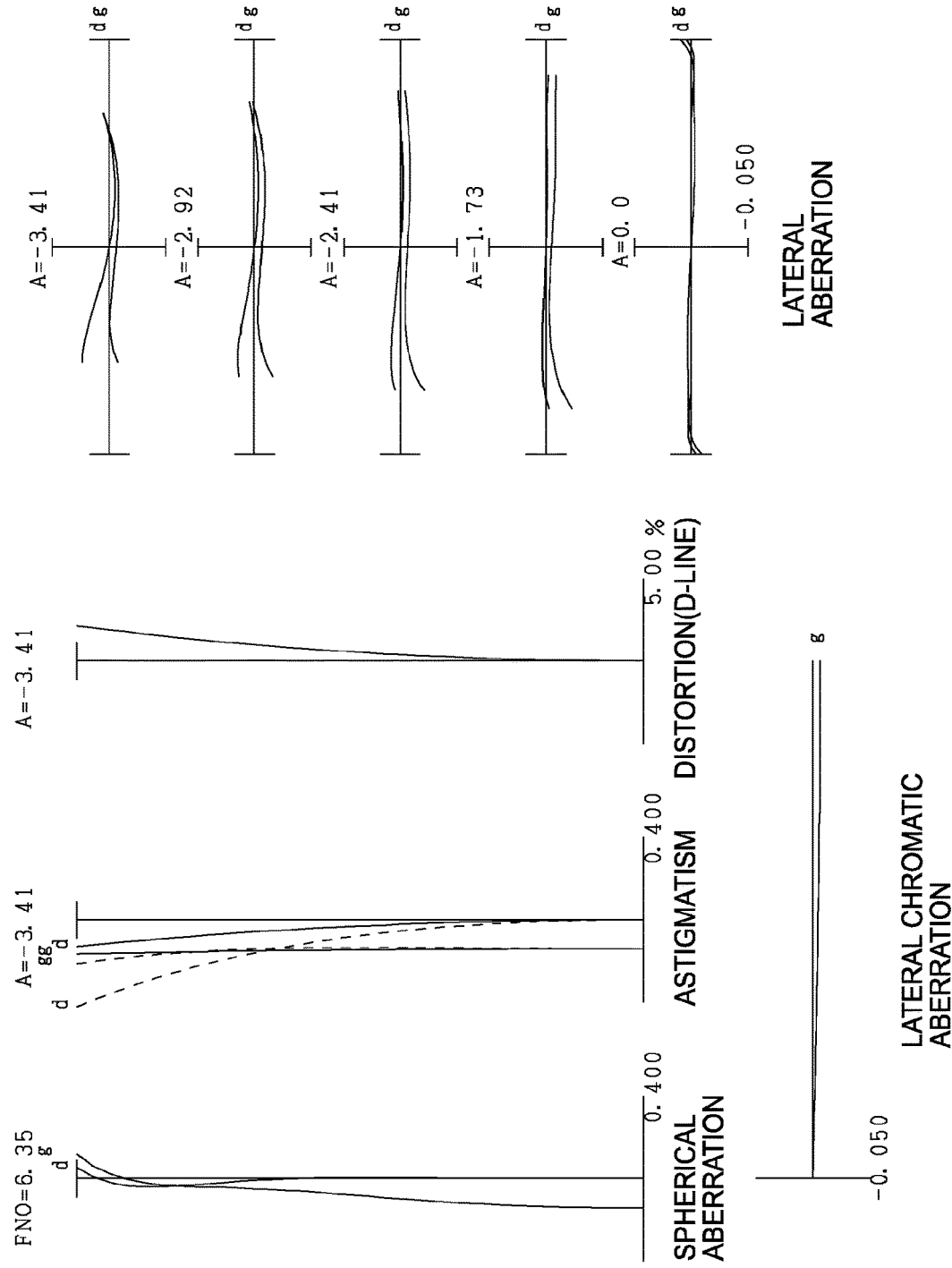

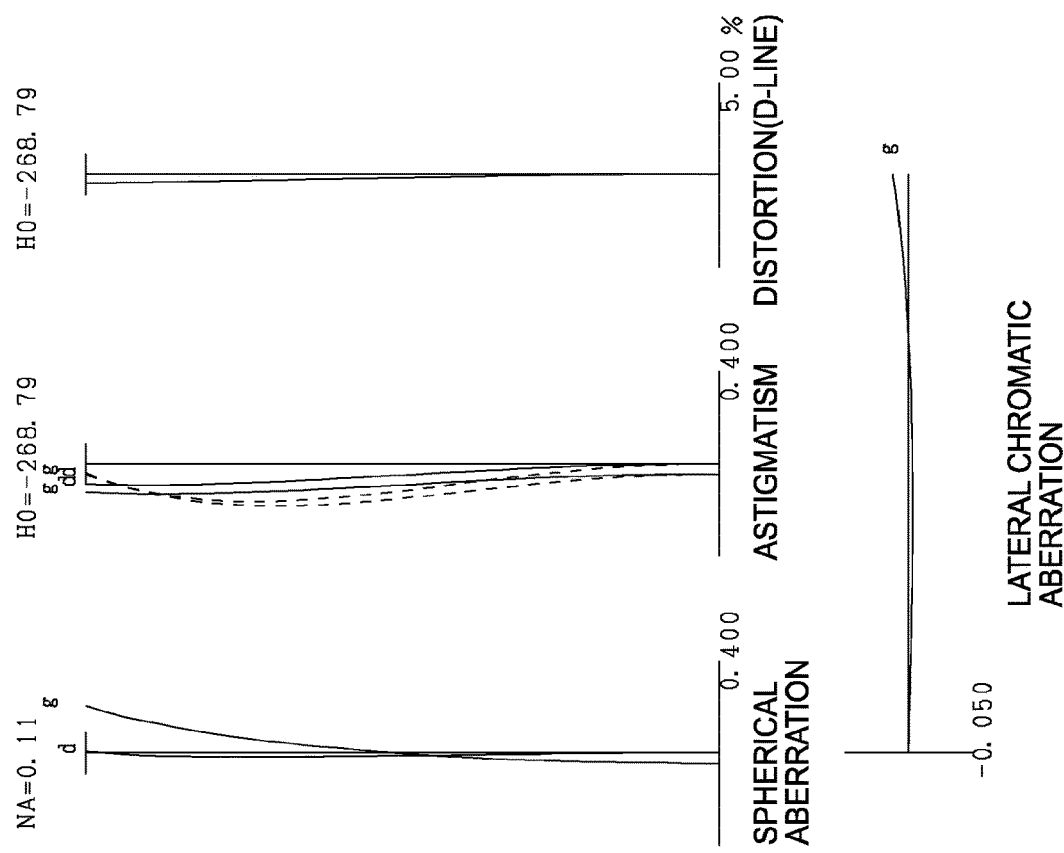

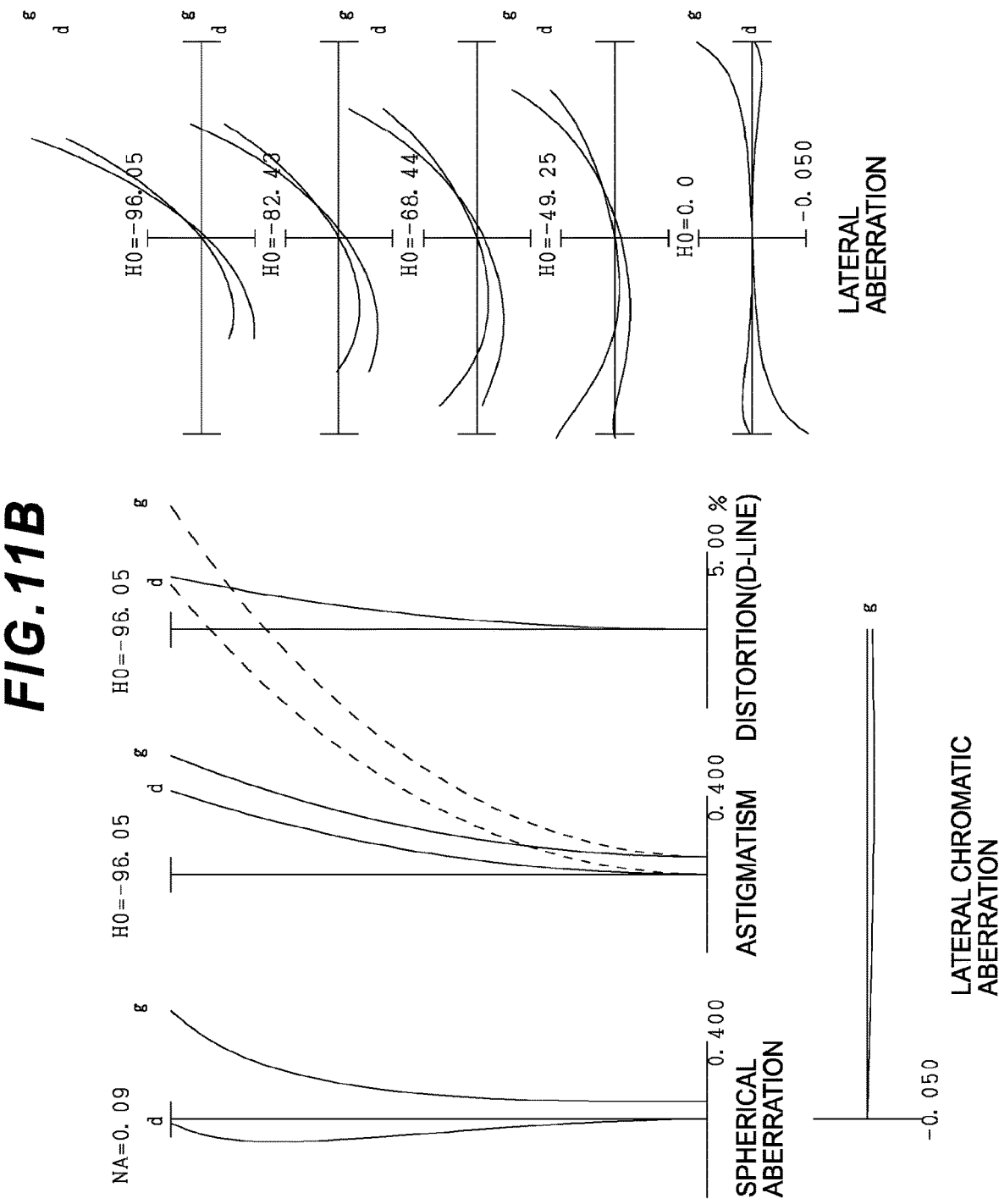

LATERAL ABERRATION

LATERAL ABERRATION

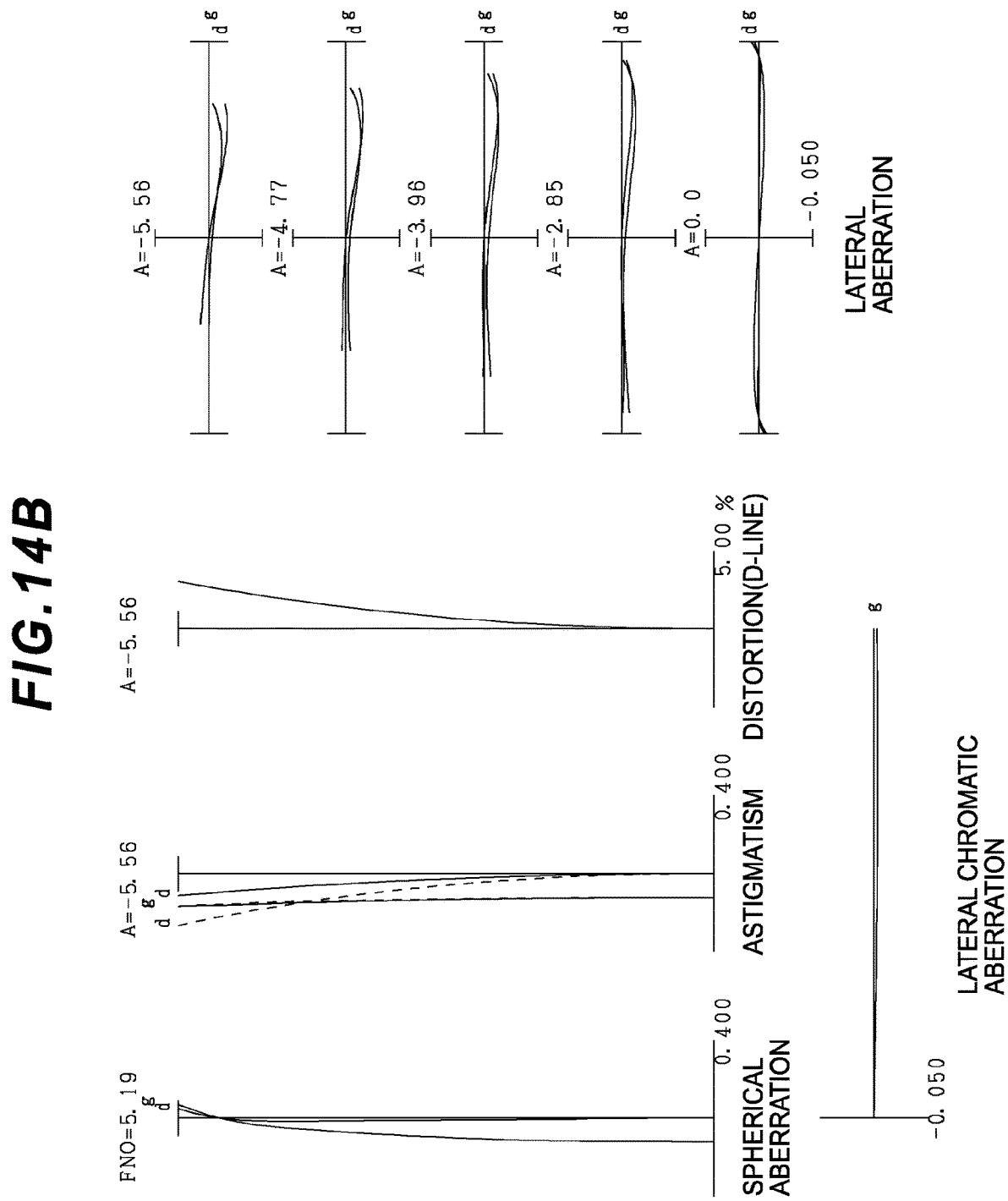

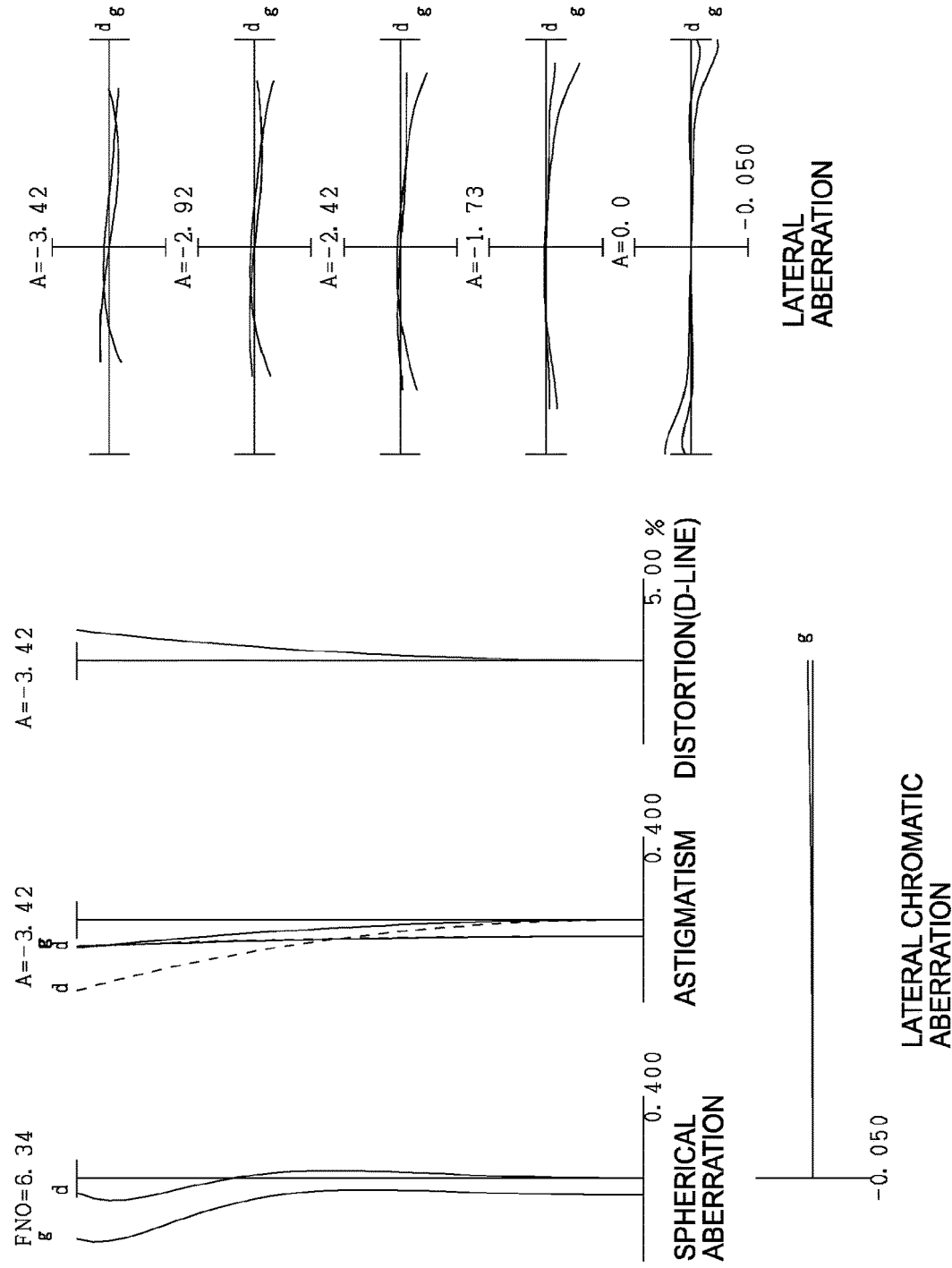

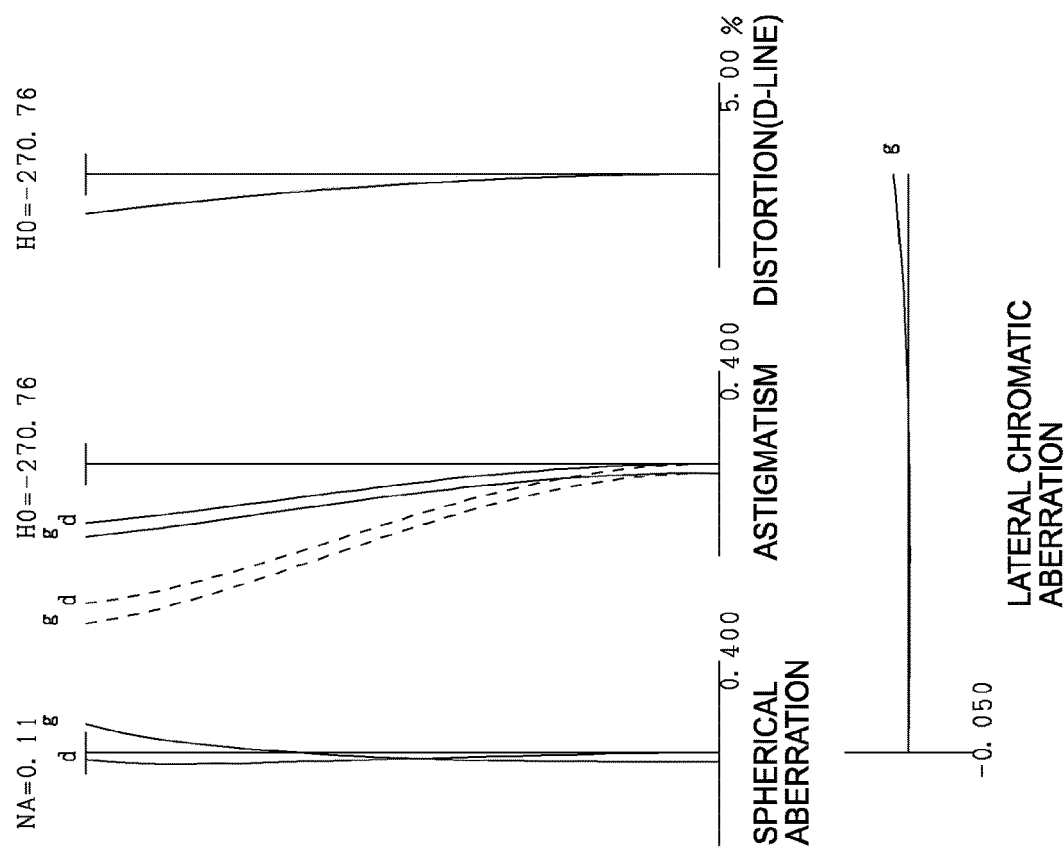

LATERAL ABERRATION

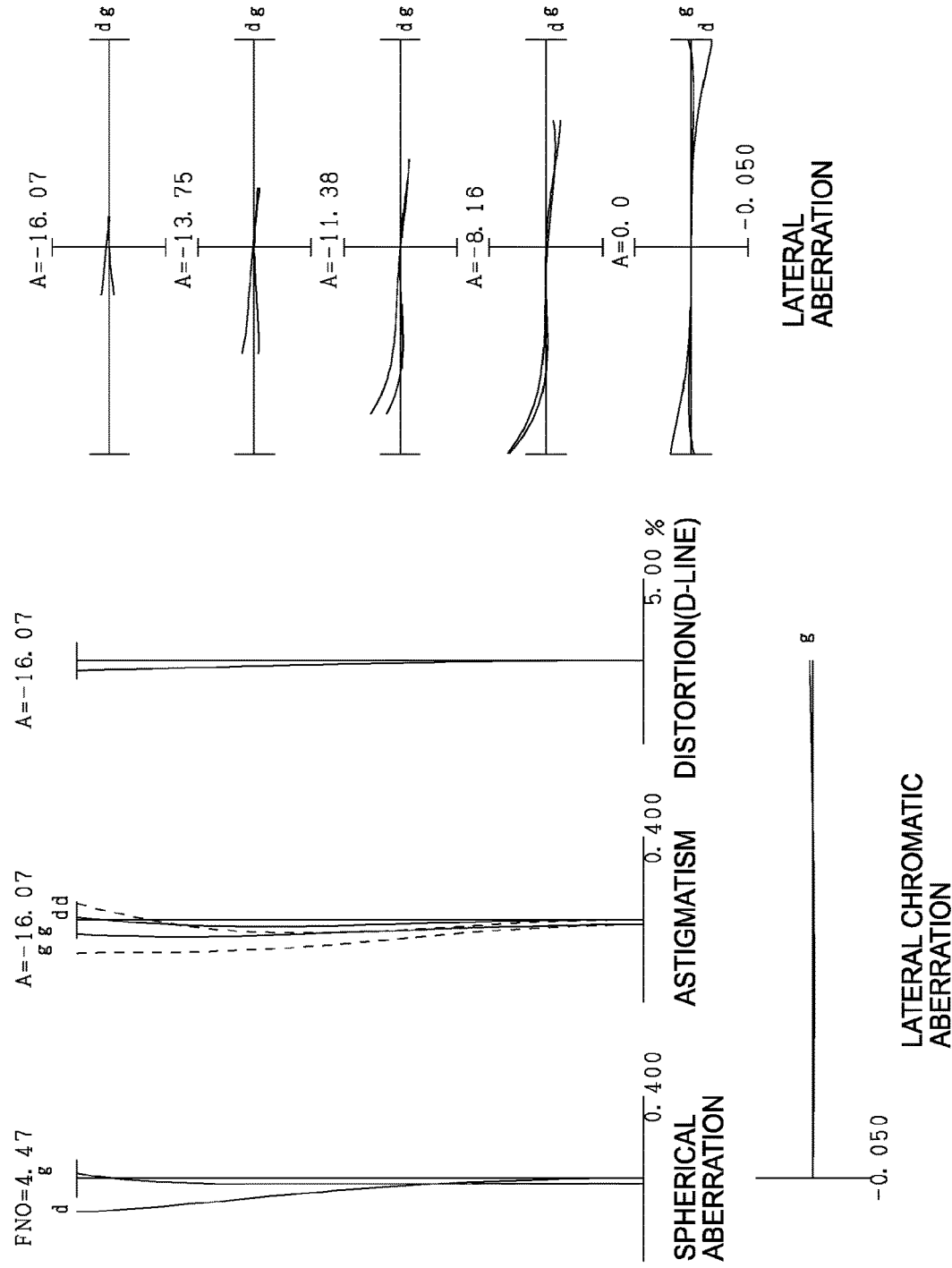

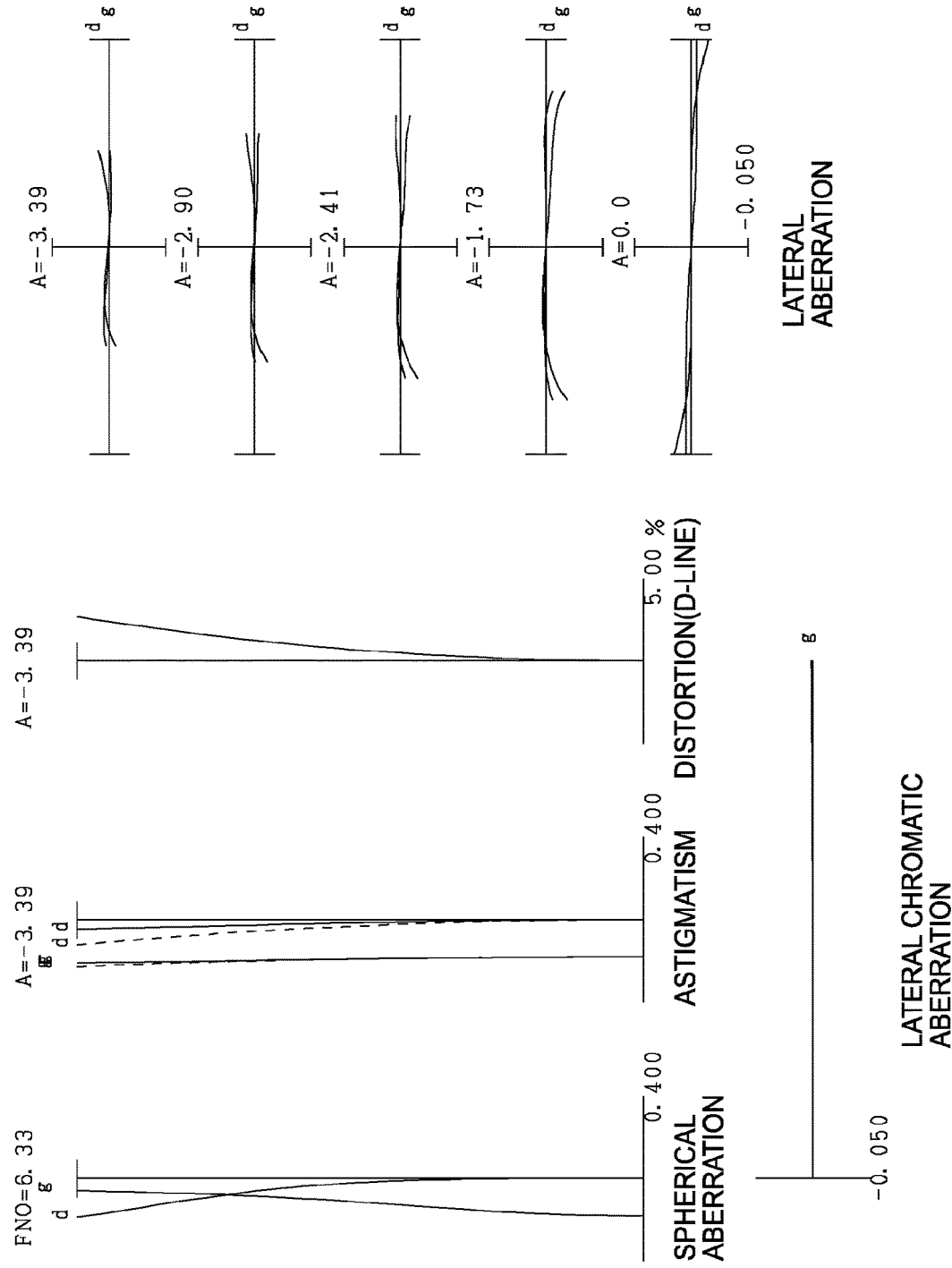

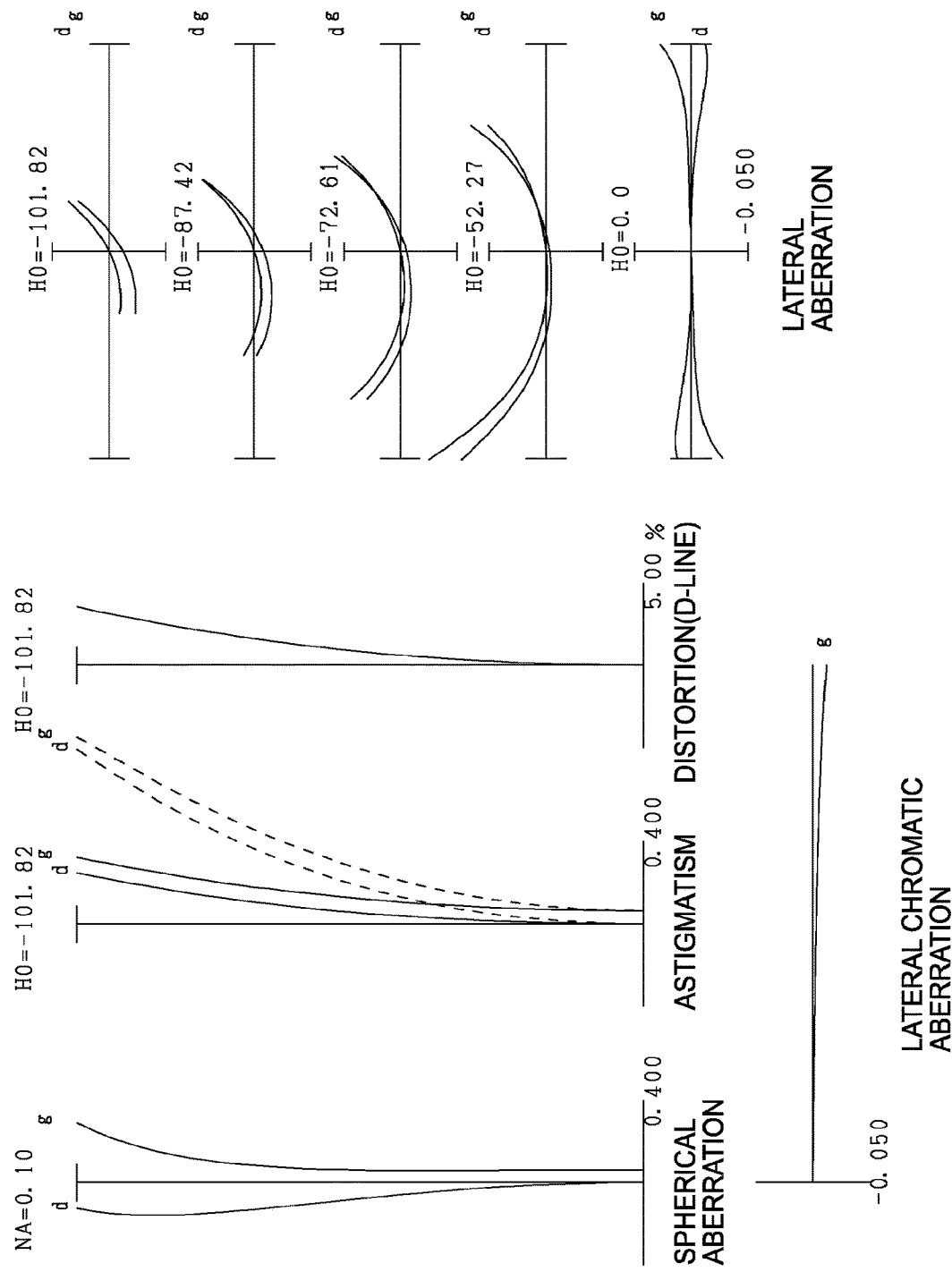

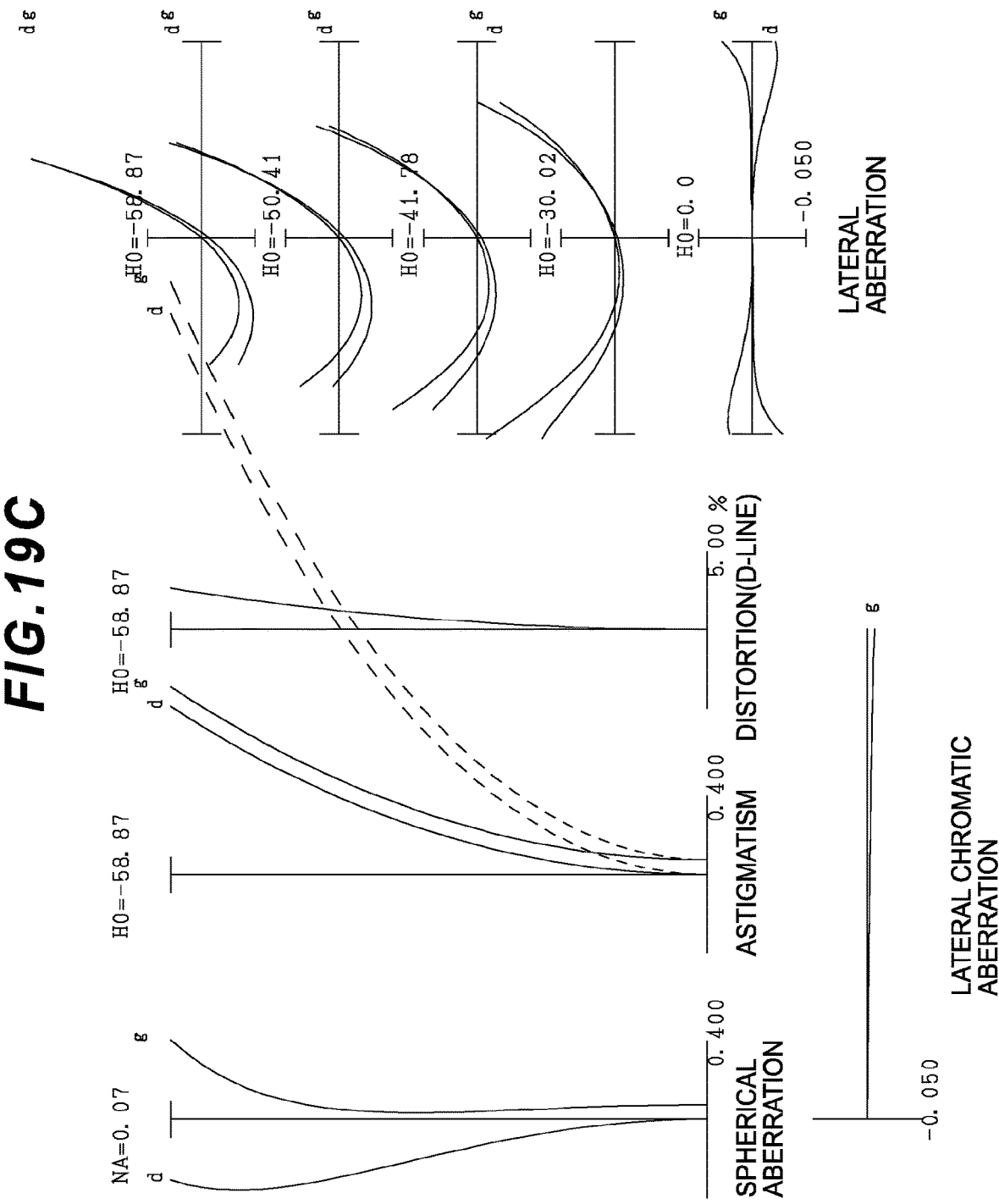

LATERAL ABERRATION

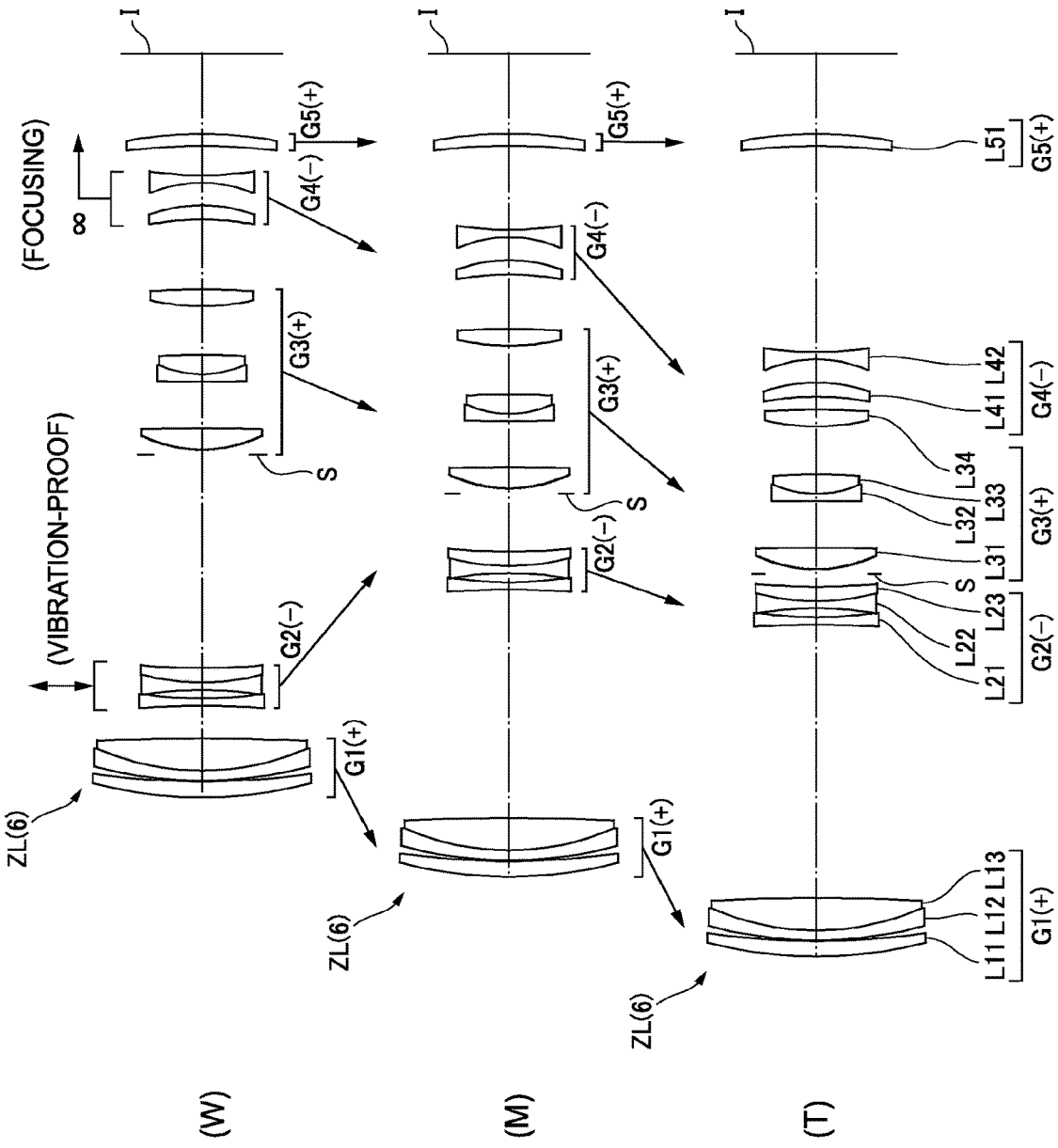

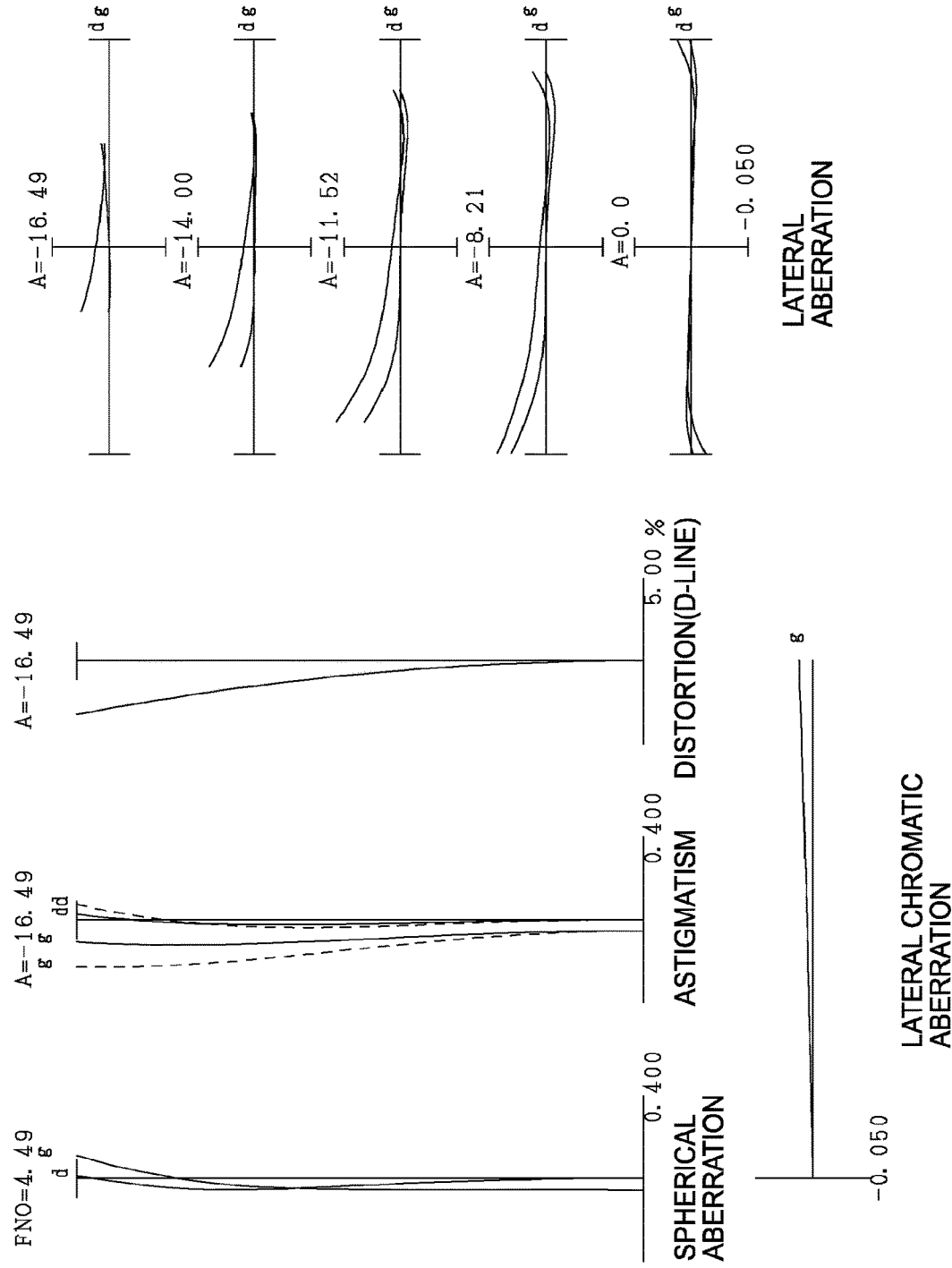

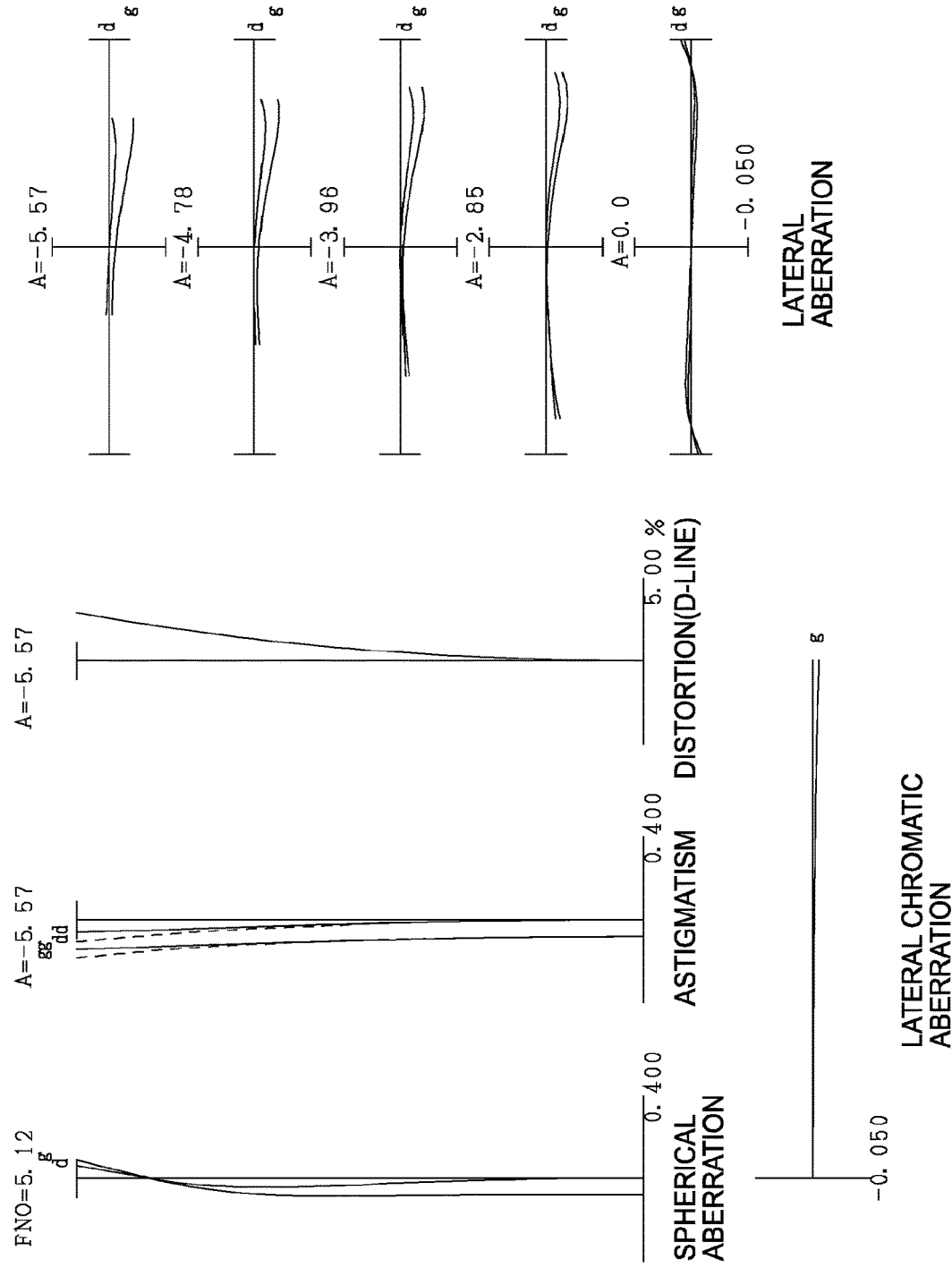

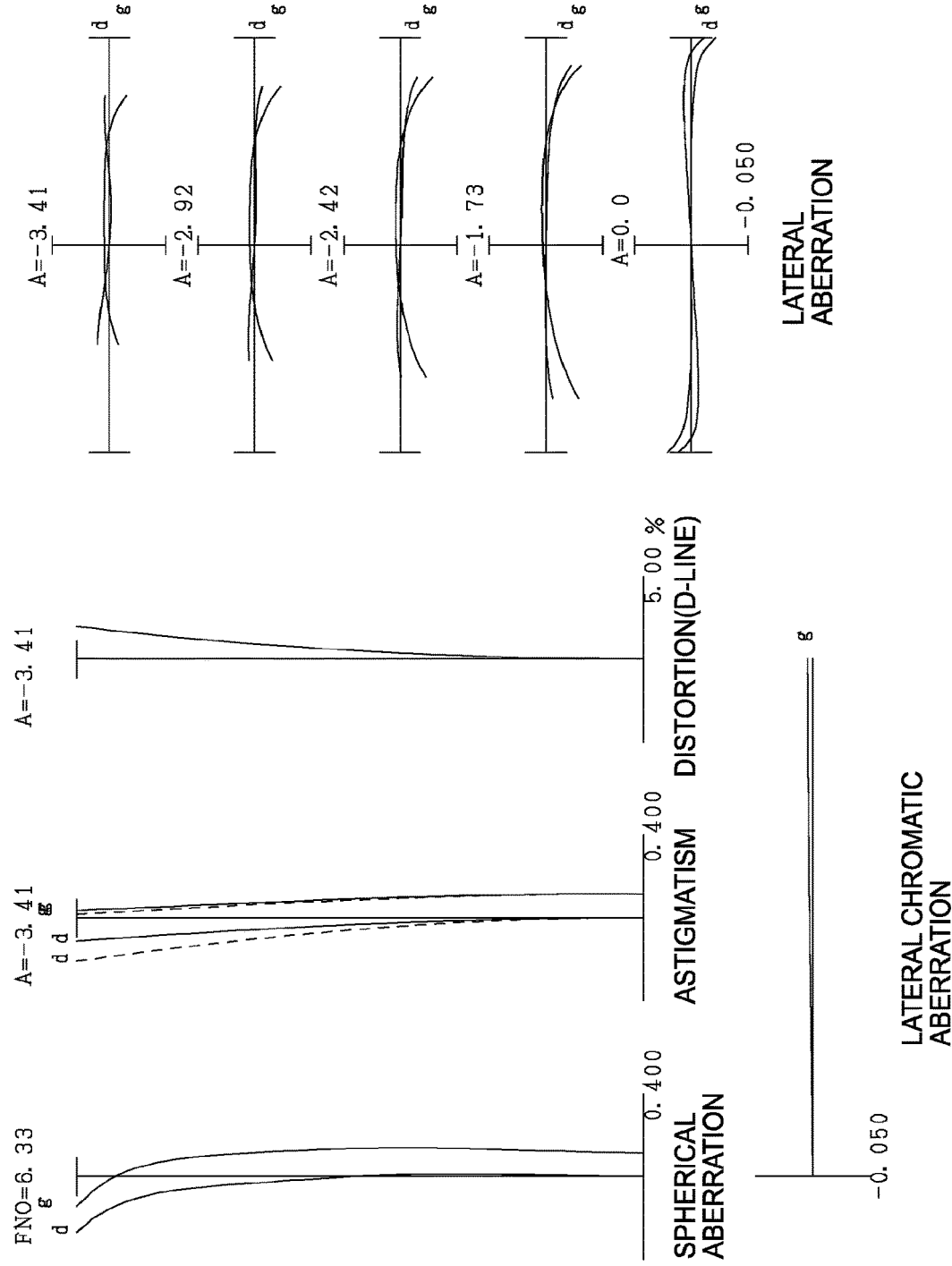

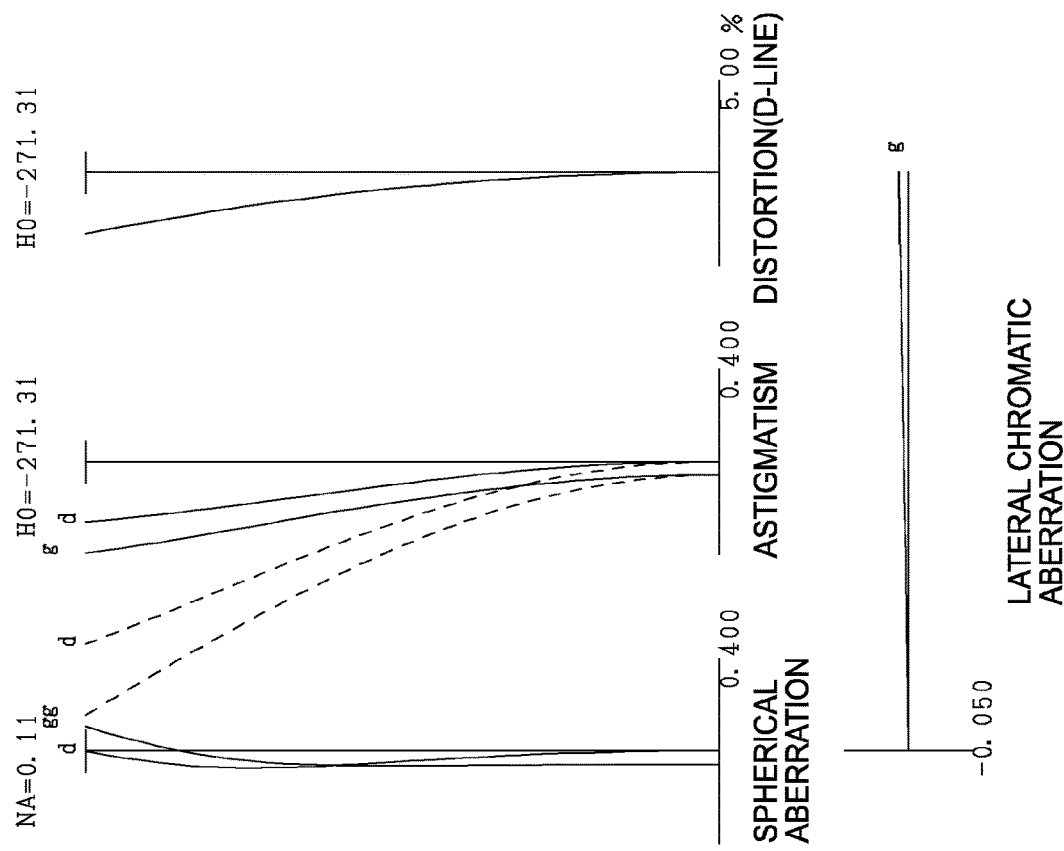

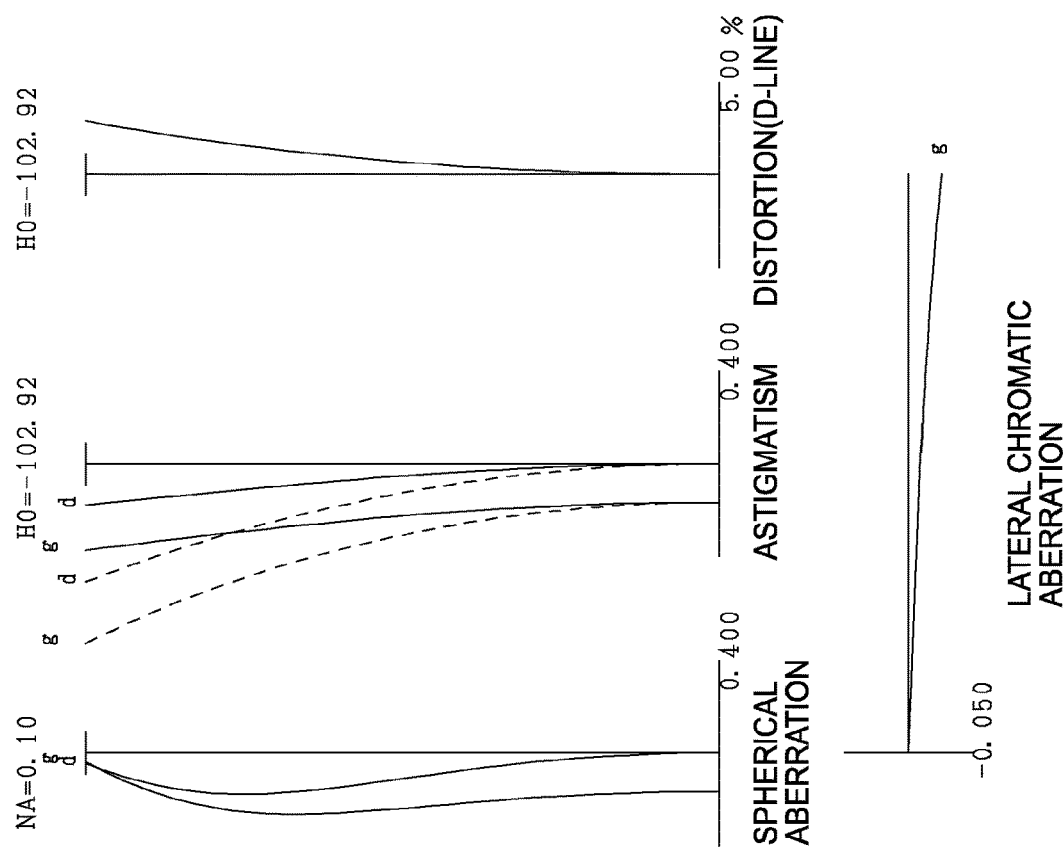

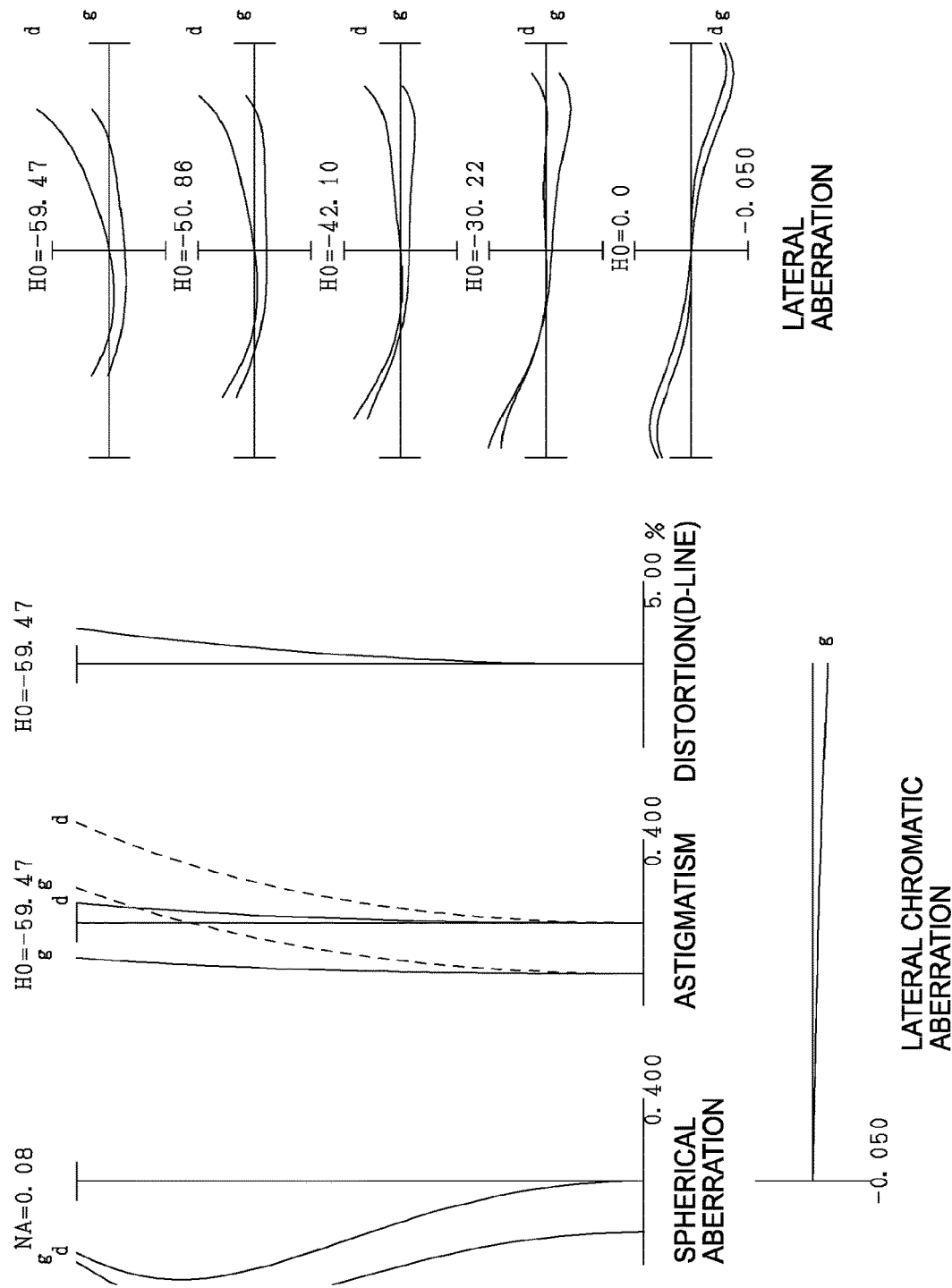

LATERAL
ABERRATION

LATERAL
ABERRATION

LATERAL ABERRATION

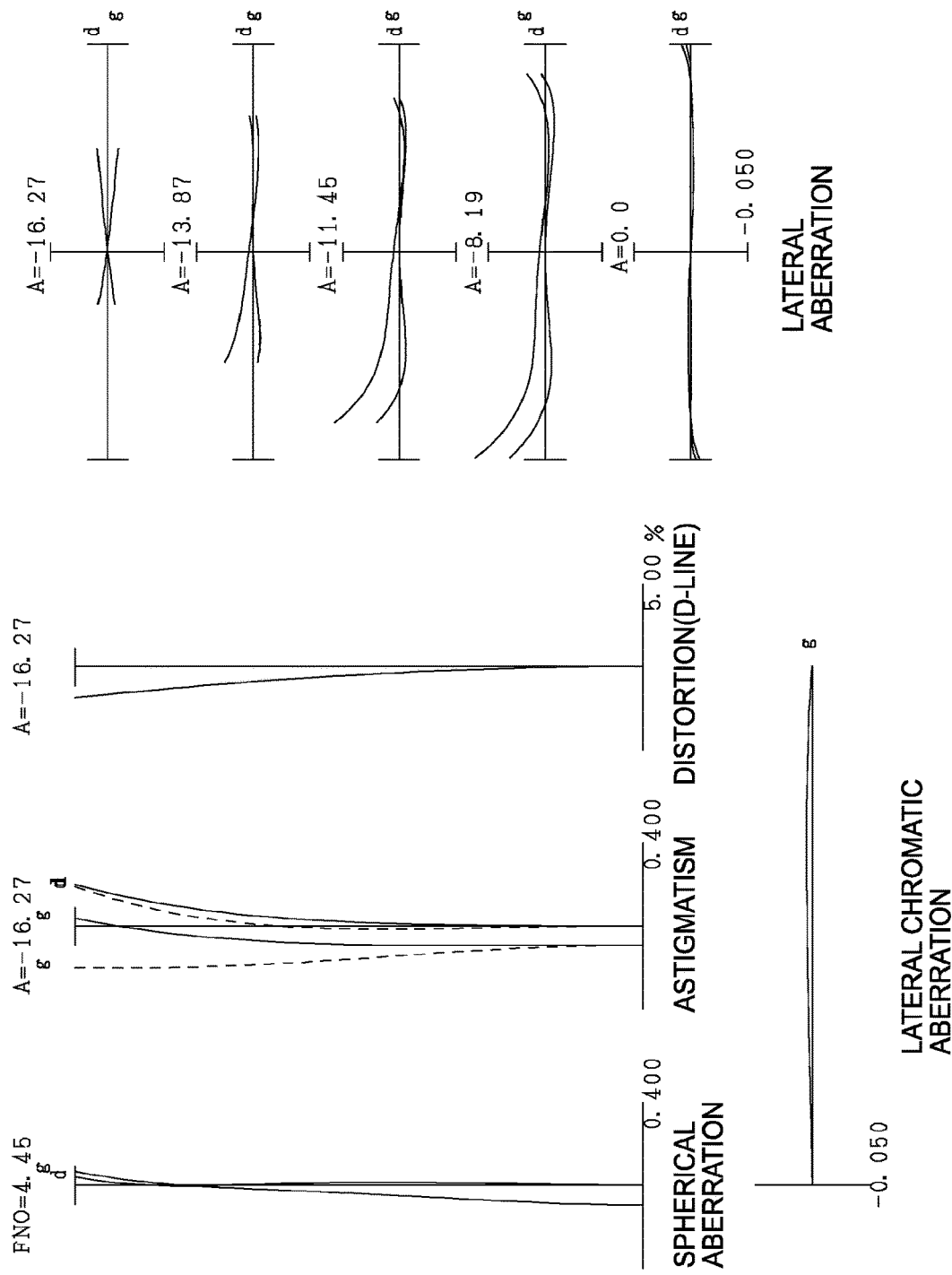

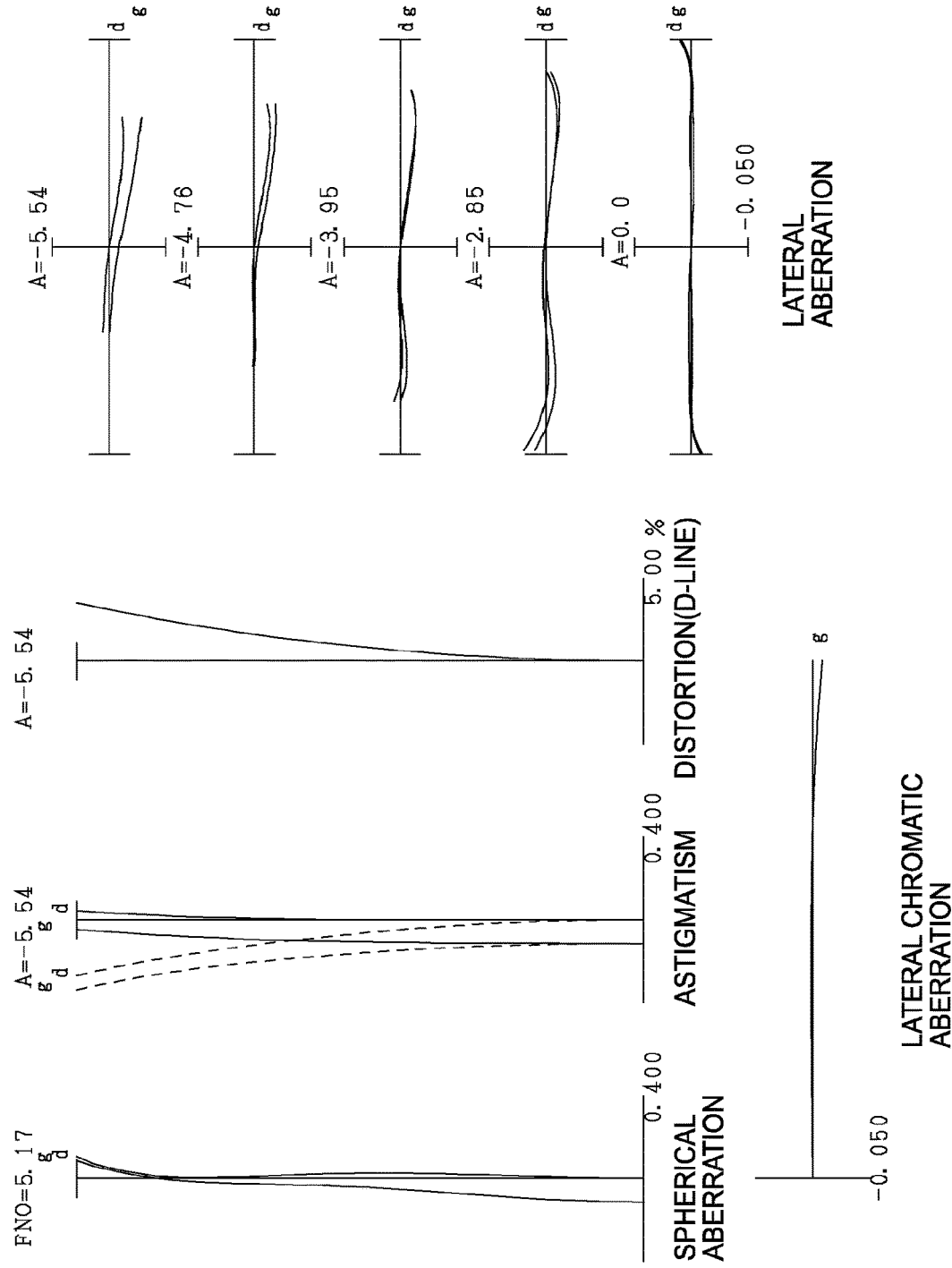

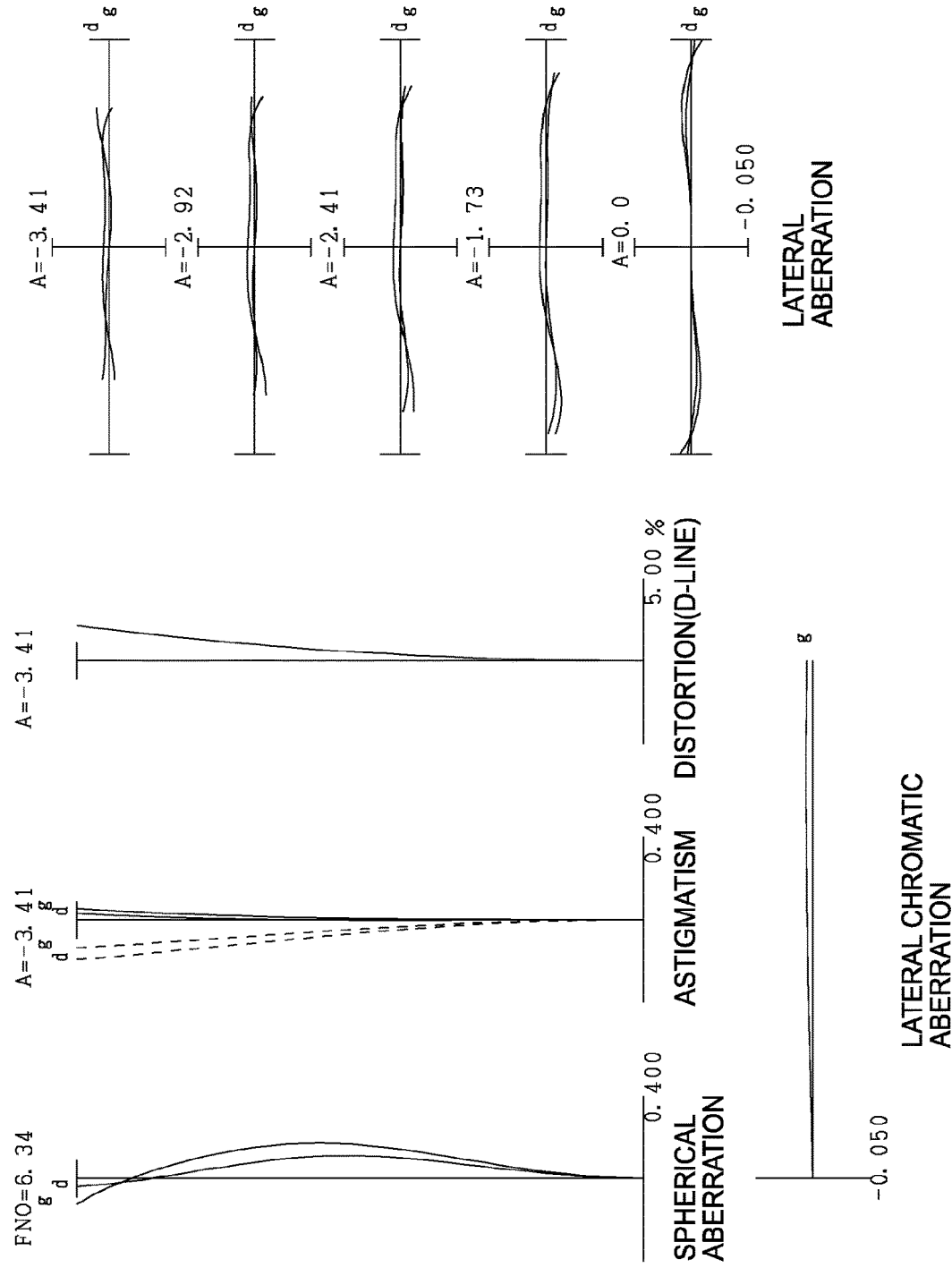

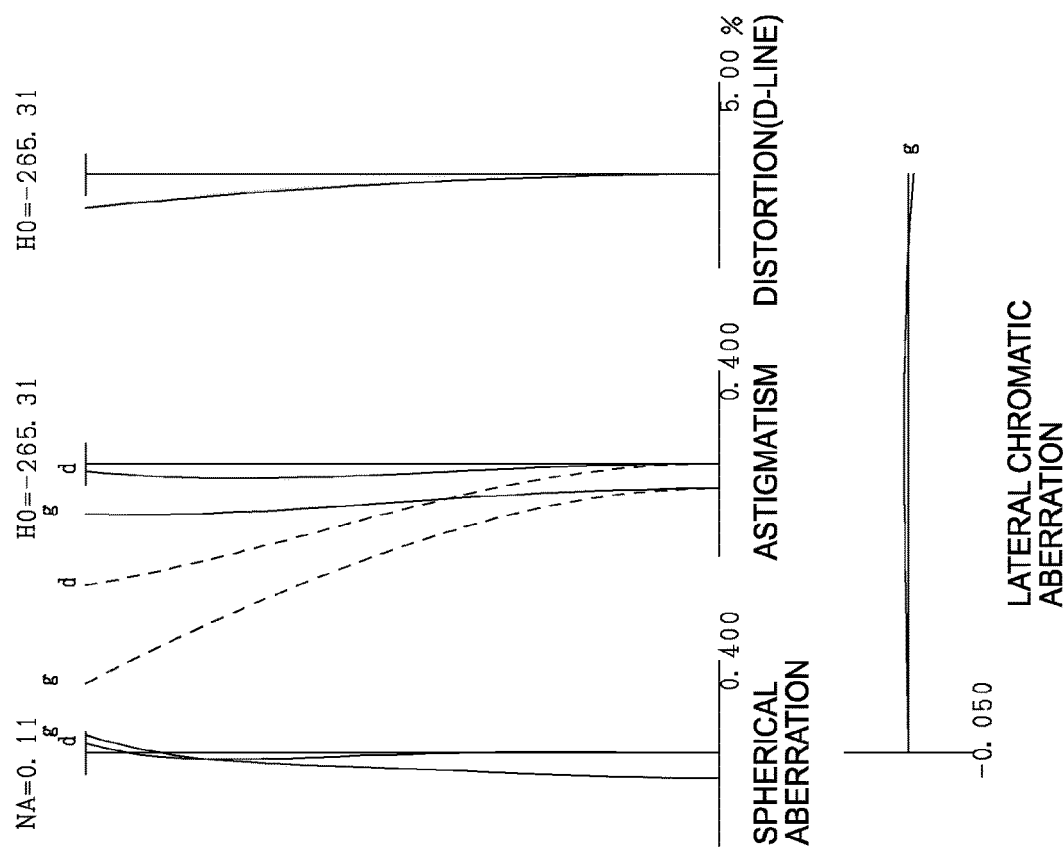

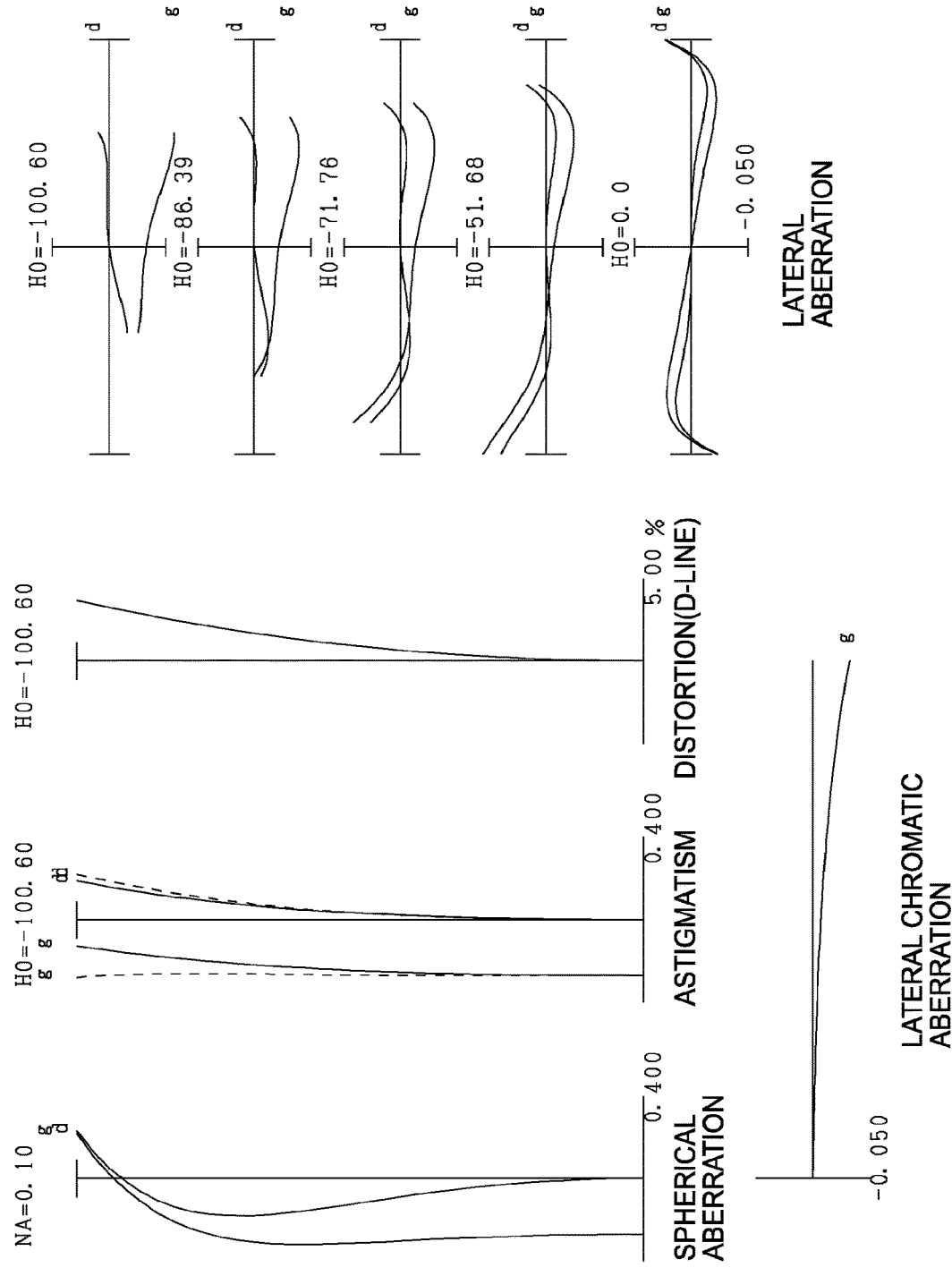

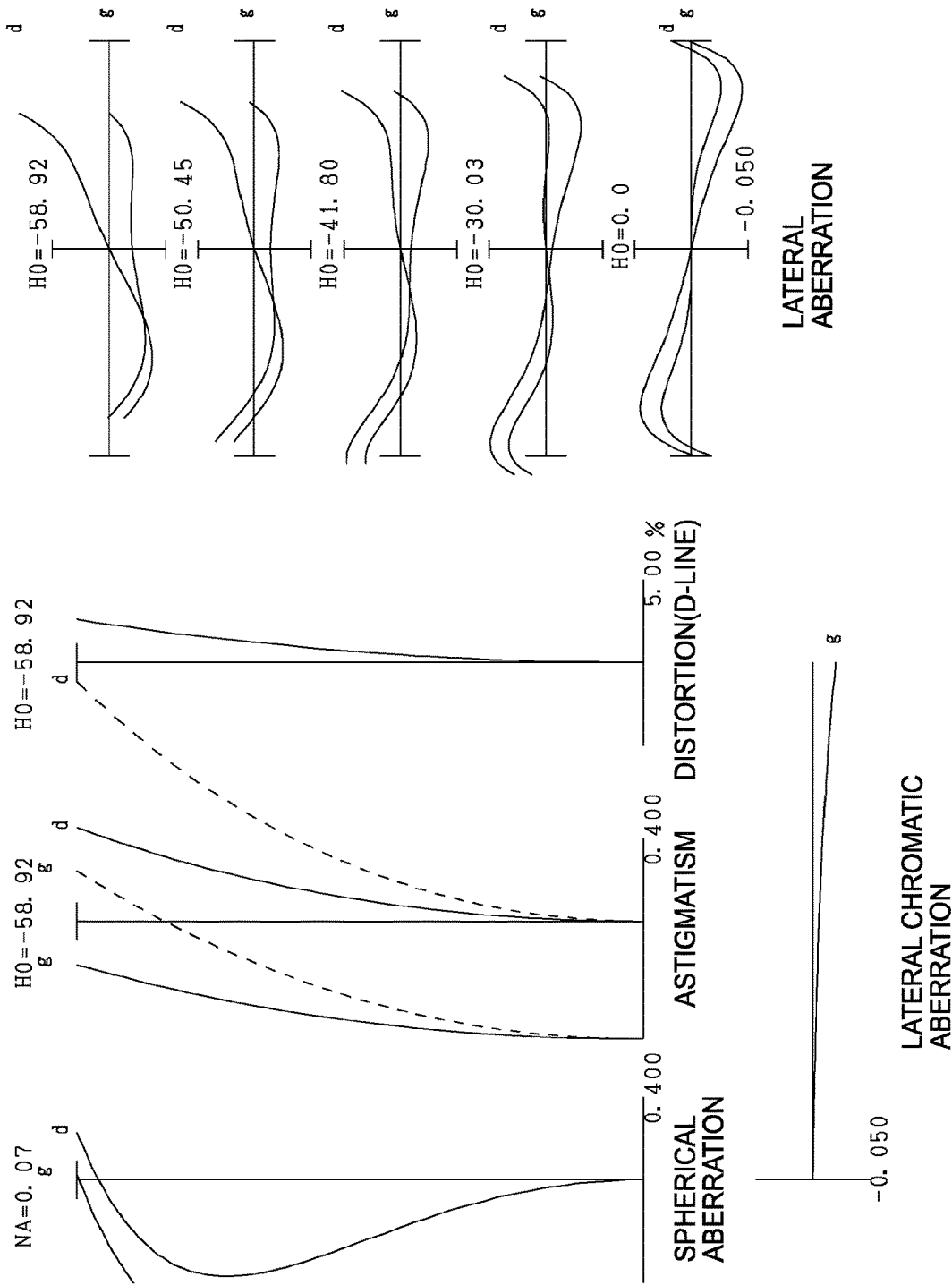

LATERAL ABERRATION

LATERAL ABERRATION

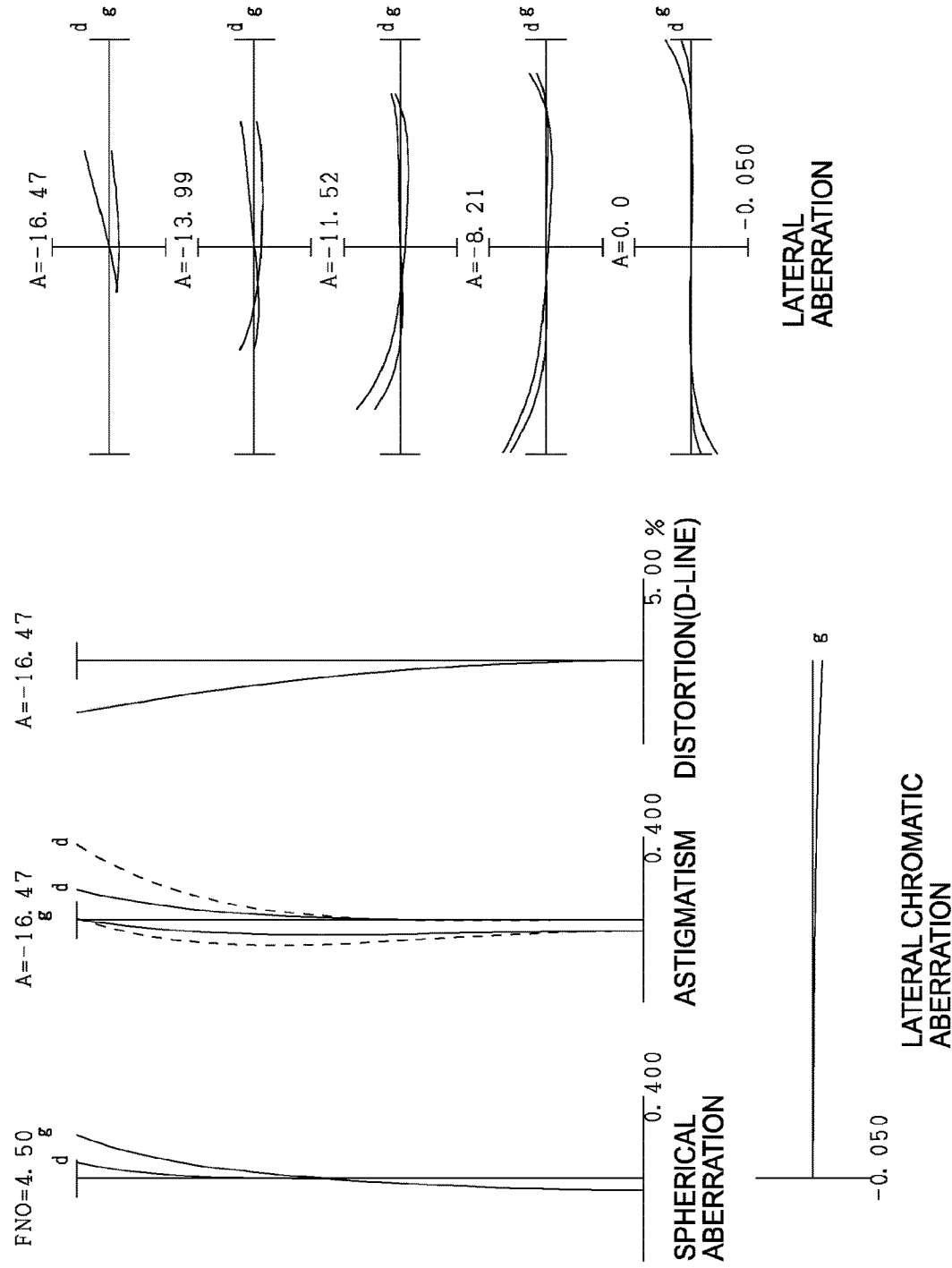

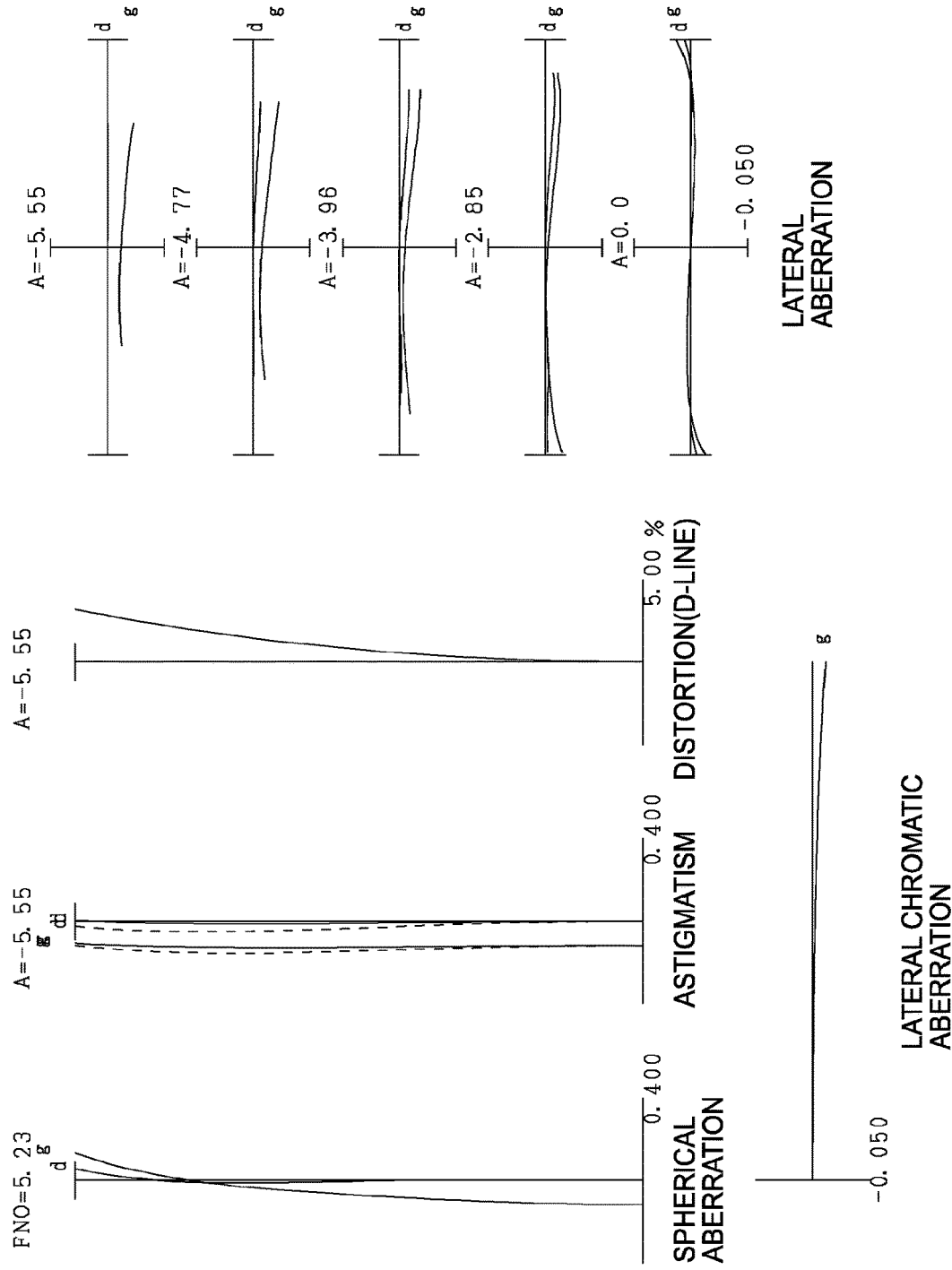

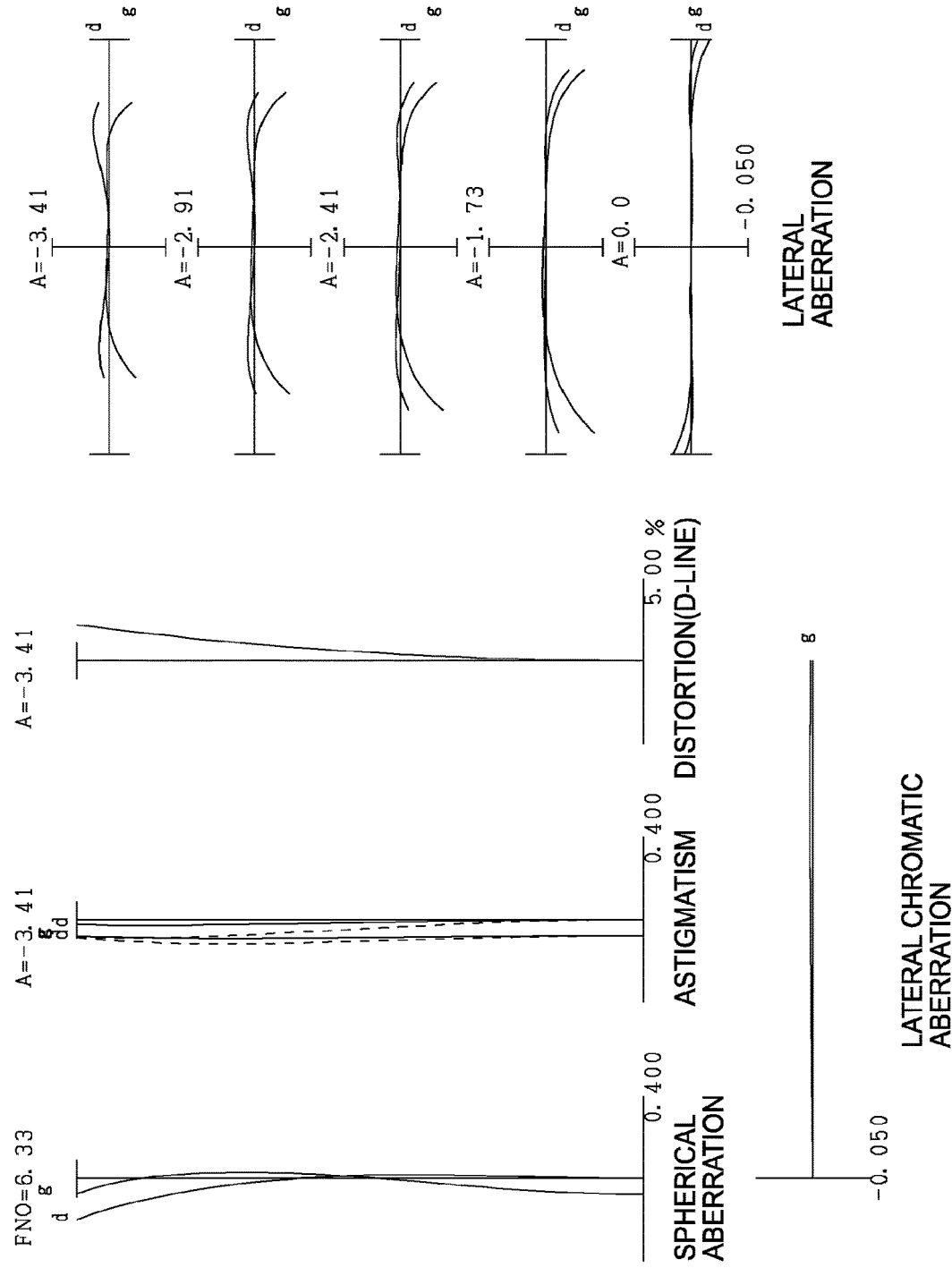

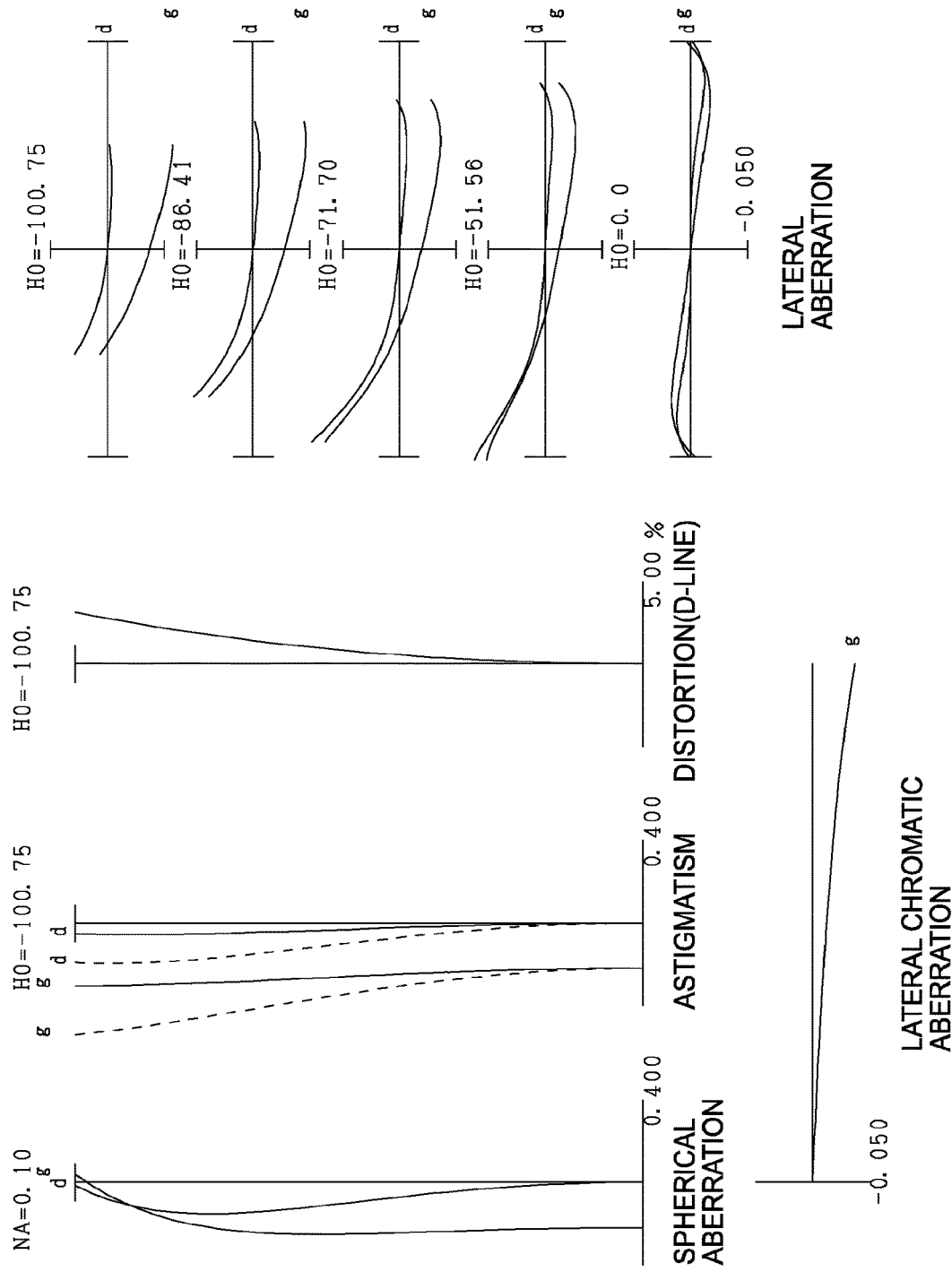

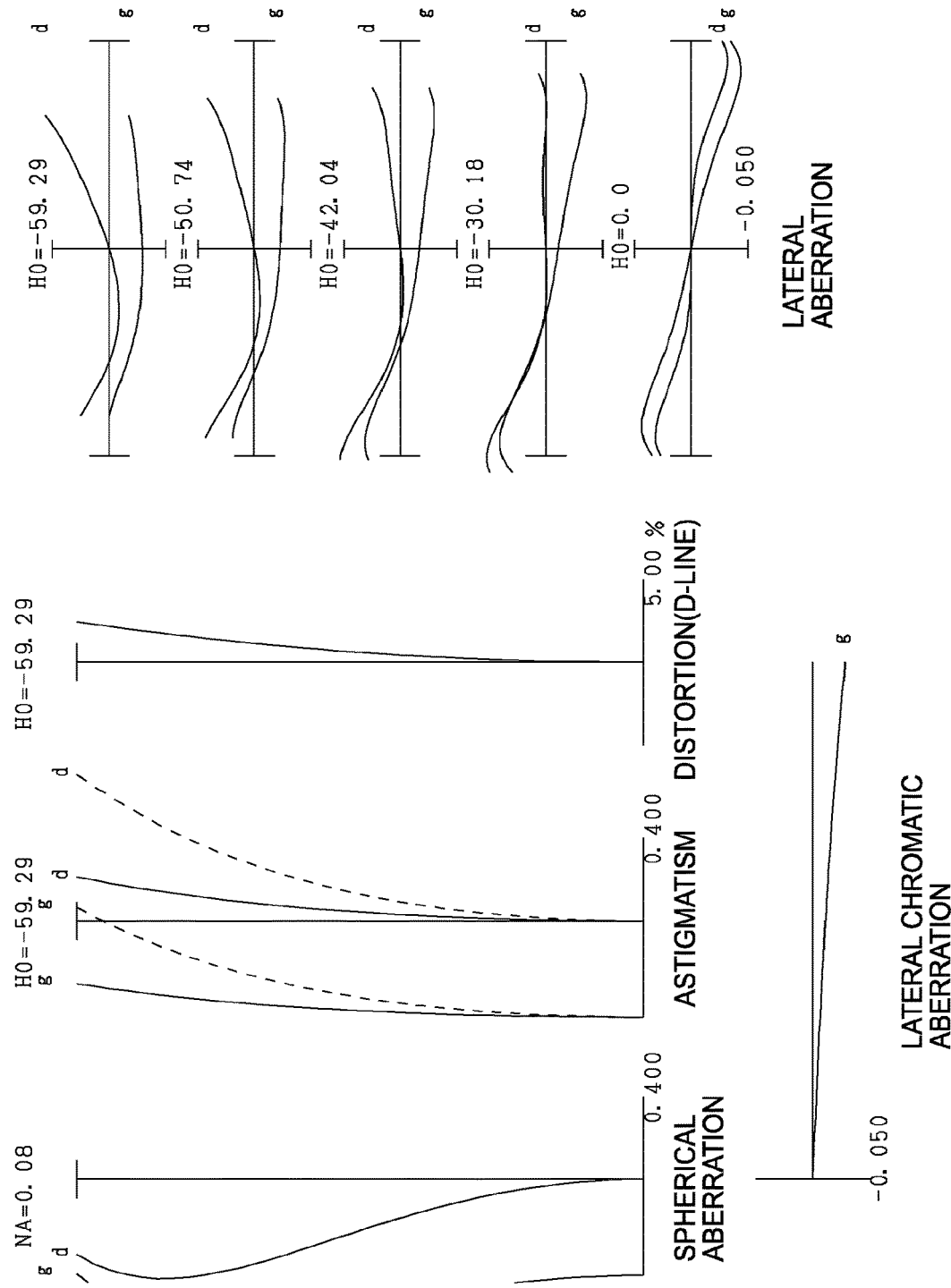

LATERAL
ABERRATION

LATERAL ABERRATION

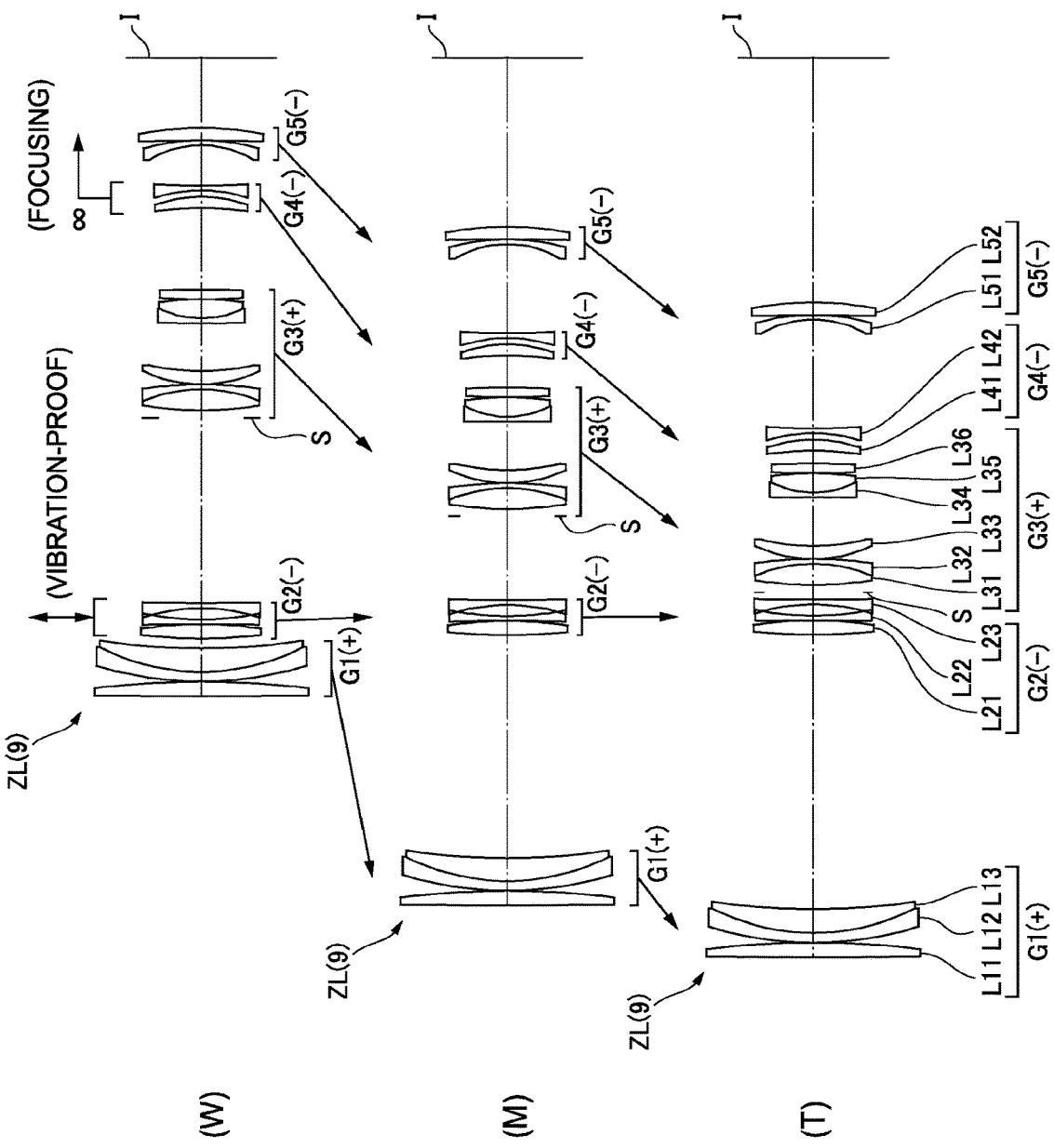

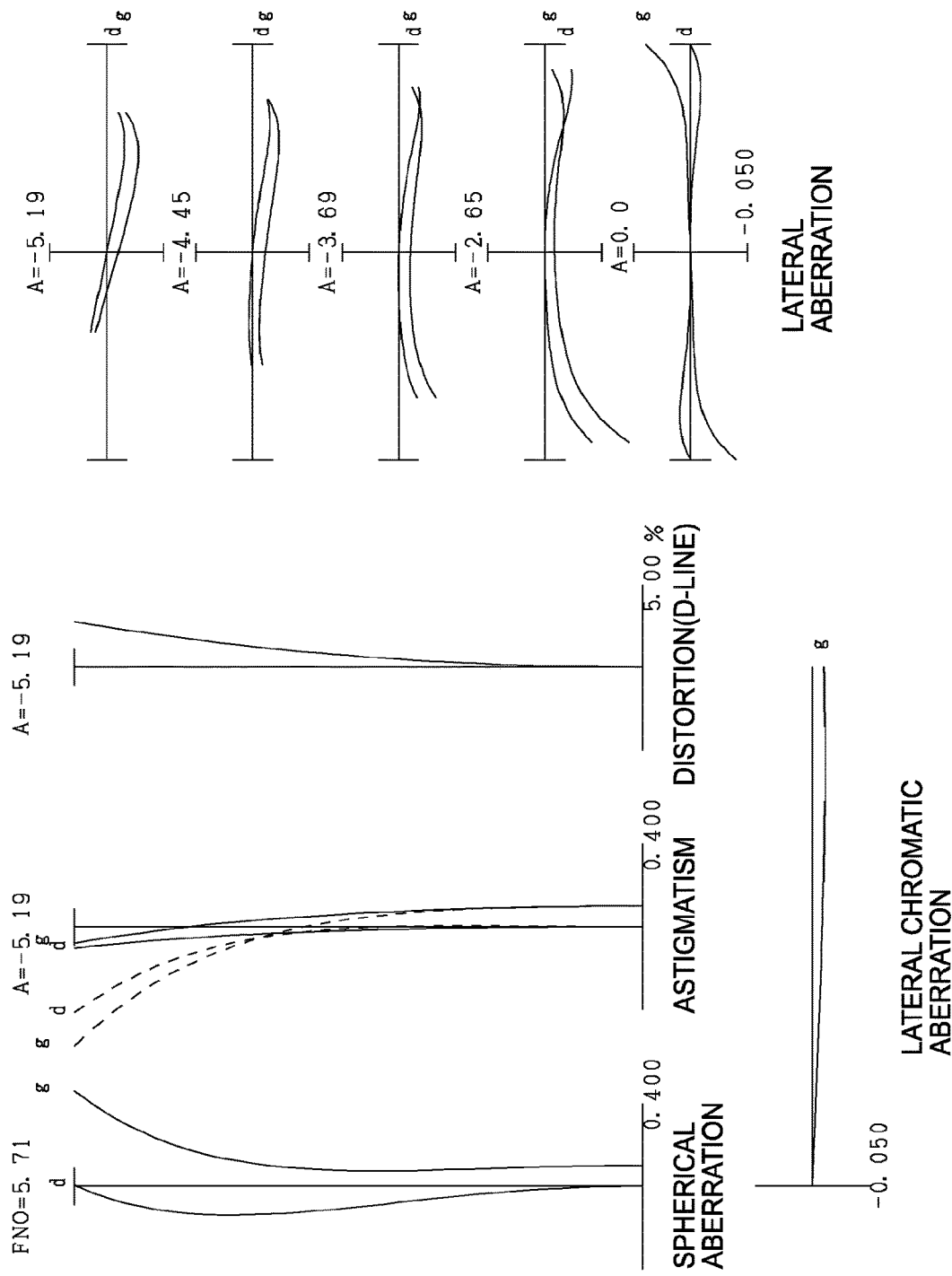

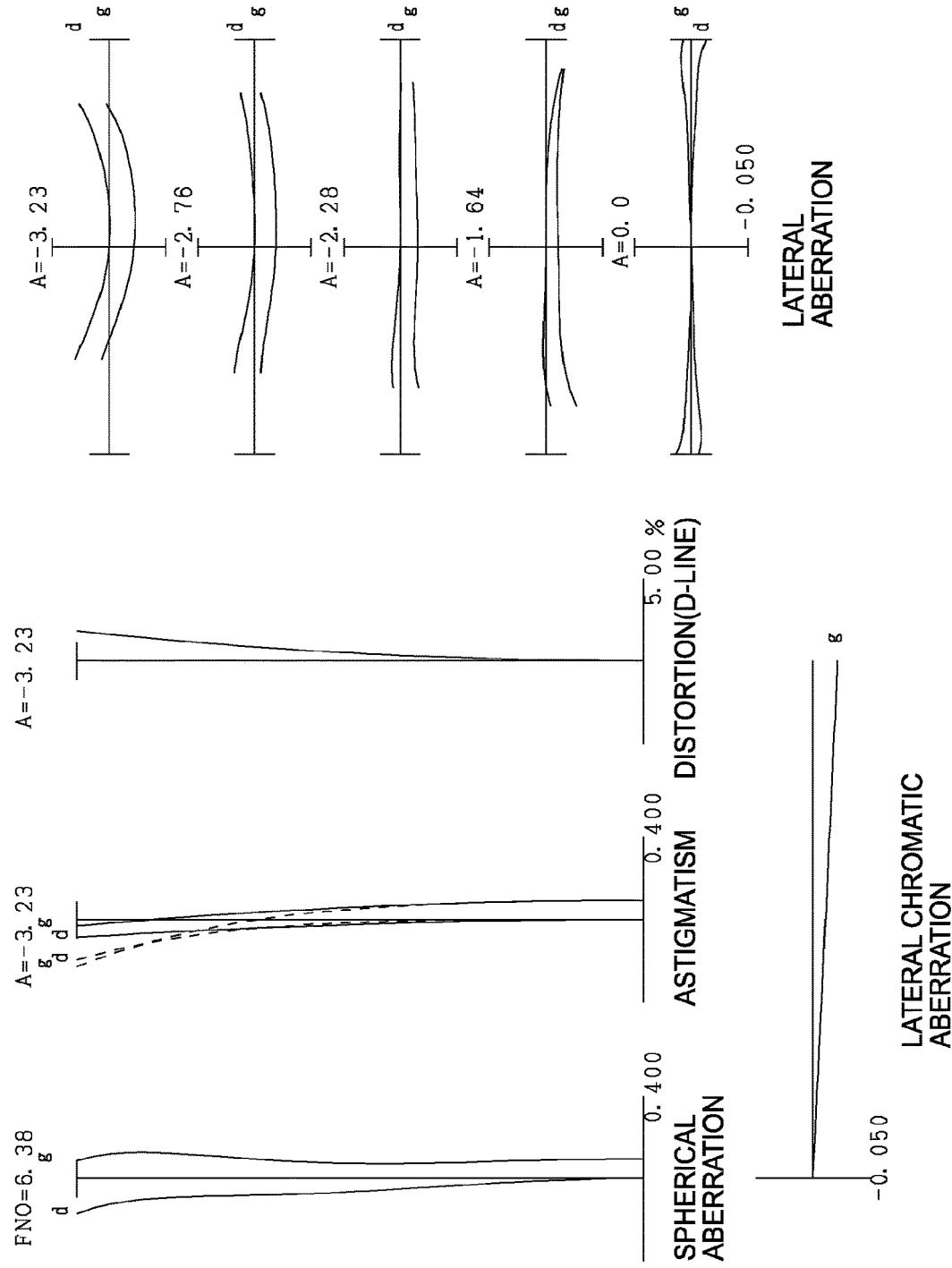

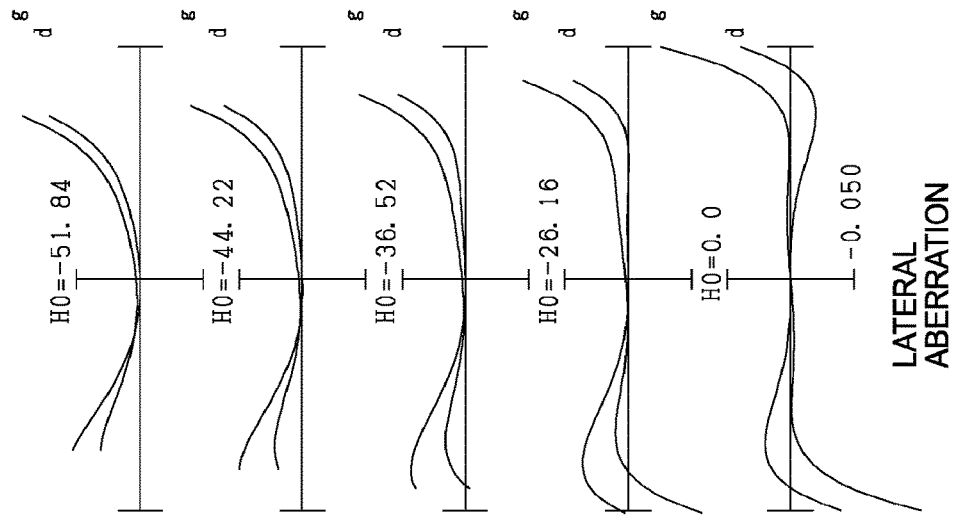
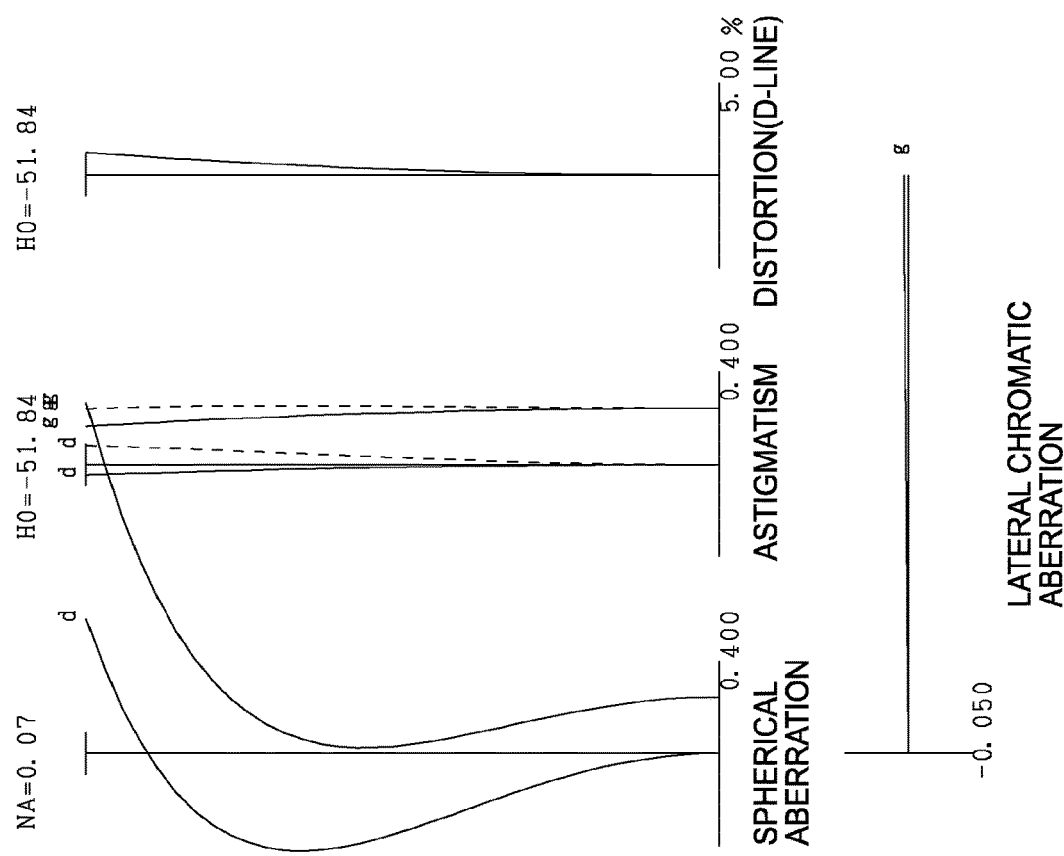
FIG.35C

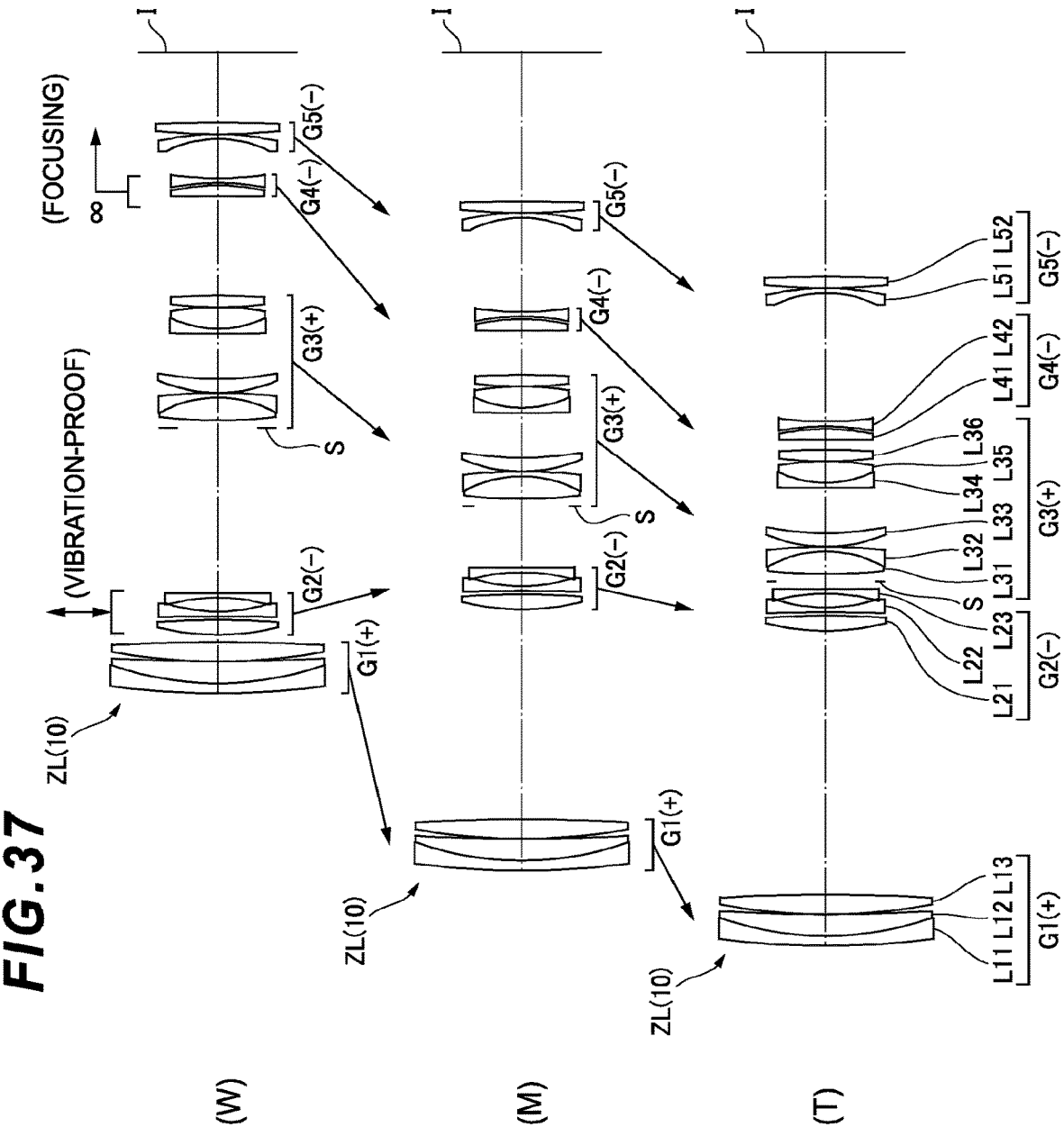

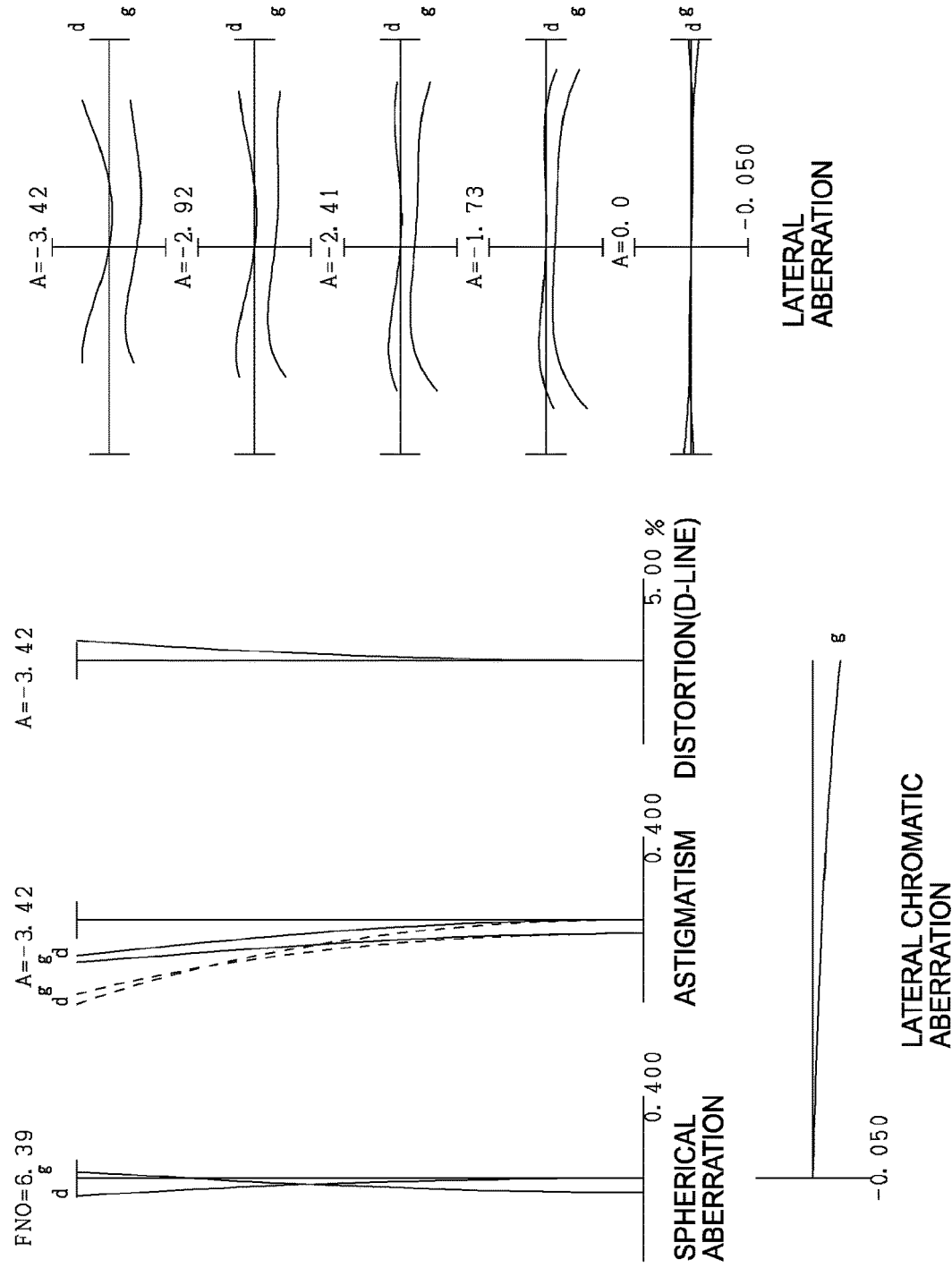

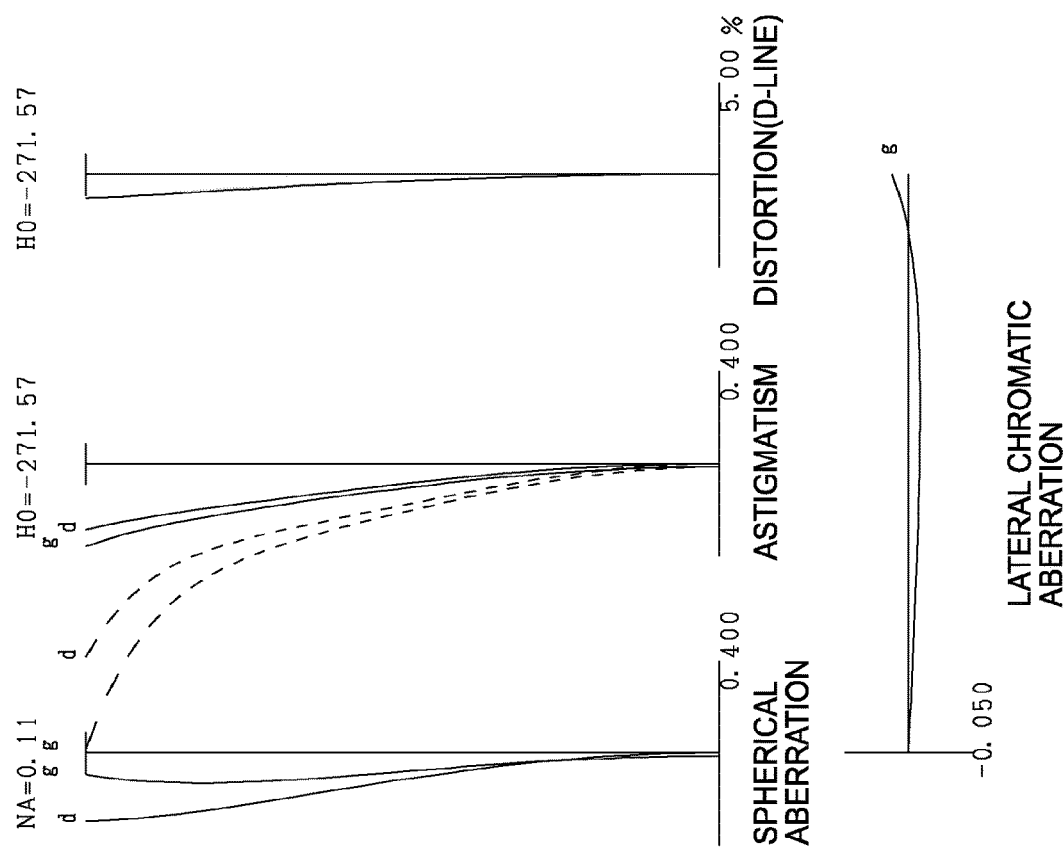

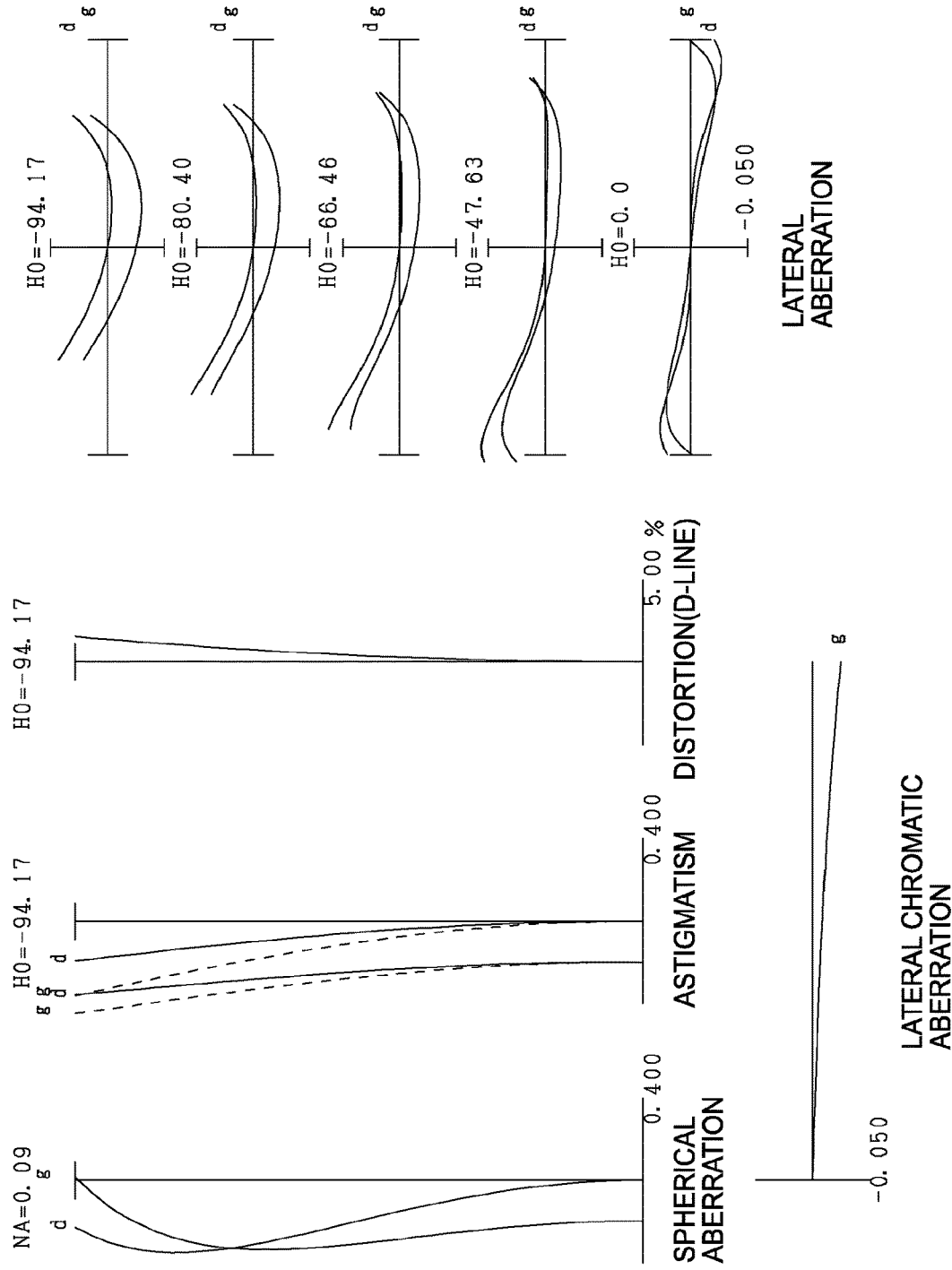

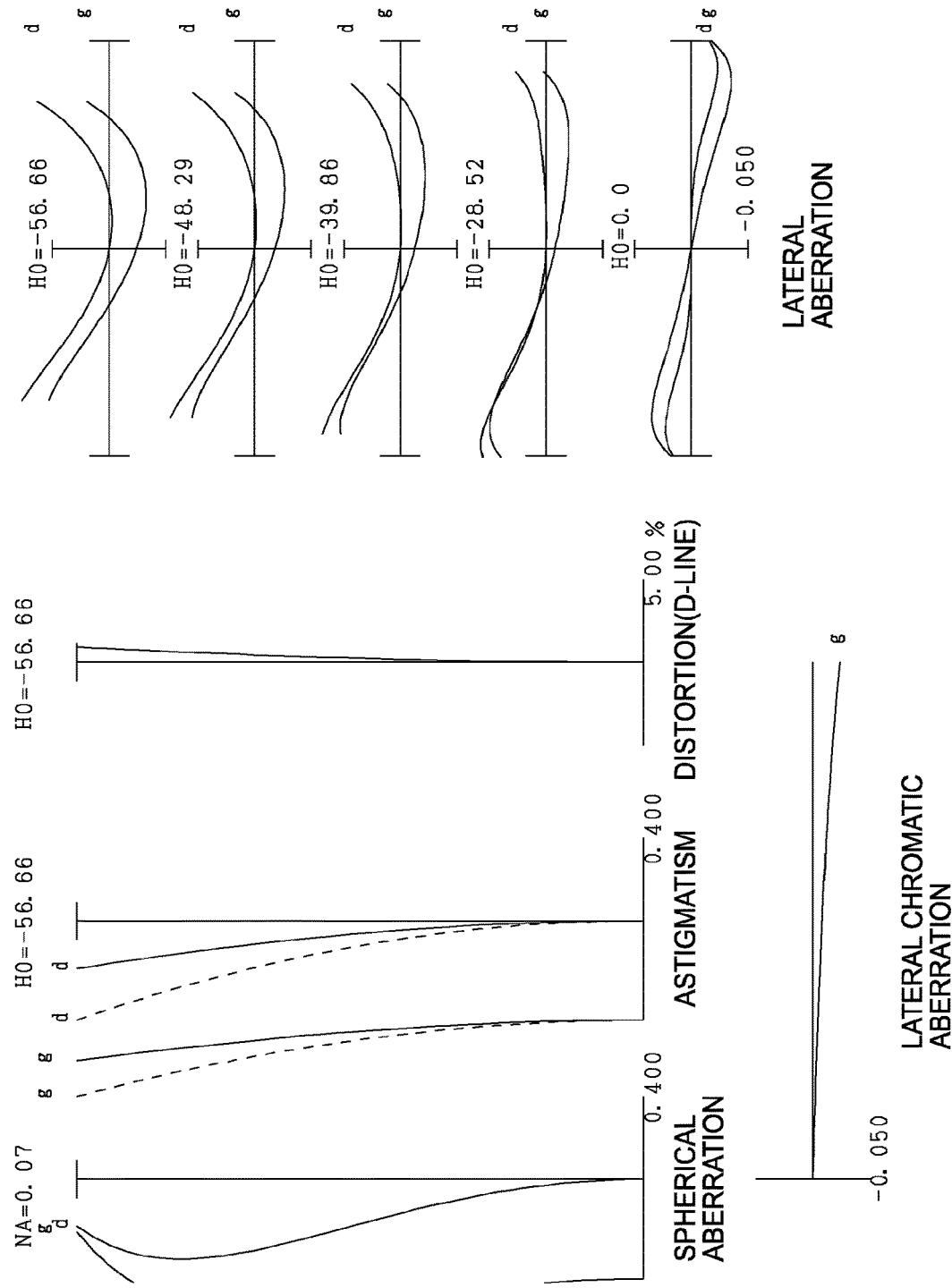

LATERAL ABERRATION

LATERAL
ABERRATION

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, optical apparatus using the zoom optical system, and a method for manufacturing the zoom optical system.

TECHNICAL BACKGROUND

Conventionally, a zoom optical system provided with a lens having an aspherical surface disposed on the image side of the aperture stop has been proposed (see Patent Literature 1, for example). In such a zoom optical system, however, since the degree of decentering sensitivity is high, variation in optical performance based on the assembly accuracy at the time of manufacture can hardly be suppressed. In addition, a zoom optical system equipped with a vibration proof group for correcting image blur has been proposed in the related art. However, in a zoom optical system equipped with a vibration proof group, a higher optical performance is required. Also, in a zoom optical system equipped with a vibration proof group, obtaining a high zooming rate has been difficult.

PRIOR ARTS LIST

Patent Document

Patent literature 1: Japanese Laid-Open Patent Publication No. 2014-219616(A)

SUMMARY OF THE INVENTION

A zoom optical system according to a first aspect comprises: a first lens group disposed closest to an object and having a positive refractive power; an aperture stop disposed closer to an image than the first lens group; a positive lens component disposed so as to oppose the image side of the aperture stop; and a lens group having the positive lens component, wherein a distance between the first lens group and a lens group having the positive lens component changes during zooming, at least one lens surface of the positive lens component has an aspherical surface, and the following conditional expression, $$0.40 < fp/fGp < 3.60$$

is satisfied
where
fp: a focal length of the positive lens component, and
fGp: a focal length of the lens group having the positive lens component.

A zoom optical system according to a second aspect comprises: a first lens group having a positive refractive power; a second lens group disposed closer to an image than the first lens group and having a negative refractive power; a third lens group disposed closer to an image than the second lens group and having a positive refractive power; and a fourth lens group disposed closer to an image than the third lens group and having a negative refractive power, wherein a distance between the first lens group and the second lens group changes, the distance between the second lens group and the third lens group changes, and the distance between the third lens group and the fourth lens group changes during zooming, the second lens group includes at least partly a vibration proof group movable so as to have a displacement component in a direction perpendicular to an optical axis, the third lens group consists of the object side subgroup having a positive refractive power and the image side subgroup having a positive refractive power disposed in order from an object, the air distance between the object side subgroup and the image side subgroup is the maximum air distance among air distances between lenses in the third lens group, and the following conditional expressions, $$0.06 < f3\alpha/f3\beta < 2.60$$

$$1.50 < f1/(-f2) < 4.50$$

are satisfied,
where
  f3α: a focal length of the object side subgroup,
  f3β: a focal length of the image side subgroup,
  f1: a focal length of the first lens group,
  f2: a focal length of the second lens group.

A zoom optical system according to a third aspect comprises: a first lens group having a positive refractive power; a second lens group disposed closer to an image than the first lens group and having a negative refractive power; a third lens group disposed closer to an image than the second lens group and having a positive refractive power; and a fourth lens group disposed closer to an image than the third lens group and having a negative refractive power, wherein a distance between the first lens group and the second lens group changes, a distance between the second lens group and the third lens group changes, and a distance between the third lens group and the fourth lens group changes during zooming, the second lens group includes at least partly a vibration proof group movable so as to have a displacement component in a direction perpendicular to an optical axis, the third lens group consists of the object side subgroup having a positive refractive power and the image side subgroup having a positive refractive power disposed in order from an object, a lens component including a negative lens is disposed at a position closest to an object in the image side subgroup, and the following conditional expression, $$0.08 < f3\alpha/f3b < 1.20$$

is satisfied,
where
  f3α: a focal length of the object side subgroup, and
  f3b: a focal length of the image side subgroup.

A zoom optical system according to a fourth aspect comprises: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, wherein a distance between the first lens group and the second lens group changes, a distance between the second lens group and the third lens group changes, and a distance between the third lens group and the fourth lens group changes during zooming, the second lens group consists of a negative subgroup having a negative refractive power and the vibration proof group capable of moving so as to have a displacement component in a direction perpendicular to the optical axis and having a negative refractive power disposed in order from an object, and a lens component including a positive lens is disposed at a position closest to an image in the vibration proof group.

An optical apparatus according to a fifth aspect includes the zoom optical system mounted thereon.

A method for manufacturing a zoom optical system according to a sixth aspect is a method of manufacturing a zoom optical system comprising: a first lens group disposed closest to an object and having a positive refractive power, an aperture stop disposed closer to an image than the first lens group, a positive lens component disposed so as to oppose the image side of the aperture stop, and a lens group having the positive lens component, the method comprising: disposing each lens within a lens barrel so that a distance between the first lens group and a lens group having the positive lens component changes during zooming, at least one lens surface of the positive lens component has an aspherical surface, and a conditional expression, $$0.40 < fp/fGp < 3.60$$

is satisfied,
where
fp: a focal length of the positive lens component, and
fGp: a focal length of the lens group having the positive lens component.

A method for manufacturing a zoom optical system according to a seventh aspect is a method of manufacturing a zoom optical system comprising: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, and the method for manufacturing the zoom optical system comprising:
disposing each lens within a lens barrel so that a distance between the first lens group and the second lens group changes, a distance between the second lens group and the third lens group changes, and a distance between the third lens group and the fourth lens group changes during zooming, the second lens group includes at least partly a vibration proof group movable so as to have a displacement component in a direction perpendicular to an optical axis, the third lens group consists of the object side subgroup having a positive refractive power and the image side subgroup having a positive refractive power disposed in order from an object, the air distance between the object side subgroup and the image side subgroup is the maximum air distance among air distances between lenses in the third lens group, and conditional expressions, $$0.06 < f3\alpha/f3\beta < 2.60$$

$$1.50 < f1/(-f2) < 4.50$$

are satisfied,
where
f3α: a focal length of the object side subgroup,
f3β: a focal length of the image side subgroup,
f1: a focal length of the first lens group,
f2: a focal length of the second lens group.

A method for manufacturing a zoom optical system according to an eighth aspect is a method of manufacturing a zoom optical system comprising: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, and the method for manufacturing the zoom optical system comprising:
disposing each lens within a lens barrel so that a distance between the first lens group and the second lens group changes, a distance between the second lens group and the third lens group changes, and a distance between the third lens group and the fourth lens group changes during zooming, the second lens group includes at least partly a vibration proof group movable so as to have a displacement component in a direction perpendicular to an optical axis, the third lens group consists of the object side subgroup having a positive refractive power and the image side subgroup having a positive refractive power disposed in order from an object, a lens component including a negative lens is disposed at a position closest to an object in the image side subgroup, and a conditional expression, $$0.08 < f3a/f3b < 1.20$$

is satisfied,
where
f3a: a focal length of the object side subgroup, and
f3b: a focal length of the image side subgroup.

A method for manufacturing a zoom optical system according to a ninth aspect is a method of manufacturing a zoom optical system comprising: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, and the method for manufacturing the zoom optical system comprising:
disposing each lens within a lens barrel so that a distance between the first lens group and the second lens group changes, a distance between the second lens group and the third lens group changes, and a distance between the third lens group and the fourth lens group changes during zooming, the second lens group consists of a negative subgroup having a negative refractive power and the vibration proof group capable of moving so as to have a displacement component in a direction perpendicular to the optical axis and having a negative refractive power disposed in order from an object, and a lens component including a positive lens is arranged closest to an image in the vibration proof group.

BRIEF DESCRIPTION OF THE DRAWINGS

FIG. 1 is a drawing illustrating a lens configuration of a zoom optical system according to Example 1;

FIG. 2A, FIG. 2B and FIG. 2C are each an aberration graph illustrating aberrations upon focusing on infinity in a wide angle end state, in an intermediate focal length state, and in a telephoto end state of the zoom optical system according to Example 1;

FIG. 3A, FIG. 3B, and FIG. 3C are each an aberration graph illustrating aberrations upon focusing on a short distant object in the wide angle end state, in the intermediate focal length state, and in the telephoto end state of the zoom optical system according to Example 1;

FIG. 5 is a drawing illustrating a lens configuration of a zoom optical system according to Example 2;

FIG. 6A, FIG. 6B and FIG. 6C are each an aberration graph illustrating aberrations upon focusing on infinity in a wide angle end state, in an intermediate focal length state, and in a telephoto end state of the zoom optical system according to Example 2;

FIG. 7A, FIG. 7B, and FIG. 7C are each an aberration graph illustrating aberrations upon focusing on a short distant object in a wide angle end state, in an intermediate focal length state, and in a telephoto end state of the zoom optical system according to Example 2;

FIG. 9 is a drawing illustrating a lens configuration of a zoom optical system according to Example 3;

FIG. 10A, FIG. 10B, and FIG. 10C are each an aberration graph illustrating aberrations upon focusing on infinity in a wide angle end state, in an intermediate focal length state, and in a telephoto end state of the zoom optical system according to Example 3.

FIG. 11A, FIG. 11B and FIG. 11C are each an aberration graph illustrating aberrations upon focusing on a short distant object in a wide angle end state, in an intermediate focal length state, and in a telephoto end state of the zoom optical system according to Example 3;

FIG. 14A, FIG. 14B, and FIG. 14C are each an aberration graph illustrating aberrations upon focusing on infinity in a wide angle end state, in an intermediate focal length state, and in a telephoto end state of the zoom optical system according to Example 4;

FIG. 15A, FIG. 15B, and FIG. 15C are each an aberration graph illustrating aberrations upon focusing on a short distant object in a wide angle end state, in an intermediate focal length state, and in a telephoto end state of the zoom optical system according to Example 4;

FIG. 18A, FIG. 18B, and FIG. 18C are each an aberration graph illustrating aberrations upon focusing on infinity in a wide angle end state, in an intermediate focal length state, and in a telephoto end state of the zoom optical system according to Example 5;

FIG. 19A, FIG. 19B, and FIG. 19C are each an aberration graph illustrating aberrations upon focusing on a short distant object in a wide angle end state, in an intermediate focal length state, and in a telephoto end state of the zoom optical system according to Example 5;

FIG. 21 is a drawing illustrating a lens configuration of a zoom optical system according to Example 6;

FIG. 22A, FIG. 22B, and FIG. 22C are each an aberration graph illustrating aberrations upon focusing on infinity in a wide angle end state, in an intermediate focal length state, and in a telephoto end state of the zoom optical system according to Example 6;

FIG. 23A, FIG. 23B, and FIG. 23C are each an aberration graph illustrating aberrations upon focusing on a short distant object in a wide angle end state, in an intermediate focal length state, and in a telephoto end state of the zoom optical system according to Example 6;

FIG. 26A, FIG. 26B, and FIG. 26C are each an aberration graph illustrating aberrations upon focusing on infinity in a wide angle end state, in an intermediate focal length state, and in a telephoto end state of the zoom optical system according to Example 7;

FIG. 27A, FIG. 27B, and FIG. 27C are each an aberration graph illustrating aberrations upon focusing on a short distant object in a wide angle end state, in an intermediate focal length state, and in a telephoto end state of the zoom optical system according to Example 7;

FIG. 30A, FIG. 30B, and FIG. 30C are each an aberration graph illustrating aberrations upon focusing on infinity in a wide angle end state, in an intermediate focal length state, and in a telephoto end state of the zoom optical system according to Example 8;

FIG. 31A, FIG. 31B, and FIG. 31C are each an aberration graph illustrating aberrations upon focusing on a short distant object in a wide angle end state, in an intermediate focal length state, and in a telephoto end state of the zoom optical system according to Example 8;

FIG. 33 is a drawing illustrating a lens configuration of a zoom optical system according to Example 9;

FIG. 34A, FIG. 34B, and FIG. 34C are each an aberration graph illustrating aberrations upon focusing on infinity in a wide angle end state, in an intermediate focal length state, and in a telephoto end state of the zoom optical system according to Example 9;

FIG. 35A, FIG. 35B, and FIG. 35C are each an aberration graph illustrating aberrations upon focusing on a short distant object in a wide angle end state, in an intermediate focal length state, and in a telephoto end state of the zoom optical system according to Example 9;

FIG. 37 is a drawing illustrating a lens configuration of a zoom optical system according to Example 10;

FIG. 38A, FIG. 38B, and FIG. 38C are each an aberration graph illustrating aberrations upon focusing on infinity in a wide angle end state, in an intermediate focal length state, and in a telephoto end state of the zoom optical system according to Example 10;

FIG. 39A, FIG. 39B, and FIG. 39C are each an aberration graph illustrating aberrations upon focusing on a short distant object in a wide angle end state, in an intermediate focal length state, and in a telephoto end state of the zoom optical system according to Example 10;

DESCRIPTION OF THE EMBODIMENTS

First Embodiment

A zoom optical system and an optical apparatus according to the first embodiment will now be described with reference to the drawings. A zoom optical system ZL (1) as an example of the zoom optical system (zoom lens) ZL according to the first embodiment comprises: as illustrated in FIG. 1, a first lens group G1 disposed at a position closest to an object and having a positive refractive power; an aperture stop S disposed closer to an image than the first lens group G1; a positive lens component disposed so as to oppose the image side of the aperture stop S; and a lens group (third lens group G3) having a positive lens component. During zooming, a distance between the first lens group G1 and a lens group having a positive lens component changes. Also, at least one lens surface of the positive lens component has an aspherical surface. In each embodiment, the lens component indicates a single lens or a cemented lens. The expression "positive lens component disposed so as to oppose the image side of the aperture stop S" means that the aperture stop S and the positive lens component are disposed in order from the object side, and no other optical element (lens or the like) is disposed between the aperture stop S and the positive lens component.

Figure 13:
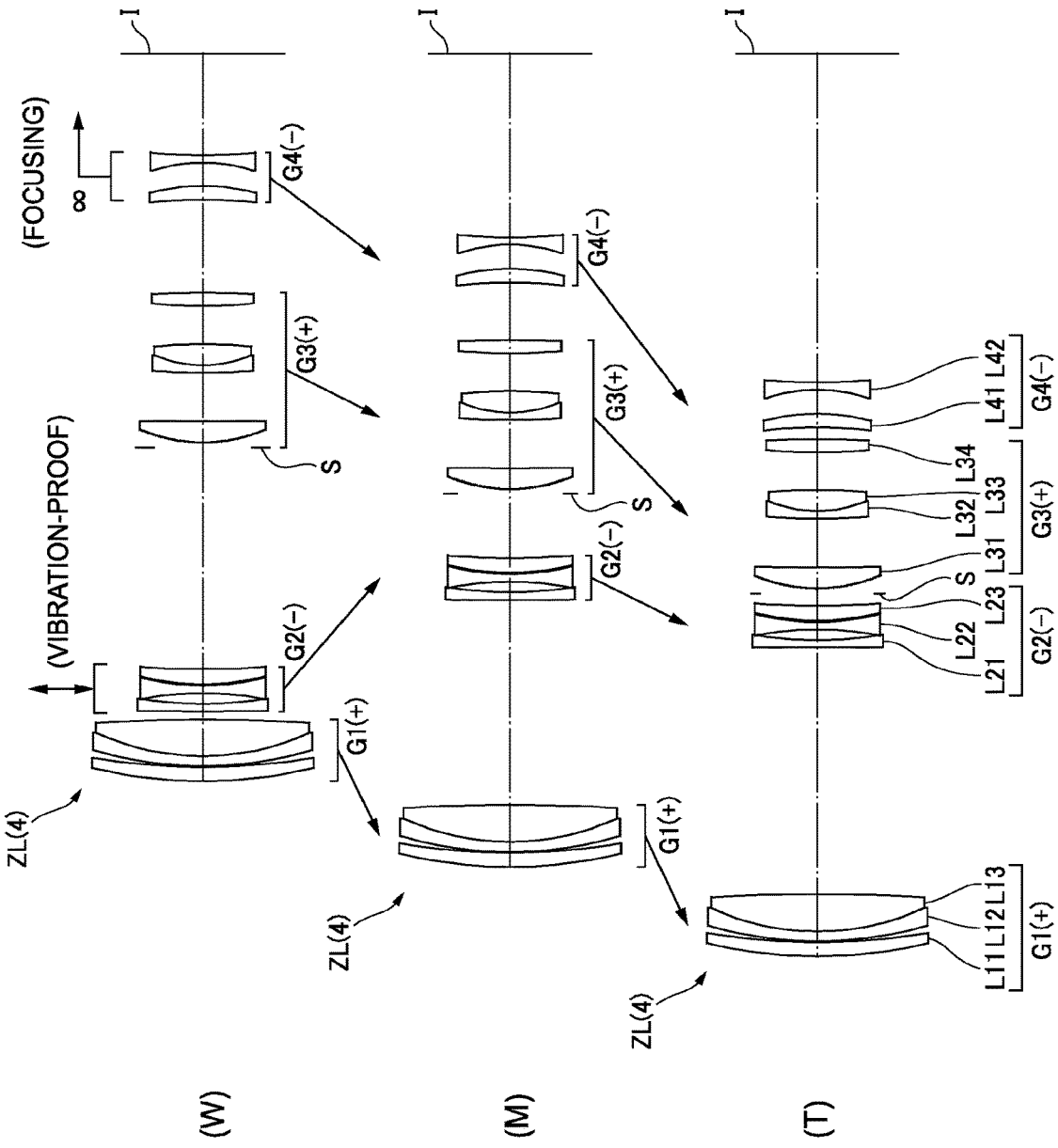
FIG. 13 is a drawing illustrating a lens configuration of a zoom optical system according to Example 4.
Figure 17:
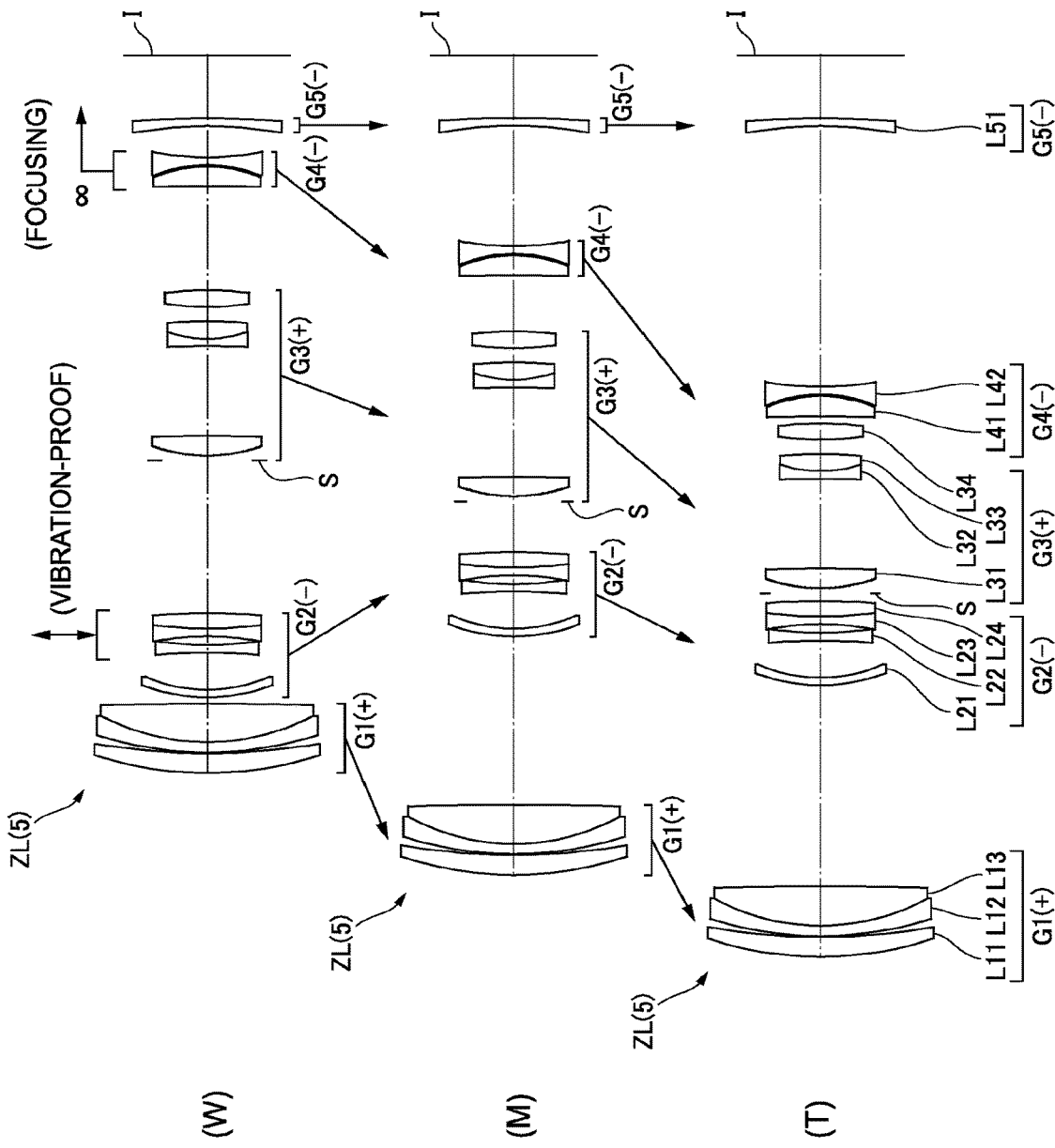
FIG. 17 is a drawing illustrating a lens configuration of a zoom optical system according to Example 5.

The zoom optical system ZL according to the first embodiment may be a zoom optical system ZL (2) illustrated in FIG. 5; may be a zoom optical system ZL (3) illustrated in FIG. 9; may be a zoom optical system ZL (4) illustrated in FIG. 13; and may be a zoom optical system ZL (5) illustrated in FIG. 17. The zoom optical system ZL according to the first embodiment may be a zoom optical system ZL (6) illustrated in FIG. 21, a zoom optical system ZL (7) illustrated in FIG. 25, and a zoom optical system ZL (8) illustrated in FIG. 29. It should be noted that groups from the zoom optical system ZL (2) to ZL (8) illustrated in FIG. 5 or other drawings are configured in the same manner as the zoom optical system ZL (1) illustrated in FIG. 1.

The zoom optical system ZL according to the first embodiment having the configuration described above satisfies the following conditional expression. Accordingly, a telephoto type zoom optical system having low degree of decentering sensitivity and less variation in optical performance based on the assembly accuracy at the time of manufacture is achieved.

$$0.40 < fp/fGp < 3.60 \tag{1},$$

where
fp: a focal length of the positive lens component, and
fGp: a focal length of the lens group having the positive lens component.

The conditional expression (1) is a conditional expression defining an adequate range of a focal length of the positive lens component disposed so as to oppose the image side of the aperture stop S. When the corresponding value of the conditional expression (1) exceeds the upper limit value, the power (refractive power) of the positive lens component decreases, which makes it difficult to correct the spherical aberration and the coma aberration. In order to ensure the effect of this embodiment, the upper limit value of the conditional expression (1) is preferably set to 3.00, and more preferably to 2.60.

When the corresponding value of the conditional expression (1) undergoes the lower limit value, the power of the positive lens component increases, and thus, which is advantageous for correction of various aberrations such as spherical aberration as a representative example. However, it is not preferable because deterioration of optical performance becomes prominent when the positive lens component is deviated due to assembly accuracy at the time of manufacture. In order to ensure the effect of this embodiment, the lower limit value of the conditional expression (1) is preferably set to 0.50, and more preferably to 0.60.

Also, it is more preferable that the zoom optical system ZL according to the first embodiment satisfies the following conditional expression (1A).

$$0.70 < fp/fGp < 1.90 \tag{1A}.$$

In the zoom optical system ZL according to the first embodiment, the following conditional expression (2) is preferably satisfied.

$$0.40 < LS/LGp < 0.90 \tag{2},$$

where
LS: a sum of air distances on the image side of the positive lens component in the lens group having the positive lens component, and
LGp: a thickness of the lens group having the positive lens component on the optical axis.

The conditional expression (2) is a conditional expression defining an adequate range of the thickness of the lens group having the positive lens component on the optical axis. When the corresponding value of the conditional expression (2) exceeds the upper limit value, the power of the lens surface closer to an image than the positive lens component becomes stronger in the lens group having the positive lens component, which makes it difficult to correct the coma aberration in the telephoto end state and the astigmatism in the wide angle end state. In order to ensure the effect of this embodiment, the upper limit value of the conditional expression (2) is preferably set to 0.80, and more preferably to 0.70.

When the corresponding value of the conditional expression (2) undergoes the lower limit value, the power of the lens surface closer to an image than the positive lens component becomes weaker in the lens group having the positive lens component, which makes it difficult to correct the coma aberration in the telephoto end state and the astigmatism in the wide angle end state. In order to ensure the effect of this embodiment, the lower limit value of the conditional expression (2) is preferably set to 0.42, and more preferably to 0.435.

In the zoom optical system ZL according to the first embodiment, the first lens group G1 preferably moves along the optical axis during zooming. Accordingly, the distance between the first lens group G1 and the lens group disposed closer to an image than the first lens group G1 changes during zooming, and thus a high zooming rate is achieved.

In the zoom optical system ZL according to the first embodiment, the following conditional expression (3) is preferably satisfied.

$$0.15 < 100 \times (\Delta/\varphi) < 1.30 \quad (3),$$

where $\varphi$: a maximum effective diameter of the lens surface on the object side of the positive lens component, and $\Delta$: an absolute value between a difference between the aspherical amount at a position corresponding to the maximum effective diameter of the lens surface on the object side in the positive lens component and the aspherical amount at a position corresponding to the maximum effective diameter of the lens surface on the image side in the positive lens component.

The conditional expression (3) is a conditional expression defining an adequate range of an aspherical amount (sag amount) of the positive lens component disposed so as to oppose the image side of the aperture stop S. It should be noted that the effective diameter of the lens surface on the object side in the positive lens component or the effective diameter of the lens surface on the image side becomes the maximum effective diameter upon focusing on infinity in the telephoto end state. However, the invention is not limited thereto. Also, the aspherical surface may be formed only on the lens surface on the object side of the positive lens component, may be formed only on the lens surface on the image side of the positive lens component, or may be formed on lens surfaces on both sides of the positive lens component. In other words, as described Above, the aspherical surface needs only be formed on at least one of the lens surfaces of the positive lens component.

When the corresponding value of the conditional expression (3) exceeds the upper limit value, the aspherical amount of the positive lens component increases, and thus, which is advantageous for correction of various aberrations such as spherical aberration as a representative example. However, it is not preferable because deterioration of optical performance becomes prominent when the positive lens component is deviated due to assembly accuracy at the time of manufacture. In order to ensure the effect of this embodiment, the upper limit value of the conditional expression (3) is preferably set to 1.00, and more preferably to 0.80.

When the corresponding value of the conditional expression (3) undergoes the lower limit value, the aspherical amount of the positive lens component decreases, which makes it difficult to correct the spherical aberration and the coma aberration. In order to ensure the effect of this embodiment, the lower limit value of the conditional expression (3) is preferably set to 0.20, and more preferably to 0.25.

The zoom optical system ZL according to the first embodiment preferably includes an image side negative lens group (fourth lens group G4) disposed at a position closer to an image than the lens group (third lens group G3) having a positive lens component and having a negative refractive power, wherein the distance between the lens group having a positive lens component and the image side negative lens group changes during zooming. Accordingly, the distance between the lens group having a positive lens component and the image side negative lens group changes during zooming, and thus a high zooming rate is achieved.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming. Accordingly, a distance between the first lens group G1 and the object side negative lens group changes, and a distance between the object side negative lens group and the lens group having a positive lens component changes during zooming, and thus a high zooming rate is achieved.

In the zoom optical system ZL according to the first embodiment, the lens group (third lens group G3) having a positive lens component preferably includes four or five lenses. Accordingly, various aberrations such as the spherical aberration, the coma Aberration, and the astigmatism may be successfully corrected.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming, and the object side negative lens group includes a vibration proof group movable so as to have a displacement component in a direction perpendicular to the optical axis. Accordingly, the eccentric coma aberration and the eccentric curvature of field when the shake compensation is performed may be successfully corrected. Also, the lateral chromatic aberration and the distortion in the wide angle end state may be successfully corrected.

The zoom optical system ZL according to the first embodiment preferably includes an image side negative lens group (fourth lens group G4) disposed at a position closer to an image than the lens group (third lens group G3) having a positive lens component and having a negative refractive power, and a distance between the lens group having a positive lens component and the image side negative lens group changes during zooming, and at least part of lenses in the image side negative lens group moves along the optical axis during focusing. Accordingly, variations in chromatic aberration and variation in spherical aberration during focusing may be successfully corrected.

In the zoom optical system ZL according to the first embodiment, the aperture stop S is preferably disposed at a position closest to an object in the lens group (third lens group G3) having a positive lens component. Accordingly, the astigmatism, the coma Aberration, and the lateral chromatic aberration may be successfully corrected.

In the zoom optical system ZL according to the first embodiment, the lens group (third lens group G3) having a positive lens component preferably consists of: an object side subgroup having a positive refractive power and an image side subgroup having a positive refractive power disposed in order from an object, and when a lens component including a negative lens is disposed at a position closest to an object in the image side subgroup, (in each example of the following description, the object side subgroup and the image side subgroup in such a case are referred to as first object side subgroup and first image side subgroup), the following conditional expression (4)

$$0.06 < fa/fb < 1.20 \tag{4}$$

is satisfied,
where
fa: a focal length of object side subgroup, and
fb: a focal length of image side subgroup.

The conditional expression (4) is a conditional expression for defining an adequate range for a ratio of focal lengths between the object side subgroup and the image side subgroup of the lens group (third lens group G3) having a positive lens component. By satisfying the conditional expression (4), the axial chromatic Aberration and the spherical aberration are successfully corrected.

When the corresponding value of the conditional expression (4) exceeds the upper limit value, the power of the image side subgroup is too much stronger than the power of the object side subgroup, which makes it difficult to correct the axial chromatic Aberration. In order to ensure the effect of this embodiment, the upper limit value of the conditional expression (4) is preferably set to 1.00, and more preferably to 0.80.

When the corresponding value of the conditional expression (4) undergoes the lower limit value, the power of the object side subgroup is too much stronger than the power of the image side subgroup, which makes it difficult to correct the spherical aberration. In order to ensure the effect of this embodiment, the lower limit value of the conditional expression (4) is preferably set to 0.08, and more preferably to 0.10.

In the zoom optical system ZL according to the first embodiment, the lens group (third lens group G3) having a positive lens component preferably consists of an object side subgroup having a positive refractive power and an image side subgroup having a positive refractive power disposed in order from an object, and when the air distance between the object side subgroup and the image side subgroup is the maximum air distance among all air distances between lenses in the lens group including a positive lens component (in each example of the following description, the object side subgroup and the image side subgroup in such a case are referred to as second object side subgroup and second image side subgroup), the following conditional expression (5) is satisfied.

$$0.06 < f\alpha/f\beta < 2.60 \tag{5}$$

where
fα: a focal length of object side subgroup, and
fβ: a focal length of the image side subgroup.

The conditional expression (5) is a conditional expression for defining an adequate range for a ratio of focal lengths between the object side subgroup and the image side subgroup of the lens group (third lens group G3) having a positive lens component. By satisfying the conditional expression (5), the axial chromatic Aberration and the spherical aberration are successfully corrected.

When the corresponding value of the conditional expression (5) exceeds the upper limit value, the power of the image side subgroup is too much stronger than the power of the object side subgroup, which makes it difficult to correct the axial chromatic Aberration. In order to ensure the effect of this embodiment, the upper limit value of the conditional expression (5) is preferably set to 2.20, and more preferably to 1.80.

When the corresponding value of the conditional expression (5) undergoes the lower limit value, the power of the object side subgroup is too much stronger than the power of the image side subgroup, which makes it difficult to correct the spherical aberration. In order to ensure the effect of this embodiment, the lower limit value of the conditional expression (5) is preferably set to 0.08, and more preferably to 0.10.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming, the object side negative lens group consists of a negative subgroup having a negative refractive power and the vibration proof group capable of moving so as to have a displacement component in a direction perpendicular to the optical axis and having a negative refractive power disposed in order from an object, and a lens component including a positive lens is disposed at a position closest to an image in the vibration proof group. Accordingly, the eccentric coma aberration and the eccentric curvature of field when the shake compensation is performed may be successfully corrected. Also, the lateral chromatic aberration and the distortion in the wide angle end state may be successfully corrected.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming, the object side negative lens group includes a vibration proof group movable so as to have a displacement component in a direction perpendicular to an optical axis, and the following conditional expression (6) is satisfied.

$$0.93 < fVR/fGa < 2.50 \tag{6}$$

where
fVR: a focal length of the vibration proof group, and
fGa: a focal length of the object side negative lens group.

The conditional expression (6) is a conditional expression for defining an adequate range for a ratio of focal lengths between the vibration proof group and the object side negative lens group (second lens group G2). By satisfying the conditional expression (6), correction of the eccentric coma aberration and the eccentric curvature of field when the shake compensation is performed may be successfully corrected. Also, the lateral chromatic aberration and the distortion in the wide angle end state may be successfully corrected.

When a corresponding value of the conditional expression (6) exceeds an upper limit value, the power of the object side negative lens group is too much stronger than the power of the vibration proof group, which makes it difficult to correct lateral chromatic aberration and distortion in the wide angle end state. In order to ensure the effect of this embodiment, the upper limit value of the conditional expression (6) is preferably set to 2.10, and more preferably to 1.70.

When the corresponding value of the conditional expression (6) undergoes the lower limit value, the power of the vibration proof group is too much stronger than the power of the object side negative lens group, which makes it difficult to correct the eccentric coma aberration and the eccentric curvature of field when shake compensation is performed. In order to ensure the effect of this embodiment, the lower limit value of the conditional expression (6) is preferably set to 1.00.

The zoom optical system ZL according to the first embodiment preferably includes an image side negative lens group (fourth lens group G4) disposed at a position closer to an image than the lens group (third lens group G3) having a positive lens component and having a negative refractive power, and a distance between the lens group having a positive lens component and the image side negative lens group changes during zooming, and the image side negative lens group includes a positive lens and a negative lens which are disposed in order from an object, and an air distance is present between the positive lens and the negative lens. Accordingly, variations in chromatic aberration and variation in spherical aberration during focusing may be successfully corrected.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, a distance between the object side negative lens group and the lens group having a positive lens component changes during zooming, and the following conditional expression (7) is satisfied.

$$0.40 < fGp/(-fGa) < 2.60 \qquad (7)$$

where
fGp: a focal length of the lens group having a positive lens component, and
fGa: a focal length of the object side negative lens group.

The conditional expression (7) is a conditional expression for defining an adequate range for a ratio of focal lengths between the lens group (third lens group G3) having a positive lens component and the object side negative lens group (second lens group G2). When a corresponding value of the conditional expression (7) exceeds an upper limit value, the power of the object side negative lens group is too much stronger than the power of the lens group having a positive lens component, which makes it difficult to correct the astigmatism in the wide angle end state. In order to ensure the effect of this embodiment, the upper limit value of the conditional expression (7) is preferably set to 2.20, and more preferably to 1.80.

When a corresponding value of the conditional expression (7) undergoes a lower limit value, the power of the lens group having a positive lens component is too much stronger than the power of the object side negative lens group, which makes it difficult to correct the astigmatism in the telephoto end state. In order to ensure the effect of this embodiment, the lower limit value of the conditional expression (7) is preferably set to 0.55, and more preferably to 0.70.

The zoom optical system ZL according to the first embodiment preferably includes an image side negative lens group (fourth lens group G4) disposed at a position closer to an image than the lens group (third lens group G3) having a positive lens component and having a negative refractive power, and a distance between the lens group having a positive lens component and the image side negative lens group changes during zooming, and the following conditional expression (8) is satisfied.

$$0.40 < fGp/(-fGb) < 2.40 \qquad (8)$$

where
fGp: a focal length of the lens group having a positive lens component, and
fGb: a focal length of the image side negative lens group.

The conditional expression (8) is a conditional expression for defining an adequate range for a ratio of focal lengths between the lens group (third lens group G3) having a positive lens component and the image side negative lens group (fourth lens group G4). When a corresponding value of the conditional expression (8) exceeds an upper limit value, the power of the image side negative lens group is too much stronger than the power of the lens group having a positive lens component, which makes it difficult to correct the coma aberration in the wide angle end state. In order to ensure the effect of this embodiment, the upper limit value of the conditional expression (8) is preferably set to 2.00, and more preferably to 1.60.

When a corresponding value of the conditional expression (8) undergoes a lower limit value, the power of the lens group having a positive lens component is too much stronger than the power of the image side negative lens group, which makes it difficult to correct the astigmatism in the telephoto end state. In order to ensure the effect of this embodiment, the lower limit value of the conditional expression (8) is preferably set to 0.50, and more preferably to 0.60.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming, and the following conditional expression (9) is satisfied.

$$0.30 < |m1a|/fw < 2.30 \qquad (9)$$

where
|m1a|: an absolute value of the amount of change in distance from a lens surface closest to an image in the first lens group G1 to a lens surface closest to an object in the object side negative lens group on the optical axis during zooming from the wide angle end state to the telephoto end state, and
fw: a focal length of the zoom optical system ZL in the wide angle end state.

The conditional expression (9) is a conditional expression for defining an adequate range for variable magnification burden of the object side negative lens group (second lens group G2). When the corresponding value of the conditional expression (9) exceeds the upper limit value, the amount of change (absolute value) in distance between the first lens group G1 and the object side negative lens group increases. Therefore, the variable magnification burden of the object side negative lens group increases, which makes it difficult to correct the coma aberration and the curvature of field. In order to ensure the effect of this embodiment, the upper limit value of the conditional expression (9) is preferably set to 1.90, and more preferably to 1.50.

When the corresponding value of the conditional expression (9) undergoes the lower limit value, the amount of change (absolute value) in distance between the first lens group G1 and the object side negative lens group is too small to secure a high zooming rate. In order to secure a zooming rate in a state in which the corresponding value of the conditional expression (9) undergoes the lower limit value, the power of the object side negative lens group needs to be stronger, which makes it difficult to correct the spherical aberration and the coma aberration. In order to ensure the effect of this embodiment, the lower limit value of the conditional expression (9) is preferably set to 0.40, and more preferably to 0.50.

The zoom optical system ZL according to the first embodiment preferably includes an image side negative lens group (fourth lens group G4) disposed at a position closer to an image than the lens group (third lens group G3) having a positive lens component and having a negative refractive power, and a distance between the lens group having a positive lens component and the image side negative lens group changes during zooming, and the following conditional expression (10) is satisfied.

$$0.050 < |mpb|/fw < 0.750 \tag{10}$$

where

|mpb|: an absolute value of the amount of change in distance from a lens surface closest to an image in the lens group having a positive lens component to a lens surface closest to an object in the image side negative lens group on the optical axis during zooming from the wide angle end state to the telephoto end state, and fw: a focal length of the zoom optical system ZL in the wide angle end state.

The conditional expression (10) is a conditional expression for achieving both the variable magnification burden and the aberration correction effect of the image side negative lens group (fourth lens group G4). When the corresponding value of the conditional expression (10) exceeds the upper limit value, the amount of change (absolute value) in distance between the lens group (third lens group G3) having a positive lens component and the image side negative lens group (fourth lens group G4) increases. Therefore, the variable magnification burden of the image side negative lens group increases, which makes it difficult to correct spherical aberration in the telephoto end state and astigmatism in the wide angle end state. In order to ensure the effect of this embodiment, the upper limit value of the conditional expression (10) is preferably set to 0.650, and more preferably to 0.550.

When the corresponding value of the conditional expression (10) undergoes the lower limit value, the amount of change (absolute value) in distance between the lens group having a positive lens component and the image side negative lens group decreases, and thus the aberration correction effect of change in distance between the lens group having a positive lens component and the image side negative lens group is less likely achieved. Therefore, achievement of both the aberration correction in the telephoto end state and the aberration correction in the wide angle end state is difficult, which makes it difficult to correct the spherical aberration and astigmatism in the wide angle end state. In order to ensure the effect of this embodiment, the lower limit value of the conditional expression (10) is preferably set to 0.065, and more preferably to 0.080.

The zoom optical system ZL according to the first embodiment preferably includes an object side negative lens group (second lens group G2) disposed between the first lens group G1 and the lens group (third lens group G3) having a positive lens component and having a negative refractive power, and a distance between the first lens group G1 and the object side negative lens group changes, and a distance between the object side negative lens group and the lens group having a positive lens component changes during zooming, the following conditional expression (11) is satisfied.

$$1.50 < f1/(-fGa) < 4.50 \tag{11}$$

where f1: a focal length of the first lens group G1, and fGa: a focal length of the object side negative lens group.

The conditional expression (11) is a conditional expression for defining an adequate range for a ratio of focal lengths between the first lens group G1 and the object side negative lens group (second lens group G2). When a corresponding value of the conditional expression (11) exceeds an upper limit value, the power of the object side negative lens group is too much stronger than the power of the first lens group G1, which makes it difficult to correct the spherical aberration and astigmatism in the wide angle end state. In order to ensure the effect of this embodiment, the upper limit value of the conditional expression (11) is preferably set to 4.10, and more preferably to 3.80.

When the corresponding value of the conditional expression (11) undergoes a lower limit value, the power of the first lens group G1 is too much stronger than the power of the object side negative lens group, which makes it difficult to correct spherical Aberration, coma aberration, and astigmatism in the telephoto end state. In order to ensure the effect of this embodiment, the lower limit value of the conditional expression (11) is preferably set to 2.00, and more preferably to 2.50.

Figure 41:
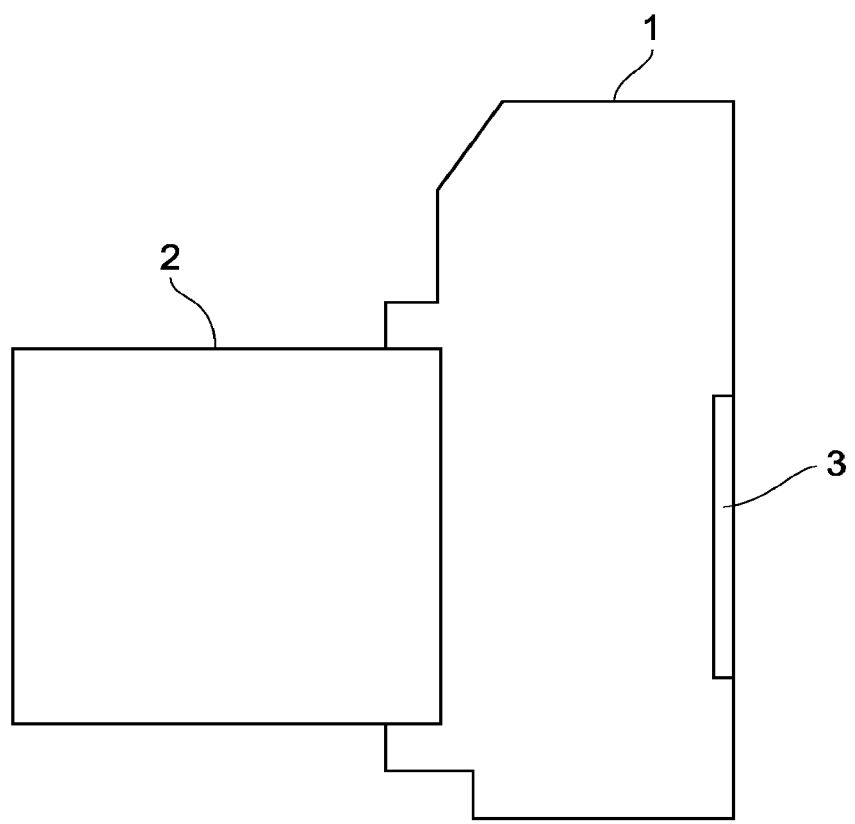
FIG. 41 is a drawing illustrating a configuration of a camera provided with the zoom optical system according to each embodiment.

An optical apparatus according to the first embodiment is configured with the zoom optical system having a configuration described above. As a specific example, a camera (optical apparatus) provided with the zoom optical system ZL according to the first embodiment will be described with reference to FIG. 41. The camera 1 is a digital camera provided with the zoom optical system according to the embodiment described above as an imaging lens 2 as illustrated in FIG. 41. In this camera 1, light from an object (subject) not illustrated is converged to the imaging lens by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the first embodiment as the imaging lens, an optical apparatus having low degree of decentering sensitivity and less variation in optical performance based on the assembly accuracy at the time of manufacture is achieved.

Figure 42:
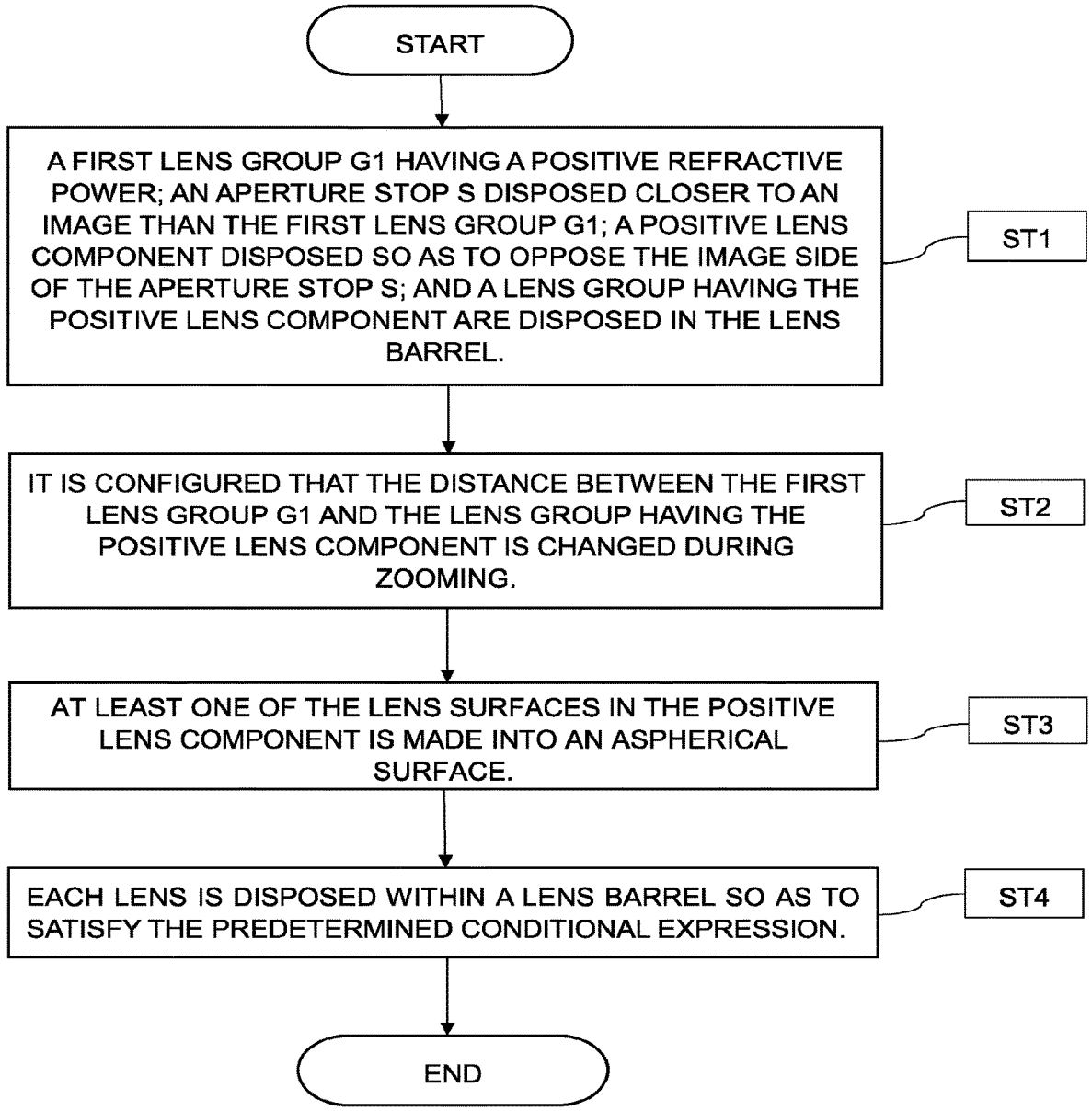
FIG. 42 is a flowchart illustrating a method for manufacturing a zoom optical system according to a first embodiment.

Subsequently, an outline of a method for manufacturing the zoom optical system ZL according to the first embodiment will be described with reference to FIG. 42. First, within a lens barrel, the first lens group G1 having a positive refractive power, an aperture stop S disposed closer to an image than the first lens group G1, a positive lens component disposed so as to oppose the image side of the aperture stop S, and a lens group (third lens group G3) having a positive lens component are disposed (Step ST1). It is configured that the distance between the first lens group G1 and the lens group having a positive lens component is changed during zooming (Step ST2). Further, at least one of the lens surfaces in the positive lens component is made into an aspherical surface (Step ST3). In addition, each lens is arranged within a lens barrel so as to satisfy at least the aforementioned conditional expression (1) (Step ST4). According to the manufacturing method as described above, a telephoto type zoom optical system having low degree of decentering sensitivity and less variation in optical performance based on the assembly accuracy at the time of manufacture is manufactured.

Second Embodiment

Next, a zoom optical system and an optical apparatus according to a second embodiment will now be described with reference to the drawings. A zoom optical system ZL (1) as an example of the zoom optical system (zoom lens) ZL according to the second embodiment comprises: as illustrated in FIG. 1, a first lens group G1 having a positive refractive power, and a second lens group G2 disposed closer to an image than the first lens group G1 and having a negative refractive power, a third lens group G3 disposed closer to an image than the second lens group G2 and having a positive refractive power, and a fourth lens group G4 disposed closer to an image than the third lens group G3 and having a negative refractive power. A distance between the first lens group G1 and the second lens croup G2 changes, a distance between the second lens group G2 and the third lens group G3 changes, and a distance between the third lens group G3 and the fourth lens group G4 changes during zooming. The second lens group G2 may be configured to include a vibration proof group movable so as to have a displacement component in a direction perpendicular to an optical axis. The third lens group G3 consists of the object side subgroup having a positive refractive power and the image side subgroup having a positive refractive power disposed in order from an object, and the air distance between the object side subgroup and the image side subgroup is the maximum air distance among all air distances between lenses in the third lens group G3. In each example of the following description, the object side subgroup and the image side subgroup in the second embodiment are referred to as second object side subgroup and second image side subgroup.

The zoom optical system ZL according to the second embodiment may be a zoom optical system ZL (2) illustrated in FIG. 5; may be a zoom optical system ZL (3) illustrated in FIG. 9; may be a zoom optical system ZL (4) illustrated in FIG. 13; may be a zoom optical system ZL (5) illustrated in FIG. 17; and may be a zoom optical system ZL (6) illustrated in FIG. 21. Also, the zoom optical system ZL according to the second embodiment may be a zoom optical system ZL (7) illustrated in FIG. 25; may be a zoom optical system ZL (8) illustrated in FIG. 29; may be a zoom optical system ZL (9) illustrated in FIG. 33; and may be a zoom optical system ZL (10) illustrated in FIG. 37. It should be noted that groups from the zoom optical system ZL (2) to ZL (10) illustrated in FIG. 5 or other drawings are configured in the same manner as the zoom optical system ZL (1) illustrated in FIG. 1.

The zoom optical system ZL according to the second embodiment having the configuration described above satisfies the following conditional expressions. Accordingly, a telephoto type zoom optical system having a higher optical performance is achieved.

$$0.06 < f3\alpha/f3\beta < 2.60 \quad (12),$$

$$1.50 < f1/(-f2) < 4.50 \quad (13)$$

where
f3α: a focal length of the object side subgroup,
f3β: a focal length of the image side subgroup,
f1: a focal length of the first lens group G, and
f2: a focal length of the second lens group G2.

The conditional expression (12) is a conditional expression for defining an adequate range for a ratio of focal lengths between the object side subgroup and the image side subgroup in the third lens group G3. By satisfying the conditional expression (12), the axial chromatic aberration and the spherical Aberration are successfully corrected.

When the corresponding value of the conditional expression (12) exceeds the upper limit value, the power of the image side subgroup is too much stronger than the power of the object side subgroup, which makes it difficult to correct the axial chromatic Aberration. In order to ensure the effect of this embodiment, the upper limit value of the conditional expression (12) is preferably set to 1.60, and more preferably to 1.50.

When the corresponding value of the conditional expression (12) undergoes the lower limit value, the power of the object side subgroup is too much stronger than the power of the image side subgroup, which makes it difficult to correct the spherical aberration. In order to ensure the effect of this embodiment, the lower limit value of the conditional expression (12) is preferably set to 0.08, and more preferably to 0.10.

The conditional expression (13) is a conditional expression for defining an adequate range for a ratio of focal lengths between the first lens group G1 and the second lens group G2. When a corresponding value of the conditional expression (13) exceeds an upper limit value, the power of the second lens group G2 is too much stronger than the power of the first lens group G1, which makes it difficult to correct the spherical aberration and astigmatism in the wide angle end state. In order to ensure the effect of this embodiment, the upper limit value of the conditional expression (13) is preferably set to 4.10, and more preferably to 3.80.

When the corresponding value of the conditional expression (13) undergoes a lower limit value, the power of the first lens group G1 is too much stronger than the power of the second lens group G2, which makes it difficult to correct spherical aberration, coma aberration, and astigmatism in the telephoto end state. In order to ensure the effect of this embodiment, the lower limit value of the conditional expression (13) is preferably set to 2.00, and more preferably to 2.50.

Preferably, in the zoom optical system ZL according to the second embodiment, during focusing, at least part of the lenses in the fourth lens group G4 move along the optical axis. Accordingly, variations in chromatic aberration and variation in spherical Aberration during focusing may be successfully corrected.

Preferably, in the zoom optical system ZL according to the second embodiment, the following conditional expression (14) is satisfied.

$$0.40 < f4/f2 < 4.00 \tag{14}$$

where f4: a focal length of the fourth lens group G4, and
f2: a focal length of the second lens group G2.

The conditional expression (14) is a conditional expression for defining an adequate range for a ratio of focal lengths between the fourth lens group G4 and the second lens group G2. When a corresponding value of the conditional expression (14) exceeds an upper limit value, the power of the second lens group G2 is too much stronger than the power of the fourth lens group G4, which makes it difficult to correct spherical aberration and coma aberration in the telephoto end state. In order to ensure the effect of this embodiment, the upper limit value of the conditional expression (14) is preferably set to 3.25, and more preferably to 2.50.

When the corresponding value of the conditional expression (14) undergoes a lower limit value, the power of the fourth lens group G4 is too much stronger than the power of the second lens group G2, which makes it difficult to correct astigmatism in the wide angle end state and spherical aberration in the telephoto end state. In order to ensure the effect of this embodiment, the lower limit value of the conditional expression (14) is preferably set to 0.55, and more preferably to 0.70.

Preferably, in the zoom optical system ZL according to the second embodiment, an aperture stop S is disposed between the second lens group G2 and the third lens group G3. Accordingly, the astigmatism, the coma aberration, and the lateral chromatic aberration may be successfully corrected.

In the zoom optical system ZL according to the second embodiment, the second lens group G2 may consist of a negative subgroup having a negative refractive power and the vibration proof group described above and having a negative refractive power disposed in order from an object, and a lens component including a positive lens may be disposed at a position closest to the image in the vibration proof group. Accordingly, the eccentric coma aberration and the eccentric curvature of field when the shake compensation is performed may be successfully corrected. Also, the lateral chromatic aberration and the distortion in the wide angle end state may be successfully corrected.

In the zoom optical system ZL according to the second embodiment, the vibration proof group may consist of a positive lens, a first negative lens, and a second negative lens disposed in order from an object, an air distance may be present between the positive lens and the first negative lens, and an air distance may be present between the first negative lens and the second negative lens. Accordingly, the eccentric coma aberration and the eccentric curvature of field when the shake compensation is performed may be successfully corrected. Also, the lateral chromatic aberration and the distortion in the wide angle end state may be successfully corrected.

Preferably, in the zoom optical system ZL according to the second embodiment, the following conditional expression (15) is satisfied.

$$0.93 < fVR/f2 < 2.50 \tag{15}$$

where fVR: a focal length of the vibration proof group, and
f2: a focal length of the second lens group G2.

The conditional expression (15) is a conditional expression for defining an adequate range for a ratio of focal lengths between the vibration proof group and the second lens group G2. By satisfying the conditional expression (15), the eccentric coma aberration and the eccentric curvature of field when the shake compensation is performed may be successfully corrected. Also, the lateral chromatic aberration and the distortion in the wide angle end state may be successfully corrected.

When a corresponding value of the conditional expression (15) exceeds an upper limit value, the power of the second lens group G2 is too much stronger than the power of the vibration proof group, which makes it difficult to correct lateral chromatic aberration and distortion in the wide angle end state. In order to ensure the effect of this embodiment, the upper limit value of the conditional expression (15) is preferably set to 2.10, and more preferably to 1.70.

When the corresponding value of the conditional expression (15) undergoes the lower limit value, the power of the vibration proof group is too much stronger than the power of the second lens group G2, which makes it difficult to correct the eccentric coma aberration and the eccentric curvature of field when shake compensation is performed. In order to ensure the effect of this embodiment, the lower limit value of the conditional expression (15) is preferably set to 1.00.

Preferably, in the zoom optical system ZL according to the second embodiment, the fourth lens group G4 comprises a positive lens and a negative lens which are disposed in order from an object, and an air distance is present between the positive lens and the negative lens. Accordingly, variations in chromatic aberration and variation in spherical aberration during focusing may be successfully corrected.

In the zoom optical system ZL according to the second embodiment, the following conditional expression (16) is preferably satisfied.

$$0.40 < f3/(-f2) < 2.60 \tag{16}$$

where, f3: a focal length of the third lens group G3, and
f2: a focal length of the second lens group G2.

The conditional expression (16) is a conditional expression for defining an adequate range for a ratio of focal lengths between the third lens group G3 and the second lens group G2. When a corresponding value of the conditional expression (16) exceeds an upper limit value, the power of the second lens group G2 is too much stronger than the power of the third lens group G3, which makes it difficult to correct the astigmatism in the wide angle end state. In order to ensure the effect of this embodiment, the upper limit value of the conditional expression (16) is preferably set to 2.20, and more preferably to 1.80.

When a corresponding value of the conditional expression (16) undergoes a lower limit value, the power of the third lens group G3 is too much stronger than the power of the second lens group G2, which makes it difficult to correct the astigmatism in the telephoto end state. In order to ensure the effect of this embodiment, the lower limit value of the conditional expression (16) is preferably set to 0.55, and more preferably to 0.70.

Preferably, in the zoom optical system ZL according to the second embodiment, the following conditional expression (17) is satisfied.

$$0.20 < f3/(-f4) < 2.40 \tag{17}$$

where f3: a focal length of the third lens group G3, and
f4: a focal length of the fourth lens group G4.

The conditional expression (17) is a conditional expression for defining an adequate range for a ratio of focal lengths between the third lens group G3 and the fourth lens group G4. When a corresponding value of the conditional expression (17) exceeds an upper limit value, the power of the fourth lens group G4 is too much stronger than the power of the third lens group G3, which makes it difficult to correct the coma aberration in the wide angle end state. In order to ensure the effect of this embodiment, the upper limit value of the conditional expression (17) is preferably set to 2.00, and more preferably to 1.60.

When a corresponding value of the conditional expression (17) undergoes a lower limit value, the power of the third lens group G3 is too much stronger than the power of the fourth lens group G4, which makes it difficult to correct the astigmatism in the telephoto end state. In order to ensure the effect of this embodiment, the lower limit value of the conditional expression (17) is preferably set to 0.30, and more preferably to 0.40.

Preferably, in the zoom optical system ZL according to the second embodiment, the following conditional expression (18) is satisfied.

$$0.30 < |m12|/fw < 2.30 \tag{18}$$

where,

|m12|: an absolute value of the amount of change in distance from a lens surface closest to an image in the first lens group G1 to a lens surface closest to an object in the second lens group G2 on the optical axis during zooming from the wide angle end state to the telephoto end state, and fw: a focal length of the zoom optical system ZL in the wide angle end state.

The conditional expression (18) is a conditional expression for defining an adequate range for variable magnification burden of the second lens group G2. When the corresponding value of the conditional expression (18) exceeds the upper limit value, the amount of change (absolute value) in distance between the first lens group G1 and the second lens group G2 increases. Therefore, the variable magnification burden of the second lens group G2 increases, which makes it difficult to correct the coma aberration and the curvature of field. In order to ensure the effect of this embodiment, the upper limit value of the conditional expression (18) is preferably set to 1.90, and more preferably to 1.50.

When the corresponding value of the conditional expression (18) undergoes the lower limit value, the amount of change (absolute value) in distance between the first lens group G1 and the second lens group G2 is too small to secure a high zooming rate. In order to secure a zooming rate in a state in which the corresponding value of the conditional expression (18) undergoes the lower limit value, the power of the second lens group G2 needs to be stronger, which makes it difficult to correct the spherical aberration and the coma Aberration. In order to ensure the effect of this embodiment, the lower limit value of the conditional expression (18) is preferably set to 0.40, and more preferably to 0.50.

Preferably, in the zoom optical system ZL according to the second embodiment, the following conditional expression (19) is satisfied.

$$0.050 < |m34|/fw < 0.750 \tag{19}$$

where

|m34|: an absolute value of the amount of change in distance from a lens surface closest to an image in the third lens group G3 to a lens surface closest to an object in the fourth lens group G4 on the optical axis during zooming from the wide angle end state to the telephoto end state, and fw: a focal length of the zoom optical system ZL in the wide angle end state.

The conditional expression (19) is a conditional expression for achieving both the variable magnification burden and the aberration correction effect of the fourth lens group G4. When the corresponding value of the conditional expression (19) exceeds the upper limit value, the amount of change (absolute value) in distance between the third lens group G3 and the fourth lens group G4 increases. Therefore, the variable magnification burden of the fourth lens group G4 increases, which makes it difficult to correct spherical aberration in the telephoto end state and astigmatism in the wide angle end state. In order to ensure the effect of this embodiment, the upper limit value of the conditional expression (19) is preferably set to 0.650, and more preferably to 0.550.

When the lower limit value of the corresponding value of the conditional expression (19) undergoes the lower limit value, the amount of change (absolute value) in distance between the third lens group G3 and the fourth lens group G4 decreases, and thus the aberration correction effect of change in distance between the third lens group G3 and the fourth lens group G4 is less likely achieved. Therefore, achievement of both the aberration correction in the telephoto end state and the aberration correction in the wide angle end state is difficult, which makes it difficult to correct the spherical aberration and astigmatism in the wide angle end state. In order to ensure the effect of this embodiment, the lower limit value of the conditional expression (19) is preferably set to 0.065, and more preferably to 0.080.

An optical apparatus according to the second embodiment is configured with the zoom optical system having a configuration described above. As a specific example, a camera (optical apparatus) provided with the zoom optical system ZL according to the second embodiment will be described with reference to FIG. 41. The camera 1 is a digital camera provided with the zoom optical system according to the embodiment described above as an imaging lens 2 as illustrated in FIG. 41. In this camera 1, light from an object (subject) not illustrated is converged to the imaging lens by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the second embodiment as the imaging lens, an optical apparatus having a higher optical performance is achieved.

Figure 43:
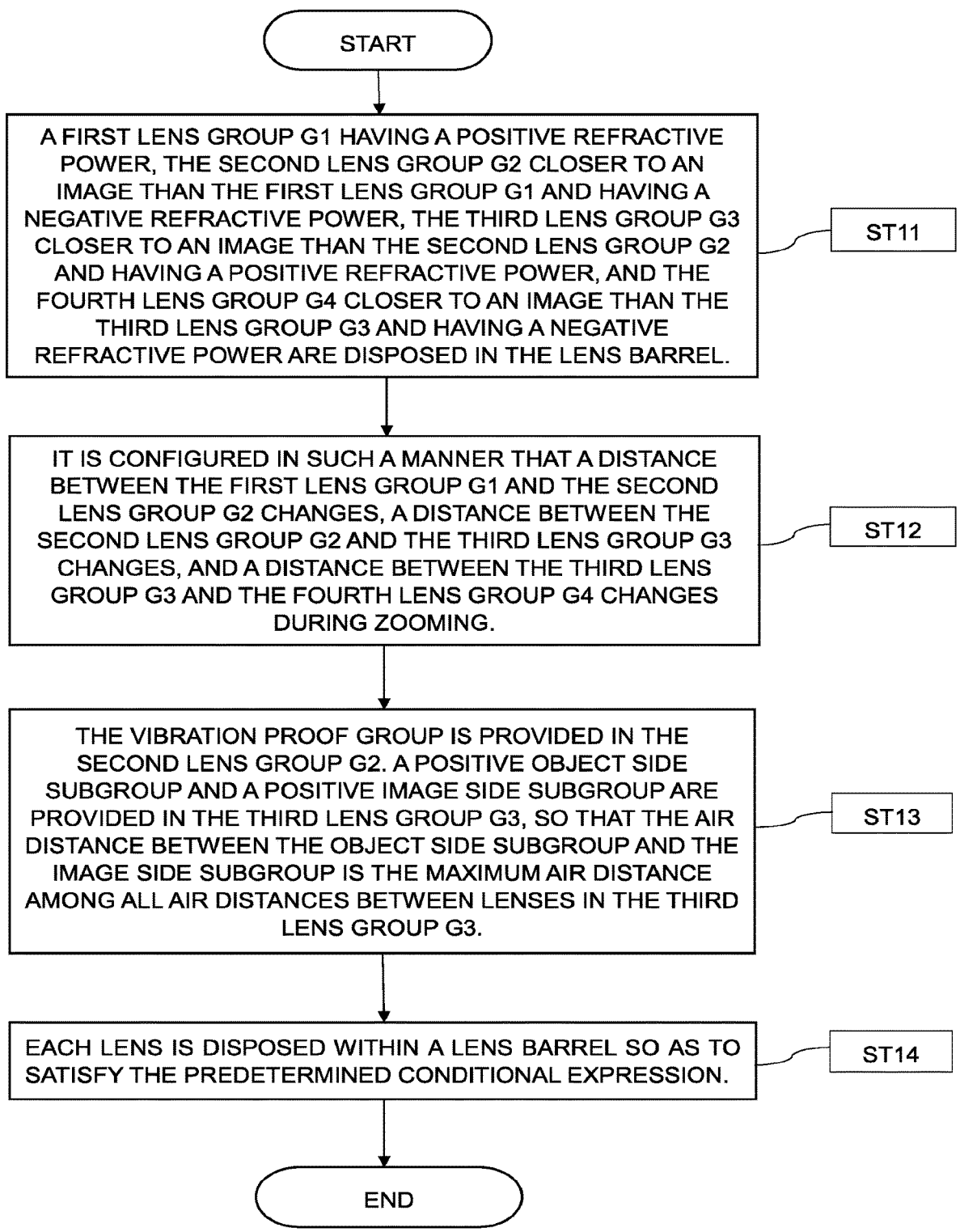
FIG. 43 is a flowchart illustrating a method for manufacturing a zoom optical system according to a second embodiment.

Subsequently, an outline of a method for manufacturing the zoom optical system ZL according to the second embodiment will be described with reference to FIG. 43. First, in a lens barrel, the first lens group G1 having a positive refractive power, the second lens group G2 closer to an image than the first lens group G1 and having a negative refractive power, the third lens group G3 closer to an image than the second lens group G2 and having a positive refractive power, and the fourth lens group G4 closer to an image than the third lens group G3 and having a negative refractive power are arranged (Step ST11). Then, it is configured that a distance between the first lens group G1 and the second lens group G2 changes, a distance between the second lens group G2 and the third lens group G3 changes, and the distance between the third lens group G3 and the fourth lens group G4 changes during zooming (Step ST12). Also, a vibration proof group movable so as to have a displacement component in a direction perpendicular to an optical axis is provided on the second lens group G2. Further, an object side subgroup having a positive refractive power and an image side subgroup having a positive refractive power are provided in the third lens group G3, so that the air distance between the object side subgroup and the image side subgroup is the maximum air distance among all air distances between lenses in the third lens group G3 (Step ST13). In addition, each lens is arranged within a lens barrel so as to satisfy at least the aforementioned conditional expression (12) and the conditional expression (13) (Step ST14). With such a manufacturing method, a telephoto type zoom optical system having a higher optical performance is manufactured.

Third Embodiment

Next, a zoom optical system and an optical apparatus according to a third embodiment will now be described with reference to the drawings. A zoom optical system ZL (1) as an example of the zoom optical system (zoom lens) ZL according to the third embodiment comprises: as illustrated in FIG. 1, a first lens group G1 having a positive refractive power, a second lens group G2 disposed closer to an image than the first lens group G1 and having a negative refractive power, a third lens group G3 disposed closer to an image than the second lens group G2 and having a positive refractive power, and a fourth lens group G4 disposed closer to an image than the third lens group G3 and having a negative refractive power. A distance between the first lens group G1 and the second lens croup G2 changes, a distance between the second lens group G2 and the third lens group G3 changes, and a distance between the third lens group G3 and the fourth lens group G4 changes during zooming. The second lens group G2 includes a vibration proof group movable so as to have a displacement component in a direction perpendicular to an optical axis. The third lens group G3 consists of an object side subgroup having a positive refractive power and an image side subgroup having a positive refractive power disposed in order from an object, and a lens component including the negative lens is disposed at a position closest to an object in the image side subgroup. In each example of the following description, the object side subgroup and the image side subgroup in the case of the third embodiment are referred to as first object side subgroup and first image side subgroup.

The zoom optical system ZL according to the third embodiment may be a zoom optical system ZL (2) illustrated in FIG. 5, may be a zoom optical system ZL (3) illustrated in FIG. 9; may be a zoom optical system ZL (4) illustrated in FIG. 13; may be a zoom optical system ZL (5) illustrated in FIG. 17; and may be a zoom optical system ZL (6) illustrated in FIG. 21. Also, the zoom optical system ZL according to the third embodiment may be a zoom optical system ZL (7) illustrated in FIG. 25; may be a zoom optical system ZL (8) illustrated in FIG. 29; may be a zoom optical system ZL (9) illustrated in FIG. 33; and may be a zoom optical system ZL (10) illustrated in FIG. 37. It should be noted that groups from the zoom optical systems ZL (2) to ZL (10) illustrated in FIG. 5 or other drawings are configured in the same manner as the zoom optical system ZL (1) illustrated in FIG. 1.

The zoom optical system ZL according to the third embodiment having the configuration described above satisfies the following conditional expression. Accordingly, a telephoto type zoom optical system having a higher optical performance is achieved.

$$0.08 < f3a/f3b < 1.20 \quad (20)$$

where
$f3a$: a focal length of the object side subgroup, and
$f3b$: a focal length of the image side subgroup.

The conditional expression (20) is a conditional expression for defining an adequate range for a ratio of focal lengths between the object side subgroup and the image side subgroup in the third lens group G3. By satisfying the conditional expression (20), the axial chromatic aberration and the spherical Aberration are successfully corrected.

When the corresponding value of the conditional expression (20) exceeds the upper limit value, the power of the image side subgroup is too much stronger than the power of the object side subgroup, which makes it difficult to correct the axial chromatic Aberration. In order to ensure the effect of this embodiment, the upper limit value of the conditional expression (20) is preferably set to 1.00, and more preferably to 0.80.

When the corresponding value of the conditional expression (20) undergoes the lower limit value, the power of the object side subgroup is too much stronger than the power of the image side subgroup, which makes it difficult to correct the spherical Aberration. In order to ensure the effect of this embodiment, the lower limit value of the conditional expression (20) is preferably set to 0.09, and more preferably to 0.10.

The zoom optical system ZL according to the third embodiment preferably satisfies the conditional expression (14) to the conditional expression (19) described above in the same manner as the second embodiment. Also, at least part of lenses in the fourth lens group G4 preferably moves along the optical axis during focusing. Also, the fourth lens group G4 preferably consists of a positive lens and a negative lens, which are disposed in order from an object, and an air distance is present between the positive lens and the negative lens. Also, an aperture stop S is preferably disposed between the second lens group G2 and the third lens group G3.

In the zoom optical system ZL according to the third embodiment, the second lens group G2 may consist of a negative subgroup having a negative refractive power and the vibration proof group described above and having a negative refractive power disposed in order from an object, and the lens component including a positive lens may be disposed at a position closest to an image of the vibration proof group in the same manner as the second embodiment. Also, the vibration proof group may consist of a positive lens, a first negative lens, and a second negative lens in order from an object, and an air distance is present between the positive lens and the first negative lens and an air distance is present between the first negative lens and the second negative lens.

An optical apparatus according to the third embodiment is configured with the zoom optical system having a configuration described above. As a specific example, a camera (optical apparatus) provided with the zoom optical system ZL according to the third embodiment will be described with reference to FIG. 41. The camera 1 is a digital camera provided with the zoom optical system according to the embodiment described above as an imaging lens 2 as illustrated in FIG. 41. In this camera 1, light from an object (subject) not illustrated is converged to the imaging lens by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the third embodiment as the imaging lens, an optical apparatus having a higher optical performance is achieved.

Figure 44:
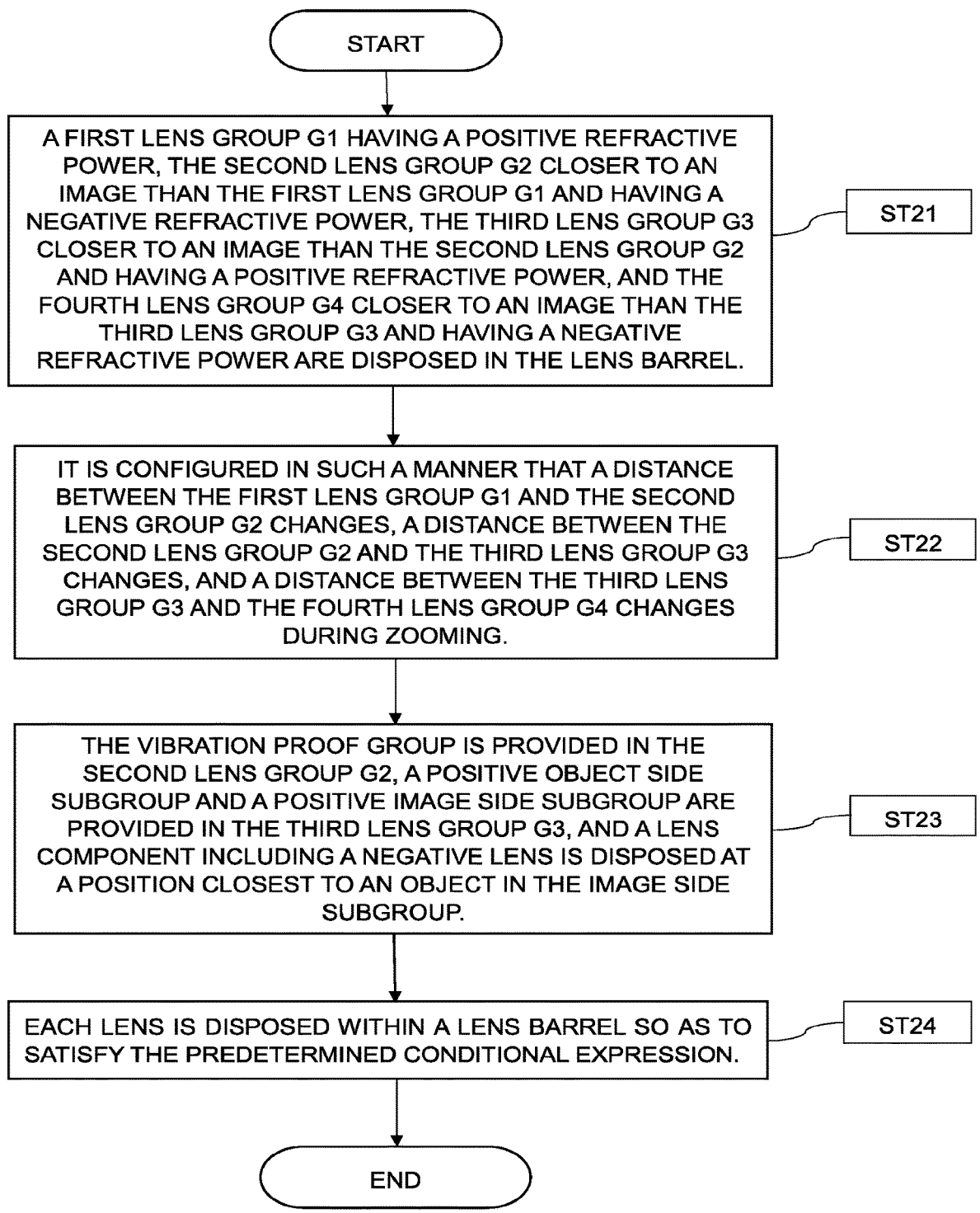
FIG. 44 is a flowchart illustrating a method for manufacturing a zoom optical system according to a third embodiment.

Subsequently, an outline of a method for manufacturing the zoom optical system ZL described above will be described with reference to FIG. 44. First of all, in the lens barrel, a first lens group G1 having a positive refractive power, the second lens group G2 closer to an image than the first lens group G1 and having a negative refractive power, the third lens group G3 closer to an image than the second lens group G2 and having a positive refractive power, and the fourth lens group G4 closer to an image than the third lens group G3 and having a negative refractive power are disposed (Step ST21). Then, it is configured that a distance between the first lens group G1 and the second lens group G2 changes, a distance between the second lens group G2 and the third lens group G3 changes, and a distance between the third lens group G3 and the fourth lens group G4 changes during zooming (Step ST22). Also, a vibration proof group movable so as to have a displacement component in a direction perpendicular to an optical axis is provided on the second lens group G2. Also, it is configured in such a manner that an object side subgroup having a positive refractive power and an image side subgroup having a positive refractive power are provided in the third lens group G3, so that a lens component including the negative lens is disposed at a position closest to an object in the image side subgroup (Step ST23). In addition, each lens is arranged within a lens barrel so as to satisfy at least the aforementioned conditional expression (20) (Step ST24). With such a manufacturing method, a telephoto type zoom optical system having a higher optical performance is manufactured.

Fourth Embodiment

Next, a zoom optical system and an optical apparatus according to a fourth embodiment will now be described with reference to the drawings. A zoom optical system ZL (1) as an example of the zoom optical system (zoom lens) ZL according to the fourth embodiment comprises: as illustrated in FIG. 1, a first lens group G1 having a positive refractive power, a second lens group G2 disposed closer to an image than the first lens group G1 and having a negative refractive power, a third lens group G3 disposed closer to an image than the second lens group G2 and having a positive refractive power, and a fourth lens group G4 disposed closer to an image than the third lens group G3 and having a negative refractive power. A distance between the first lens group G1 and the second lens croup G2 changes, a distance between the second lens group G2 and the third lens group G3 changes, and a distance between the third lens group G3 and the fourth lens group G4 changes during zooming.

Also, the second lens group G2 consists of a negative subgroup having a negative refractive power and the vibration proof group capable of moving so as to have a displacement component in a direction perpendicular to the optical axis and having a negative refractive power disposed in order from an object. A lens component including a positive lens is disposed at a position closest to an image in the vibration proof group of the second lens group G2. Accordingly, a telephoto type zoom optical system having a higher zooming rate is achieved.

The zoom optical system ZL according to the fourth embodiment may be a zoom optical system ZL (2) illustrated in FIG. 5, may be a zoom optical system ZL (3) illustrated in FIG. 9, and may be a zoom optical system ZL (5) illustrated in FIG. 17. It should be noted that each of groups of the zoom optical systems ZL (2), ZL (3) and ZL (5) illustrated in FIG. 5 or other drawings is configured in the same manner as the zoom optical system ZL (1) illustrated in FIG. 1.

In the zoom optical system ZL according to the fourth embodiment, the third lens group G3 consists of the object side subgroup having a positive refractive power and the image side subgroup having a positive refractive power disposed in order from an object, and when the air distance between the object side subgroup and the image side subgroup is the maximum air distance among all air distances between lenses in the third lens group G3, the above-described conditional expressions (12) is preferably satisfied as in the second embodiment.

In the zoom optical system ZL according to the fourth embodiment, when the third lens group G3 consists of an object side subgroup having a positive refractive power and an image side subgroup having a positive refractive power disposed in order from an object, and a lens component including the negative lens is disposed at a position closest to an object in the image side subgroup, the above-described conditional expressions (20) is preferably satisfied as in the third embodiment.

The zoom optical system ZL according to the fourth embodiment preferably satisfies the conditional expression (14) to the conditional expression (19) described above in the same manner as the second embodiment. Also, at least part of lenses in the fourth lens group G4 preferably moves along the optical axis during focusing. Also, the fourth lens group G4 preferably comprises a positive lens and a negative lens, which are disposed in order from an object, and an air distance is present between the positive lens and the negative lens. Also, an aperture stop S is preferably disposed between the second lens group G2 and the third lens group G3.

An optical apparatus according to the fourth embodiment is configured with the zoom optical system having a configuration described above. As a specific example, a camera (optical apparatus) provided with the zoom optical system ZL according to the fourth embodiment will be described with reference to FIG. 41. The camera 1 is a digital camera provided with the zoom optical system according to the embodiment described above as an imaging lens 2 as illustrated in FIG. 41. In this camera 1, light from an object (subject) not illustrated is converged to the imaging lens by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the fourth embodiment as the imaging lens, an optical apparatus having a higher zooming rate is achieved.

Figure 45:
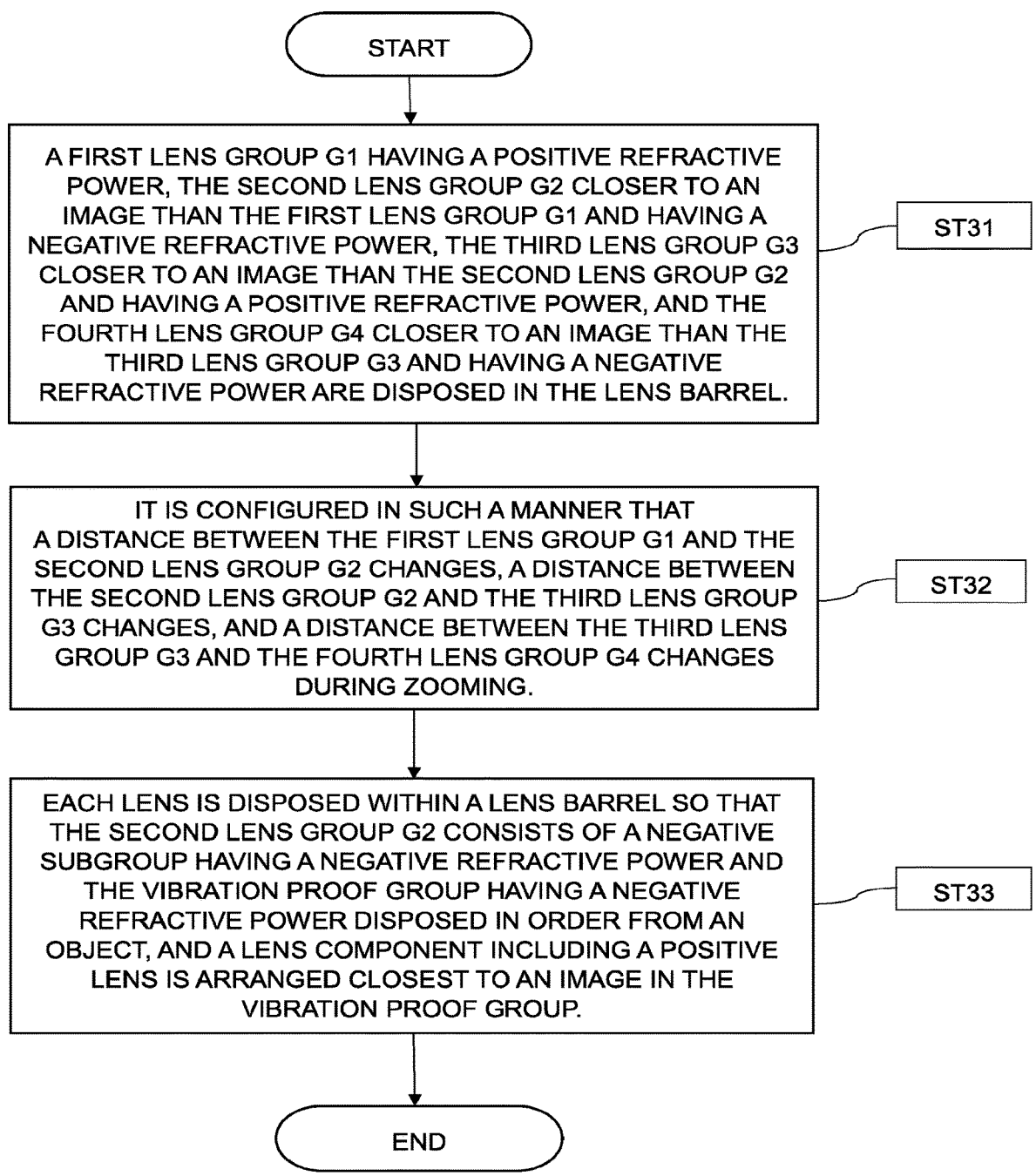
FIG. 45 is a flowchart illustrating a method for manufacturing a zoom optical system according to a fourth embodiment.

Subsequently, an outline of a method for manufacturing the zoom optical system ZL according to the fourth embodiment will be described with reference to FIG. 45. First of all, in the lens barrel, a first lens group G1 having a positive refractive power, the second lens group G2 closer to an image than the first lens group G1 and having a negative refractive power, the third lens group G3 closer to an image than the second lens group G2 and having a positive refractive power, and the fourth lens group G4 closer to an image than the third lens group G3 and having a negative refractive power are disposed (Step ST31). Then, it is configured that a distance between the first lens group G1 and the second lens group G2 changes, a distance between the second lens group G2 and the third lens group G3 changes, and a distance between the third lens group G3 and the fourth lens group G4 changes during zooming (Step ST32). Also, the second lens group G2 consists of a negative subgroup having a negative refractive power and the vibration proof group capable of moving so as to have a displacement component in a direction perpendicular to the optical axis and having a negative refractive power disposed in order from an object, and each lens is disposed within a lens barrel so that the lens component including a positive lens is arranged closest to an image in the vibration proof group (Step ST33). With such a manufacturing method, a telephoto type zoom optical system having a higher zooming rate is manufactured.

EXAMPLES

Hereinafter, the zoom optical system (telephoto type zoom lens) ZL according to Examples in each embodiment will be described with reference to the drawings. It should be noted that Examples corresponding to the first embodiment are Examples 1 to 8, Examples corresponding to the second embodiment and the third embodiment are Examples 1 to 10, and Examples corresponding to the fourth embodiment are Examples 1 to 3 and Example 5. FIG. 1, FIG. 5, FIG. 9, FIG. 13, FIG. 17, FIG. 21, FIG. 25, FIG. 29, FIG. 33, and FIG. are cross-sectional views illustrating configurations and distributions of refractive power of the zoom optical system ZL {ZL (1) to ZL (10)} according to Examples 1 to 10. Each cross-sectional view illustrate positions of the respective lens groups when zooming from the wide angle end state (W) via the intermediate focal length state (M) to the telephoto end state (T) is performed. Arrows in the middle parts of these drawings indicate directions of movement of the first to fourth lens groups G1 to G4 (or the fifth lens group G5) when zooming (zooming operation) from the wide angle end state through the intermediate focal length state to the telephoto end state is performed. In addition, a direction of movement of the fourth lens group G4 for focusing from an infinity to a short distant object as a zooming group is indicated by an arrow associated with a term "FOCUSING". A direction of movement of at least part of the second lens group G2 for correcting an image blur as a vibration proof group is indicated by an arrow associated with a term "VIBRATION PROOF".

In these drawings (FIG. 1, FIG. 5, FIG. 9, FIG. 13, FIG. 17, FIG. 21, FIG. 25, FIG. 29, FIG. 33, and FIG. 37), each lens group is indicated by a combination of a sign G and a number, and each lens is indicated by a combination of a sign L and a number. In this case, in order to avoid complication by increases of type and number of the signs and the numbers, the lens groups are indicated by using combinations of the sign and the number independently from example to example. Therefore, even when the combination of the same sign and the number are used in examples, it does not mean that they have the same configuration.

Tables 1 to 10 are shown below. Among these tables, Table 1 shows data of Example 1, Table 2 shows data of Example 2, Table 3 shows data of Example 3, Table 4 shows data of Example 4, Table 5 shows data of Example 5, Table 6 shows data of Example 6, Table 7 shows data of Example 7, Table 8 shows data of Example 8, Table 9 shows data of Example 9, and Table 10 shows data of Example 10. In each example, a d-line (wavelength λ=587.6 nm) and a g-line (wavelength λ, =435.8 nm) are selected as objects of calculation of an aberration feature.

In tables of [General Data], f represents a focal length of a whole lens system, FNO represents F number, 2ω represents the angle of view (unit is degree (°) and ω is a half angle of view), and Y represents the maximum image height. TL represents a distance obtained by adding BF to a distance from a lens forefront surface to a lens last surface on an optical axis upon focusing on infinity, and BF indicates an air equivalent distance (back focus) from the lens last surface to an image surface I on the optical axis upon focusing on infinity. It should be noted that these values are indicated for the respective zooming states, that is, the wide angle end (W), the intermediate focal length (M) and the telephoto end (T). In the tables [General Data], φ represents a maximum effective diameter of a lens surface on the object side in a positive lens component of the third lens group disposed so as to oppose the image side of the aperture stop, A represents an absolute value of a difference between an aspherical amount at a position corresponding to the maximum effective diameter of the lens surface on the object side in the positive lens component and an aspherical amount at a position corresponding to the maximum effective diameter of the lens surface on the image side in the positive lens component.

In the table of [Lens Data], the surface numbers indicate the orders of the optical surfaces from the object side along the direction of the traveling of the rays, the sign R indicates a radius of curvature of each optical surface (a positive value is allocated to the surface where the center of curvature is located on the image side), and the sign D represents a distance to the next lens surface, which corresponds to the distance from each optical surface to the next optical surface (or an image surface) on the optical axis, the sign nd indicates the refractive index of a material of the optical member for d-line, and the sign vd indicates an abbe number with reference to the d-line of the material of the optical member. The sign "∞" of the radius of curvature indicates a flat surface or an opening, and (Aperture) S indicates an aperture stop S, respectively. Notation of the refractive index of air "nd=1.00000" is omitted. When the lens surface is an aspherical surface, the surface number is asterisked, and a paraxial radius of curvature is shown in a column of the radius of curvature R.

In the tables of [Aspherical Data], the shapes of the aspherical surfaces listed in [Lens Data] are expressed by the following expression (a). In the following expression (a), X(y) represents a distance (sag amount) along the direction of the optical axis from a tangent surface at a vertex of the aspherical surface to a position on the aspherical surface at a height y, R represents a radius of curvature (paraxial radius of curvature) of a reference spherical surface, K represents a conical coefficient, and Ai represents an $i^{th}$ order aspherical coefficient. "E-n" represents "×10$^{-n}$". For example, 1.234E−05=1.234×10⁻⁵. It should be noted that the 2nd order aspherical coefficient A2 is 0, and notation of which is omitted.

$$X(y)=(y^2/R)/\{1+(1-\kappa\times y^2/R^2)^{1/2}\}+A4\times y^4+A6\times y^6+A8\times y^8+A10\times y^{10} \quad (a)$$

In the tables of [Lens Group Data], starting surfaces (the surface closest to the object) and the focal lengths of the first to fourth lens groups G1 to G4 (or the fifth lens group G5) are shown.

In the tables of [Variable Distance Data], distances to the next lens surface of surface numbers which are indicated as "variable" in terms of distance to the next lens surface in the tables of [Lens Data]. Shown here are distances to the next lens surface in the respective zooming states, that is, in the wide angle end (W), the intermediate focal length (M), and the telephoto end (T) when in focus to infinity and short distance, respectively.

In the tables of [Conditional Expression Corresponding Value], values corresponding to the aforementioned conditional expressions (1) to (20) are shown.

In the following description, the unit "mm" is generally used for the focal length f, the radius of curvature R, the distance to the next lens surface D, and other lengths in all data values. However, the optical system is not limited thereto because the optical system achieves an equivalent optical performance even when the optical system is proportionally enlarged or proportionally contracted.

The description given thus far about the tables are common to all the examples, and the overlapped description will be omitted in the following description.

Example 1

Example 1 will be described with reference to FIG. 1 to FIG. 4 and Table 1. FIG. 1 is a drawing illustrating a lens configuration of a zoom optical system according to Example 1. The zoom optical system ZL (1) according to Example 1 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 1. The second lens group G2 corresponds to the object side negative lens group in the first embodiment. The third lens group G3 corresponds to the lens group having a positive lens component in the first embodiment. The fourth lens group G4 corresponds to the image side negative lens group in the first embodiment. Sign (+) or (−) accompanied with each lens group indicate the refractive power of each lens group, which applies to all other examples described below.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a meniscus shaped first negative lens L21 having a convex surface facing the object, a second negative lens L22 having a biconcave shape, and a cemented lens consisting of a third negative lens L23 having a biconcave shape and a positive lens L24 having a biconvex shape. In this example, the first negative lens L21 constitutes the negative subgroup, and the second negative lens L22, a third negative lens L23, and the positive lens L24 constitute the vibration proof group.

The third lens group G3 consists of, in order from an object, a first positive lens L31 having a flat-convex shape having a convex surface facing the object, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41. An image surface I is disposed on the image side of the fourth lens group G4.

In the zoom optical system ZL (1) according to Example 1, focusing from the infinity to the short distant object is achieved by moving all the lenses in the fourth lens group G4 to the image side along the optical axis. Also, in the zoom optical system ZL (1) according to Example 1, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 1, the vibration proof coefficient is −1.16, the focal length is 51.50 mm. Therefore, the amount of movement of the vibration-proof lens group for correcting the rotational blur of 0.38° is −0.29 mm. In the intermediate focal length state of Example 1, the vibration proof coefficient is −2.13, the focal length is 146.99 mm. Therefore, the amount of movement of the vibration-proof lens group for correcting the rotational blur of 0.30° is −0.36 mm. In the telephoto end state of Example 1, the vibration proof coefficient is −3.07, the focal length is 242.50 mm. Therefore, the amount of movement of the vibration-proof lens group for correcting the rotational blur of 0.30° is −0.41 mm.

In Table 1 shown below, data values of the zoom optical system according to Example 1 will be shown.

TABLE 1

[General Data]

zooming rate 4.71
φ 20.3200
Δ 0.0952

|   | W | M | T |
|---|---|---|---|
| f | 51.50 | 146.99 | 242.50 |
| FNO | 4.49 | 5.35 | 6.35 |
| 2ω | 32.0 | 11.0 | 6.8 |
| Y | 14.75 | 14.75 | 14.75 |
| TL | 137.496 | 160.260 | 176.460 |
| BF | 19.642 | 42.682 | 69.906 |

[Lens Data]

| Surface Number | R | D | nd | νd |
|---|---|---|---|---|
| 1 | 62.65940 | 3.856 | 1.51680 | 63.9 |
| 2 | 154.73019 | 0.150 | | |
| 3 | 60.57662 | 2.000 | 1.89190 | 37.1 |
| 4 | 35.51015 | 7.425 | 1.49782 | 82.6 |
| 5 | −265.34719 | D5(variable) | | |
| 6 | 101.41493 | 1.500 | 1.49782 | 82.6 |
| 7 | 42.78933 | 2.880 | | |
| 8 | −95.81122 | 1.500 | 1.75500 | 52.3 |
| 9 | 95.81122 | 2.600 | | |
| 10 | −57.21453 | 1.500 | 1.77250 | 49.6 |
| 11 | 45.10341 | 3.196 | 1.80809 | 22.7 |
| 12 | −332.69479 | D12(variable) | | |
| 13 | ∞ | 1.000 | | (Aperture S) |
| 14* | 25.99484 | 3.973 | 1.59201 | 67.0 |
| 15 | ∞ | 14.392 | | |
| 16 | 125.51396 | 1.500 | 2.00069 | 25.5 |
| 17 | 23.07932 | 3.872 | 1.49782 | 82.6 |
| 18 | −67.48646 | 2.834 | | |
| 19 | 98.90402 | 2.608 | 1.80194 | 26.4 |
| 20 | −98.90402 | D20(variable) | | |
| 21 | −66.56598 | 2.765 | 1.85895 | 22.7 |
| 22 | −32.47980 | 4.143 | | |
| 23 | −26.59956 | 1.500 | 1.77250 | 49.6 |
| 24 | 105.53899 | BF | | |

[Aspherical Data]

Fourteenth Surface

κ = 1.00000E+00
A4 = −8.52477E−06, A6 = −4.03131E−09, A8 = 1.30869E−11, A10 = −1.23416E−13

[Lens Group Data]

| Group | Starting Surface | Focal Length |
|---|---|---|
| G1 | 1 | 95.53 |
| G2 | 6 | −29.71 |
| G3 | 14 | 37.42 |
| G4 | 21 | −47.67 |

[Variable Distance Data]

|   | W Infinity | M Infinity | T Infinity | W Short Distance | M Short Distance | T Short Distance |
|---|---|---|---|---|---|---|
| f | 51.50 | 146.99 | 242.50 | — | — | — |
| Magnification | — | — | — | −0.0548 | −0.1467 | −0.2554 |
| D0 | ∞ | ∞ | ∞ | 862.00 | 839.18 | 823.00 |
| D5 | 2.500 | 30.824 | 37.428 | 2.500 | 30.824 | 37.428 |
| D12 | 28.894 | 10.857 | 1.750 | 28.894 | 10.857 | 1.750 |
| D20 | 21.267 | 10.703 | 2.182 | 24.716 | 21.048 | 16.950 |
| BF | 19.642 | 42.682 | 69.906 | 16.193 | 32.337 | 55.138 |

[Conditional Expression Corresponding Value]

Conditional Expression (1) fp/fGp = 1.1733
Conditional Expression (2) LS/LGp = 0.5904
Conditional Expression (3) 100 × (Δ/φ) = 0.4685

TABLE 1-continued

Conditional Expression (4) fa/fb = 0.4765
Conditional Expression (5) fα/fβ = 0.4765
Conditional Expression (6) fVR/fGa = 1.2759
Conditional Expression (7) fGp/(−fGa) = 1.2597
Conditional Expression (8) fGp/(−fGb) = 0.7851
Conditional Expression (9) |m1a|/fw = 0.6782
Conditional Expression (10) |mpb|/fw = 0.3706
Conditional Expression (11) f1/(−fGa) = 3.2157
Conditional Expression (12) f3a/f3p = 0.4765
Conditional Expression (13) f1/(−f2) = 3.2157
Conditional Expression (14) f4/f2 = 1.6045
Conditional Expression (15) fVR/f2 = 1.2759
Conditional Expression (16) f3/(−f2) = 1.2597
Conditional Expression (17) f3/(−f4) = 0.7851
Conditional Expression (18) |m12|/fw = 0.6782
Conditional Expression (19) |m34|/fw = 0.3706
Conditional Expression (20) f3a/f3b = 0.4765

Figure 3C:
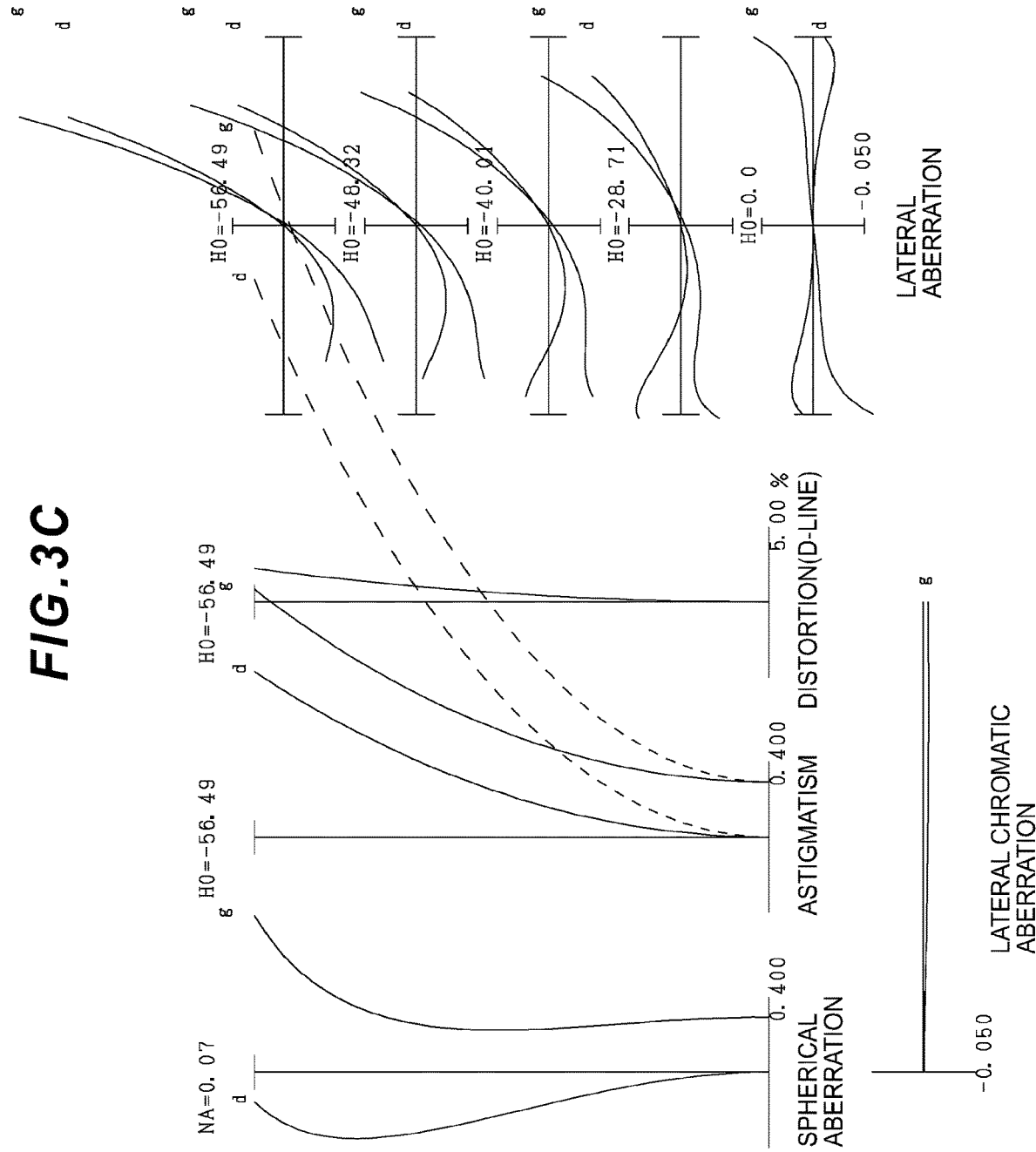
Figure 4A:
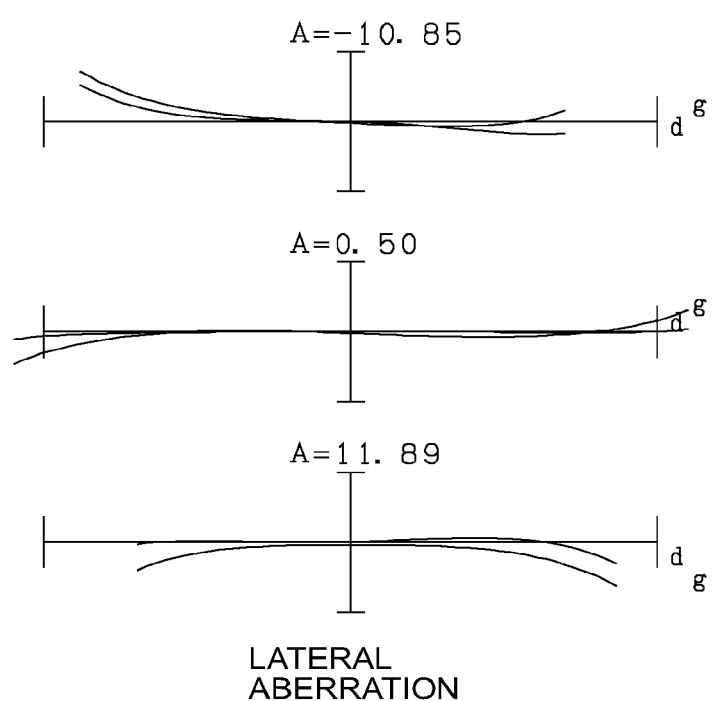
FIG. 4A, FIG. 4B, and FIG. 4C are each a meridional lateral (or transverse) aberration graph when shake compensation is performed in the wide angle end state, in the intermediate focal length state, and in the telephoto end state of the zoom optical system according to Example 1.
Figure 4B:
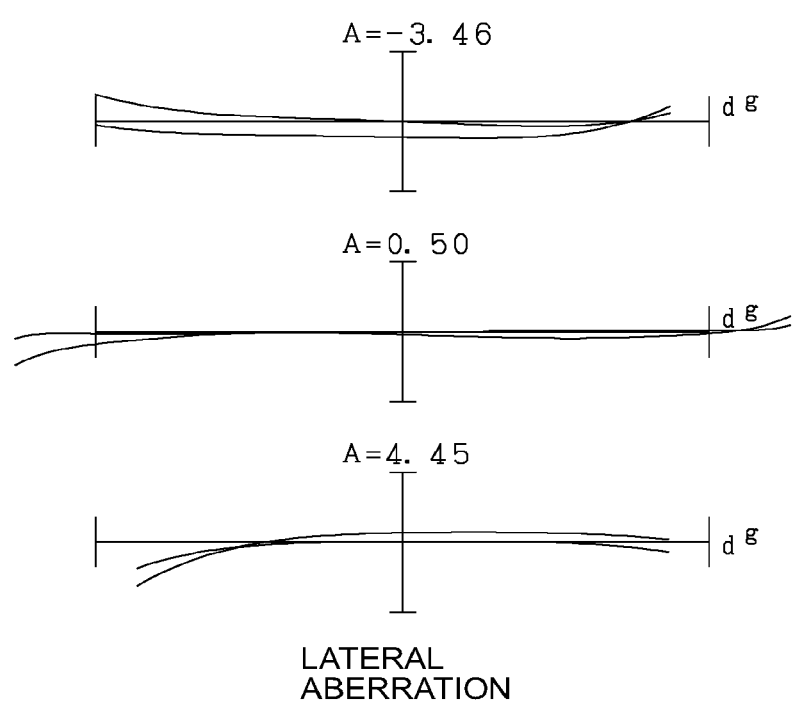
Figure 4C:
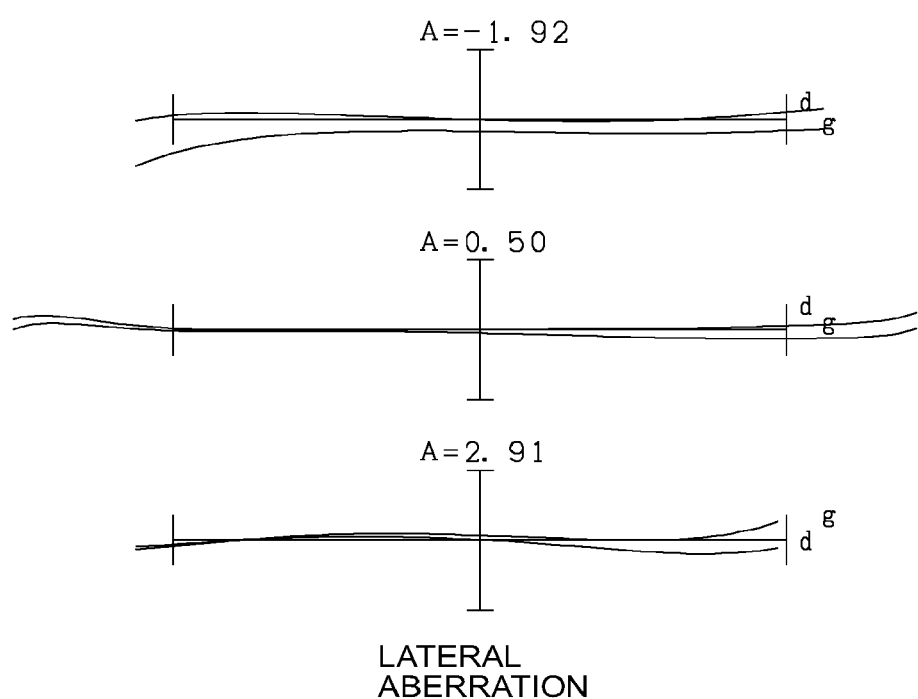

FIG. 2A, FIG. 2B and FIG. 2C are each an aberration graph illustrating aberrations upon focusing on infinity in a wide angle end state, in an intermediate focal length state, and in a telephoto end state of the zoom optical system having a vibration proof function according to Example 1. FIG. 3A, FIG. 3B and FIG. 3C are each an aberration graph illustrating aberrations upon focusing on short distance (close range) in a wide angle end state, in an intermediate focal length state, and in a telephoto end state of the zoom optical system having a vibration proof function according to Example 1. FIG. 4A, FIG. 4B, and FIG. 4C are each a meridional lateral aberration graph when shake compensation is performed in the wide angle end state, in the intermediate focal length state, and in the telephoto end state of the zoom optical system having a vibration proof function according to Example 1.

In each aberration graph in FIG. 2A to FIG. 2C, FNO indicates an F number, and A indicates a half angle of view. It should be noted that the values of the F number corresponding to the maximum aperture are shown in the spherical aberration graphs, and the maximum values of the half angle of view are shown respectively in the astigmatism graphs and in the distortion graphs, and the values of the respective half angle of views are shown in the lateral aberration graphs. In each aberration graph in FIG. 3A to FIG. 3C, NA indicates a numerical aperture, and HO indicates the object height. It should be noted that the values of the numerical aperture corresponding to the maximum aperture are shown in the spherical aberration graphs, and the maximum values of the object height are shown respectively in the astigmatism graphs and in the distortion graphs, and the values of the respective object height are shown in the lateral aberration graphs. In each aberration graph in FIG. 4A to FIG. 4C, A indicates a half angle of view. It should be noted that, in the lateral aberration graph, the values of the half angle of view are shown. In each aberration graph, d indicates a d-line (wavelength λ=587.6 nm), and g indicates a g-line (wavelength λ=435.8 nm). In the astigmatism graphs, solid lines indicate a sagittal image surface, and broken lines indicate a meridional image surface, respectively. It should be noted that the same reference signs as this example are used in the following aberration graphs of the respective examples described below as well, and overlapped description will be omitted.

It is apparent from respective aberration graphs that the zoom optical system according to Example 1 has an excellent image forming performance capable of correcting various aberrations successfully from the wide angle end state to the telephoto end state, and also has an excellent image forming performance also upon focusing on a short distant object.

Example 2

Example 2 will be described with reference to FIG. 5 to FIG. 8 and Table 2. FIG. 5 is a drawing illustrating a lens configuration of a zoom optical system according to Example 2. The zoom optical system ZL (2) according to Example 2 consists of, in order from an object, a first lens group G1 having a positive refractive power; a second lens group G2 having a negative refractive power; an aperture stop S; a third lens group G3 having a positive refractive power; and a fourth lens group G4 having a negative refractive power. For zooming from the wide angle end state (W) to the telephoto end state (T), the first to fourth lens groups G1 to G4 move in the directions indicated by the arrows shown in FIG. 5. The second lens group G2 corresponds to the object side negative lens group in the first embodiment. The third lens group G3 corresponds to the lens group having a positive lens component in the first embodiment. The fourth lens group G4 corresponds to the image side negative lens group in the first embodiment. In Example 2, the first lens group G1, the second lens group G2 and the fourth lens group G4 have the same configuration as in Example 1, so that the same signs as those in Example 1 are allocated, and detailed descriptions of these lenses will be omitted.

The third lens group G3 consists of, in order from an object, a meniscus shaped first positive lens L31 having a convex surface facing the object, the second positive lens L32 meniscus shaped facing a convex surface thereof to the object side, a cemented lens consisting of a meniscus shaped negative lens L33 having a convex surface facing the object and a third lens L34 having a biconvex shape, and a fourth positive lens L35 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 and the second positive lens L32 constitute the first object side subgroup, and the negative lens L33, the third lens L34, and the fourth positive lens L35 constitute the first image side subgroup. In the same manner, the first positive lens L31 and the second positive lens L32 constitute the second object side subgroup, and the negative lens L33, the third lens L34, and the fourth positive lens L35 constitute the second image side subgroup.

In the zoom optical system ZL (2) according to Example 2, focusing from the infinity to the short distant object is achieved by moving all the lenses in the fourth lens group G4 to the image side along the optical axis. Also, in the zoom optical system ZL (2) according to Example 2, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 2, the vibration proof coefficient is −1.21, the focal length is 51.50 mm. Therefore, the amount of movement of the vibration-proof lens group for correcting the rotational blur of 0.38° is −0.28 mm. In the intermediate focal length state of Example 2, the vibration proof coefficient is −2.18, the focal length is 147.00 mm. Therefore, the amount of movement of the vibration-proof lens group for correcting the rotational blur of 0.30° is −0.35 mm. In the telephoto end state of Example 2, the vibration proof coefficient is −3.12, the focal length is 242.51 mm. Therefore, the amount of movement of the vibration-proof lens group for correcting the rotational blur of 0.30° is −0.41 mm.

In Table 2 shown below, data values of the zoom optical system according to Example 2 will be shown.

TABLE 2

[General Data]

zooming rate 4.71
φ 20.0640
Δ 0.0763

|  | W | M | T |
|---|---|---|---|
| f | 51.50 | 147.00 | 242.51 |
| FNO | 4.49 | 5.33 | 6.35 |
| 2ω | 32.0 | 11.0 | 6.8 |
| Y | 14.75 | 14.75 | 14.75 |
| TL | 135.610 | 159.663 | 176.402 |
| BF | 19.521 | 41.599 | 68.637 |

[Lens Data]

| Surface Number | R | D | nd | νd |
|---|---|---|---|---|
| 1 | 63.13584 | 4.009 | 1.51680 | 63.9 |
| 2 | 169.41882 | 0.150 | | |
| 3 | 58.78287 | 2.000 | 1.90004 | 36.3 |
| 4 | 35.74722 | 7.264 | 1.49782 | 82.6 |
| 5 | −369.04726 | D5(variable) | | |
| 6 | 129.61183 | 1.500 | 1.48749 | 70.3 |
| 7 | 44.54195 | 5.235 | | |
| 8 | −87.39254 | 1.500 | 1.82128 | 39.3 |
| 9 | 72.63040 | 2.572 | | |
| 10 | −48.97929 | 1.500 | 1.75500 | 52.3 |
| 11 | 47.83568 | 3.376 | 1.80809 | 22.7 |
| 12 | −113.72334 | D12(variable) | | |
| 13 | ∞ | 1.000 | | (Aperture S) |
| 14* | 28.00000 | 3.189 | 1.59201 | 67.0 |
| 15 | 83.02809 | 0.150 | | |
| 16 | 36.24963 | 3.196 | 1.49289 | 69.9 |
| 17 | 264.57441 | 12.166 | | |
| 18 | 232.65896 | 1.500 | 2.00100 | 29.1 |
| 19 | 21.43772 | 3.929 | 1.49782 | 82.6 |
| 20 | −55.47598 | 2.145 | | |
| 21 | 75.79063 | 2.613 | 1.83238 | 31.6 |
| 22 | −129.42011 | D22(variable) | | |
| 23 | −64.66082 | 2.812 | 1.80809 | 22.7 |
| 24 | −30.79887 | 3.516 | | |
| 25 | −26.32863 | 1.500 | 1.76127 | 51.3 |
| 26 | 100.00000 | BF | | |

TABLE 2-continued

[Aspherical Data]

Fourteenth Surface

κ = 1.00000E+00
A4 = −7.36136E−06, A6 = −2.03409E−09, A8 = 1.41855E−11, A10 = −1.07528E−13

[Lens Group Data]

| Group | Starting Surface | Focal Length |
|---|---|---|
| G1 | 1 | 94.01 |
| G2 | 6 | −27.89 |
| G3 | 14 | 35.97 |
| G4 | 23 | −47.07 |

[Variable Distance Data]

| | W Infinity | M Infinity | T Infinity | W Short Distance | M Short Distance | T Short Distance |
|---|---|---|---|---|---|---|
| f | 51.50 | 147.00 | 242.51 | — | — | — |
| Magnification | — | — | — | −0.0552 | −0.1470 | −0.2564 |
| D0 | ∞ | ∞ | ∞ | 857.82 | 833.68 | 816.97 |
| D5 | 2.003 | 30.544 | 36.912 | 2.003 | 30.544 | 36.912 |
| D12 | 26.003 | 9.906 | 1.750 | 26.003 | 9.906 | 1.750 |
| D22 | 21.260 | 10.791 | 2.282 | 24.584 | 21.180 | 16.994 |
| BF | 19.521 | 41.599 | 68.637 | 16.212 | 31.316 | 54.243 |

[Conditional Expression Corresponding Value]

Conditional Expression (1) fp/fGp = 1.9423
Conditional Expression (2) LS/LGp = 0.5006
Conditional Expression (3) 100 × (Δ/φ) = 0.3803
Conditional Expression (4) fa/fb = 0.3462
Conditional Expression (5) fα/fβ = 0.3462
Conditional Expression (6) fVR/fGa = 1.2947
Conditional Expression (7) fGp/(−fGa) = 1.2896
Conditional Expression (8) fGp/(−fGb) = 0.7641
Conditional Expression (9) |m1a|/fw = 0.6778
Conditional Expression (10) |mpb|/fw = 0.3685
Conditional Expression (11) f1/(−fGa) = 3.3709
Conditional Expression (12) f3α/f3β = 0.3462
Conditional Expression (13) f1/(−f2) = 3.3709
Conditional Expression (14) f4/f2 = 1.6877
Conditional Expression (15) fVR/f2 = 1.2947
Conditional Expression (16) f3/(−f2) = 1.2896
Conditional Expression (17) f3/(−f4) = 0.7641
Conditional Expression (18) |m12|/fw = 0.6778
Conditional Expression (19) |m34|/fw = 0.3685
Conditional Expression (20) f3a/f3b = 0.3462

Figure 7C:
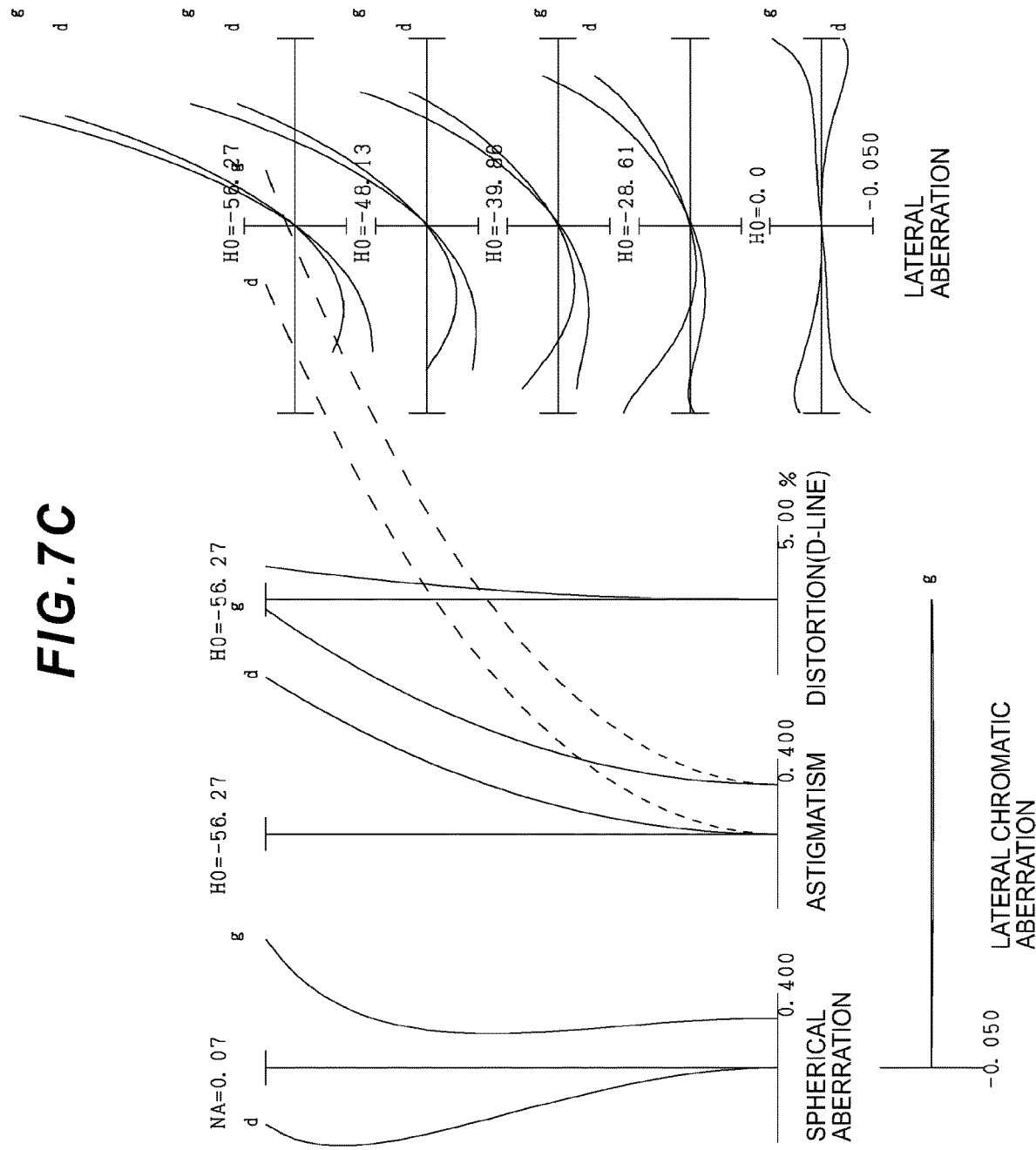
Figure 8A:
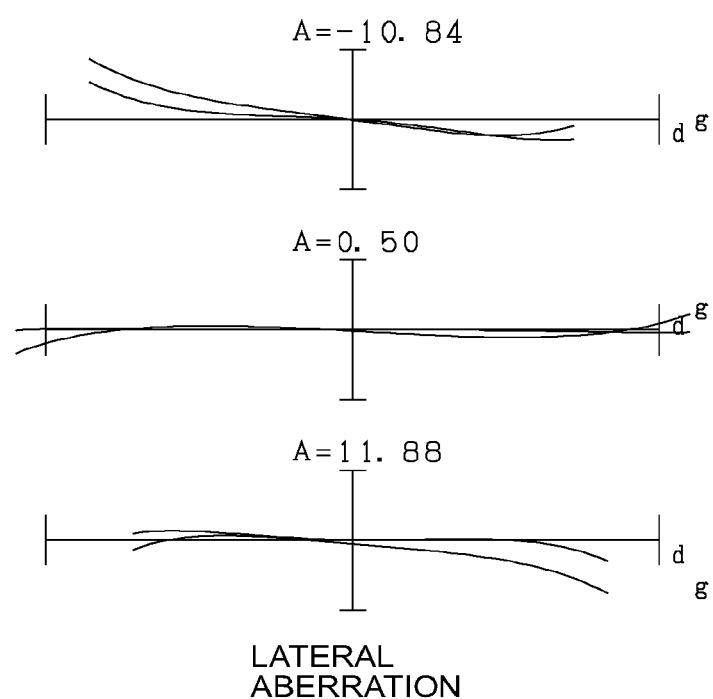
FIG. 8A, FIG. 8B, and FIG. 8C are each a meridional lateral Aberration graph when shake compensation is performed in the wide angle end state, in the intermediate focal length state, and in the telephoto end state of the zoom optical system according to Example 2.
Figure 8B:
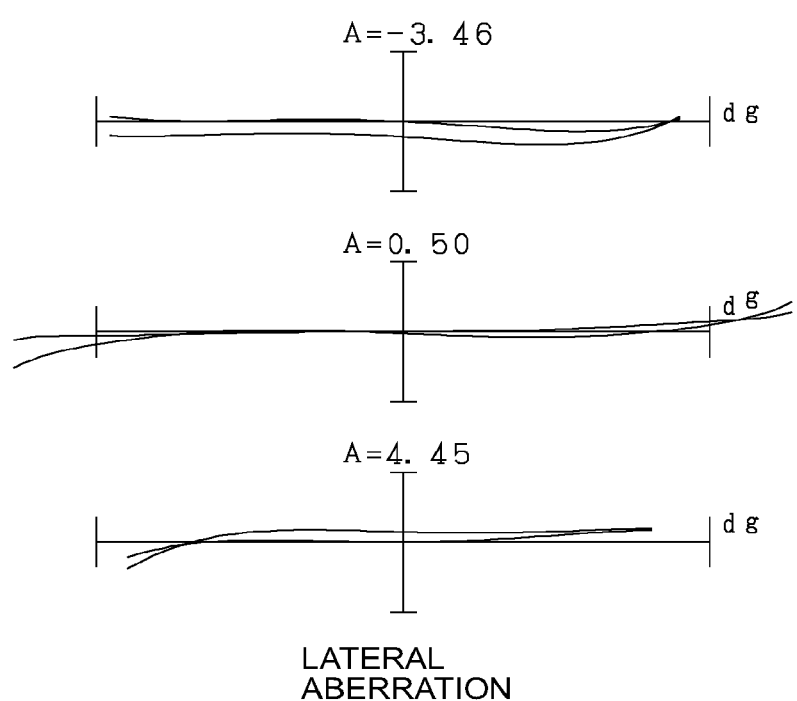
Figure 8C:
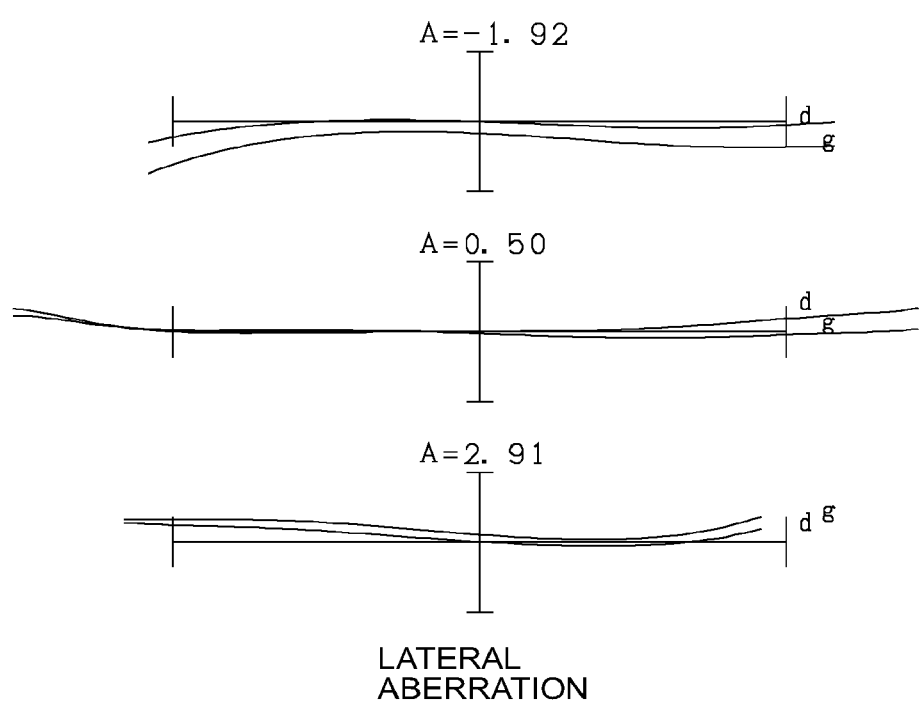

FIG. 6A, FIG. 6B and FIG. 6C are each an aberration graph illustrating aberrations upon focusing on infinity in a wide angle end state, in an intermediate focal length state, and in a telephoto end state of the zoom optical system having a vibration proof function according to Example 2. FIG. 7A, FIG. 7B and FIG. 7C are each an aberration graph illustrating aberrations upon focusing on short distance (close range) in a wide angle end state, in an intermediate focal length state, and in a telephoto end state of the zoom optical system having a vibration proof function according to Example 2. FIG. 8A, FIG. 8B, and FIG. 8C are each a meridional lateral aberration graph when shake compensation is performed in the wide angle end state, in the intermediate focal length state, and in the telephoto end state of the zoom optical system having a vibration proof function according to Example 2. It is apparent from respective aberration graphs that the zoom optical system according to Example 2 has an excellent image forming performance capable of correcting various aberrations successfully from the wide angle end state to the telephoto end state, and also has an excellent image forming performance also upon focusing on a short distant object.

Example 3

Example 3 will be described with reference to FIG. 9 to FIG. 12 and Table 3. FIG. 9 is a drawing illustrating a lens configuration of a zoom optical system according to Example 3. The zoom optical system ZL (3) according to Example 3 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 9. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment. In Example 3, the first lens group G1, the second lens group G2 and the fourth lens group G4 have the same configuration as in Example 1, so that the same signs as those in Example 1 are allocated, and detailed descriptions of these lenses will be omitted.

The third lens group G3 consists of, in order from an object, a cemented lens consisting of a first positive lens L31 having a biconvex shape and a first negative lens L32 having a biconcave shape, a cemented lens consisting of a meniscus shaped second negative lens L33 having a convex surface facing the object, and a second positive lens L34 having a biconvex shape, and a third positive lens L35 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 and the first negative lens L32 constitute the first object side subgroup, and the second negative lens L33, the second positive lens L34, and the third positive lens L35 constitute the first image side subgroup. In the same manner, the first positive lens L31 and the first negative lens L32 constitute the second object side subgroup, and the second negative lens L33, the second positive lens L34, and the third positive lens L35 constitute the second image side subgroup.

In the zoom optical system ZL (3) according to Example 3, focusing from the infinity to the short distant object is achieved by moving all the lenses in the fourth lens group G4 to the image side along the optical axis. Also, in the zoom optical system ZL (3) according to Example 3, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 3, the vibration proof coefficient is −1.14, the focal length is 51.49 mm. Therefore, the amount of movement of the vibration-proof lens group for correcting the rotational blur of 0.38° is −0.30 mm. In the intermediate focal length state of Example 3, the vibration proof coefficient is −2.09, the focal length is 146.98 mm. Therefore, the amount of movement of the vibration-proof lens group for correcting the rotational blur of 0.30° is −0.37 mm. In the telephoto end state of Example 3, the vibration proof coefficient is −3.01, the focal length is 242.46 mm. Therefore, the amount of movement of the vibration-proof lens group for correcting the rotational blur of 0.30° is −0.42 mm.

In Table 3 shown below, data values of the zoom optical system according to Example 3 will be shown.

TABLE 3

[General Data]

zooming rate 4.71
φ 20.4220
Δ 0.0884

| | W | M | T |
|---|---|---|---|
| f | 51.49 | 146.98 | 242.46 |
| FNO | 4.49 | 5.35 | 6.35 |
| 2ω | 32.0 | 11.0 | 6.8 |
| Y | 14.75 | 14.75 | 14.75 |
| TL | 137.501 | 160.239 | 176.433 |
| BF | 19.721 | 43.125 | 70.648 |

[Lens Data]

| Surface Number | R | D | nd | νd |
|---|---|---|---|---|
| 1 | 62.50796 | 3.877 | 1.51680 | 63.9 |
| 2 | 160.82600 | 0.150 | | |
| 3 | 60.93270 | 2.000 | 1.89190 | 37.1 |
| 4 | 35.47039 | 7.429 | 1.49782 | 82.6 |
| 5 | −263.78226 | D5(variable) | | |
| 6 | 143.24691 | 1.500 | 1.49782 | 82.6 |
| 7 | 45.94533 | 2.613 | | |
| 8 | −93.19985 | 1.500 | 1.75500 | 52.3 |
| 9 | 98.93609 | 2.600 | | |
| 10 | −59.00326 | 1.500 | 1.75500 | 52.3 |
| 11 | 49.53829 | 3.099 | 1.80809 | 22.7 |
| 12 | −395.65819 | D12(variable) | | |
| 13 | ∞ | 1.000 | | (Aperture S) |
| 14* | 26.40000 | 4.435 | 1.61557 | 64.2 |
| 15 | −108.15758 | 1.500 | 1.65055 | 33.0 |
| 16 | 1060.50670 | 14.393 | | |
| 17 | 131.84354 | 1.500 | 2.00100 | 29.1 |
| 18 | 23.34947 | 3.867 | 1.49782 | 82.6 |
| 19 | −62.51733 | 0.405 | | |

TABLE 3-continued

| | | | | |
|---|---|---|---|---|
| 20 | 73.98240 | 2.633 | 1.76320 | 29.5 |
| 21 | −140.65166 | D21(variable) | | |
| 22 | −69.02433 | 2.770 | 1.85895 | 22.7 |
| 23 | −32.89941 | 4.169 | | |
| 24 | −26.76944 | 1.500 | 1.77250 | 49.6 |
| 25 | 105.64282 | BF | | |

[Aspherical Data]

Fourteenth Surface

κ = 1.00000E+00
A4 = −7.74297E−06, A6 = −3.79343E−09, A8 = 1.13866E−11, A10 = −1.06621E−13

[Lens Group Data]

| Group | Starting Surface | Focal Length |
|---|---|---|
| G1 | 1 | 95.01 |
| G2 | 6 | −29.65 |
| G3 | 14 | 37.08 |
| G4 | 22 | −48.44 |

[Variable Distance Data]

| | W Infinity | M Infinity | T Infinity | W Short Distance | M Short Distance | T Short Distance |
|---|---|---|---|---|---|---|
| f | 51.49 | 146.98 | 242.46 | — | — | — |
| Magnification | — | — | — | −0.0551 | −0.1485 | −0.2603 |
| D0 | ∞ | ∞ | ∞ | 856.43 | 833.62 | 817.43 |
| D5 | 2.623 | 30.816 | 37.312 | 2.623 | 30.816 | 37.312 |
| D12 | 29.110 | 11.057 | 1.750 | 29.110 | 11.057 | 1.750 |
| D21 | 21.608 | 10.801 | 2.284 | 25.143 | 21.325 | 17.367 |
| BF | 19.721 | 43.125 | 70.648 | 16.202 | 32.708 | 55.893 |

[Conditional Expression Corresponding Value]

Conditional Expression (1) fp/fGp = 1.2010
Conditional Expression (2) LS/LGp = 0.5150
Conditional Expression (3) 100 × (Δ/φ) = 0.4329
Conditional Expression (4) fa/fb = 0.4711
Conditional Expression (5) fα/fβ = 0.4711
Conditional Expression (6) fVR/fGa = 1.3095
Conditional Expression (7) fGp/(−fGa) = 1.2507
Conditional Expression (8) fGp/(−fGb) = 0.7655
Conditional Expression (9) |m1a|/fw = 0.6737
Conditional Expression (10) |mpb|/fw = 0.3753
Conditional Expression (11) f1/(−fGa) = 3.2043
Conditional Expression (12) f3α/f3β = 0.4711
Conditional Expression (13) f1/(−f2) = 3.2043
Conditional Expression (14) f4/f2 = 1.6339
Conditional Expression (15) fVR/f2 = 1.3095
Conditional Expression (16) f3/(−f2) = 1.2507
Conditional Expression (17) f3/(−f4) = 0.7655
Conditional Expression (18) |m12|/fw = 0.6737
Conditional Expression (19) |m34|/fw = 0.3753
Conditional Expression (20) f3a/f3b = 0.4711

Figure 10B:
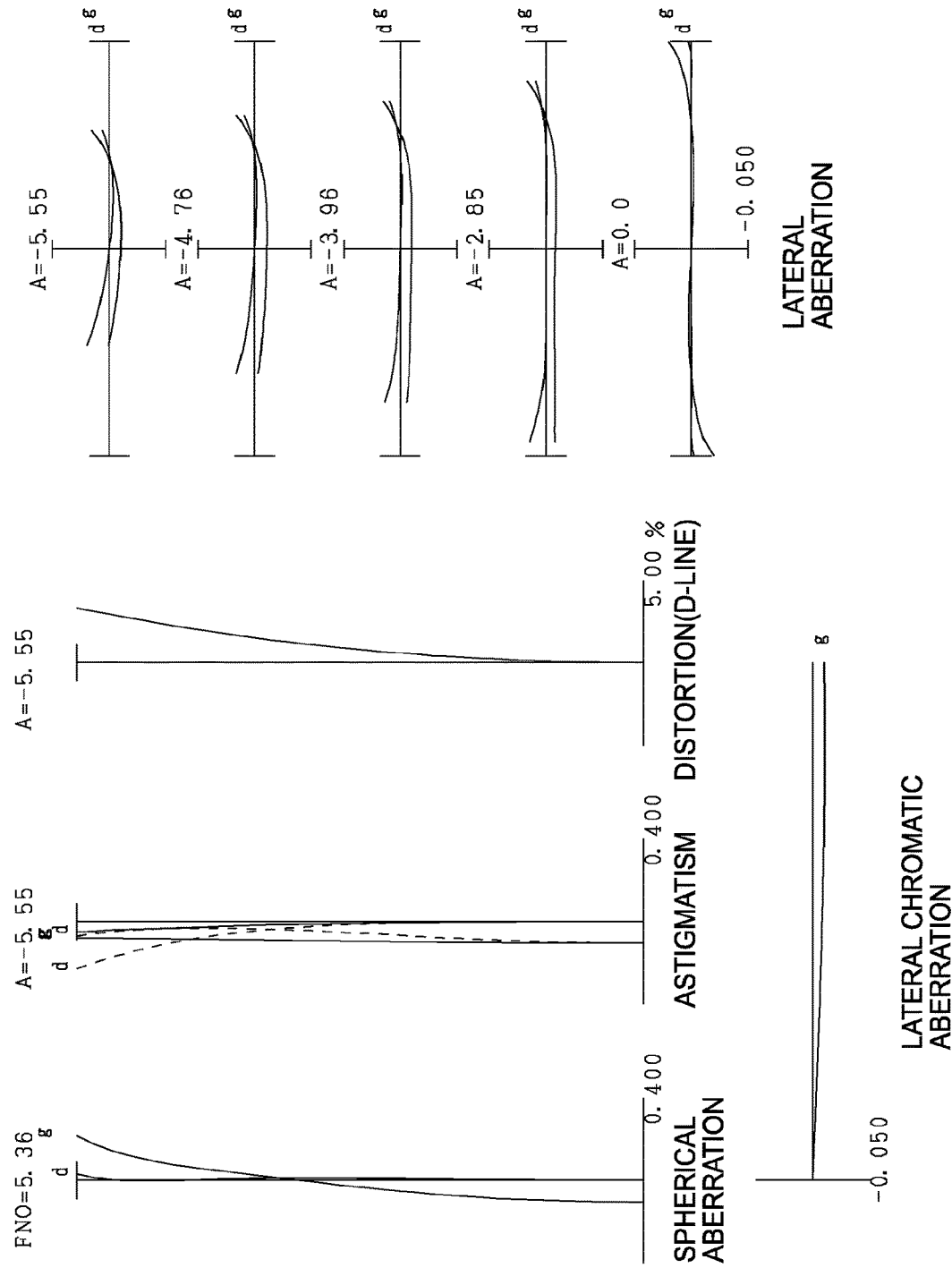
Figure 11C:
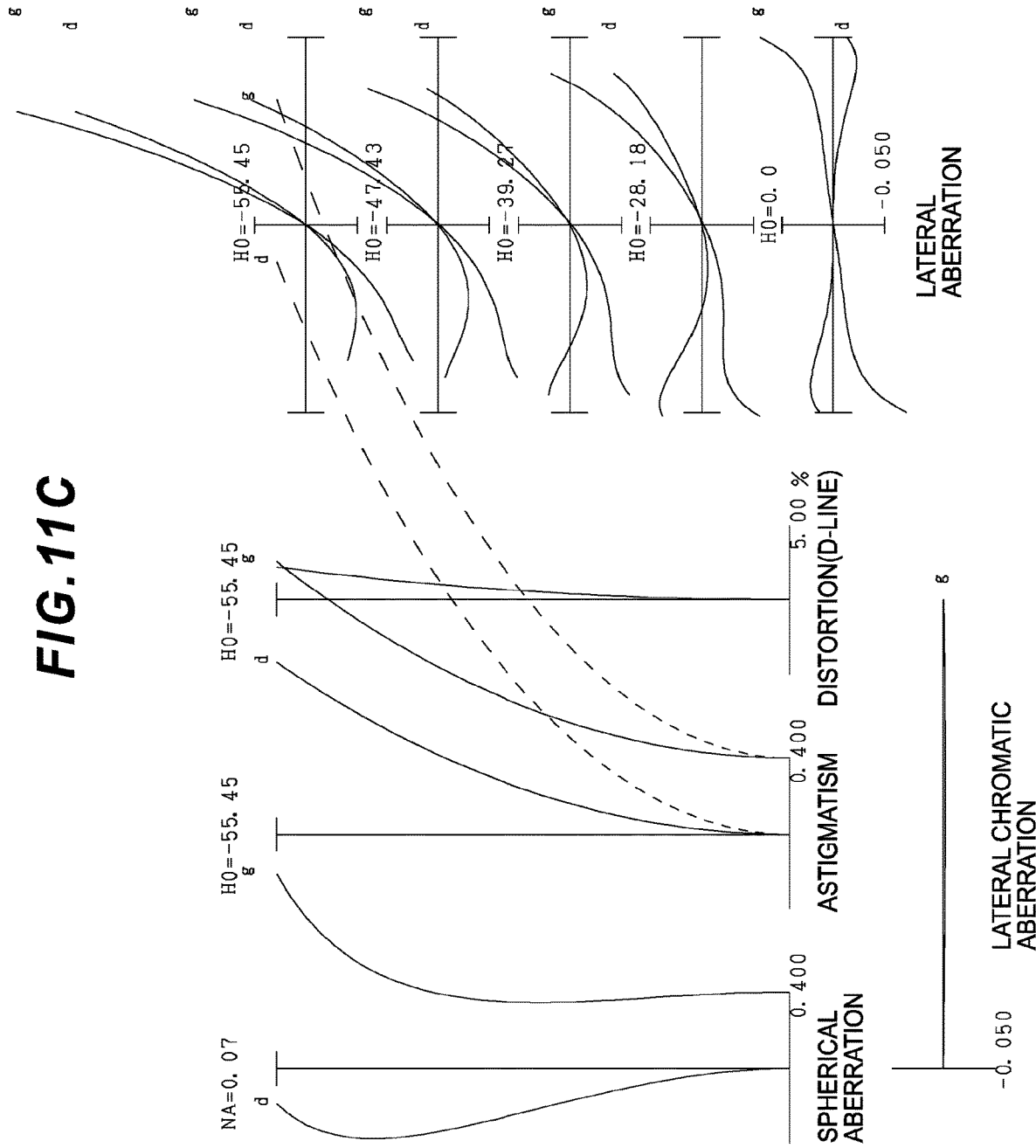
Figure 12A:
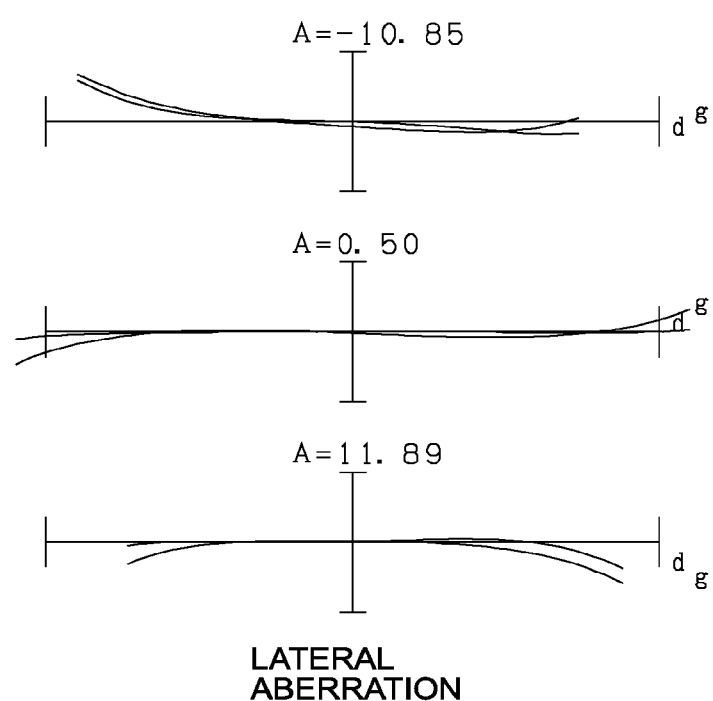
FIG. 12A, FIG. 12B, and FIG. 12C are each a meridional lateral aberration graph when shake compensation is performed in the wide angle end state, in the intermediate focal length state, and in the telephoto end state of the zoom optical system according to Example 3.
Figure 12B:
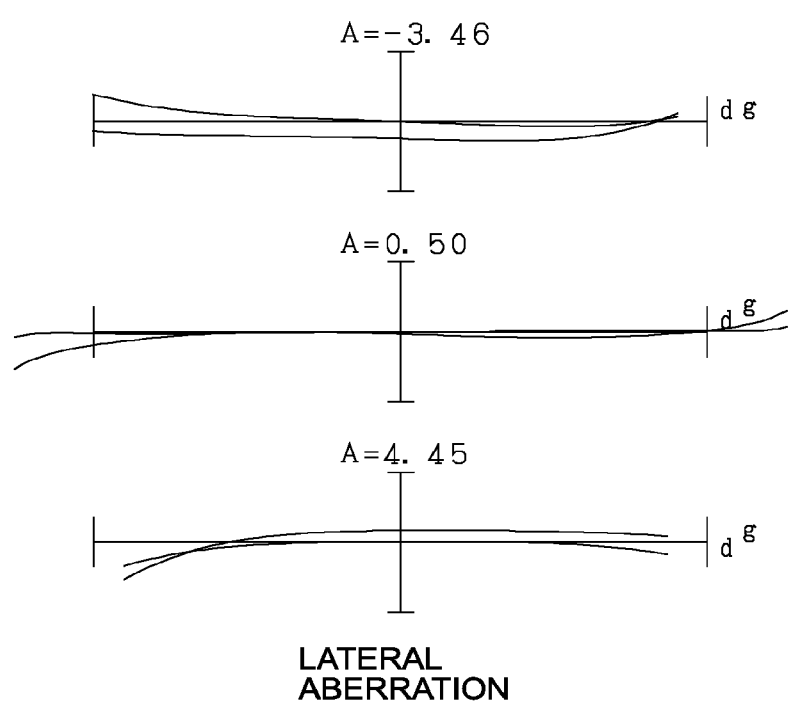
Figure 12C:
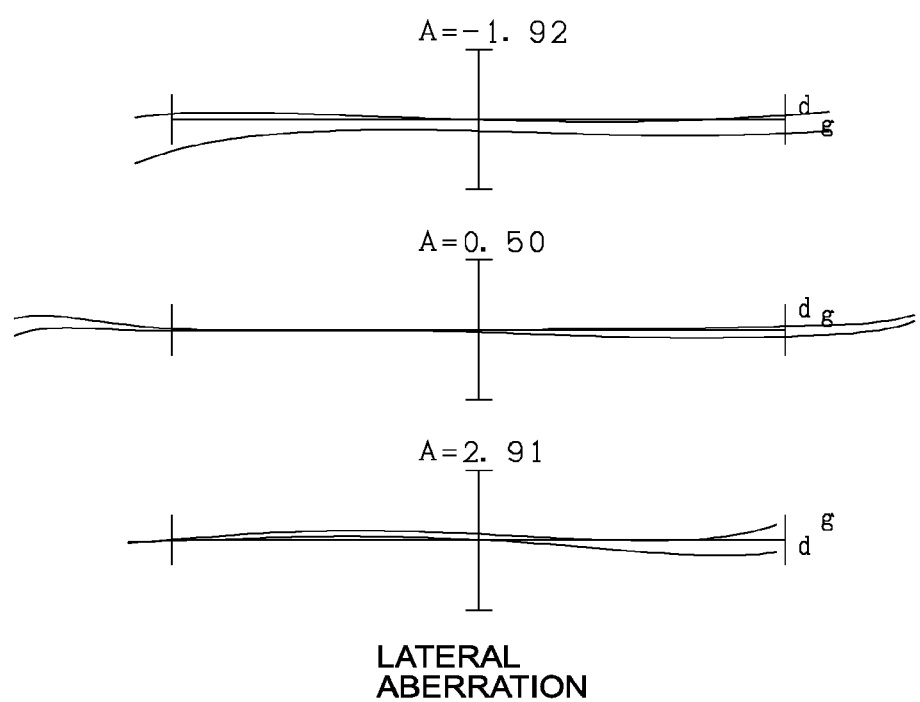

FIG. 10A, FIG. 10B and FIG. 10C are each an aberration graph illustrating aberrations upon focusing on infinity in a wide angle end state, in an intermediate focal length state, and in a telephoto end state of the zoom optical system having a vibration proof function according to Example 3. FIG. 11A, FIG. 11B and FIG. 11C are each an aberration graph illustrating aberrations upon focusing on short distance (close range) in a wide angle end state, in an intermediate focal length state, and in a telephoto end state of the zoom optical system having a vibration proof function according to Example 3. FIG. 12A, FIG. 12B, and FIG. 12C are each a meridional lateral aberration graph when shake compensation is performed in the wide angle end state, in the intermediate focal length state, and in the telephoto end state of the zoom optical system having a vibration proof function according to Example 3. It is apparent from respective aberration graphs that the zoom optical system according to Example 3 has an excellent image forming performance capable of correcting various aberrations successfully from the wide angle end state to the telephoto end state, and also has an excellent image forming performance also upon focusing on a short distant object.

Example 4

Example 4 will be described with reference to FIG. 13 to FIG. 16 and Table 4. FIG. 13 is a drawing illustrating a lens configuration of a zoom optical system according to Example 4. The zoom optical system ZL (4) according to Example 4 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 13. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment. In Example 4, the first lens group G1 and the fourth lens group G4 have the same configuration as in the first embodiment, so that the same reference signs as those in Example 1 are allocated, and detailed descriptions of these lenses will be omitted.

The second lens group G2 consists of, in order from an object, a meniscus shaped first negative lens L21 having a convex surface facing the object, the second negative lens L22 having a biconcave shape, and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a meniscus shaped first positive lens L31 having a convex surface facing the object, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

In the zoom optical system ZL (4) according to Example 4, focusing from the infinity to the short distant object is achieved by moving all the lenses in the fourth lens group G4 to the image side. Also, in the zoom optical system ZL (4) according to Example 4, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 4, the vibration proof coefficient is −1.11, the focal length is 51.50 mm. Therefore, the amount of movement of the vibration-proof lens group for correcting the rotational blur of 0.38° is −0.30 mm. In the intermediate focal length state of Example 4, the vibration proof coefficient is −2.06, the focal length is 146.99 mm. Therefore, the amount of movement of the vibration-proof lens group for correcting the rotational blur of 0.30° is −0.37 mm. In the telephoto end state of Example 4, the vibration proof coefficient is −3.00, the focal length is 242.48 mm. Therefore, the amount of movement of the vibration-proof lens group for correcting the rotational blur of 0.30° is −0.42 mm.

In Table 4 shown below, data values of the zoom optical system according to Example 4 will be shown.

TABLE 4

[General Data]

zooming rate 4.71
φ 21.2780
Δ 0.0828

|  | W | M | T |
|---|---|---|---|
| f | 51.50 | 146.99 | 242.48 |
| FNO | 4.49 | 5.19 | 6.35 |
| 2ω | 32.6 | 11.2 | 6.8 |
| Y | 14.75 | 14.75 | 14.75 |
| TL | 144.334 | 161.305 | 179.008 |
| BF | 20.073 | 36.479 | 65.178 |

[Lens Data]

| Surface Number | R | D | nd | νd |
|---|---|---|---|---|
| 1 | 78.55125 | 2.800 | 1.48749 | 70.3 |
| 2 | 111.14411 | 0.150 |  |  |
| 3 | 63.92316 | 2.000 | 1.91082 | 35.2 |
| 4 | 42.96816 | 7.327 | 1.49782 | 82.6 |
| 5 | −291.62059 | D5(variable) |  |  |
| 6 | 1504.08930 | 1.500 | 1.71476 | 54.4 |
| 7 | 66.05775 | 2.065 |  |  |
| 8 | −53.66495 | 1.500 | 1.61800 | 63.3 |
| 9 | 40.89287 | 0.277 |  |  |
| 10 | 42.28895 | 2.955 | 1.80809 | 22.7 |

TABLE 4-continued

| | | | | |
|---|---|---|---|---|
| 11 | 141.93243 | D11(variable) | | |
| 12 | ∞ | 1.000 | | (Aperture S) |
| 13* | 25.82873 | 4.154 | 1.61881 | 63.9 |
| 14 | 958.79702 | 9.656 | | |
| 15 | 116.29028 | 1.500 | 2.00100 | 29.1 |
| 16 | 21.19932 | 4.178 | 1.49782 | 82.6 |
| 17 | −79.19840 | 7.501 | | |
| 18 | 86.66199 | 2.649 | 1.78408 | 26.5 |
| 19 | −168.51191 | D19(variable) | | |
| 20 | −79.67614 | 2.749 | 1.80809 | 22.7 |
| 21 | −33.68051 | 4.721 | | |
| 22 | −26.62702 | 1.500 | 1.83481 | 42.7 |
| 23 | 109.98588 | BF | | |

[Aspherical Data]

Thirteenth Surface

κ = 1.00000E+00
A4 = −5.91135E−06, A6 = −4.94128E−09, A8 = 1.13438E−11, A10 = −9.44997E−14

[Lens Group Data]

| Group | Starting Surface | Focal Length |
|---|---|---|
| G1 | 1 | 121.71 |
| G2 | 6 | −41.86 |
| G3 | 13 | 41.24 |
| G4 | 20 | −43.85 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.48 | — | — | — |
| Magnification | — | — | — | −0.0557 | −0.1430 | −0.2573 |
| D0 | ∞ | ∞ | ∞ | 849.10 | 832.12 | 814.43 |
| D5 | 1.668 | 40.693 | 48.933 | 1.668 | 40.693 | 48.933 |
| D11 | 44.006 | 12.587 | 2.432 | 44.006 | 12.587 | 2.432 |
| D19 | 18.405 | 11.365 | 2.283 | 21.531 | 23.518 | 17.138 |
| BF | 20.073 | 36.479 | 65.178 | 16.962 | 24.425 | 50.643 |

[Conditional Expression Corresponding Value]

Conditional Expression (1) fp/fGp = 1.0384
Conditional Expression (2) LS/LGp = 0.5789
Conditional Expression (3) 100 × (Δ/φ) = 0.3891
Conditional Expression (4) fa/fb = 0.2816
Conditional Expression (5) fα/fβ = 0.2816
Conditional Expression (6) fVR/fGa = 1.0000
Conditional Expression (7) fGp/(−fGa) = 0.9852
Conditional Expression (8) fGp/(−fGb) = 0.9404
Conditional Expression (9) |m1a|/fw = 0.9178
Conditional Expression (10) |mpb|/fw = 0.3130
Conditional Expression (11) f1/(−fGa) = 2.9077
Conditional Expression (12) f3α/f3β = 0.2816
Conditional Expression (13) f1/(−f2) = 2.9077
Conditional Expression (14) f4/f2 = 1.0476
Conditional Expression (15) fVR/f2 = 1.0000
Conditional Expression (16) f3/(−f2) = 0.9852
Conditional Expression (17) f3/(−f4) = 0.9404
Conditional Expression (18) |m12|/fw = 0.9178
Conditional Expression (19) |m34|/fw = 0.3130
Conditional Expression (20) f3a/f3b = 0.2816

Figure 14A:
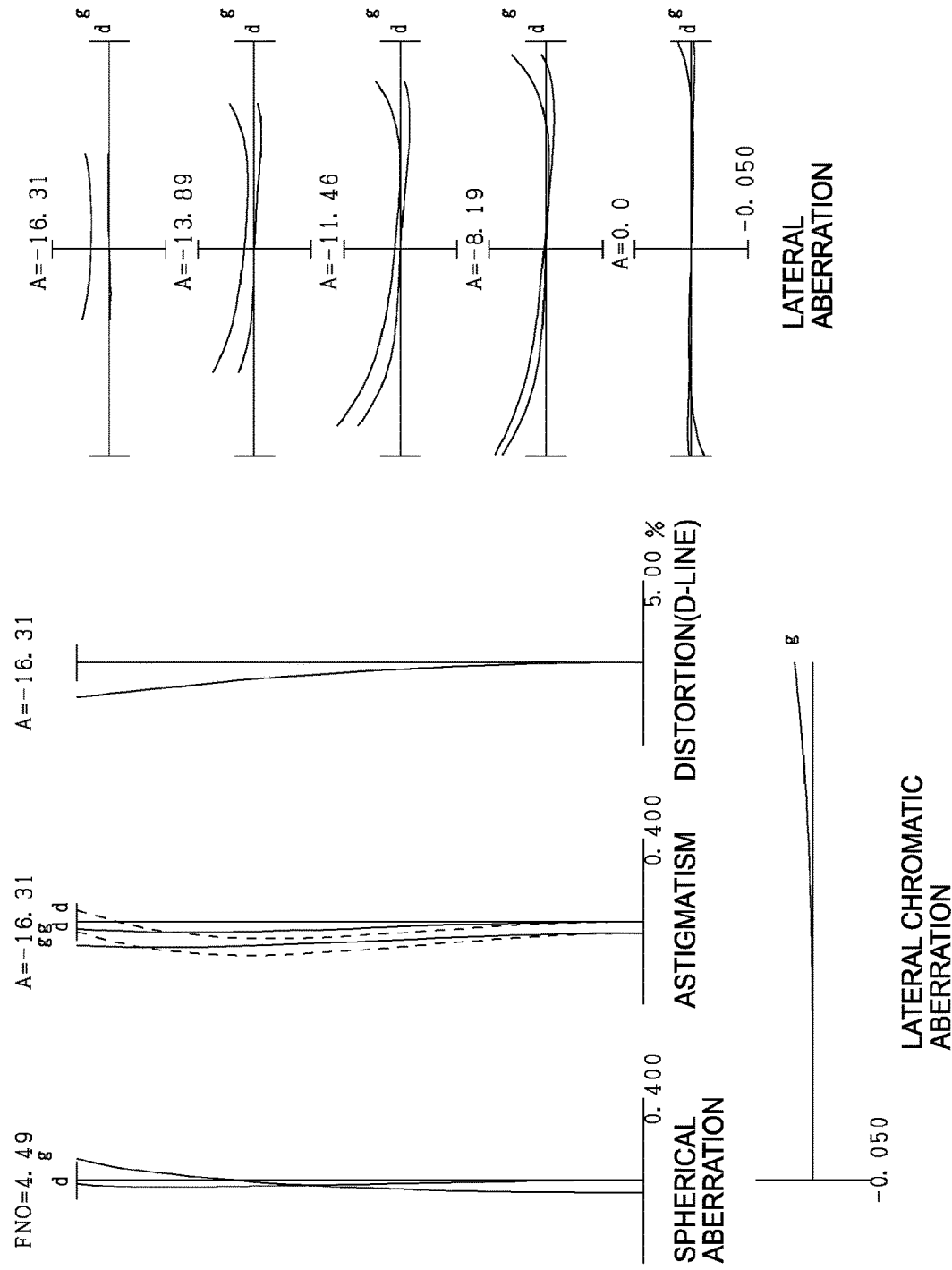
Figure 15B:
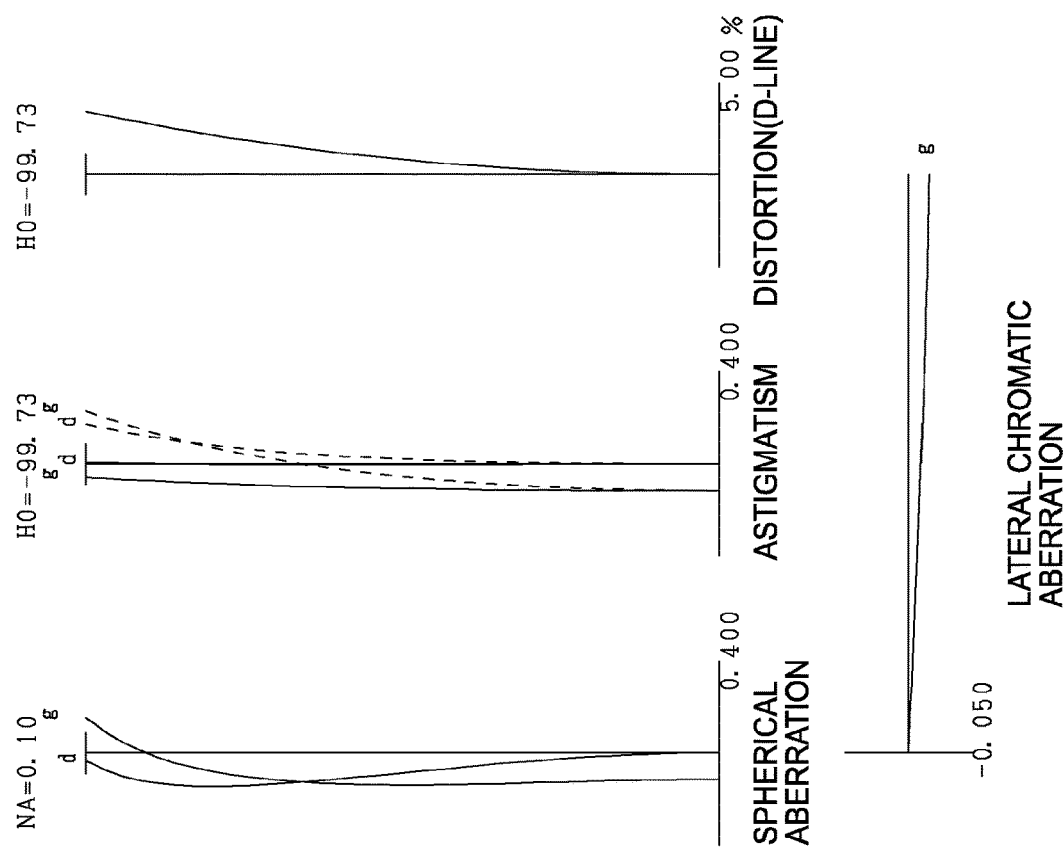
Figure 15C:
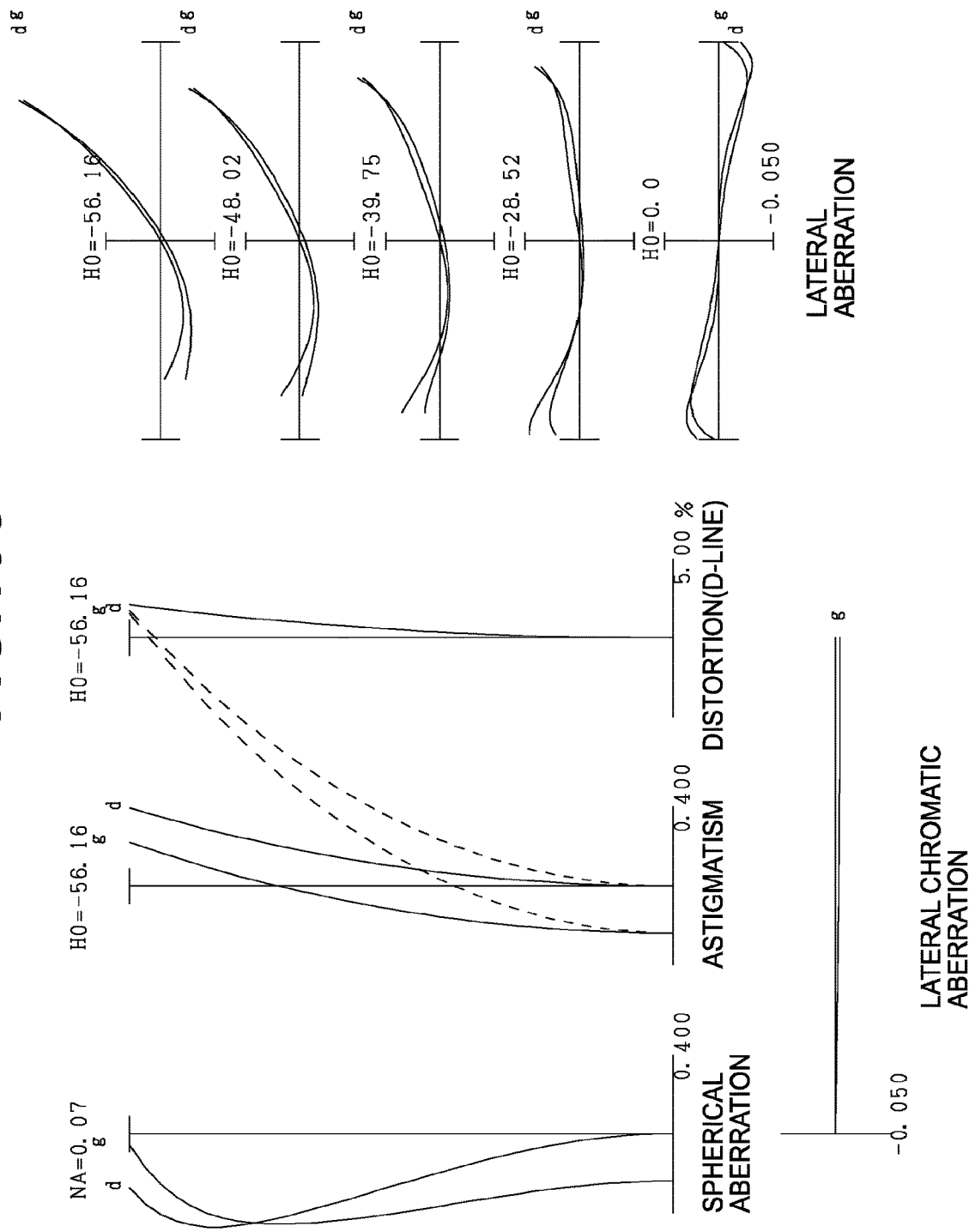
Figure 16A:
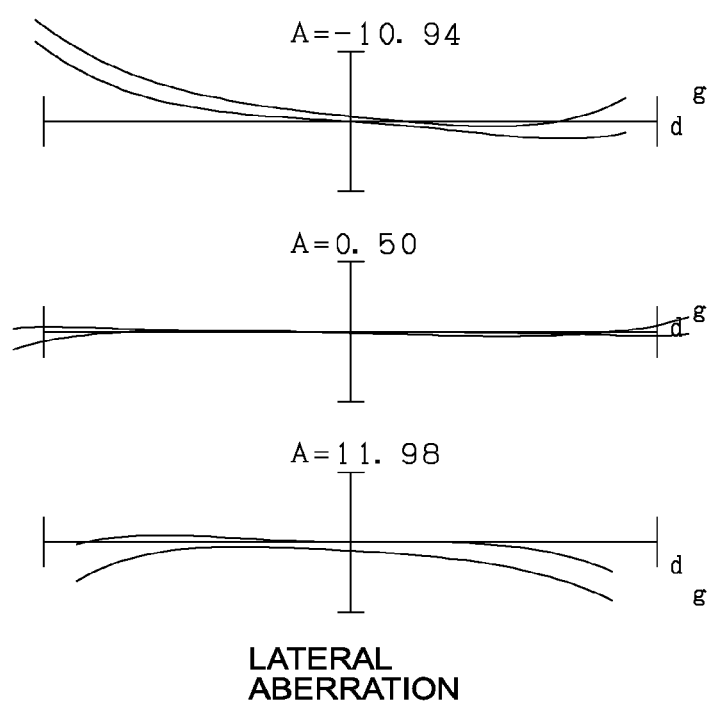
FIG. 16A, FIG. 16B, and FIG. 16C are each a meridional lateral aberration graph when shake compensation is performed in the wide angle end state, in the intermediate focal length state, and in the telephoto end state of the zoom optical system according to Example 4.
Figure 16B:
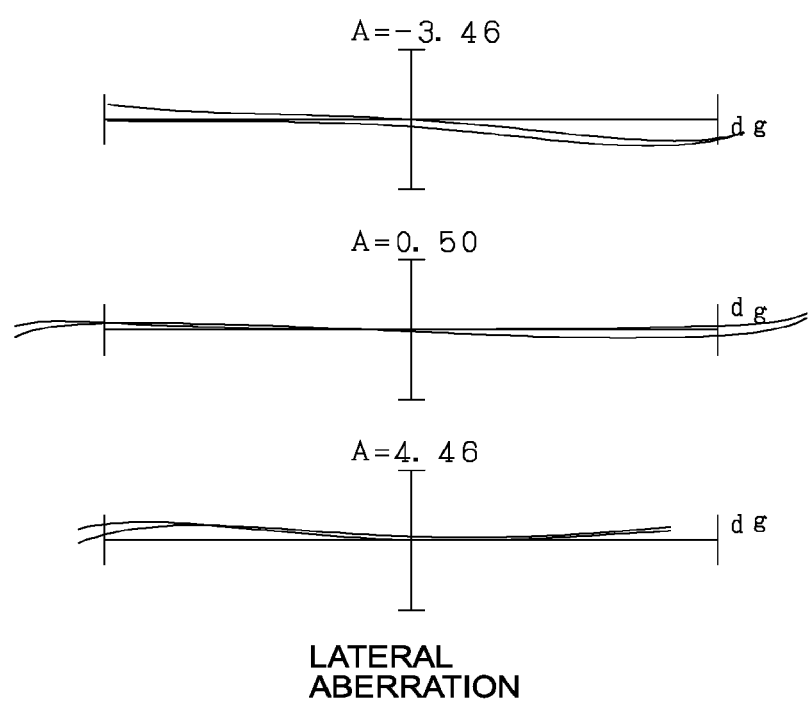
Figure 16C:
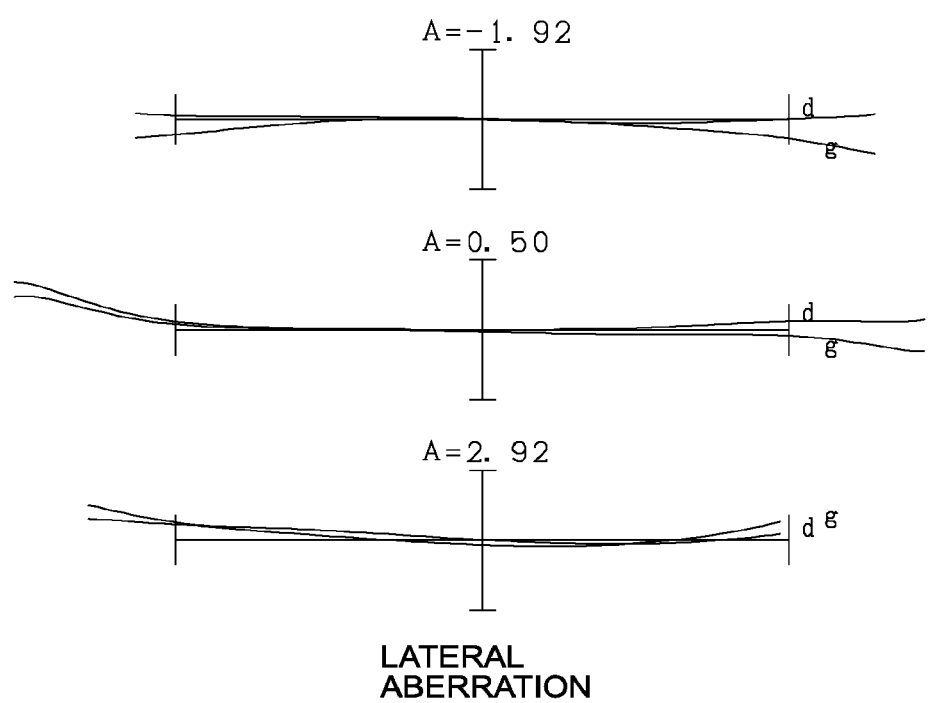

FIG. 14A, FIG. 14B and FIG. 14C are each an aberration graph illustrating aberrations upon focusing on infinity in a wide angle end state, in an intermediate focal length state, and in a telephoto end state of the zoom optical system having a vibration proof function according to Example 4. FIG. 15A, FIG. 15B and FIG. 15C are each an aberration graph illustrating aberrations upon focusing on short distance (close range) in a wide angle end state, in an intermediate focal length state, and in a telephoto end state of the zoom optical system having a vibration proof function according to Example 4. FIG. 16A, FIG. 16B, and FIG. 16C are each a meridional lateral aberration graph when shake compensation is performed in the wide angle end state, in the intermediate focal length state, and in the telephoto end state of the zoom optical system having a vibration proof function according to Example 4. It is apparent from respective aberration graphs that the zoom optical system according to Example 4 has an excellent image forming performance capable of correcting various aberrations successfully from the wide angle end state to the telephoto end state, and also has an excellent image forming performance also upon focusing on a short distant object.

Example 5

Example 5 will be described with reference to FIG. 17 to FIG. 20 and Table 5. FIG. 17 is a drawing illustrating a lens configuration of a zoom optical system according to Example 5. The zoom optical system ZL (5) according to Example 5 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a negative refractive power. For zooming from the wide angle end state (W) to the telephoto end state (T), the first to fourth lens groups G1 to G4 move in the directions indicated by the arrows shown in FIG. 17, and the fifth lens group G5 is secured. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a meniscus shaped first negative lens L21 having a convex surface facing the object, a second negative lens L22 having a biconcave shape, and a cemented lens consisting of a third negative lens L23 having a biconcave shape and a positive lens L24 having a biconvex shape. In this example, the first negative lens L21 constitutes the negative subgroup, and the second negative lens L22, a third negative lens L23, and the positive lens L24 constitute the vibration proof group.

The third lens group G3 consists of, in order from an object, a first positive lens L31 having a biconvex shape, a cemented lens consisting of a negative lens L32 having a biconcave shape and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a negative lens L51 meniscus shaped with a convex surface facing the image side. An image surface I is disposed on the image side of the fifth lens group G5.

In the zoom optical system ZL (5) according to Example 5, focusing from the infinity to the short distant object is achieved by moving all the lenses in the fourth lens group G4 to the image side along the optical axis. Also, in the zoom optical system ZL (5) according to Example 5, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 5, the vibration proof coefficient is −1.21, the focal length is 51.50 mm. Therefore, the amount of movement of the vibration-proof lens group for correcting the rotational blur of 0.38° is −0.28 mm. In the intermediate focal length state of Example 5, the vibration proof coefficient is −2.14, the focal length is 146.99 mm. Therefore, the amount of movement of the vibration-proof lens group for correcting the rotational blur of 0.30° is −0.36 mm. In the telephoto end state of Example 5, the vibration proof coefficient is −3.08, the focal length is 242.48 mm. Therefore, the amount of movement of the vibration-proof lens group for correcting the rotational blur of 0.30° is −0.41 mm.

In Table 5 shown below, data values of the zoom optical system according to Example 5 will be shown.

TABLE 5

| [General Data] | | | |
| --- | --- | --- | --- |
| zooming rate 4.71 | | | |
| φ 18.5740 | | | |
| Δ 0.0609 | | | |
| | W | M | T |
| f | 51.50 | 146.99 | 242.48 |
| FNO | 4.49 | 5.22 | 6.35 |
| 2ω | 32.2 | 11.0 | 6.8 |
| Y | 14.75 | 14.75 | 14.75 |

TABLE 5-continued

| | | | |
|---|---|---|---|
| TL | 139.517 | 159.237 | 175.122 |
| BF | 12.228 | 12.167 | 12.232 |

[Lens Data]

| Surface Number | R | D | nd | νd |
|---|---|---|---|---|
| 1 | 59.18642 | 3.866 | 1.62299 | 58.1 |
| 2 | 106.62157 | 0.150 | | |
| 3 | 59.10574 | 2.000 | 1.90275 | 36.3 |
| 4 | 36.52221 | 7.578 | 1.49782 | 82.6 |
| 5 | −659.38914 | D5(variable) | | |
| 6 | 29.79653 | 1.500 | 1.72916 | 54.6 |
| 7 | 25.16699 | 7.180 | | |
| 8 | −88.47901 | 1.500 | 1.81600 | 46.6 |
| 9 | 55.88999 | 1.662 | | |
| 10 | −43.86910 | 1.500 | 1.65160 | 58.6 |
| 11 | 68.86771 | 2.985 | 1.80809 | 22.7 |
| 12 | −109.96417 | D12(variable) | | |
| 13 | ∞ | 1.000 | | (Aperture S) |
| 14* | 25.79838 | 3.809 | 1.59201 | 67.0 |
| 15 | −279.37355 | 17.406 | | |
| 16 | −247.49695 | 1.500 | 2.00069 | 25.5 |
| 17 | 21.01070 | 3.365 | 1.49782 | 82.6 |
| 18 | −72.37303 | 2.817 | | |
| 19 | 51.64620 | 3.167 | 1.79504 | 28.7 |
| 20 | −54.87648 | D20(variable) | | |
| 21 | −383.32468 | 3.902 | 1.73537 | 27.7 |
| 22 | −22.63165 | 0.334 | | |
| 23 | −22.44228 | 1.500 | 1.81600 | 46.6 |
| 24 | 52.43184 | D24(variable) | | |
| 25 | −66.76465 | 1.500 | 1.51680 | 63.9 |
| 26 | −190.01529 | BF | | |

[Aspherical Data]

Fourteenth Surface

κ = 1.00000E+00
A4 = −7.86750E−06, A6 = −2.82414E−09, A8 = −5.58002E−12, A10 = −5.40323E−14

[Lens Group Data]

| Group | Starting Surface | Focal Length |
|---|---|---|
| G1 | 1 | 101.81 |
| G2 | 6 | −30.57 |
| G3 | 14 | 37.64 |
| G4 | 21 | −47.69 |
| G5 | 25 | −200.00 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.48 | — | — | — |
| Magnification | — | — | — | −0.0550 | −0.1399 | −0.2441 |
| D0 | ∞ | ∞ | ∞ | 854.43 | 834.65 | 818.83 |
| D5 | 1.200 | 32.757 | 39.155 | 1.200 | 32.757 | 39.155 |
| D12 | 29.679 | 9.845 | 1.514 | 29.679 | 9.845 | 1.514 |
| D20 | 20.216 | 10.855 | 1.386 | 23.206 | 21.666 | 15.248 |
| D24 | 5.973 | 23.393 | 50.613 | 2.983 | 12.581 | 36.751 |
| BF | 12.228 | 12.167 | 12.232 | 12.243 | 12.262 | 12.521 |

[Conditional Expression Corresponding Value]

Conditional Expression (1) fp/fGp = 1.0647
Conditional Expression (2) LS/LGp = 0.6307
Conditional Expression (3) 100 × (Δ/φ) = 0.3279
Conditional Expression (4) fa/fb = 0.5198
Conditional Expression (5) fα/fβ = 0.5198
Conditional Expression (6) fVR/fGa = 1.1429
Conditional Expression (7) fGp/(−fGa) = 1.2313
Conditional Expression (8) fGp/(−fGb) = 0.7893
Conditional Expression (9) |m1a|/fw = 0.7370
Conditional Expression (10) |mpb|/fw = 0.3656
Conditional Expression (11) f1/(−fGa) = 3.3302

TABLE 5-continued

Conditional Expression (12) f3α/f3β = 0.5198
Conditional Expression (13) f1/(−f2) = 3.3302
Conditional Expression (14) f4/f2 = 1.5600
Conditional Expression (15) fVR/f2 = 1.1429
Conditional Expression (16) f3/(−f2) = 1.2313
Conditional Expression (17) f3/(−f4) = 0.7893
Conditional Expression (18) |m12|/fw = 0.7370
Conditional Expression (19) |m34|/fw = 0.3656
Conditional Expression (20) f3a/f3b = 0.5198

Figure 18B:
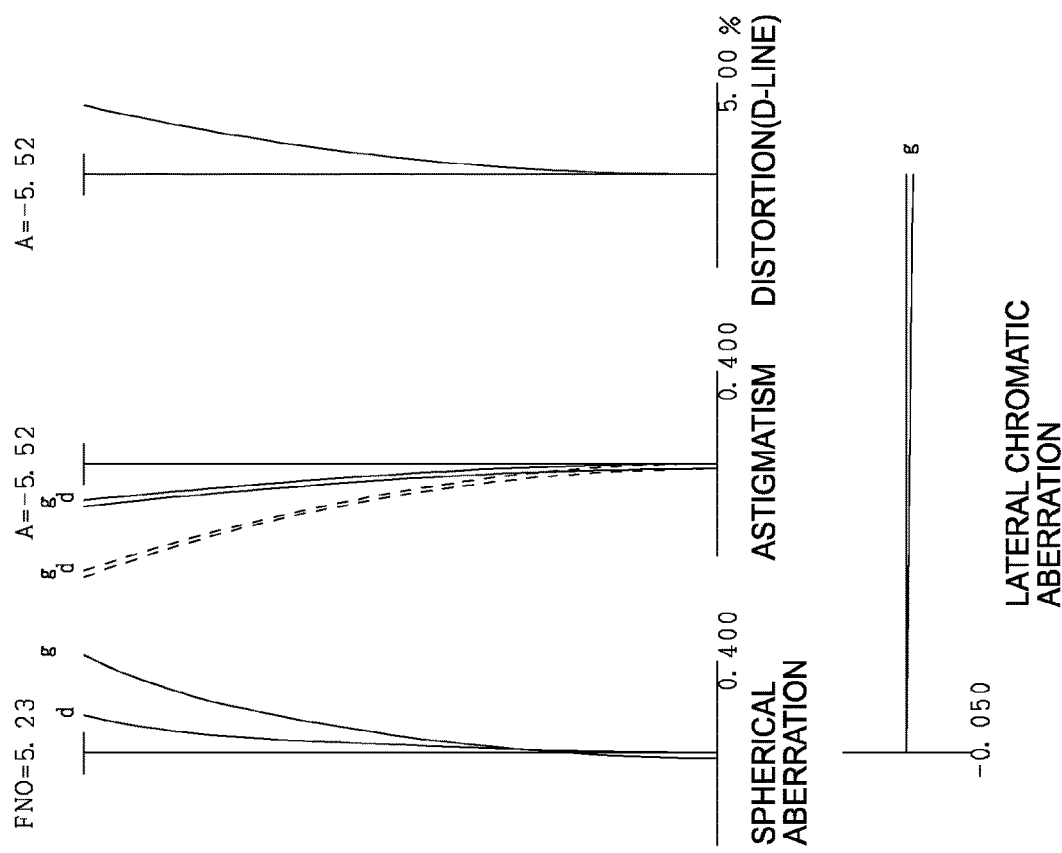
Figure 19A:
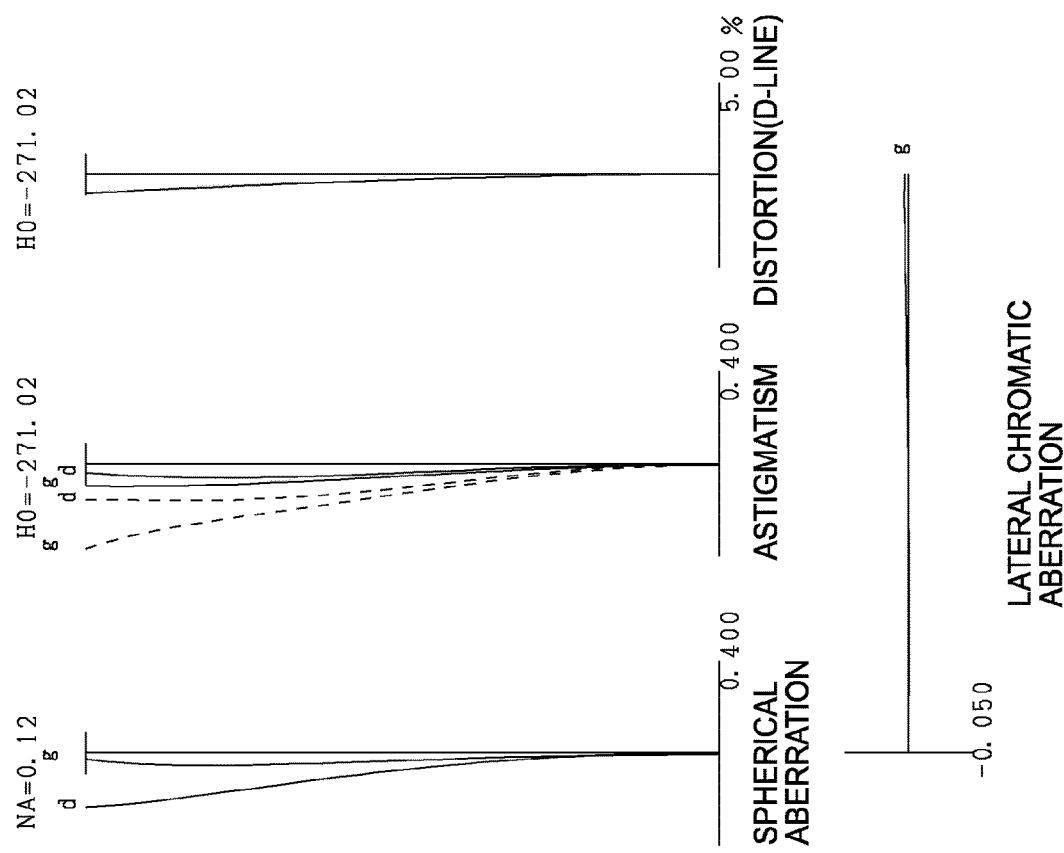
Figure 20A:
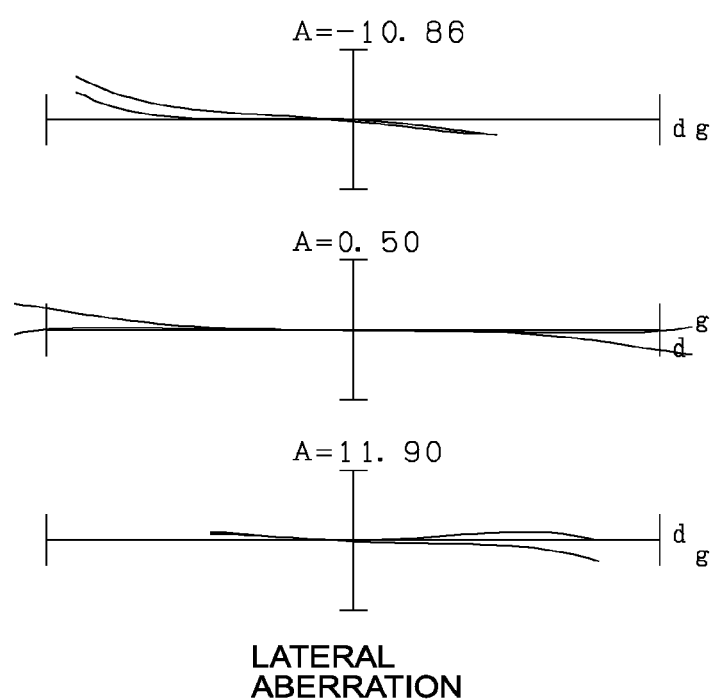
FIG. 20A, FIG. 20B, and FIG. 20C are each a meridional lateral aberration graph when shake compensation is performed in the wide angle end state, in the intermediate focal length state, and in the telephoto end state of the zoom optical system according to Example 5.
Figure 20B:
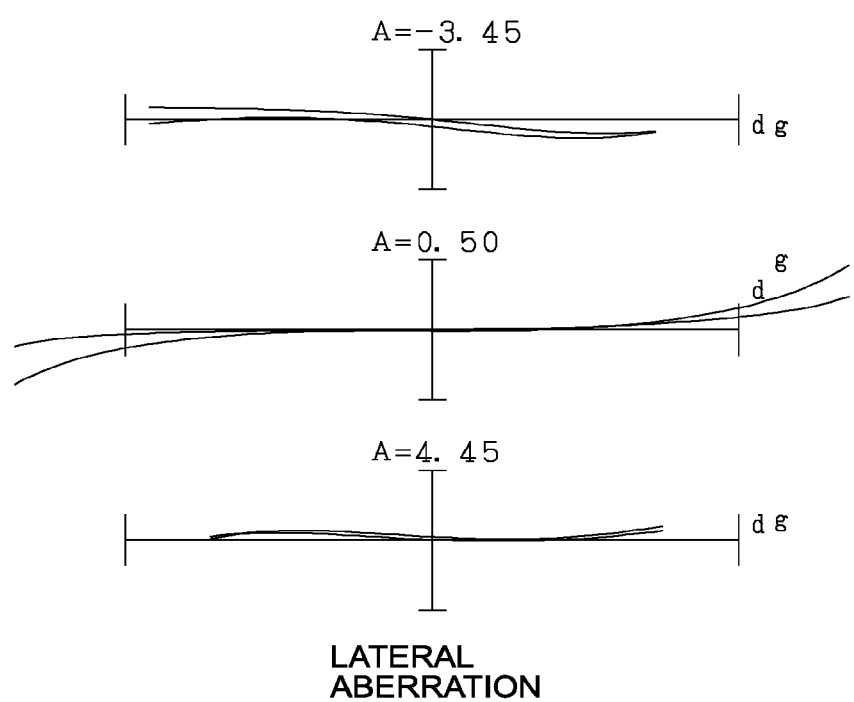
Figure 20C:
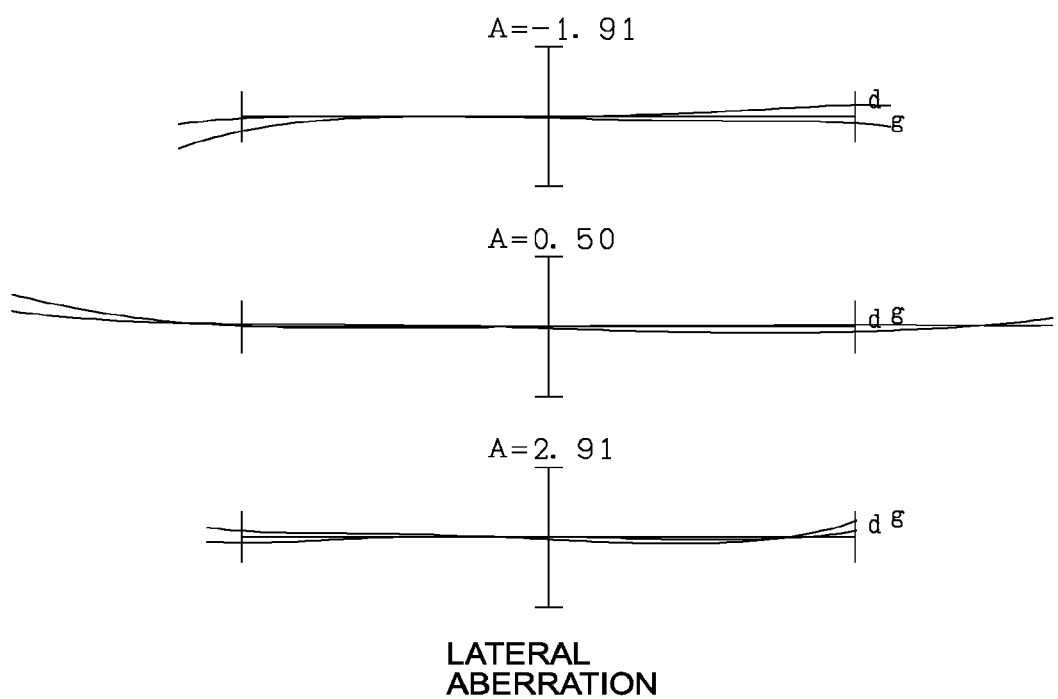

FIG. 18A, FIG. 18B and FIG. 18C are each an aberration graph illustrating aberrations upon focusing on infinity in a wide angle end state, in an intermediate focal length state, and in a telephoto end state of the zoom optical system having a vibration proof function according to Example 5. FIG. 19A, FIG. 19B and FIG. 19C are each an aberration graph illustrating aberrations upon focusing on short distance (close range) in a wide angle end state, in an intermediate focal length state, and in a telephoto end state of the zoom optical system having a vibration proof function according to Example 5. FIG. 20A, FIG. 20B, and FIG. 20C are each a meridional lateral aberration graph when shake compensation is performed in the wide angle end state, in the intermediate focal length state, and in the telephoto end state of the zoom optical system having a vibration proof function according to Example 5. It is apparent from respective aberration graphs that the zoom optical system according to Example 5 has an excellent image forming performance capable of correcting various aberrations successfully from the wide angle end state to the telephoto end state, and also has an excellent image forming performance also upon focusing on a short distant object.

Example 6

Example 6 will be described with reference to FIG. 21 to FIG. 24 and Table 6. FIG. 21 is a drawing illustrating a lens configuration of a zoom optical system according to Example 6. The zoom optical system ZL (6) according to Example 6 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 21, and the fifth lens group G5 is secured. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In contrast, the first positive lens L31, the negative lens L32, and the second positive lens L33 constitute the second object side subgroup, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (6) according to Example 6, focusing from the infinity to the short distant object is achieved by moving all the lenses in the fourth lens group G4 to the image side along the optical axis. Also, in the zoom optical system ZL (6) according to Example 6, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 6, the vibration proof coefficient is −1.18, the focal length is 51.50 mm. Therefore, the amount of movement of the vibration-proof lens group for correcting the rotational blur of 0.38° is −0.29 mm. In the intermediate focal length state of Example 6, the vibration proof coefficient is −2.12, the focal length is 147.00 mm. Therefore, the amount of movement of the vibration-proof lens group for correcting the rotational blur of 0.30° is −0.36 mm. In the telephoto end state of Example 6, the vibration proof coefficient is −3.02, the focal length is 242.50 mm. Therefore, the amount of movement of the vibration-proof lens group for correcting the rotational blur of 0.30° is −0.42 mm.

In Table 6 shown below, data values of the zoom optical system according to Example 6 will be shown.

TABLE 6

[General Data]

zooming rate 4.71
φ 19.6040
Δ 0.0756

|  | W | M | T |
|---|---|---|---|
| f | 51.50 | 147.00 | 242.50 |
| FNO | 4.49 | 5.12 | 6.35 |
| 2ω | 33.0 | 11.2 | 6.8 |
| Y | 14.75 | 14.75 | 14.75 |
| TL | 149.546 | 165.522 | 181.571 |
| BF | 16.057 | 16.033 | 16.082 |

[Lens Data]

| Surface Number | R | D | nd | νd |
|---|---|---|---|---|
| 1 | 73.23242 | 3.136 | 1.48749 | 70.3 |
| 2 | 128.12637 | 0.150 |  |  |
| 3 | 70.00768 | 2.000 | 1.89190 | 37.1 |
| 4 | 44.09599 | 6.484 | 1.49782 | 82.6 |
| 5 | −346.69704 | D5(variable) |  |  |
| 6 | −144.15859 | 1.500 | 1.61800 | 63.3 |
| 7 | 69.26357 | 1.742 |  |  |
| 8 | −59.86879 | 1.500 | 1.61800 | 63.3 |
| 9 | 39.22000 | 2.890 | 1.80809 | 22.8 |
| 10 | 116.35585 | D10(variable) |  |  |
| 11 | ∞ | 1.000 |  | (Aperture S) |
| 12* | 22.82058 | 4.270 | 1.58313 | 59.4 |
| 13 | −352.54253 | 9.345 |  |  |
| 14 | 341.42758 | 1.500 | 1.95375 | 32.3 |
| 15 | 17.61559 | 3.948 | 1.49782 | 82.6 |
| 16 | −89.90153 | 9.738 |  |  |
| 17 | 40.00424 | 3.341 | 1.62004 | 36.4 |
| 18 | −124.57218 | D18(variable) |  |  |
| 19 | −48.94477 | 2.849 | 1.64769 | 33.7 |
| 20 | −25.84032 | 4.651 |  |  |
| 21 | −21.32560 | 1.500 | 1.61800 | 63.3 |
| 22 | 65.03472 | D22(variable) |  |  |
| 23 | −102.08397 | 2.443 | 1.48749 | 70.3 |
| 24 | −69.00838 | BF |  |  |

[Aspherical Data]

Twelfth Surface

κ = 1.00000E+00
A4 = −7.37913E−06, A6 = −5.05231E−09, A8 = −5.01437E−11, A10 = 1.59136E−13

[Lens Group Data]

| Group | Starting Surface | Focal Length |
|---|---|---|
| G1 | 1 | 122.71 |
| G2 | 6 | −38.09 |
| G3 | 12 | 40.11 |
| G4 | 19 | −40.20 |
| G5 | 23 | 426.58 |

[Variable Distance Data]

|  | W Infinity | M Infinity | T Infinity | W Short Distance | M Short Distance | T Short Distance |
|---|---|---|---|---|---|---|
| f | 51.50 | 147.00 | 242.50 | — | — | — |
| Magnification | — | — | — | −0.0562 | −0.1393 | −0.2428 |
| D0 | ∞ | ∞ | ∞ | 844.43 | 828.43 | 812.43 |
| D5 | 6.640 | 45.984 | 55.000 | 6.640 | 45.984 | 55.000 |

TABLE 6-continued

| | | | | | | |
|---|---|---|---|---|---|---|
| D10 | 42.959 | 11.661 | 2.493 | 42.959 | 11.661 | 2.493 |
| D18 | 14.018 | 10.921 | 2.595 | 16.211 | 22.316 | 17.610 |
| D22 | 5.885 | 16.936 | 41.414 | 3.692 | 5.542 | 26.399 |
| BF | 16.057 | 16.033 | 16.082 | 16.073 | 16.127 | 16.367 |

[Conditional Expression Corresponding Value]

Conditional Expression (1) fp/fGp = 0.9202
Conditional Expression (2) LS/LGp = 0.5937
Conditional Expression (3) 100 × (Δ/φ) = 0.3856
Conditional Expression (4) fa/fb = 0.2920
Conditional Expression (5) fα/fβ = 1.3131
Conditional Expression (6) fVR/fGa = 1.0000
Conditional Expression (7) fGp/(−fGa) = 1.0532
Conditional Expression (8) fGp/(−fGb) = 0.9978
Conditional Expression (9) |m1a|/fw = 0.9390
Conditional Expression (10) |mpb|/fw = 0.2218
Conditional Expression (11) f1/(−fGa) = 3.2220
Conditional Expression (12) f3α/f3β = 1.3131
Conditional Expression (13) f1/(−f2) = 3.2220
Conditional Expression (14) f4/f2 = 1.0556
Conditional Expression (15) fVR/f2 = 1.0000
Conditional Expression (16) f3/(−f2) = 1.0532
Conditional Expression (17) f3/(−f4) = 0.9978
Conditional Expression (18) |m12|/fw = 0.9390
Conditional Expression (19) |m34|/fw = 0.2218
Conditional Expression (20) f3a/f3b = 0.2920

Figure 24A:
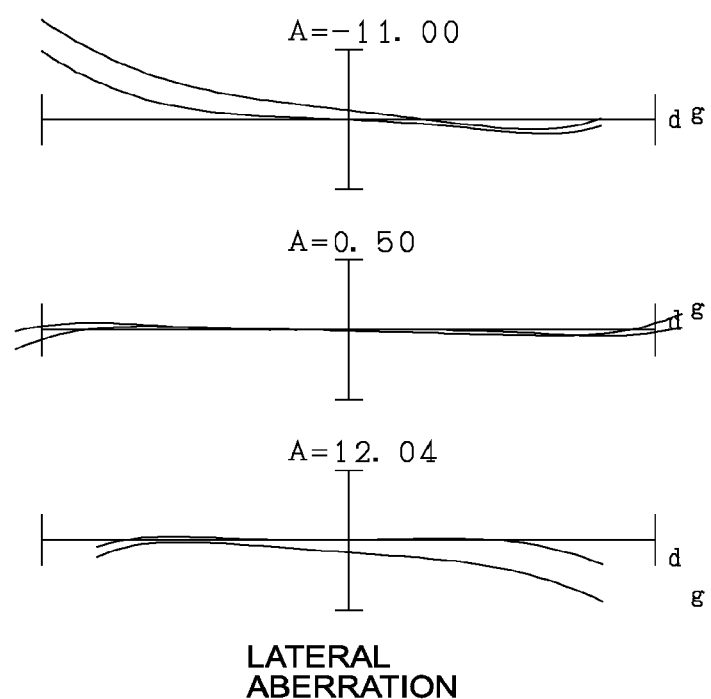
FIG. 24A, FIG. 24B, and FIG. 24C are each a meridional lateral aberration graph when shake compensation is performed in the wide angle end state, in the intermediate focal length state, and in the telephoto end state of the zoom optical system according to Example 6.
Figure 24B:
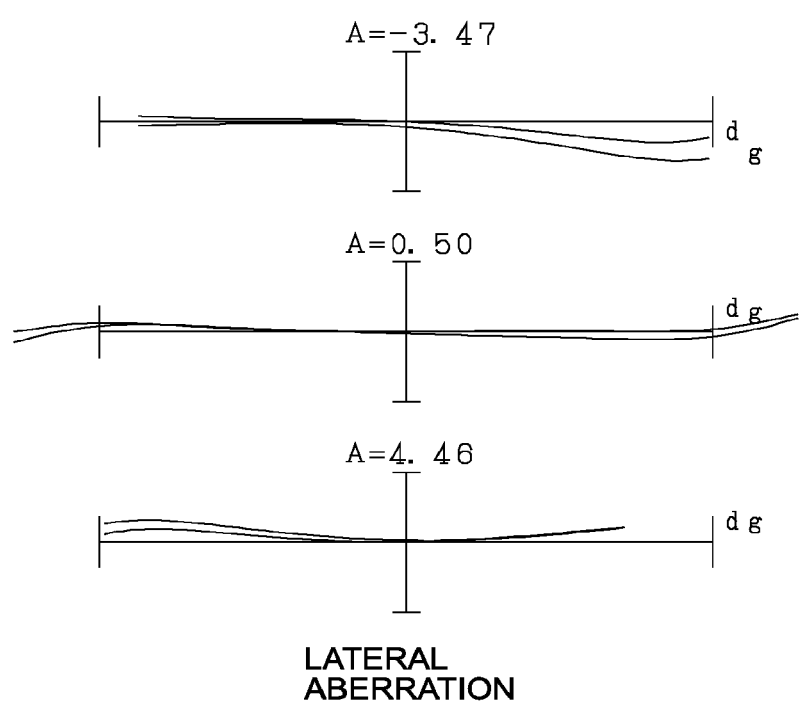
Figure 24C:
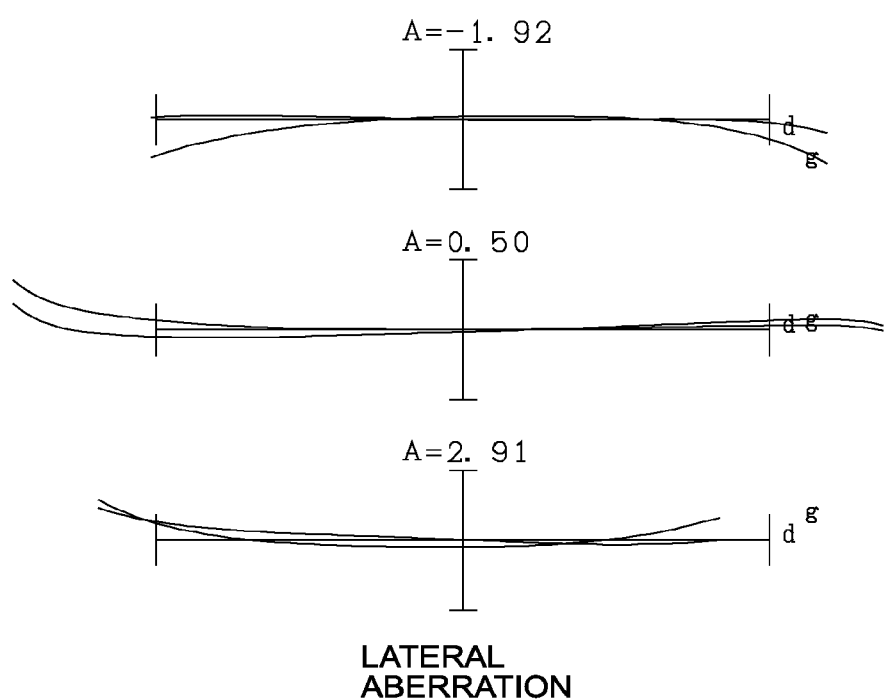

FIG. 22A, FIG. 22B and FIG. 22C are each an aberration graph illustrating aberrations upon focusing on infinity in a wide angle end state, in an intermediate focal length state, and in a telephoto end state of the zoom optical system having a vibration proof function according to Example 6. FIG. 23A, FIG. 23B and FIG. 23C are each an aberration graph illustrating aberrations upon focusing on short distance (close range) in a wide angle end state, in an intermediate focal length state, and in a telephoto end state of the zoom optical system having a vibration proof function according to Example 6. FIG. 24A, FIG. 24B, and FIG. 24C are each a meridional lateral aberration graph when shake compensation is performed in the wide angle end state, in the intermediate focal length state, and in the telephoto end state of the zoom optical system having a vibration proof function according to Example 6. It is apparent from respective aberration graphs that the zoom optical system according to Example 6 has an excellent image forming performance capable of correcting various aberrations successfully from the wide angle end state to the telephoto end state, and also has an excellent image forming performance also upon focusing on a short distant object.

Example 7

Figure 25:
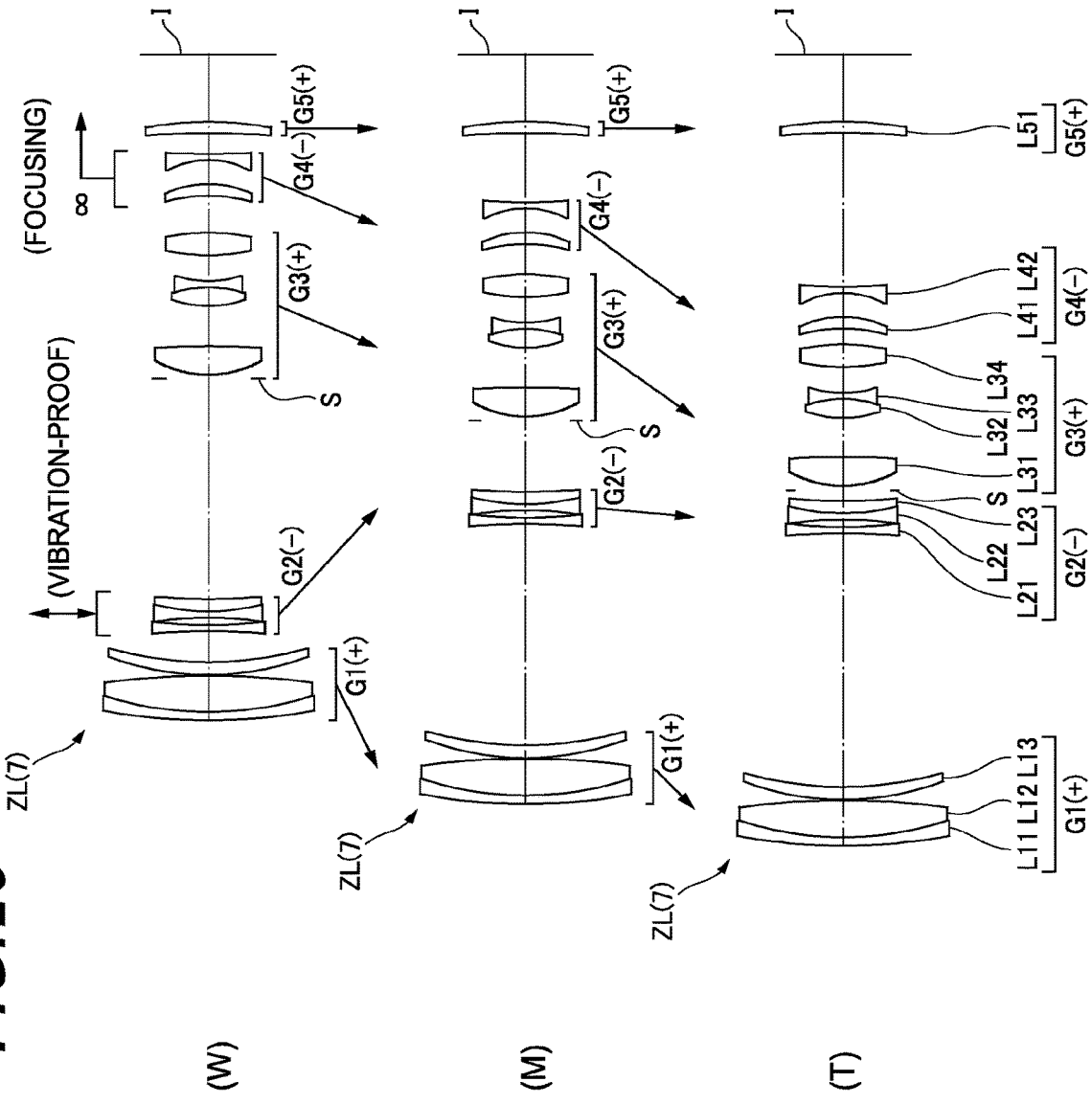
FIG. 25 is a drawing illustrating a lens configuration of a zoom optical system according to Example 7.

Example 7 will be described with reference to FIG. 25 to FIG. 28 and Table 7. FIG. 25 is a drawing illustrating a lens configuration of a zoom optical system according to Example 7. The zoom optical system ZL (7) according to Example 7 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 25, and the fifth lens group G5 is secured. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment.

The first lens group G1 consists of, in order from an object, a cemented lens consisting of a negative lens L11 meniscus shaped with a convex surface thereof facing the object side and a first positive lens L12 having a biconvex shape, and a meniscus shaped second positive lens L13 having a convex surface facing the object.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a second positive lens L32 having a biconvex shape and a negative lens L33 having a biconcave shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the second positive lens L32, the negative lens L33, and the third positive lens L34 constitute the first image side subgroup. In the same manner, the first positive lens L31 constitutes the second object side subgroup, and the second positive lens L32, the negative lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (7) according to Example 7, focusing from the infinity to the short distant object is achieved by moving all the lenses in the fourth lens group G4 to the image side along the optical axis. Also, in the zoom optical system ZL (7) according to Example 7, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 7, the vibration proof coefficient is −1.04, the focal length is 51.50 mm. Therefore, the amount of movement of the vibration-proof lens group for correcting the rotational blur of 0.38° is −0.33 mm. In the intermediate focal length state of Example 7, the vibration proof coefficient is −1.92, the focal length is 146.99 mm. Therefore, the amount of movement of the vibration-proof lens group for correcting the rotational blur of 0.30° is −0.40 mm. In the telephoto end state of Example 7, the vibration proof coefficient is −2.87, the focal length is 242.46 mm. Therefore, the amount of movement of the vibration-proof lens group for correcting the rotational blur of 0.30° is −0.44 mm.

In Table 7 shown below, data values of the zoom optical system according to Example 7 will be shown.

TABLE 7

[General Data]

zooming rate 4.71
φ 21.7420
Δ 0.0812

|  | W | M | T |
|---|---|---|---|
| f | 51.50 | 146.99 | 242.46 |
| FNO | 4.45 | 5.16 | 6.35 |
| 2ω | 32.6 | 11.0 | 6.8 |
| Y | 14.75 | 14.75 | 14.75 |
| TL | 159.487 | 179.476 | 189.442 |
| BF | 15.998 | 15.987 | 15.953 |

[Lens Data]

| Surface Number | R | D | nd | νd |
|---|---|---|---|---|
| 1 | 116.77666 | 2.000 | 1.89190 | 37.1 |
| 2 | 66.26478 | 8.804 | 1.49782 | 82.6 |
| 3 | −157.07732 | 0.150 | | |
| 4 | 56.71957 | 3.051 | 1.48749 | 70.3 |
| 5 | 72.61791 | D5(variable) | | |
| 6 | −136.32692 | 1.500 | 1.61800 | 63.3 |
| 7 | 90.78344 | 1.745 | | |
| 8 | −67.46030 | 1.500 | 1.61800 | 63.3 |
| 9 | 43.53314 | 2.942 | 1.84666 | 23.8 |
| 10 | 121.70198 | D10(variable) | | |
| 11 | ∞ | 1.000 | | (Aperture S) |
| 12* | 21.27766 | 6.876 | 1.55332 | 71.7 |
| 13 | −187.46379 | 9.566 | | |
| 14 | 22.50666 | 4.454 | 1.49782 | 82.6 |
| 15 | −22.13521 | 1.500 | 1.95375 | 32.3 |
| 16 | 21.56753 | 6.178 | | |
| 17 | 40.28651 | 5.404 | 1.69895 | 30.1 |
| 18 | −39.80095 | D18(variable) | | |
| 19 | −31.69688 | 2.781 | 1.62004 | 36.4 |
| 20 | −20.94278 | 5.719 | | |
| 21 | −17.59612 | 1.500 | 1.61800 | 63.3 |
| 22 | 128.08217 | D22(variable) | | |
| 23 | −151.04365 | 2.691 | 1.48749 | 70.3 |
| 24 | −69.67045 | BF | | |

TABLE 7-continued

[Aspherical Data]

Twelfth Surface

κ = 1.00000E+00
A4 = −5.26085E−06, A6 = −1.54081E−09, A8 = −2.64260E−11, A10 = 0.00000E+00

[Lens Group Data]

| Group | Starting Surface | Focal Length |
|---|---|---|
| G1 | 1 | 145.38 |
| G2 | 6 | −44.06 |
| G3 | 12 | 41.20 |
| G4 | 19 | −35.93 |
| G5 | 23 | 262.44 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.46 | — | — | — |
| Magnification | — | — | — | −0.0566 | −0.1414 | −0.2440 |
| D0 | ∞ | ∞ | ∞ | 834.43 | 814.43 | 804.43 |
| D5 | 7.439 | 53.047 | 60.838 | 7.439 | 53.047 | 60.838 |
| D10 | 52.750 | 17.177 | 2.577 | 52.750 | 17.177 | 2.577 |
| D18 | 8.810 | 7.217 | 3.780 | 10.787 | 17.018 | 18.785 |
| D22 | 5.129 | 16.686 | 36.933 | 3.151 | 6.885 | 21.928 |
| BF | 15.998 | 15.987 | 15.953 | 16.014 | 16.084 | 16.242 |

[Conditional Expression Corresponding Value]

Conditional Expression (1) fp/fGp = 0.8481
Conditional Expression (2) LS/LGp = 0.4634
Conditional Expression (3) 100 × (Δ/φ) = 0.3735
Conditional Expression (4) fa/fb = 0.1214
Conditional Expression (5) fα/fβ = 0.1214
Conditional Expression (6) fVR/fGa = 1.0000
Conditional Expression (7) fGp/(−fGa) = 0.9352
Conditional Expression (8) fGp/(−fGb) = 1.1466
Conditional Expression (9) |m1a|/fw = 1.0369
Conditional Expression (10) |mpb|/fw = 0.0977
Conditional Expression (11) f1/(−fGa) = 3.2997
Conditional Expression (12) f3α/f3β = 0.1214
Conditional Expression (13) f1/(−f2) = 3.2997
Conditional Expression (14) f4/f2 = 0.8156
Conditional Expression (15) fVR/f2 = 1.0000
Conditional Expression (16) f3/(−f2) = 0.9352
Conditional Expression (17) f3/(−f4) = 1.1466
Conditional Expression (18) |m12|/fw = 1.0369
Conditional Expression (19) |m34|/fw = 0.0977
Conditional Expression (20) f3a/f3b = 0.1214

Figure 28A:
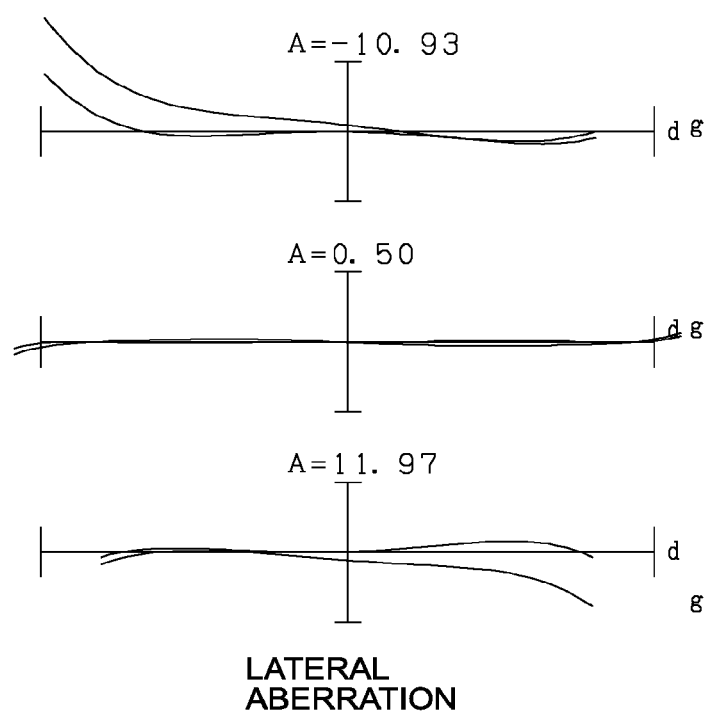
FIG. 28A, FIG. 28B, and FIG. 28C are each a meridional lateral aberration graph when shake compensation is performed in the wide angle end state, in the intermediate focal length state, and in the telephoto end state of the zoom optical system according to Example 7.
Figure 28B:
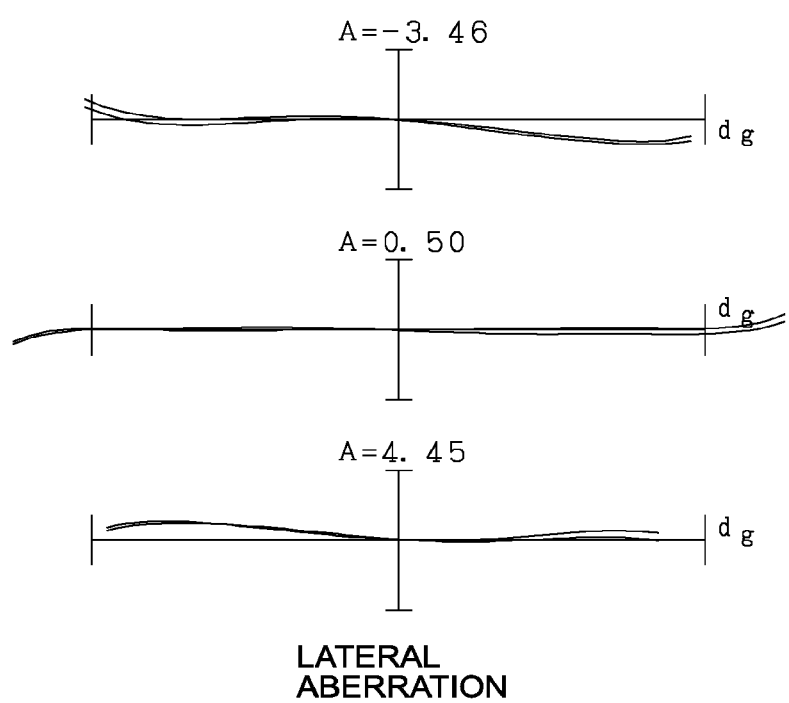
Figure 28C:
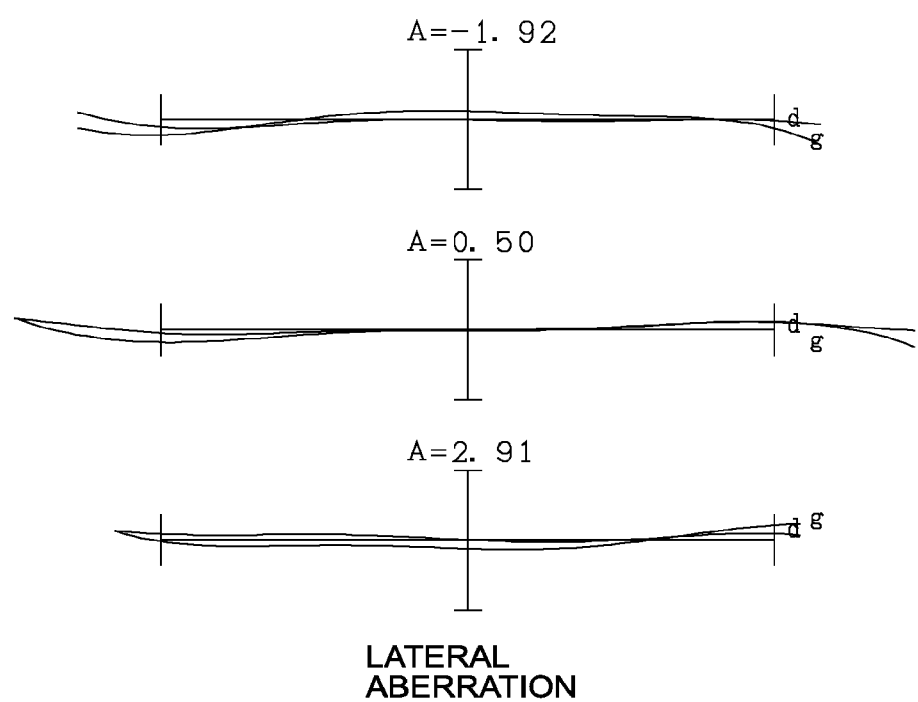

FIG. 26A, FIG. 26B and FIG. 26C are each an aberration graph illustrating aberrations upon focusing on infinity in a wide angle end state, in an intermediate focal length state, and in a telephoto end state of the zoom optical system having a vibration proof function according to Example 7. FIG. 27A, FIG. 27B and FIG. 27C are each an aberration graph illustrating aberrations upon focusing on short distance (close range) in a wide angle end state, in an intermediate focal length state, and in a telephoto end state of the zoom optical system having a vibration proof function according to Example 7. FIG. 28A, FIG. 28B, and FIG. 28C are each a meridional lateral aberration graph when shake compensation is performed in the wide angle end state, in the intermediate focal length state, and in the telephoto end state of the zoom optical system having a vibration proof function according to Example 7. It is apparent from respective aberration graphs that the zoom optical system according to Example 7 has an excellent image forming performance capable of correcting various aberrations successfully from the wide angle end state to the telephoto end state, and also has an excellent image forming performance also upon focusing on a short distant object.

Example 8

Figure 29:
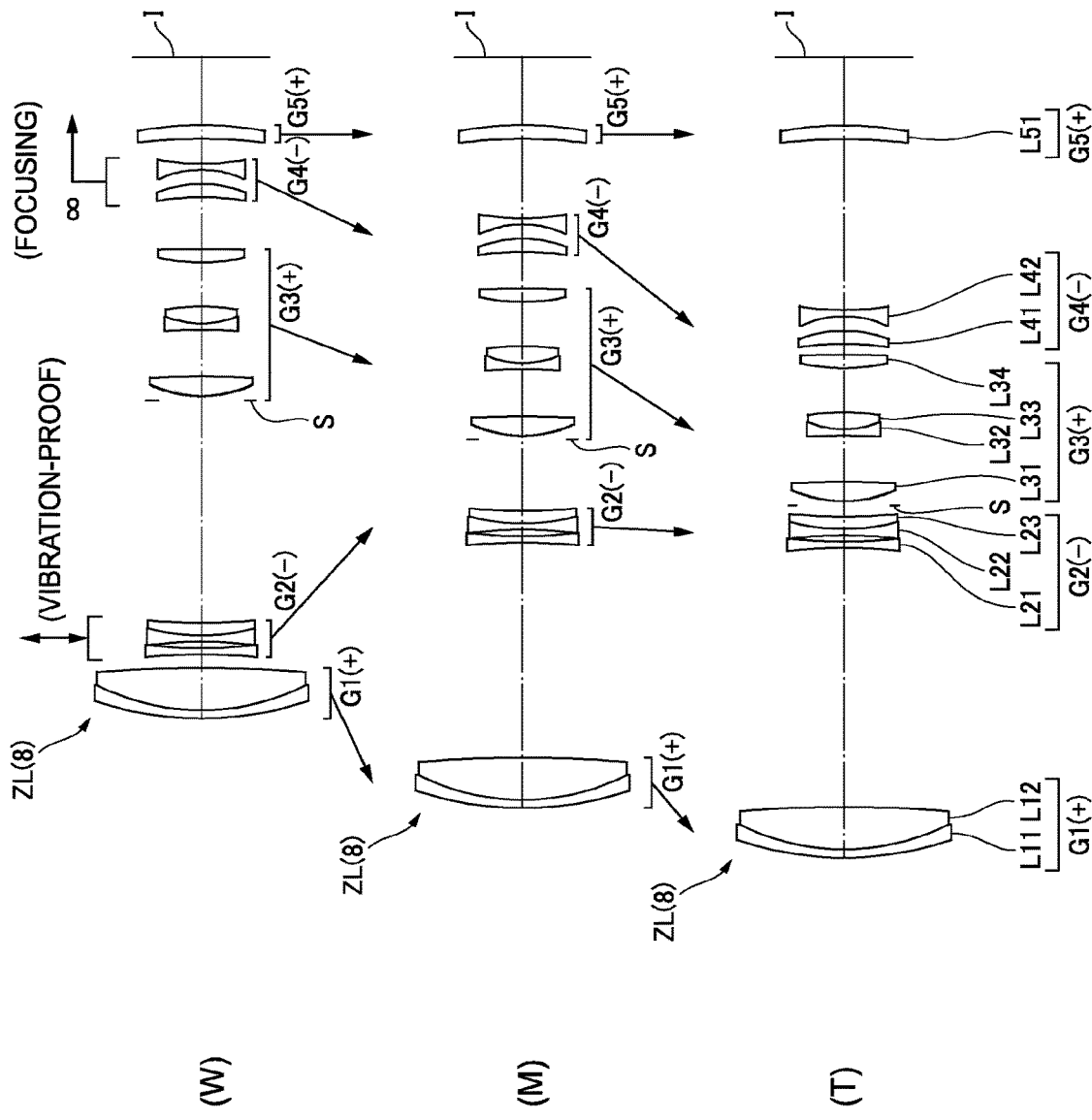
FIG. 29 is a drawing illustrating a lens configuration of a zoom optical system according to an Example 8.

Example 8 will be described with reference to FIG. 29 to FIG. 32 and Table 8. FIG. 29 is a drawing illustrating a lens configuration of a zoom optical system according to Example 8. The zoom optical system ZL (8) according to Example 8 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 29, and the fifth lens group G5 is secured. The second lens group G2 corresponds to the object side negative lens group in the first embodiment. The third lens group G3 corresponds to the lens group having the positive lens component in the first embodiment. The fourth lens group G4 corresponds to the image side negative lens group in the first embodiment.

The first lens group G1 consists of, in order from an object, a cemented lens consisting of a meniscus shaped negative lens L11 having a convex surface facing the object, and a first positive lens L12 having a biconvex shape.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a negative lens L32 having a biconcave shape and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (8) according to Example 8, focusing from the infinity to the short distant object is achieved by moving all the lenses in the fourth lens group G4 to the image side along the optical axis. Also, in the zoom optical system ZL (8) according to Example 8, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 8, the vibration proof coefficient is −1.02, the focal length is 51.50 mm. Therefore, the amount of movement of the vibration-proof lens group for correcting the rotational blur of 0.38° is −0.33 mm. In the intermediate focal length state of Example 8, the vibration proof coefficient is −1.86, the focal length is 147.00 mm. Therefore, the amount of movement of the vibration-proof lens group for correcting the rotational blur of 0.30° is −0.41 mm. In the telephoto end state of Example 8, the vibration proof coefficient is −2.68, the focal length is 242.50 mm. Therefore, the amount of movement of the vibration-proof lens group for correcting the rotational blur of 0.30° is −0.47 mm.

In Table 8 shown below, data values of the zoom optical system according to Example 8 will be shown.

TABLE 8

[General Data]

zooming rate 4.71
φ 20.8580
Δ 0.0803

|  | W | M | T |
|---|---|---|---|
| f | 51.50 | 147.00 | 242.50 |
| FNO | 4.49 | 5.23 | 6.35 |
| 2ω | 33.0 | 11.2 | 6.8 |
| Y | 14.75 | 14.75 | 14.75 |
| TL | 156.512 | 177.844 | 189.541 |
| BF | 15.987 | 16.005 | 16.052 |

[Lens Data]

| Surface Number | R | D | nd | νd |
|---|---|---|---|---|
| 1 | 66.20579 | 2.000 | 1.89190 | 37.1 |
| 2 | 46.51466 | 9.965 | 1.49782 | 82.6 |
| 3 | −253.04363 | D3(variable) | | |
| 4 | −113.59911 | 1.500 | 1.61800 | 63.3 |
| 5 | 96.53848 | 1.543 | | |
| 6 | −75.73354 | 1.500 | 1.58913 | 61.2 |
| 7 | 42.43845 | 2.891 | 1.84666 | 23.8 |
| 8 | 109.64148 | D8(variable) | | |

TABLE 8-continued

| | | | | | |
|---|---|---|---|---|---|
| 9 | ∞ | 1.000 | | | (Aperture S) |
| 10* | 23.81391 | 4.594 | 1.61881 | 63.9 | |
| 11 | −192.35661 | 11.074 | | | |
| 12 | −109.32160 | 1.500 | 1.95375 | 32.3 | |
| 13 | 18.85959 | 3.991 | 1.49782 | 82.6 | |
| 14 | −49.11786 | 10.482 | | | |
| 15 | 42.16349 | 3.131 | 1.69895 | 30.1 | |
| 16 | −192.85659 | D16(variable) | | | |
| 17 | −58.00910 | 3.101 | 1.62004 | 36.4 | |
| 18 | −24.00528 | 3.399 | | | |
| 19 | −20.05219 | 1.500 | 1.61800 | 63.3 | |
| 20 | 56.15912 | D20(variable) | | | |
| 21 | −99.07327 | 3.231 | 1.48749 | 70.3 | |
| 22 | −69.36557 | BF | | | |

[Aspherical Data]

Tenth Surface $\kappa$ = 1.00000E+00
A4 = −6.04393E−06, A6 = −5.13093E−09, A8 = −1.58013E−11, A10 = 0.00000E+00

[Lens Group Data]

| Group | Starting Surface | Focal Length |
|---|---|---|
| G1 | 1 | 143.01 |
| G2 | 4 | −46.04 |
| G3 | 10 | 43.15 |
| G4 | 17 | −40.12 |
| G5 | 21 | 458.20 |

[Variable Distance Data]

| | W Infinity | M Infinity | T Infinity | W Short Distance | M Short Distance | T Short Distance |
|---|---|---|---|---|---|---|
| f | 51.50 | 147.00 | 242.50 | — | — | — |
| Magnification | — | — | — | −0.0568 | −0.1420 | −0.2429 |
| D0 | ∞ | ∞ | ∞ | 837.39 | 816.08 | 804.43 |
| D3 | 3.189 | 50.971 | 61.368 | 3.189 | 50.971 | 61.368 |
| D8 | 52.750 | 16.964 | 2.613 | 52.750 | 16.964 | 2.613 |
| D16 | 12.220 | 8.654 | 2.561 | 14.352 | 18.721 | 17.566 |
| D20 | 5.964 | 18.848 | 40.545 | 3.833 | 8.781 | 25.540 |
| BF | 15.987 | 16.005 | 16.052 | 16.003 | 16.103 | 16.338 |

[Conditional Expression Corresponding Value]

Conditional Expression (1) fp/fGp = 0.8001
Conditional Expression (2) LS/LGp = 0.6199
Conditional Expression (3) 100 × (Δ/φ) = 0.3850
Conditional Expression (4) fa/fb = 0.1658
Conditional Expression (5) fα/fβ = 0.1658
Conditional Expression (6) fVR/fGa = 1.0000
Conditional Expression (7) fGp/(−fGa) = 0.9373
Conditional Expression (8) fGp/(−fGb) = 1.0757
Conditional Expression (9) |m1a|/fw = 1.1297
Conditional Expression (10) |mpb|/fw = 0.1876
Conditional Expression (11) f1/(−fGa) = 3.1064
Conditional Expression (12) f3α/f3β = 0.1658
Conditional Expression (13) f1/(−f2) = 3.1064
Conditional Expression (14) f4/f2 = 0.8714
Conditional Expression (15) fVR/f2 = 1.0000
Conditional Expression (16) f3/(−f2) = 0.9373
Conditional Expression (17) f3/(−f4) = 1.0757
Conditional Expression (18) |m12|/fw = 1.1297
Conditional Expression (19) |m34|/fw = 0.1876
Conditional Expression (20) f3a/f3b = 0.1658

Figure 31A:
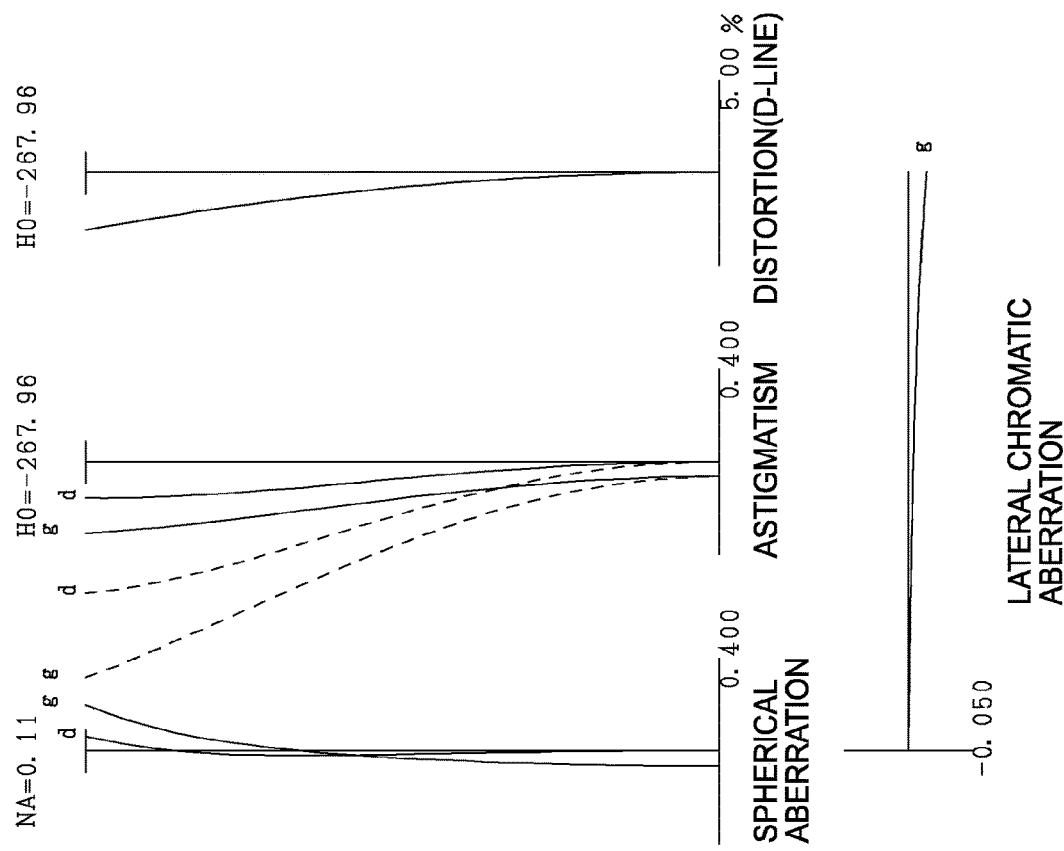
Figure 32A:
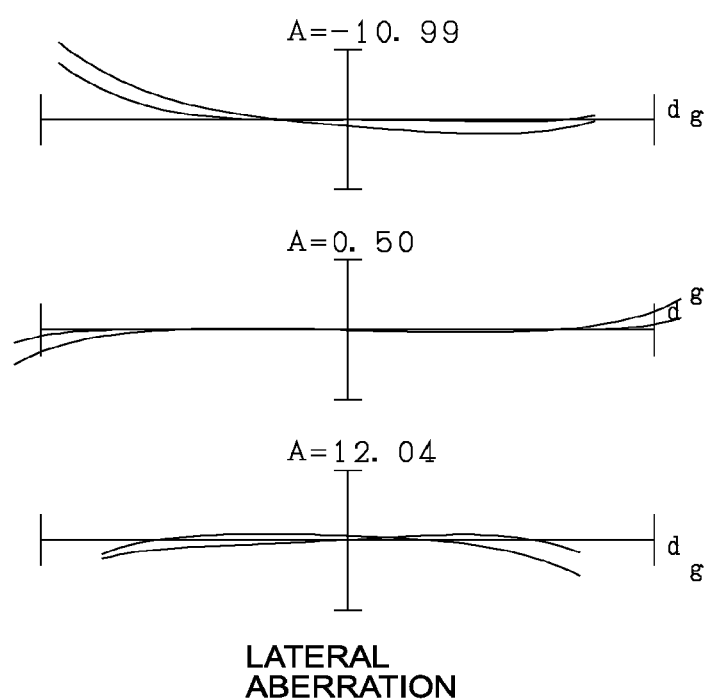
FIG. 32A, FIG. 32B, and FIG. 32C are each a meridional lateral aberration graph when shake compensation is performed in the wide angle end state, in the intermediate focal length state, and in the telephoto end state of the zoom optical system according to Example 8.
Figure 32B:
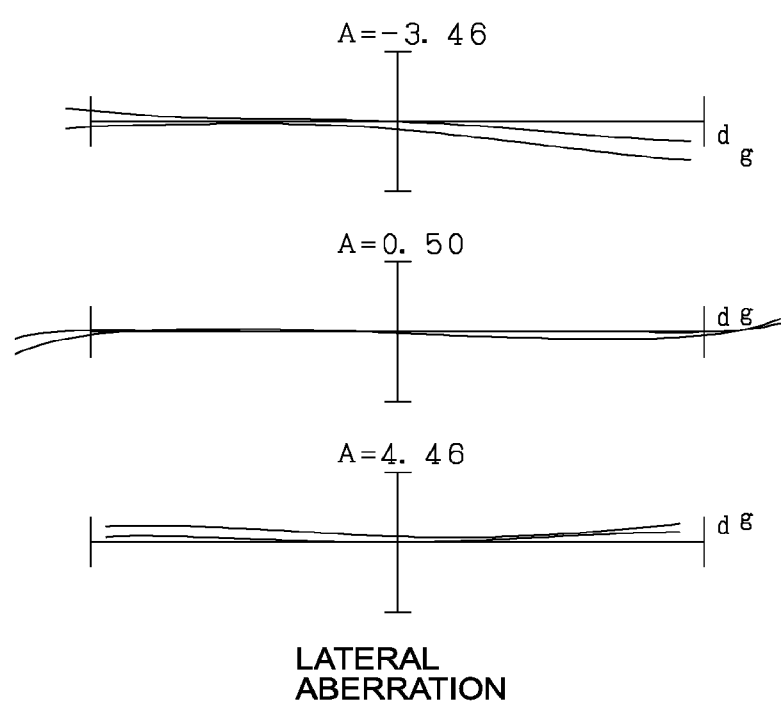
Figure 32C:
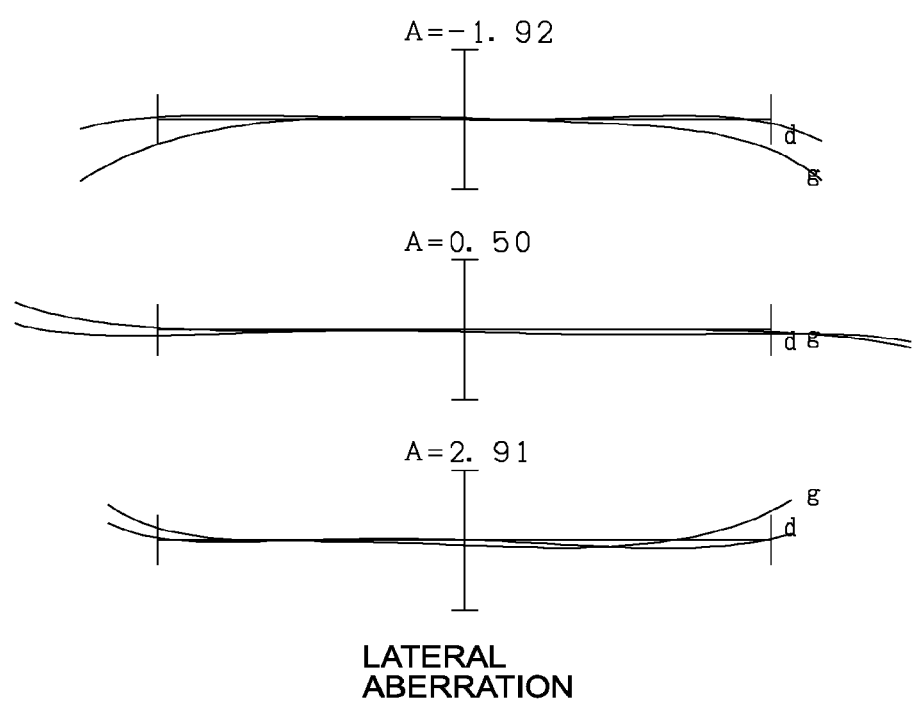

FIG. 30A, FIG. 30B and FIG. 30C are each an aberration graph illustrating aberrations upon focusing on infinity in a wide angle end state, in an intermediate focal length state, and in a telephoto end state of the zoom optical system having a vibration proof function according to Example 8. FIG. 31A, FIG. 31B and FIG. 31C are each an aberration graph illustrating aberrations upon focusing on short distance (close range) in a wide angle end state, in an intermediate focal length state, and in a telephoto end state of the zoom optical system having a vibration proof function according to Example 8. FIG. 32A, FIG. 32B, and FIG. 32C are each a meridional lateral aberration graph when shake compensation is performed in the wide angle end state, in the intermediate focal length state, and in the telephoto end state of the zoom optical system having a vibration proof function according to Example 8. It is apparent from respective aberration graphs that the zoom optical system according to Example 8 has an excellent image forming performance capable of correcting various aberrations successfully from the wide angle end state to the telephoto end state, and also has an excellent image forming performance also upon focusing on a short distant object.

Example 9

Example 9 will be described with reference to FIG. 33 to FIG. 36 and Table 9. FIG. 33 is a drawing illustrating a lens configuration of a zoom optical system according to Example 9. The zoom optical system ZL (9) according to Example 9 consists of, in order from an object, a first lens group G1 having a positive refractive power; a second lens group G2 having a negative refractive power; an aperture stop S; a third lens group G3 having a positive refractive power; a fourth lens group G4 having a negative refractive power, and a fifth lens group G5 having a negative refractive power. For zooming from the wide angle end state (W) to the telephoto end state (T), the first to fifth lens groups G1 to G5 move in the directions indicated by the arrows shown in FIG. 33. Also, for zooming from the wide angle end state (W) to the telephoto end state (T), the third lens group G3 and the fifth lens group G5 move synchronously.

The first lens group G1 consists of, in order from an object, a first positive lens L11 having a biconvex shape, and a cemented lens consisting of a meniscus shaped negative lens L12 having a convex surface facing the object and a meniscus shaped second positive lens L13 having a convex surface facing the object.

The second lens group G2 consists of, in order from an object, a positive lens L21 having a biconvex shape, first negative lens L22 having a biconcave shape disposed at an air distance from the positive lens L21, and a second negative lens L23 having a biconcave shape disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a cemented lens consisting of a first positive lens L31 having a biconvex shape and a first negative lens L32 meniscus shaped with a convex surface facing the image side, a meniscus shaped second positive lens L33 having a convex surface facing the object, a cemented lens consisting of a meniscus shaped second negative lens L34 having a convex surface facing the object and a third positive lens L35 having a biconvex shape, and a fourth positive lens L36 having a biconvex shape. The aperture stop S is provided near the object side of the third lens group G3, and moves integrally with the third lens group G3 during zooming. In this example, the first positive lens L31, the first negative lens L32, and the second positive lens L33 constitute the first object side subgroup, and the second negative lens L34, the third positive lens L35, and the fourth positive lens L36 constitute the first image side subgroup. In the same manner, the first positive lens L31, the first negative lens L32, and the second positive lens L33 constitute the second object side subgroup, and the second negative lens L34, the third positive lens L35, and the fourth positive lens L36 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of, in order from an object, a negative lens L51 meniscus shaped with a convex surface facing the image side, and a positive lens L52 meniscus shaped with a convex surface facing the image side. An image surface I is disposed on the image side of the fifth lens group G5.

In the zoom optical system ZL (9) according to Example 9, focusing from the infinity to the short distant object is achieved by moving all the lenses in the fourth lens group G4 to the image side along the optical axis. Also, in the zoom optical system ZL (9) according to Example 9, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 9, the vibration proof coefficient is −1.14, the focal length is 51.25 mm. Therefore, the amount of movement of the vibration-proof lens group for correcting the rotational blur of 0.38° is −0.29 mm. In the intermediate focal length state of Example 9, the vibration proof coefficient is −2.14, the focal length is 150.00 mm. Therefore, the amount of movement of the vibration-proof lens group for correcting the rotational blur of 0.30° is −0.37 mm. In the telephoto end state of Example 9, the vibration proof coefficient is −3.00, the focal length is 243.75 mm. Therefore, the amount of movement of the vibration-proof lens group for correcting the rotational blur of 0.30° is −0.42 mm.

In Table 9 shown below, data values of the zoom optical system according to Example 9 will be shown.

TABLE 9

| [General Data] | | | |
|---|---|---|---|
| zooming rate 4.76 | | | |
| φ 19.3516 | | | |
| Δ 0.0000 | | | |
| | W | M | T |
| f | 51.25 | 150.00 | 243.75 |
| FNO | 4.60 | 5.72 | 6.40 |
| 2ω | 30.8 | 10.4 | 6.4 |
| Y | 14.00 | 14.00 | 14.00 |

TABLE 9-continued

| | | | |
|---|---|---|---|
| TL | 130.819 | 173.736 | 184.319 |
| BF | 14.319 | 34.524 | 50.036 |

[Lens Data]

| Surface Number | R | D | nd | νd |
|---|---|---|---|---|
| 1 | 1416.79120 | 2.989 | 1.58913 | 61.2 |
| 2 | −147.91784 | 0.000 | | |
| 3 | 61.00249 | 2.000 | 1.67270 | 32.2 |
| 4 | 38.22260 | 4.859 | 1.51680 | 63.9 |
| 5 | 119.14290 | D5(variable) | | |
| 6 | 102.36977 | 2.902 | 1.84666 | 23.8 |
| 7 | −68.94932 | 0.000 | | |
| 8 | −390.03851 | 1.000 | 1.83481 | 42.7 |
| 9 | 50.57712 | 2.261 | | |
| 10 | −32.76989 | 1.000 | 1.83481 | 42.7 |
| 11 | 327.50948 | D11(variable) | | |
| 12 | ∞ | 1.500 | | (Aperture S) |
| 13 | 63.22768 | 4.290 | 1.61800 | 63.3 |
| 14 | −25.88397 | 1.000 | 1.85026 | 32.4 |
| 15 | −67.95813 | 0.000 | | |
| 16 | 23.41092 | 2.701 | 1.83481 | 42.7 |
| 17 | 39.30737 | 9.905 | | |
| 18 | 5597.30300 | 1.000 | 1.83481 | 42.7 |
| 19 | 16.12840 | 3.916 | 1.49782 | 82.6 |
| 20 | −55.01811 | 0.000 | | |
| 21 | 93.69151 | 2.031 | 1.85026 | 32.4 |
| 22 | −181.95197 | D22(variable) | | |
| 23 | −55.96543 | 2.264 | 1.71736 | 29.6 |
| 24 | −23.93891 | 1.325 | | |
| 25 | −26.15067 | 1.000 | 1.83481 | 42.7 |
| 26 | 157.23705 | D26(variable) | | |
| 27 | −17.83804 | 1.000 | 1.49782 | 82.6 |
| 28 | −36.29943 | 0.000 | | |
| 29 | −389.26337 | 2.560 | 1.85000 | 27.0 |
| 30 | −56.49544 | BF | | |

[Lens Group Data]

| Group | Starting Surface | Focal Length |
|---|---|---|
| G1 | 1 | 136.65 |
| G2 | 6 | −39.80 |
| G3 | 13 | 34.62 |
| G4 | 23 | −51.61 |
| G5 | 27 | −1999.99 |

[Variable Distance Data]

| | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0554 | −0.1564 | −0.2667 |
| D0 | ∞ | ∞ | ∞ | 869.18 | 826.26 | 815.68 |
| D5 | 2.000 | 45.577 | 56.263 | 2.000 | 45.577 | 56.263 |
| D11 | 38.113 | 17.247 | 1.633 | 38.113 | 17.247 | 1.633 |
| D22 | 16.656 | 6.548 | 2.584 | 19.137 | 14.288 | 17.571 |
| D26 | 8.227 | 18.336 | 22.300 | 5.747 | 10.596 | 7.313 |
| BF | 14.319 | 34.524 | 50.036 | 14.319 | 34.524 | 50.036 |

[Conditional Expression Corresponding Value]

Figure 34A:
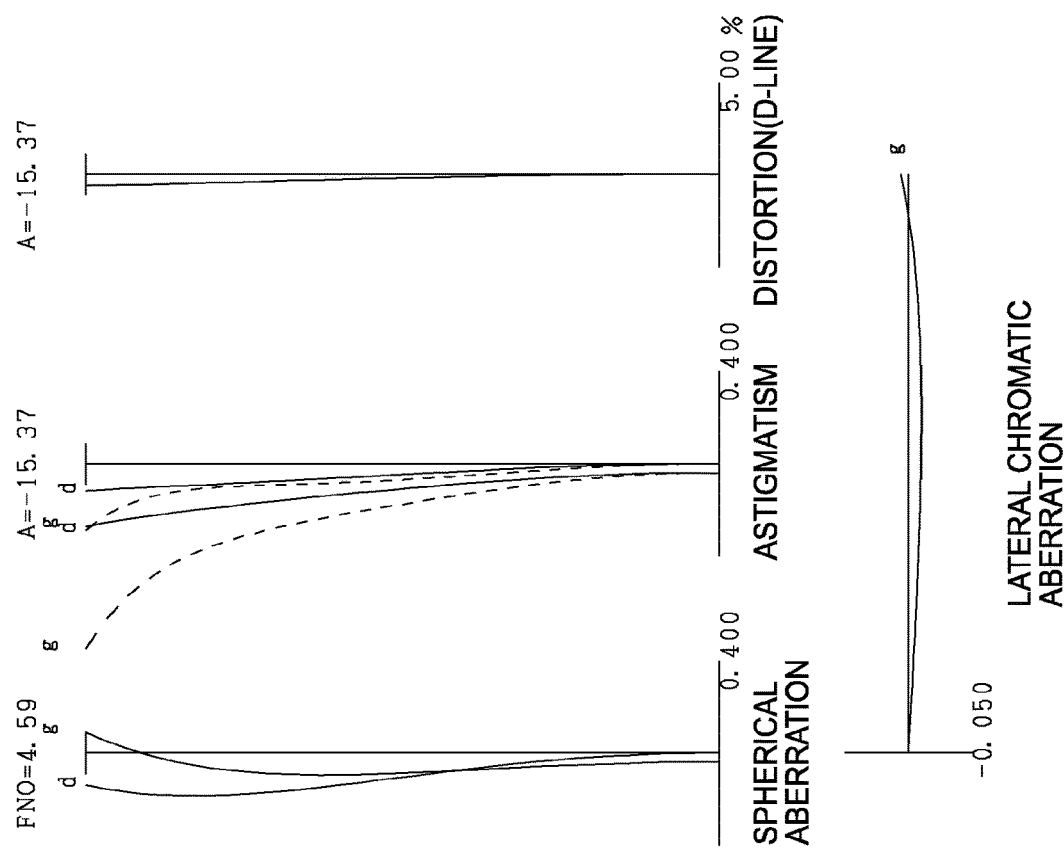
Figure 35A:
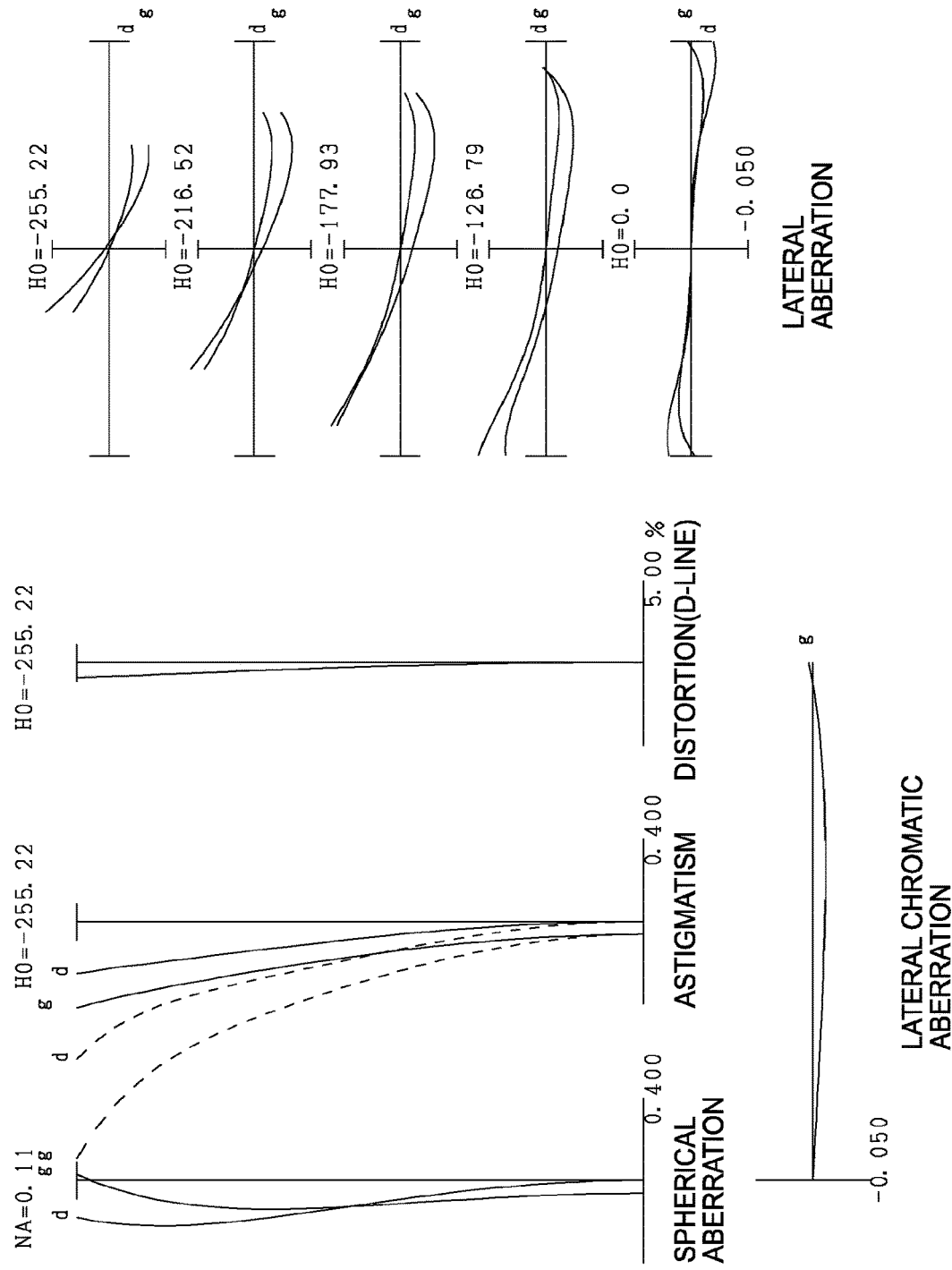
Figure 35B:
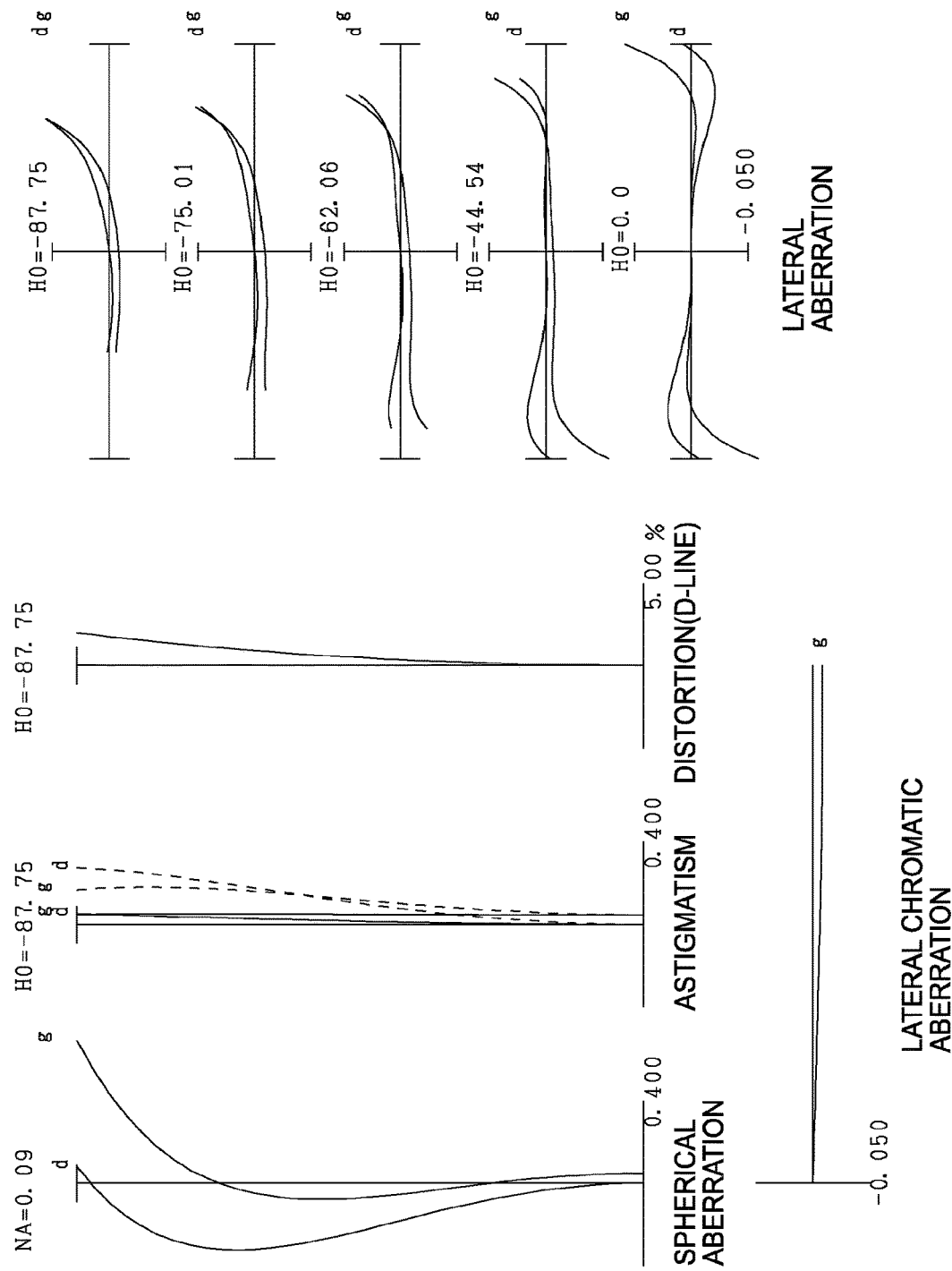
Figure 36A:
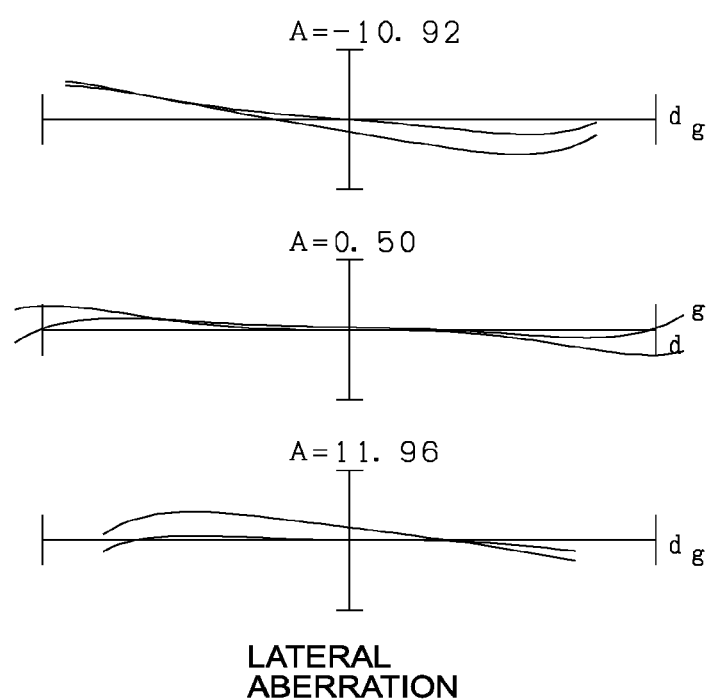
FIG. 36A, FIG. 36B, and FIG. 36C are each a meridional lateral aberration graph when shake compensation is performed in the wide angle end state, in the intermediate focal length state, and in the telephoto end state of the zoom optical system according to Example 9.
Figure 36B:
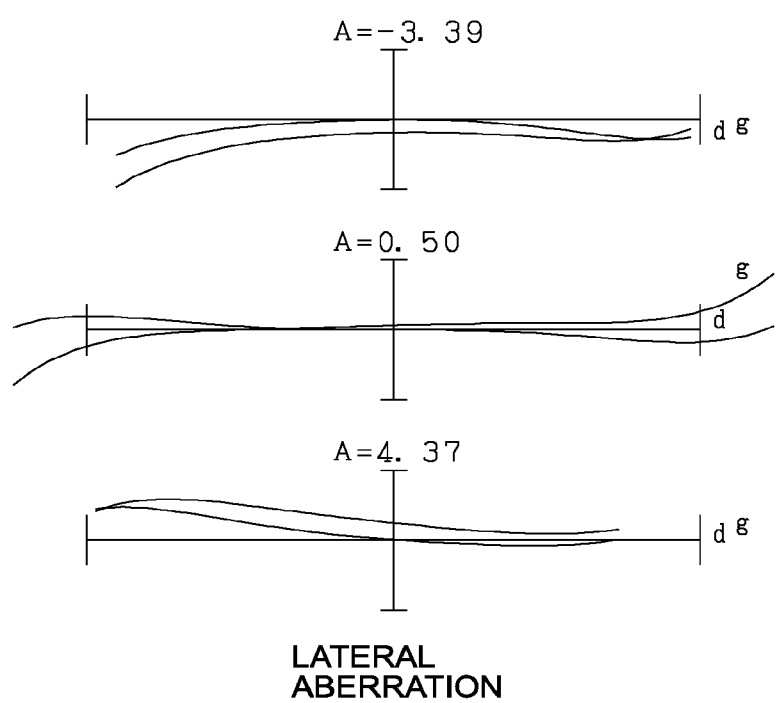
Figure 36C:
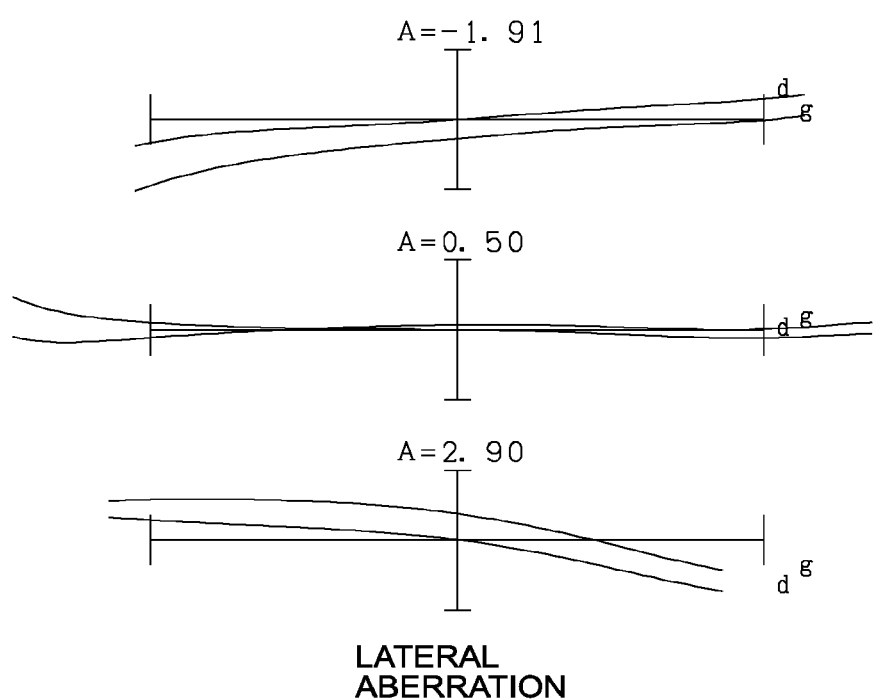

Conditional Expression (12) $f3\alpha/f3\beta = 0.1146$
Conditional Expression (13) $f1/(-f2) = 3.4331$
Conditional Expression (14) $f4/f2 = 1.2967$
Conditional Expression (15) $fVR/f2 = 1.0000$
Conditional Expression (16) $f3/(-f2) = 0.8698$
Conditional Expression (17) $f3/(-f4) = 0.6708$
Conditional Expression (18) $|m12|/fw = 1.0588$
Conditional Expression (19) $|m34|/fw = 0.2746$
Conditional Expression (20) $f3a/f3b = 0.1146$ FIG. 34A, FIG. 34B and FIG. 34C are each an aberration graph illustrating aberrations upon focusing on infinity in a wide angle end state, in an intermediate focal length state, and in a telephoto end state of the zoom optical system having a vibration proof function according to Example 9. FIG. 35A, FIG. 35B and FIG. 35C are each an aberration graph illustrating aberrations upon focusing on short distance (close range) in a wide angle end state, in an intermediate focal length state, and in a telephoto end state of the zoom optical system having a vibration proof function according to Example 9. FIG. 36A, FIG. 36B, and FIG. 36C are each a meridional lateral aberration graph when shake compensation is performed in the wide angle end state, in the intermediate focal length state, and in the telephoto end state of the zoom optical system having a vibration proof function according to Example 9. It is apparent from respective aberration graphs that the zoom optical system according to Example 9 has an excellent image forming performance capable of correcting various aberrations successfully from the wide angle end state to the telephoto end state, and also has an excellent image forming performance also upon focusing on a short distant object.

Example 10

Example 10 will be described with reference to FIG. 37 to FIG. 40 and Table 10. FIG. 37 is a drawing illustrating a lens configuration of a zoom optical system according to Example 10. The zoom optical system ZL (10) according to Example 10 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a negative refractive power. For zooming from the wide angle end state (W) to the telephoto end state (T), the first to fifth lens groups G1 to G5 move in the directions indicated by the arrows shown in FIG. 37. Also, for zooming from the wide angle end state (W) to the telephoto end state (T), the third lens group G3 and the fifth lens group G5 move synchronously.

The first lens group G1 consists of, in order from an object, a cemented lens consisting of a meniscus shaped negative lens L11 having a convex surface facing the object and the meniscus shaped first positive lens L12 having a convex surface facing the object, and a second positive lens L13 having a biconvex shape.

The second lens group G2 consists of, in order from an object, a positive lens L21 having a biconvex shape, first negative lens L22 having a biconcave shape disposed at an air distance from the positive lens L21, and a second negative lens L23 having a flat-concave shape with a concave surface facing the object side and disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a cemented lens consisting of a first positive lens L31 having a biconvex shape and a first negative lens L32 meniscus shaped with a convex surface facing the image side, a meniscus shaped second positive lens L33 having a convex surface facing the object, a cemented lens consisting of a meniscus shaped second negative lens L34 having a convex surface facing the object and a third positive lens L35 having a biconvex shape, and a fourth positive lens L36 having a biconvex shape. The aperture stop S is provided near the object side of the third lens group G3, and moves integrally with the third lens group G3 during zooming. In this example, the first positive lens L31, the first negative lens L32, and the second positive lens L33 constitute the first object side subgroup, and the second negative lens L34, the third positive lens L35, and the fourth positive lens L36 constitute the first image side subgroup. In the same manner, the first positive lens L31, the first negative lens L32, and the second positive lens L33 constitute the second object side subgroup, and the second negative lens L34, the third positive lens L35, and the fourth positive lens L36 constitute the second image side subgroup.

The fourth lens group G4 consists of, in order from an object, a positive lens L41 having a biconvex shape, and a negative lens L42 having a biconcave shape disposed at an air distance from the positive lens L41.

The fifth lens group G5 consists of, in order from an object, a negative lens L51 meniscus shaped with a convex surface facing the image side, and a positive lens L52 having a biconvex shape. An image surface I is disposed on the image side of the fifth lens group G5.

In the zoom optical system ZL (10) according to Example 10, focusing from the infinity to the short distant object is achieved by moving all the lenses in the fourth lens group G4 to the image side along the optical axis. Also, in the zoom optical system ZL (10) according to Example 10, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 10, the vibration proof coefficient is −1.15, the focal length is 51.25 mm. Therefore, the amount of movement of the vibration-proof lens group for correcting the rotational blur of 0.38° is −0.29 mm. In the intermediate focal length state of Example 10, the vibration proof coefficient is −2.17, the focal length is 150.00 mm. Therefore, the amount of movement of the vibration-proof lens group for correcting the rotational blur of 0.30° is −0.36 mm. In the telephoto end state of Example 10, the vibration proof coefficient is −3.00, the focal length is 243.75 mm. Therefore, the amount of movement of the vibration-proof lens group for correcting the rotational blur of 0.30° is −0.42 mm.

In Table 10 shown below, data values of the zoom optical system according to Example 10 will be shown.

TABLE 10

[General Data]

zooming rate 4.76
φ 19.1495
Δ 0.0000

|  | W | M | T |
|---|---|---|---|
| f | 51.25 | 150.00 | 243.75 |
| FNO | 4.60 | 5.44 | 6.40 |
| 2ω | 32.4 | 11.0 | 6.8 |
| Y | 14.75 | 14.75 | 14.75 |
| TL | 130.819 | 167.081 | 182.443 |
| BF | 14.319 | 30.464 | 45.827 |

[Lens Data]

| Surface Number | R | D | nd | νd |
|---|---|---|---|---|
| 1 | 146.12588 | 2.000 | 1.67270 | 32.2 |
| 2 | 54.86660 | 4.428 | 1.51680 | 63.9 |
| 3 | 312.17775 | 0.000 | | |
| 4 | 101.16252 | 3.952 | 1.58913 | 61.2 |
| 5 | −323.20365 | D5(variable) | | |
| 6 | 43.38347 | 3.058 | 1.84666 | 23.8 |
| 7 | −138.79221 | 0.687 | | |
| 8 | −376.50943 | 1.000 | 1.80610 | 41.0 |
| 9 | 28.98442 | 2.791 | | |
| 10 | −34.24602 | 1.000 | 1.80610 | 41.0 |
| 11 | ∞ | D11(variable) | | |
| 12 | ∞ | 1.500 | | (Aperture S) |
| 13 | 91.93396 | 4.597 | 1.61800 | 63.3 |
| 14 | −20.70690 | 1.000 | 1.85026 | 32.4 |
| 15 | −85.24875 | 0.000 | | |
| 16 | 26.52497 | 2.766 | 1.83481 | 42.7 |
| 17 | 53.58887 | 9.298 | | |
| 18 | 1031.02320 | 1.000 | 1.83481 | 42.7 |
| 19 | 19.27465 | 4.338 | 1.49782 | 82.6 |
| 20 | −49.99316 | 0.000 | | |
| 21 | 71.99304 | 2.412 | 1.79504 | 28.7 |
| 22 | −115.55384 | D22(variable) | | |
| 23 | 169183.09000 | 2.296 | 1.72825 | 28.4 |
| 24 | −37.98446 | 0.527 | | |
| 25 | −42.61955 | 1.000 | 1.83481 | 42.7 |
| 26 | 61.50123 | D26(variable) | | |
| 27 | −19.99185 | 1.000 | 1.83481 | 42.7 |
| 28 | −44.54325 | 0.000 | | |
| 29 | 106.57684 | 2.315 | 1.84666 | 23.8 |
| 30 | −279.81339 | BF | | |

[Lens Group Data]

| Group | Starting Surface | Focal Length |
|---|---|---|
| G1 | 1 | 130.24 |
| G2 | 6 | −40.13 |
| G3 | 13 | 34.55 |
| G4 | 23 | −73.25 |
| G5 | 27 | −88.38 |

[Variable Distance Data]

| | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0550 | −0.1542 | −0.2580 |
| D0 | ∞ | ∞ | ∞ | 869.21 | 832.89 | 817.52 |
| D5 | 1.500 | 42.947 | 53.964 | 1.500 | 42.947 | 53.964 |
| D11 | 33.847 | 12.518 | 1.500 | 33.847 | 12.518 | 1.500 |
| D22 | 20.245 | 9.019 | 2.000 | 23.641 | 18.765 | 16.987 |

TABLE 10-continued

| | | | | | | |
|---|---|---|---|---|---|---|
| D26 | 7.944 | 19.170 | 26.189 | 4.548 | 9.423 | 11.201 |
| BF | 14.319 | 30.464 | 45.827 | 14.319 | 30.464 | 45.827 |

[Conditional Expression Corresponding Value]

Conditional Expression (12) f3α/f3β = 0.5679
Conditional Expression (13) f1/(−f2) = 3.2458
Conditional Expression (14) f4/f2 = 1.8255
Conditional Expression (15) fVR/f2 = 1.0000
Conditional Expression (16) f3/(−f2) = 0.8610
Conditional Expression (17) f3/(−f4) = 0.4716
Conditional Expression (18) |m12|/fw = 1.0237
Conditional Expression (19) |m34|/fw = 0.3560
Conditional Expression (20) f3a/f3b = 0.5679

Figure 38A:
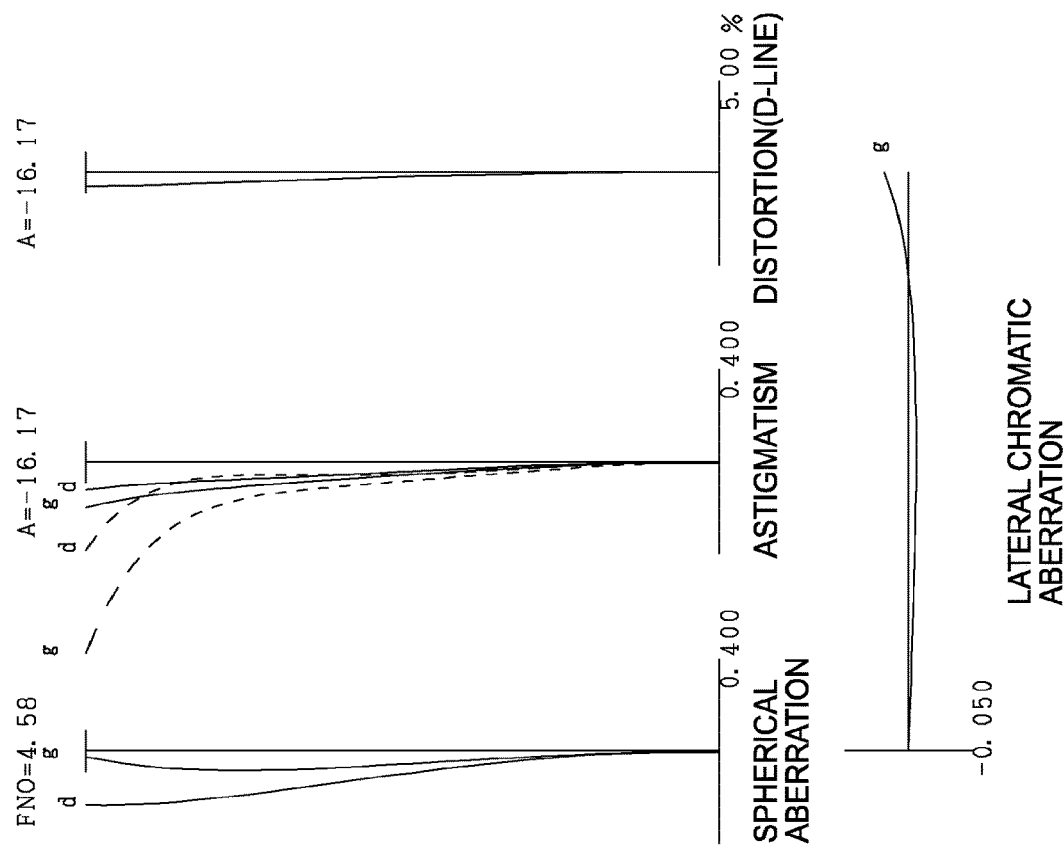
Figure 38B:
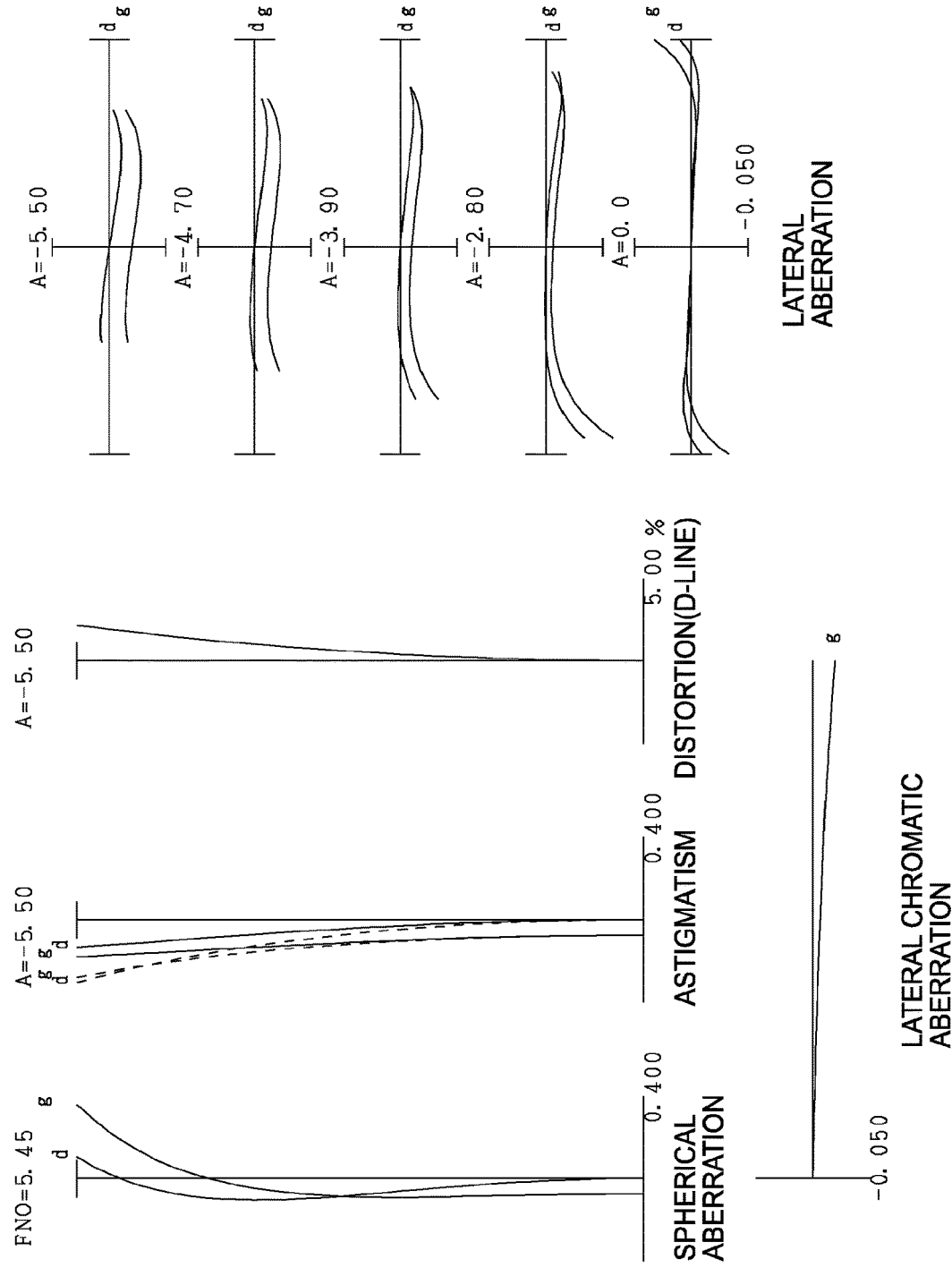
Figure 40A:
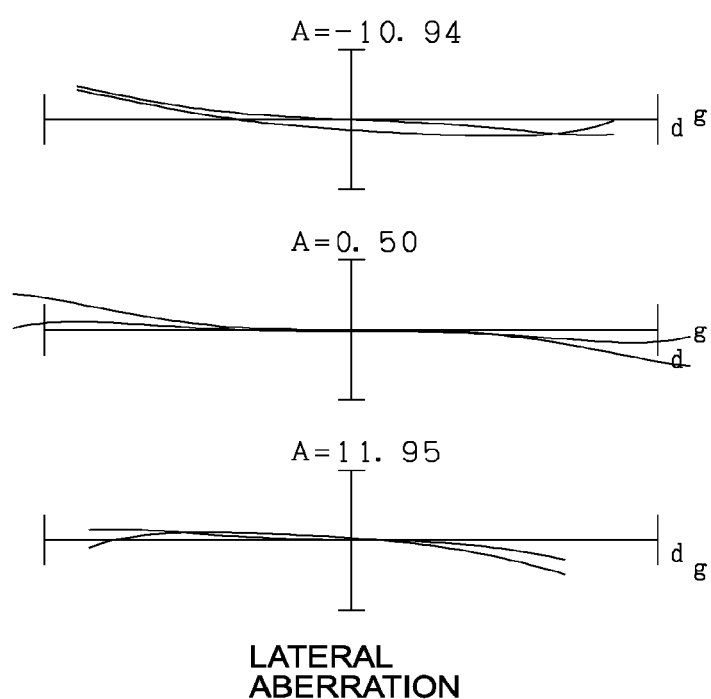
FIG. 40A, FIG. 40B, and FIG. 40C are each a meridional lateral aberration graph when shake compensation is performed in the wide angle end state, in the intermediate focal length state, and in the telephoto end state of the zoom optical system according to Example 10.
Figure 40B:
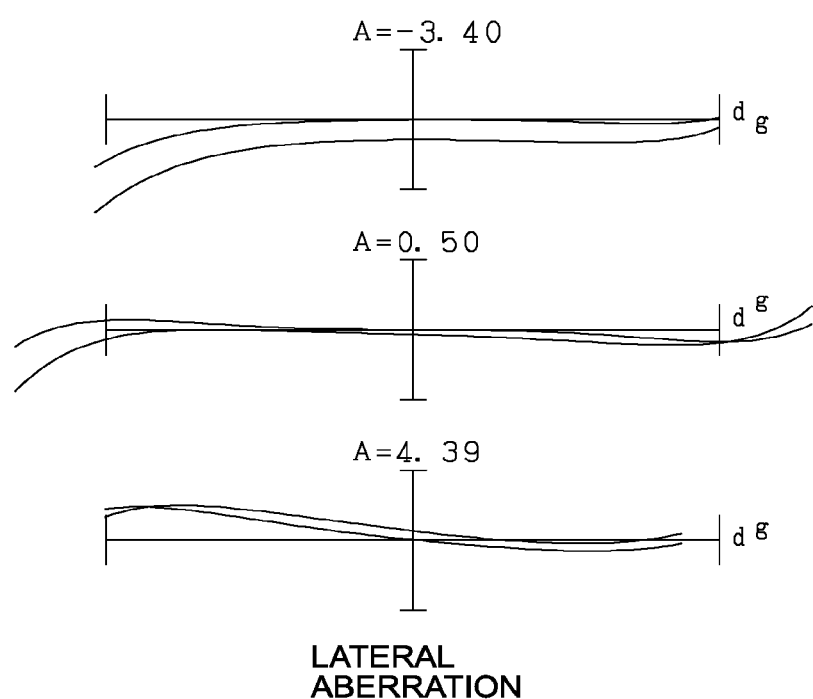
Figure 40C:
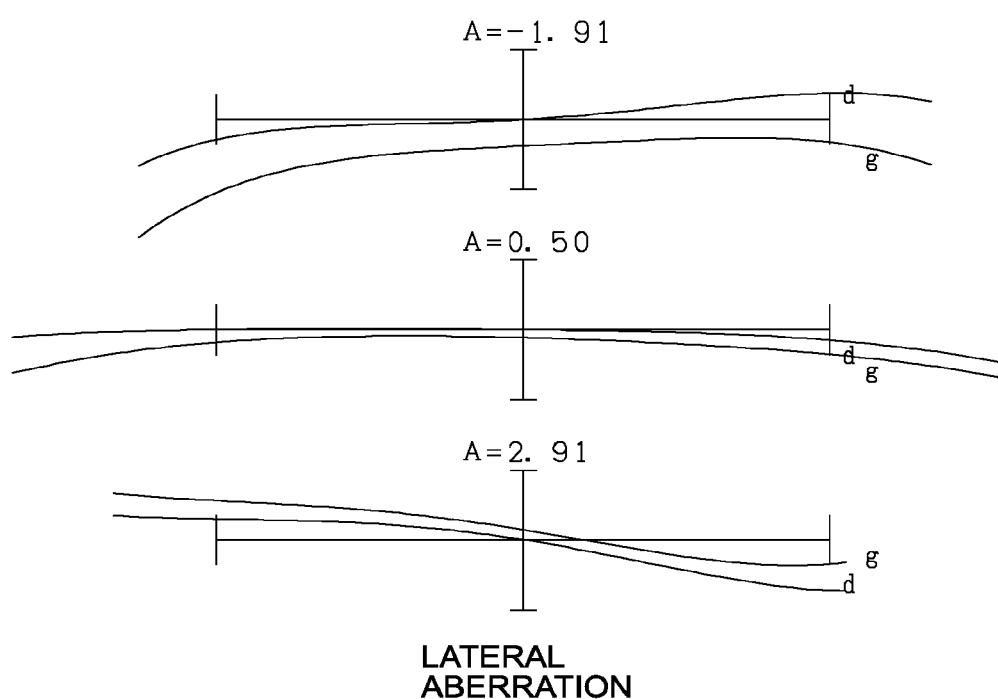

FIG. 38A, FIG. 38B and FIG. 38C are each an aberration graph illustrating aberrations upon focusing on infinity in a wide angle end state, in an intermediate focal length state, and in a telephoto end state of the zoom optical system having a vibration proof function according to Example 10. FIG. 39A, FIG. 39B and FIG. 39C are each an aberration graph illustrating aberrations upon focusing on short distance (close range) in a wide angle end state, in an intermediate focal length state, and in a telephoto end state of the zoom optical system having a vibration proof function according to Example 10. FIG. 40A, FIG. 40B, and FIG. 40C are each a meridional lateral aberration graph when shake compensation is performed in the wide angle end state, in the intermediate focal length state, and in the telephoto end state of the zoom optical system having a vibration proof function according to Example 10. It is apparent from respective aberration graphs that the zoom optical system according to Example 10 has an excellent image forming performance capable of correcting various aberrations successfully from the wide angle end state to the telephoto end state, and also has an excellent image forming performance also upon focusing on a short distant object.

According to the Examples 1 to 8, a telephoto type zoom optical system having low degree of decentering sensitivity and less variation in optical performance based on the assembly accuracy at the time of manufacture is achieved. According to Examples 1 to 10, a telephoto type zoom optical system having a higher optical performance is achieved. According to Examples 1 to 3 and Example 5, a telephoto type zoom optical system having a higher zooming rate is achieved.

In this specification, each example described above shows a specific example of each embodiment, and the embodiments are not limited thereto.

It should be noted that the following contents can be suitably employed within the range in which optical performance of the optical system of each embodiment is not impaired.

Although a 4-groups configuration and a 5-groups configuration are described as examples of the numerical values of the zoom optical system in each embodiment. However, the present application is not limited thereto, and the zoom optical systems with other number of groups (for example, 6 groups) configuration are also applicable. Specifically, there may be provided a configuration in which 2 or more lens groups having positive or negative refractive power are disposed between the first lens group and the lens group having the positive lens component. Also, a configuration in which two or more lens groups having positive or negative refractive power are disposed closer to an image than the lens group having the positive lens component is also applicable. Further, it is possible to add a lens or a lens group to a position closest to the object or a position closest to the image surface of the zoom optical system of each embodiment. It should be noted that the lens group means a portion having at least one lens separated at an air distance that varies during zooming of the lens group.

In the zoom optical system of each embodiment, the focusing lens group may be configured to focus from an infinite distant object to a short distant object by moving a single or a plurality of lens groups or a partial lens group in the optical axis direction instead of the at least part of lenses in the image side negative lens group. The focusing lens group may be applied to autofocusing, and is also suitable to the motor driving for autofocusing (using a stepping motor or the like).

The lens surface may be formed of a spherical surface or a flat surface, or even of an aspherical surface. In particular, Aberration correction by using an aspherical surface for a positive lens component arranged so as to oppose the image side of the aperture stop enables reduction of the number of lenses of the lens group including the aperture stop (or the lens group disposed so as to oppose the image side of the aperture stop in the case where the aperture stop moves solely during zooming). In addition, adjustment of aberration correction and manufacture sensitivity is enabled by using the aspherical surface for the positive lens component disposed so as to oppose the image side of the aperture stop and also by using an air distance in the lens group including the aperture stop (or the lens group disposed so as to oppose the image side of the aperture stop in the case where the aperture stop moves solely during zooming). When the lens surface is a spherical surface or a flat surface, machining and assembly adjustment are easy. It is therefore preferable because deterioration of optical performance due to errors in machining and assembly adjustment is prevented. In addition, it is preferable because deterioration of descriptive performance is not much even when the image surface is displaced.

When the lens surface is an aspherical surface, the aspherical surface may be any of an aspherical surface formed by grinding, a glass mold aspherical surface formed of glass into an aspherical shape by a mold, and a composite type aspherical surface fabricated by forming a resin into an aspherical surface shape on a surface of glass. The lens surface may be a diffraction surface, and the lenses may be gradient index lenses (GRIN lenses) or plastic lenses.

The aperture stop is preferably disposed between the second lens group and the third lens group, but may be disposed in the third lens group or on the image side of the third lens group. Alternatively, a member as the aperture stop may not be provided and a lens frame may be used instead to perform the role of the aperture stop.

Each lens surface may be coated with an antireflection film having a high transmittance in a wide wavelength region for reducing flare and ghost and achieving a high contrast optical performance. Accordingly, the flare and the ghost may be reduced, and a high optical performance with a high contrast is achieved.

EXPLANATION OF NUMERALS AND CHARACTERS

G1 first lens group
G2 second lens group (object side negative lens group)
G3 third lens group
G4 fourth lens group (image side negative lens group)
G5 fifth lens group
I image surface
S aperture stop

The invention claimed is:
1. A zoom optical system comprising:
a first lens group having positive refractive power, a second lens group disposed on an image side of the first lens group and having negative refractive power, a third lens group disposed on an image side of the second lens group and having positive refractive power, a fourth lens group disposed on an image side of the third lens group and having negative refractive power, and a final lens group disposed on an image side of the fourth lens group and also disposed closest to an image,
wherein
a distance between the first lens group and the second lens group, a distance between the second lens group and the third lens group, and a distance between the third lens group and the fourth lens group change during zooming,
the first lens group is moved along an optical axis during zooming,
the second lens group comprises a vibration proof group capable of moving with a displacement component in a direction perpendicular to the optical axis and having negative refractive power,
a focusing lens group having negative refractive power is included,
the focusing lens group is moved along the optical axis during focusing,
the final lens group is disposed on an image side of the focusing lens group, and
the vibration proof group comprises, in order from an object, a negative lens, an air gap and a cemented lens of a negative lens and a positive lens.
2. The zoom optical system according to claim 1, further comprising an aperture stop disposed on an image side of the second lens group.
3. The zoom optical system according to claim 2, wherein a positive lens is disposed on an image side of the aperture stop.
4. The zoom optical system according to claim 1, wherein the third lens group comprises, in order from an object, a positive lens, an air gap, a cemented lens of a negative lens and a positive lens, an air gap, and a positive lens.
5. The zoom optical system according to claim 1, wherein the third lens group has an aperture stop at a closest position to an object, and the aperture stop is moved together with the third lens group during zooming.

6. The zoom optical system according to claim 1, wherein
the third lens group consists of an object side subgroup having positive refractive power and an image side subgroup having positive refractive power,
a lens component including a negative lens is disposed at a position closest to the object in the image side subgroup, and
the following conditional expression is satisfied:

$$0.06 < f3\alpha/f3\beta < 2.60$$

where
f3α: a focal length of the object side subgroup, and
f3β: a focal length of the image side group.
7. The zoom optical system according to claim 1, wherein
the third lens group consists of an object side subgroup having positive refractive power and an image side subgroup having positive refractive power,
an air distance between the object side subgroup and the image side subgroup is a maximum air distance among all air distances between lenses in the third lens group, and
the following conditional expression is satisfied:

$$0.06 < f3\alpha/f3\beta < 2.60$$

where
f3α: a focal length of the object side subgroup, and
f3β: a focal length of the image side group.
8. The zoom optical system according to claim 1, wherein the following conditional expression is satisfied:

$$0.93 < fVR/f2 < 2.50$$

where
fVR: a focal length of the vibration proof group, and
f2: a focal length of the second lens group.
9. The zoom optical system according to claim 1, wherein the following conditional expression is satisfied:

$$0.40 < f3/(-f2) < 2.60$$

where
f2: a focal length of the second lens group, and
f3: a focal length of the third lens group.
10. The zoom optical system according to claim 1, wherein the following conditional expression is satisfied:

$$0.40 < f3/(-f4) < 2.40$$

where
f3: a focal length of the third lens group, and
f4: a focal length of the fourth lens group.
11. The zoom optical system according to claim 1, wherein the following conditional expression is satisfied:

$$0.30 < |m12|/fw < 2.30$$

where
|m12|: an absolute value of the amount of change in distance from a lens surface closest to the image in the first lens group to a lens surface closest to an object in the second lens group on the optical axis during zooming from a wide-angle end state to a telephoto end state, and
fw: a focal length of the zoom optical system in the wide-angle end state.
12. The zoom optical system according to claim 1, wherein
a single lens having negative refractive power is disposed closest to the image.

13. An optical apparatus comprising the zoom optical system according to claim 1.

14. The zoom optical system according to claim 1, wherein
the first lens group and the second lens group are disposed adjacent to each other having only air distance therebetween.

15. A method for manufacturing a zoom optical system comprising:
arranging, in a lens barrel, a first lens group having positive refractive power, a second lens group disposed on an image side of the first lens group and having negative refractive power, a third lens group disposed on an image side of the second lens group and having positive refractive power, a fourth lens group disposed on an image side of the third lens group and having negative refractive power, and a final lens group disposed on an image side of the fourth lens group and also disposed closest to an image,
arranging the first to fourth lens groups such that a distance between the first lens group and the second lens group, a distance between the second lens group and the third lens group, and a distance between the third lens group and the fourth lens group change during zooming,
arranging the first lens group to be movable along an optical axis during zooming,
configuring the second lens group to comprise a vibration proof group capable of moving with a displacement component in a direction perpendicular to the optical axis and having negative refractive power, and
providing a focusing lens group having negative refractive power to be moved along the optical axis during focusing, with the final lens group being disposed on an image side of the focusing lens group,
the method further comprising at least one of the following features A and B,
the feature A including:
configuring the vibration proof group to comprise, in order from an object, a negative lens, an air gap and a cemented lens of a negative lens and a positive lends,
the feature B including:
configuring the final lens group so as to have a negative refractive power.

16. A zoom optical system comprising:
a first lens group having positive refractive power, a second lens group disposed on an image side of the first lens group and having negative refractive power, a third lens group disposed on an image side of the second lens group and having positive refractive power, a fourth lens group disposed on an image side of the third lens group and having negative refractive power, and a final lens group disposed on an image side of the fourth lens group and also disposed closest to an image,
wherein
a distance between the first lens group and the second lens group, a distance between the second lens group and the third lens group, and a distance between the third lens group and the fourth lens group change during zooming,
the first lens group is moved along an optical axis during zooming,
the second lens group comprises a vibration proof group capable of moving with a displacement component in a direction perpendicular to the optical axis and having negative refractive power,
a focusing lens group having negative refractive power is included,
the focusing lens group is moved along the optical axis during focusing,
the final lens group is disposed on an image side of the focusing lens group, and
the final lens group has negative refractive power.

17. The zoom optical system according to claim 16, wherein
the first lens group and the second lens group are disposed adjacent to each other having only air distance therebetween.

* * * * *